United States Patent [19]
North et al.

[11] Patent Number: 6,055,619
[45] Date of Patent: Apr. 25, 2000

[54] CIRCUITS, SYSTEM, AND METHODS FOR PROCESSING MULTIPLE DATA STREAMS

[75] Inventors: Gregory Allen North; Douglas D. Gephardt; James D. Barnette; James D. Austin; Scott Thomas Haban; Thomas Saroshan David, all of Austin; Brian Christopher Kircher, Round Rock, all of Tex.

[73] Assignee: Cirrus Logic, Inc.

[21] Appl. No.: 08/797,232

[22] Filed: Feb. 7, 1997

[51] Int. Cl.[7] .................................................. G06F 17/00
[52] U.S. Cl. .............................. 712/36; 712/35; 704/270
[58] Field of Search ..................... 712/35, 36; 704/270

[56] References Cited

U.S. PATENT DOCUMENTS

| | | | |
|---|---|---|---|
| 4,135,249 | 1/1979 | Irwin | 364/758 |
| 4,187,549 | 2/1980 | Bond et al. | 364/746 |
| 4,276,595 | 6/1981 | Brereton et al. | 364/200 |
| 4,367,525 | 1/1983 | Brown et al. | 364/200 |
| 4,410,940 | 10/1983 | Carlson et al. | 364/200 |
| 4,575,812 | 3/1986 | Kloker et al. | 364/760 |
| 4,631,671 | 12/1986 | Kawashifa | 364/200 |
| 4,703,449 | 10/1987 | Berman | 364/900 |
| 4,716,523 | 12/1987 | Burus et al. | 364/200 |
| 4,722,068 | 1/1988 | Kuroda et al. | 364/757 |
| 4,736,335 | 4/1988 | Barkan | 364/758 |
| 4,748,582 | 5/1988 | New et al. | 364/754 |
| 4,800,524 | 1/1989 | Roesgen | 364/900 |
| 4,811,269 | 3/1989 | Hirose et al. | 364/754 |
| 4,847,750 | 7/1989 | Daniel | 364/200 |
| 4,876,660 | 10/1989 | Owen et al. | |
| 4,893,268 | 1/1990 | Denman et al. | 364/759 |
| 4,930,069 | 5/1990 | Batra et al. | 364/200 |
| 4,991,131 | 2/1991 | Yeh et al. | 364/748 |
| 4,992,934 | 2/1991 | Portanova et al. | 364/200 |
| 4,999,769 | 3/1991 | Costes et al. | 364/200 |
| 5,003,465 | 3/1991 | Chisholm et al. | 364/200 |
| 5,005,121 | 4/1991 | Nakuda et al. | 364/200 |
| 5,027,374 | 6/1991 | Rossmann | 375/94 |
| 5,056,010 | 10/1991 | Huang | 364/200 |

(List continued on next page.)

FOREIGN PATENT DOCUMENTS

| | | |
|---|---|---|
| 348113A2 | 12/1989 | European Pat. Off. . |
| 375794A1 | 7/1990 | European Pat. Off. . |
| 378423A2 | 7/1990 | European Pat. Off. . |
| 550163A1 | 7/1992 | European Pat. Off. . |
| 576409A1 | 12/1993 | European Pat. Off. . |
| 617361A2 | 9/1994 | European Pat. Off. . |
| 671691A2 | 9/1995 | European Pat. Off. . |
| 798630A1 | 10/1997 | European Pat. Off. . |
| 473805A1 | 3/1998 | European Pat. Off. . |
| 640912A1 | 3/1998 | European Pat. Off. . |
| 282825A | 9/1998 | European Pat. Off. . |

OTHER PUBLICATIONS

P. Sadayappan et al.: "Task Distribution on a Hierarchical Multicomputer" COM PCON Fall '84. The Small Computer, Whole Document.

Sohie, G.R.L., et al. "A Digital Signal Processor with IEEE Floating Point Arithmatic" IEEE Micro. vol. 8, No. 6 Dec. 1988 pp. 49–67.

(List continued on next page.)

*Primary Examiner*—Eric Coleman
*Attorney, Agent, or Firm*—James J. Murphy, Esq.; J. P. Violette, Esq.

[57] ABSTRACT

An audio information processing subsystem 200 is disclosed which includes a stream processor 100 for simultaneously processing multiple streams of audio data. Processing subsystem 200 also includes a program memory 202 coupled to stream processor 100 for storing instructions for controlling processing system 200 and a data memory 203/204 also coupled to stream processor 100. Additionally, a direct memory access circuitry 208 is provided for controlling direct memory accesses to a selected one of program memory 202 and data memory 203/204.

30 Claims, 64 Drawing Sheets

U.S. PATENT DOCUMENTS

| | | | |
|---|---|---|---|
| 5,142,675 | 8/1992 | Oi et al. | 395/650 |
| 5,155,830 | 10/1992 | Kurashige | 395/425 |
| 5,163,136 | 11/1992 | Richmond | 395/275 |
| 5,179,531 | 1/1993 | Yamaki | 364/736 |
| 5,293,596 | 3/1994 | Toyokura et al. | 395/400 |
| 5,333,274 | 7/1994 | Amini et al. | 395/275 |
| 5,355,462 | 10/1994 | Rousseau | 395/400 |
| 5,377,325 | 12/1994 | Chan | 395/200 |
| 5,381,360 | 1/1995 | Shridhar et al. | 364/746 |
| 5,404,522 | 4/1995 | Carmon | 395/650 |
| 5,414,815 | 5/1995 | Schwede | 395/273 |
| 5,448,706 | 9/1995 | Fleming et al. | 395/421.07 |
| 5,473,756 | 12/1995 | Traylor | 395/250 |
| 5,483,239 | 1/1996 | Arczynski | 341/141 |
| 5,490,257 | 2/1996 | Hoberman et al. | 395/427 |
| 5,491,793 | 2/1996 | Somasundarum et al. | 395/183.21 |
| 5,513,374 | 4/1996 | Baji | 395/846 |
| 5,517,436 | 5/1996 | Andreas | 708/524 |
| 5,535,417 | 7/1996 | Baji . | |
| 5,550,767 | 8/1996 | Taborn et al. | 364/745 |
| 5,574,934 | 11/1996 | Mirashrafi | 364/231.4 |
| 5,633,897 | 5/1997 | Fettweis | 375/341 |
| 5,644,787 | 7/1997 | Nakamura et al. | 395/853 |
| 5,652,903 | 7/1997 | Weng | 395/800.35 |
| 5,689,691 | 11/1997 | Mann | 395/557 |
| 5,889,480 | 3/1999 | Kim | 395/889 |

OTHER PUBLICATIONS

Kohn, L., et al. "The Visual Instruction Set (VIS) in UltraSparctm" IEEE 1995 pp. 462–469 Conf. 40, Mar. 1995 XP000545454.

Patent Abstracts of Japan, vol. 7, No. 73 (p–186) Mar. 25, 1983 Takahashi Rikiyoshi/Inventor.

Gerber, C., et al., "Peripheral Component Interconnect (PCI) Interface with the Quick Logic QL1 16×24 B FPGA" Western Elec. Show & Convention, Anaheim, Sep. 27–29, 1994 & IEEE.

"Software Controlled Wrap–Around Buffer" IBM Tech. Discl. Ball. vol. 28, No. 12, May 1986 pp. 5314–5316.

Matsushita, U., et. al. "A 32×24 Bit Digital Audio Signal Processor" IEEE Transaction on Consumer Elect. vol. 35, No. 4 pp. 785–791, Nov. 1989.

Figure 3A

| [39:36] | [35:26] | [25:23] | [22:19] | [18:7] | [6:0] |
|---|---|---|---|---|---|
| mOp | mpy/mem/moveOperands | aOp | addOpers | aluOperands[18:7] | aluOpcode[6:0] |

Figure 3B

| [39:36] | [35:26] | [25:23] | [22:19] | [18:7] | [6:0] |
|---|---|---|---|---|---|
| mOp | mpy/moveOperands | 000 | SIDX8[7:4] | aluOperands[18:7] | aluOpcode[6:0] |

Figure 3C

| [39:32] | 31 | [30:7] | [6:0] |
|---|---|---|---|
| 0000.0001 | | wideOperands[30:7] | wideOpcode[6:0] |

Figure 3D

| [39:38] | [37:26] | [25:19] | [18:7] | [6:0] |
|---|---|---|---|---|
| 11 | aluOperands2[18:7] | aluOpcode2[6:0] | aluOperands1[18:7] | aluOpcode1[6:0] |

Figure 6B

| Row | Col. 0 | Col. 1 | Col. 2 | Col. 3 | Col. 4 | Col. 5 | Col. 6 | Col. 7 |
|---|---|---|---|---|---|---|---|---|
| 0 | Reserved | Stream 1 | Stream 2 | | | | Stream 6 | Reserved |
| 1 | | | | | | | | |
| 2 | | | | | | | | |
| 3 | | | | | | | | |
| 4 | Stream 32 | | | | | | | Stream 39 |
| 5 | | | | | | | | |
| 6 | | | | | | | | |
| 7 | | | | | | | | |
| 8 | | | | | | | | |
| 9 | | | | | | | | |
| 10 | | | | | | | | Stream 88 |
| 11 | Stream 95 | | | | | | | |

Figure 7

| 31 30 | 29 | [28:24] | [23:16] | 15 14 13 12 11 10 9 8 | 7 6 | 5 | 4 | [3:0] |
|---|---|---|---|---|---|---|---|---|
| DMA prio | D | maxDMAsize | streamNum | dir | ds | sh1 rev | Cy | mod |

Figure 8

| | [31:16] | [15:0] |
|---|---|---|
| rsa0: | | fracBytePtr[15:0] |
| rsa1: | sampleBytePtr[15:0] | |
| rsa2:i2 | | sampleByteIncr[15:0] |
| rsa3: | | |
| rsi0: | sampleByteIncr[15:0] | fracByteIncr[15:0] |
| rsi1: | | |

Figure 9

| 31 | 30 | [29:20] | [19:16] | [15:2] | [1:0] |
|---|---|---|---|---|---|
| E | SE | Reserved for future use | Mem ID | Next DMA sample dword address | byOfs |

Figure 13A

| 31 30 29 28 27 26 25 24 23 22 21 20 19 18 17 16 15 14 13 12 11 10 9 8 7 6 5 4 3 2 1 0 |
|---|
| Host source byte address |

Figure 13B

| 31 30 | 29 28 27 26 25 24 23 22 21 20 | 19 18 17 16 | 15 14 13 12 11 10 9 8 7 6 5 4 3 2 1 0 |
|---|---|---|---|
| ERR / END | | Source Memory ID | DSP source "byte" address |

Figure 13C

| 31 30 29 28 27 26 25 24 23 22 21 20 19 18 17 16 15 14 13 12 11 10 9 8 7 6 5 4 3 2 1 0 |
|---|
| Host destination byte address |

Figure 13D

| 31 30 | 29 28 27 26 25 24 23 22 21 20 | 19 18 17 16 | 15 14 13 12 11 10 9 8 7 6 5 4 3 2 1 0 |
|---|---|---|---|
| ERR / END | | Destination Memory ID | DSP destination "byte" address |

Figure 17G

| 31 30 29 28 27 26 25 24 23 22 21 20 19 18 17 16 15 14 13 12 11 10 9 8 7 6 5 4 3 2 1 0 |
|---|
| Physical address of the first byte on the next page |

Figure 17H

| 31 30 29 28 | 27 | 26 | 25 24 23 22 21 20 19 18 17 16 | 15 14 13 12 | 11 10 9 8 7 6 5 4 3 | 2 1 0 |
|---|---|---|---|---|---|---|
| SV page | L E | S E | Sample-end byte offset in next page, if next page is the last page. | | Page-map entry offset for next page, if !sample-end | |

Figure 17I

| 31 30 29 28 27 26 25 24 23 22 21 20 19 18 17 16 15 14 13 12 11 10 9 8 7 6 5 4 3 2 1 0 |
|---|
| Physical byte-address of loop-begin (required if LF ≠ 0) |

Figure 17J

| 31 30 29 28 27 26 25 24 23 22 21 20 19 18 17 16 15 14 13 12 11 10 9 8 7 6 5 4 3 2 1 0 |
|---|
| Physical byte-address of the page after loop-begin (required if LF ≥ 2) |

Figure 17K

| 31 30 29 28 27 26 25 24 23 22 21 20 19 18 17 16 15 14 13 12 | 11 10 9 8 7 6 5 4 3 | 2 1 0 |
|---|---|---|
| Host-page containing page-mapping table (required for scatter/gather) | Page-map entry offset for 2nd page after loop-begin (required if LF=3) | |

```
                    PCIVDD[7]  PCIGND[6]              PCIVDD[5]
                     PCIGND[7]  PCIVDD[6]
                      AD[0]      CBE[0]#
                       AD[1]      AD[8]
                        AD[2]     AD[9]
                         AD[3]    AD[10]
                          AD[4]   AD[11]
                           AD[5]  AD[12]
                            AD[6] AD[13]
                             AD[7]
                  50 49 48 47 46 45 44 43 42 41 40 39 38 37 36 35 34 33 32 31
```

|          |    |                          |    |           |
|---------:|---:|:------------------------:|---:|:----------|
|    TEST# | 51 |                          | 30 | PCIGND[5] |
|     JACX | 52 |                          | 29 | AD[14]    |
|     JACY | 53 |                          | 28 | AD[15]    |
|     JBCX | 54 |                          | 27 | CBE[1]#   |
|     JBCY | 55 |                          | 26 | PAR       |
| JAB1/SDO2| 56 |                          | 25 | SERR#     |
| JAB2/SDO3| 57 |                          | 24 | PERR#     |
|JBB1/LRCLK| 58 |                          | 23 | STOP#     |
| JBB2/MCLK| 59 |                          | 22 | PCIGND[4] |
|   MIDIIN | 60 |     PCI Accelerator      | 21 | PCIVDD[4] |
|  CVDD[2] | 61 |     100-pin PQFP         | 20 | DEVSEL#   |
|  CGND[2] | 62 |                          | 19 | CVDD[0]   |
|  MIDIOUT | 63 |                          | 18 | CGND[0]   |
|  CVDD[3] | 64 |                          | 17 | TRDY#     |
|  CGND[3] | 65 |          100             | 16 | IRDY#     |
|SDIN2/GPIO| 66 |                          | 15 | FRAME#    |
|  CGND[4] | 67 |                          | 14 | CBE[2]#   |
|  CVDD[4] | 68 |                          | 13 | CGND[1]   |
|   CRYVDD | 69 |                          | 12 | CVDD[1]   |
|VOLUP/XTALI| 70|                          | 11 | AD[16]    |
|VOLDN/XTALO| 71|                          | 10 | AD[17]    |
|   CRYGND | 72 |                          |  9 | AD[18]    |
|  VDD5REF | 73 |                          |  8 | PCIVDD[3] |
|ABITCLK/SCLK|74|                          |  7 | PCIGND[3] |
|   ASDOUT | 75 |                          |  6 | AD[19]    |
|    ASDIN | 76 |                          |  5 | AD[20]    |
|ASYNC/FSYNC|77 |                          |  4 | AD[21]    |
|    ARST# | 78 |                          |  3 | AD[22]    |
|EECLK/GPOUT|79 |                          |  2 | AD[23]    |
|EEDAT/GPIO2|80 |                          |  1 | PCIGND[2] |

```
              81 82 83 84 85 86 87 88 89 90 91 92 93 94 95 96 97 98 99 100
              INTA#                                                  PCIVDD[2]
               RST#                                                IDSEL
                PCICLK                                          CBE[3]#
                 PCI_GNT#                                     AD[24]
                  PCI_REQ#                                  AD[25]
                   PCIVDD[0]                              AD[26]
                    PCIGND[0]                           PCIVDD[1]
                     AD[31]                           PCIGND[1]
                      AD[30]                        AD[27]
                       AD[29]                     AD[28]
```

Figure 24

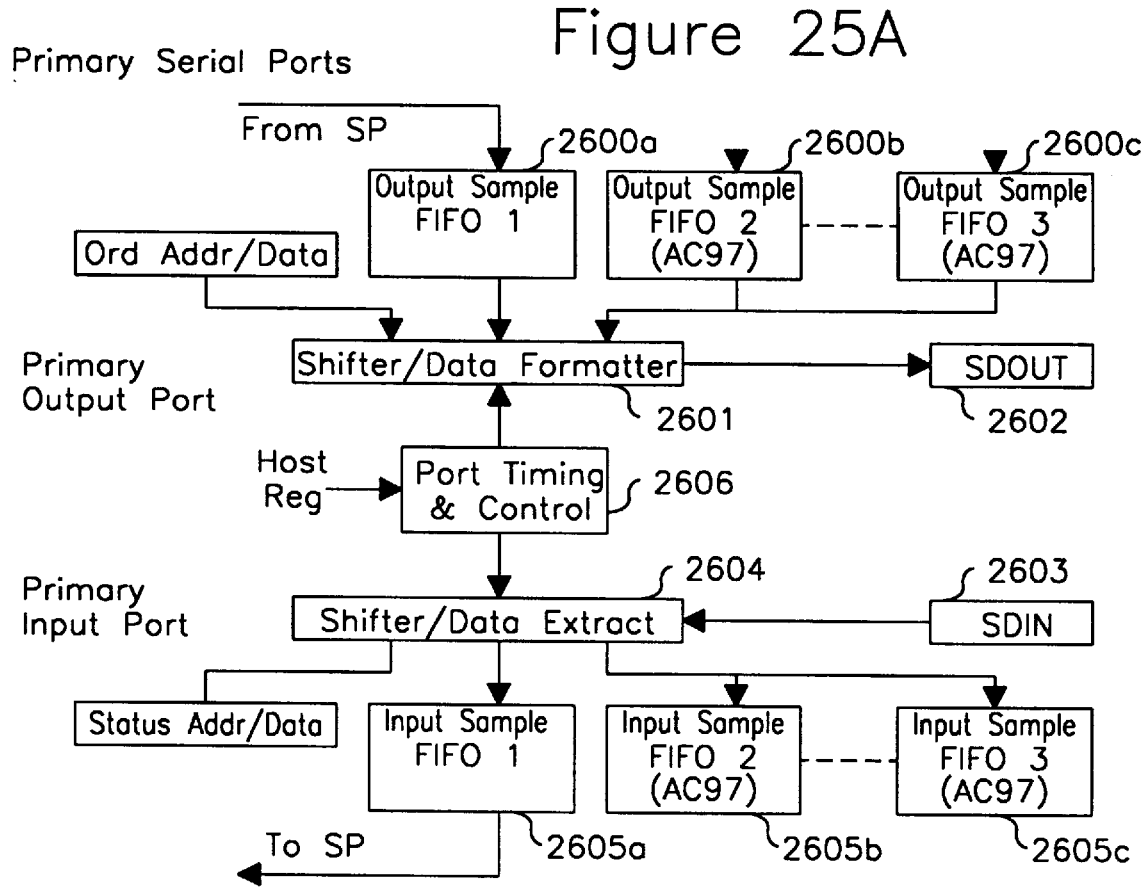
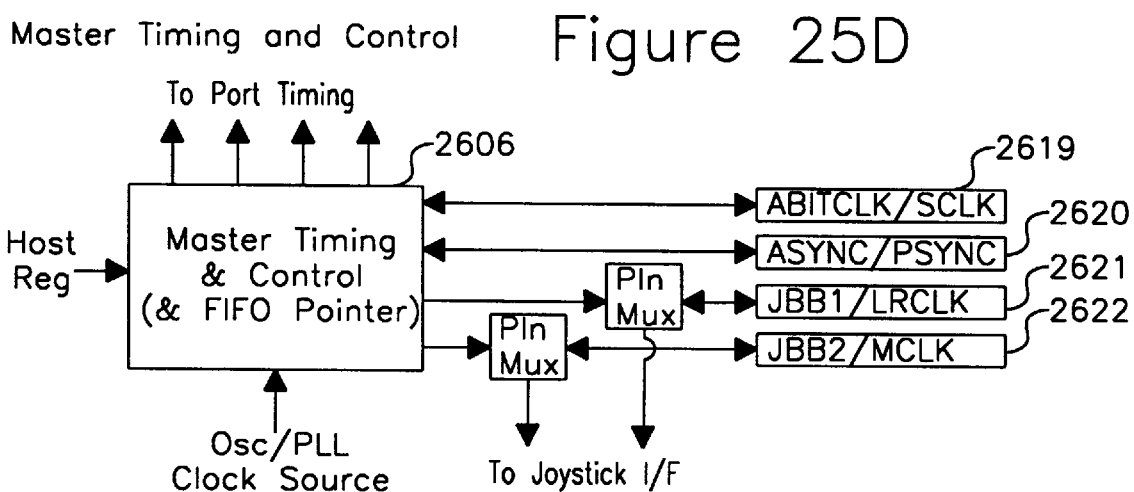

Figure 54B

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| PC2V31 | PC2V30 | PC2V29 | PC2V28 | PC2V27 | PC2V26 | PC2V25 | PC2V24 | PC2V23 | PC2V22 | PC2V21 | PC2V20 | PC2V19 | PC2V18 | PC2V17 | PC2V16 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| PC2V15 | PC2V14 | PC2V13 | PC2V12 | PC2V11 | PC2V10 | PC2V9 | PC2V8 | PC2V7 | PC2V6 | PC2V5 | PC2V4 | PC2V3 | PC2V2 | PC2V1 | PC2V0 |

Figure 38

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
|  |  |  |  |  |  |  |  |  |  |  |  |  |  |  |  |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
|  |  |  |  |  |  |  |  |  |  |  |  |  | DIN/EEN | DOUT | CLK |

Figure 31

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
|  |  |  |  |  |  |  |  |  |  |  |  |  |  |  |  |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
|  |  |  |  |  |  |  |  |  |  |  |  | PTC2 | PTC1 | PTC0 | ???? |

Figure 32

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
|  |  |  |  |  |  |  |  |  |  |  |  |  |  |  |  |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
|  |  |  |  |  |  |  |  |  |  |  |  |  | MCDIV | MODE | LRDE |

Figure 33

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|------|------|------|------|
|    |    |    |    |    |    |   |   |   |   |   |   | S01F2 | S01F1 | S01F0 | S01EN |

Figure 34

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|------|------|------|------|
|    |    |    |    |    |    |   |   |   |   |   |   | S1F2 | S1F1 | S1F0 | S1EN |

Figure 35

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|------|------|------|
|    |    |    |    |    |    |   |   |   |   |   |   |   | S02F1 | S02F0 | S02EN |

Figure 36A

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|------|------|------|
|    |    |    |    |    |    |   |   |   |   |   |   |   | S02F1 | S02F0 | S02EN |

Figure 36B

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   | SI2F1 | SI2F0 | SI2EN |

Figure 55

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   | RSTSP | ORCEN | RES | TICK | RUNFR | STPFR | RUN |

Figure 56

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    | TRAP | RGBK2 | K1 | K0 | DEBUG | REGID6 | REGID5 | REGID4 | REGID3 | REGID2 | REGID1 | REGID0 |

Figure 57

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| F1S15 | F1S14 | F1S13 | F1S12 | F1S11 | F1S10 | F1S9 | F1S8 | F1S7 | F1S6 | F1S5 | F1S4 | F1S3 | F1S2 | F1S1 | F1S1 |

EEPROM READ SEQUENCE

Figure 49

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| INTENA | HCP | | | | | | | | | | | FROVF | DMA1 | INT1 | INT0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| VC15 | VC14 | VC13 | VC12 | VC11 | VC10 | VC9 | VC8 | VC7 | VC6 | VC5 | VC4 | VC3 | VC2 | VC1 | VC0 |

Figure 50

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| VC47 | VC46 | VC45 | VC44 | VC43 | VC42 | VC41 | VC40 | VC39 | VC38 | VC37 | VC36 | VC35 | VC34 | VC33 | VC32 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| VC31 | VC30 | VC29 | VC28 | VC27 | VC26 | VC25 | VC24 | VC23 | VC22 | VC21 | VC20 | VC19 | VC18 | VC17 | VC16 |

Figure 51

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | | | | | | | CHGM | IRV |

Figure 53

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| FGN2 | FGN1 | FGN0 | IRQ | ORUN | FG | SLEEP | SPRUN | IP3 | IP2 | IP1 | IP0 | GP13 | GP12 | DOI | FRI |

Figure 54A

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| PC1V31 | PC1V30 | PC1V29 | PC1V28 | PC1V27 | PC1V26 | PC1V25 | PC1V24 | PC1V23 | PC1V22 | PC1V21 | PC1V20 | PC1V19 | PC1V18 | PC1V17 | PC1V16 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| PC1V15 | PC1V14 | PC1V13 | PC1V12 | PC1V11 | PC1V10 | PC1V9 | PC1V8 | PC1V7 | PC1V6 | PC1V5 | PC1V4 | PC1V3 | PC1V2 | PC1V1 | PC1V0 |

Figure 58

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   | DFS3 | DFS2 | DFS1 | DFS0 |

Figure 59

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| FGN2 | FGN1 | FGN0 | URQ | DRUN | FG | SLEEP | SPRUN | P3 | P2 | P1 | P0 | GPI3 | GPI2 | DOI | FRI |

Figure 60

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   | DOE7 | DOE6 | DOE5 | DOE4 | DOE3 | DOE2 | DOE1 | DOE0 |   |

Figure 61

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| TW15 | TW14 | TW13 | TW12 | TW11 | TW10 | TW9 | TW8 | TW7 | TW6 | TW5 | TW4 | TW3 | TW2 | TW1 | TW0 |

Figure 62
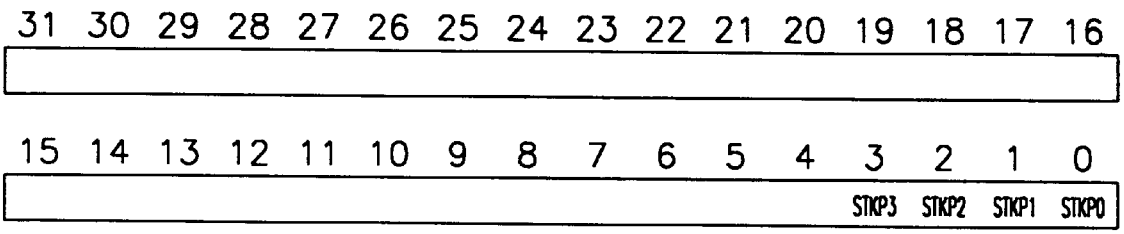
Figure 63
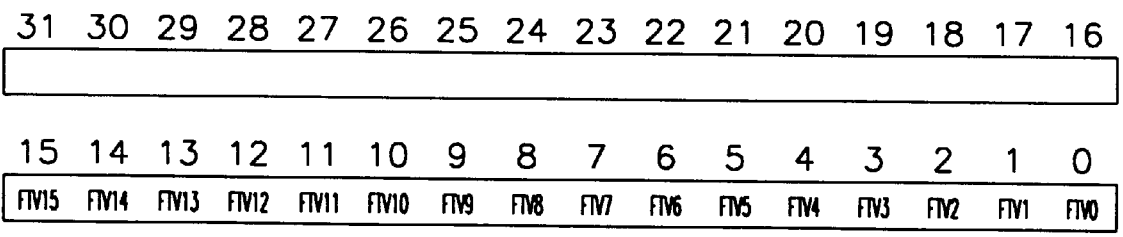
Figure 64A
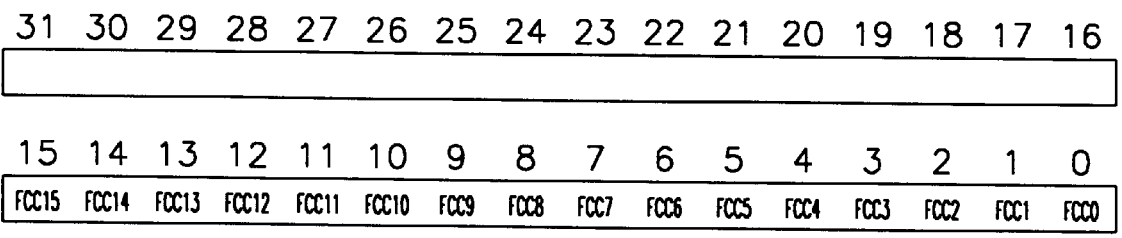
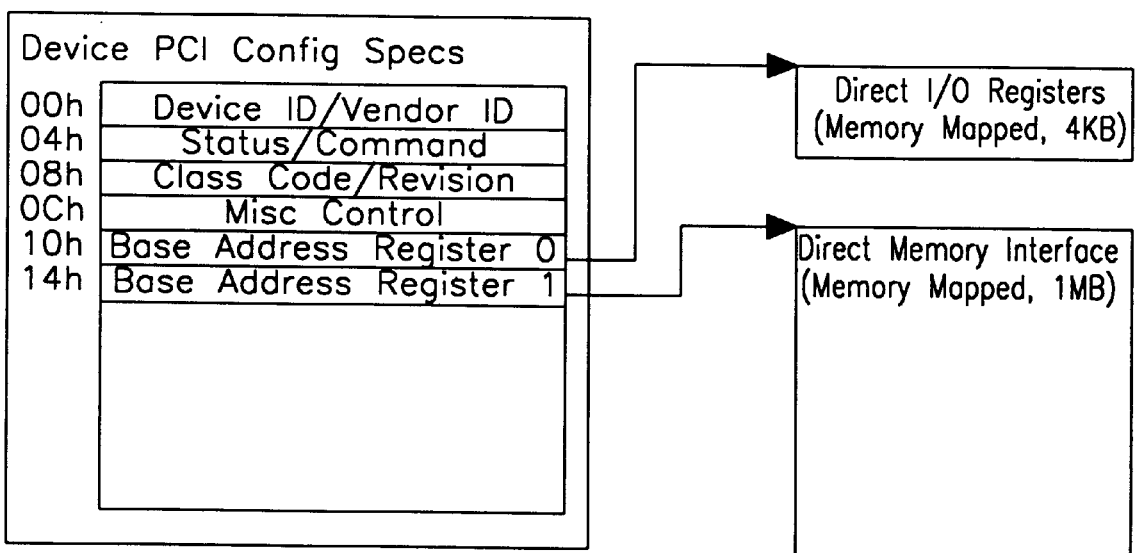
Figure 65

Figure 64B

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| FCS15 | FCS14 | FCS13 | FCS12 | FCS11 | FCS10 | FCS9 | FCS8 | FCS7 | FCS6 | FCS5 | FCS4 | FCS3 | FCS2 | FCS1 | FCS0 |

Figure 64C

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   | P3 | P2 | P1 | P0 | CP3 | CP2 | DOI | FRI |

Figure 66A

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   | FSP3 | FSP2 | FSP1 | FSP0 |

Figure 66B

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   |   | WBSY | RRDY |

Figure 66C

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   |   | WRC | RDC |

Figure 66D

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   | FAD7 | FAD6 | FAD5 | FAD4 | FAD3 | FAD2 | FAD1 | FAD0 |

Figure 66E

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   |   |   | HBP |

Figure 66F

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    | FWD19 | FWD18 | FWD17 | FWD16 |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| FWD15 | FWD14 | FWD13 | FWD12 | FWD11 | FWD10 | FWD9 | FWD8 | FWD7 | FWD6 | FWD5 | FWD4 | FWD3 | FWD2 | FWD1 | FWD0 |

Figure 66G

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    | FRD19 | FRD18 | FRD17 | FRD16 |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| FRD15 | FRD14 | FRD13 | FRD12 | FRD11 | FRD10 | FRD9 | FRD8 | FRD7 | FRD6 | FRD5 | FRD4 | FRD3 | FRD2 | FRD1 | FRD0 |

Figure 67A

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   | ASYN | CRW | OCV | VFRM | ESYN | RSTN |

Figure 67B

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   |   | VSTS | CRDY |

Figure 67C

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    | SLV12 | SLV11 | SLV10 | SLV9 | SLV8 | SLV7 | SLV6 | SLV5 | SLV4 | SLV3 |   |   |

Figure 67D

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   | C6 | C5 | C4 | C3 | C2 | C1 | C0 |

Figure 67E

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| CD15 | CD14 | CD13 | CD12 | CD11 | CD10 | CD9 | CD8 | CD7 | CD6 | CD5 | CD4 | CD3 | CD2 | CD1 | CD0 |

Figure 68F

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   | MR07 | MR06 | MR05 | MR04 | MR03 | MR02 | MR01 | MR00 |

Figure 69A

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   | DB2 | DB1 | BA2 | BA1 | CBY | CBX | CAY | CAX |

Figure 69B

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   |   |   |   |   |   | ARE | SP1 | SP0 |

Figure 69C

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
| Y1V15 | Y1V14 | Y1V13 | Y1V12 | Y1V11 | Y1V10 | Y1V9 | Y1V8 | Y1V7 | Y1V6 | Y1V5 | Y1V4 | Y1V3 | Y1V2 | Y1V1 | Y1V0 |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| X1V15 | X1V14 | X1V13 | X1V12 | X1V11 | X1V10 | X1V9 | X1V8 | X1V7 | X1V6 | X1V5 | X1V4 | X1V3 | X1V2 | X1V1 | X1V0 |

Figure 69D

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| Y2V15 | Y2V14 | Y2V13 | Y2V12 | Y2V11 | Y2V10 | Y2V9 | Y2V8 | Y2V7 | Y2V6 | Y2V5 | Y2V4 | Y2V3 | Y2V2 | Y2V1 | Y2V0 |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X2V15 | X2V14 | X2V13 | X2V12 | X2V11 | X2V10 | X2V9 | X2V8 | X2V7 | X2V6 | X2V5 | X2V4 | X2V3 | X2V2 | X2V1 | X2V0 |

Figure 69E

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
|  |  |  |  |  |  |  |  |  |  |  |  |  |  |  |  |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
|  |  |  |  |  |  |  |  | BYOE | BXOE | AYOE | AXOE | DBY | DBX | DAY | DAX |

CIRCUITS, SYSTEM, AND METHODS FOR PROCESSING MULTIPLE DATA STREAMS

BACKGROUND OF THE INVENTION

1. Field of the Invention

The present invention relates in general to digital data processing and in particular to circuits, systems, and methods for processing multiple data streams.

2. Description of the Related Art

The ability to process audio information has become increasingly important in the personal computer (PC) environment. Among other things, audio is important in many multimedia applications, such as gaming and telecommunications. Audio functionality is typically available on most conventional PCs, either in the form of an add-on audio board or as a standard feature provided on the motherboard itself. In fact, PC users increasingly expect not only audio functionality but high quality sound capability.

Although PC manufacturers are sensitive to meeting their customers' demands for enhanced audio capability, they must also be aware of the tight price margins imposed on their products. In order to balance these competing interests, system designers must strive to provide as much audio functionality as possible while minimizing the number of components required to perform a given function. From the functionality point of view, a state-of-the-art digital audio processing subsystem should provide for such diverse processing techniques as wavetable synthesis, 3-D audio, and sample rate conversion. Sound Blaster compatibility and compatibility with future systems not relying on Sound Blaster technology must also be considered. Further, such a subsystem should be capable of integration on a PC system motherboard through the now widely used PCI bus with its higher bandwidth. From a cost and efficiency point of view, a single chip solution would be optimal. Additionally, the next generation of games will require the processing of simultaneous streams of audio data and thus any system should address the multiple streaming requirements of game designers.

Thus, the need has arisen for an audio processor solution for simultaneously processing multiple streams of digital audio information. Among other things, there is a need for an audio processor that provides for wavetable synthesis operations, including general MIDI wavetable synthesis, and voice channel effects like reverb and chorus. Further, there is a need for such a device to provide 3-D audio processing and direct sound support. Additionally, there is a need for such a device to perform processing functions, such as Dolby™ AC-3 audio decoding. There is also a need for such a solution to account for such factors as varying potential system configurations. For example, there is a need for such a device to interface directly with a codec or through an additional audio processing device, such as an audio motherboard. There is also a need for such a device to interface with a PCI bus.

SUMMARY OF THE INVENTION

According to an embodiment of the principles of the present invention, an audio information processing subsystem is provided which includes a stream processor for simultaneously processing multiple streams of audio data. A program memory is coupled to the stream processor by a first bus for storing instructions for controlling the processing system. A data memory is coupled to the stream processor by a second bus. Direct memory access circuitry is included for controlling direct memory accesses to a selected one of the program and data memories.

All systems, circuits, and methods embodying the principles of the present invention provide substantial advantages over the prior art. Among other things, such principles provide for the construction and operation of audio accelerators, although such principles are not limited thereto. With regards to the design and operation of audio accelerators, these principles allow for the processing of multiple streams of data in multiple formats. Among other things, such an accelerator can be advantageously used in applications requiring wavetable synthesis, 3D audio processing and direct sound. Additionally, these principles allow an accelerator to efficiently process such audio applications as Dolby AC/3 audio decoding. Further, such principles allow for an audio accelerator to be efficiently interfaced with a PCI bus as well as with a Codec or audio motherboard.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A is a diagram of a Mop, aop and ALUop instruction formats;

FIG. 3B is a diagram of an exemplary parallel extended load/store and ALUop instructions format;

FIG. 3C is a diagram of a wideop instruction format;

FIG. 3D is a diagram of the format for a dual packed ALUop instruction format;

FIG. 6B is a diagram illustrating the organization of the requester array;

FIG. 7 is a diagram of fields of an exemplary DMA channel;

FIG. 8 is a diagram of the fields of the sample memory address (rsa) and sample memory address increment (rsi) registers of the sample address generation unit;

FIG. 9 is a diagram of the fields of a DMA sample doubleword address string;

FIGS. 13A is a diagram of the fields in the host source address register (HSAR) when the host is the source and accelerator 200 is the destination in a host initiated DMA transfer;

FIG. 13B is a diagram of the fields in the host source address register (HSAR) when the host is the destination and accelerator 200 is the destination in a host initiated DMA transfer;

FIGS. 13C is a diagram of the fields in the host destination register (HDAR) when the host is the destination and accelerator 200 is the source during a DMA initiated transfer;

FIG. 13D is a diagram of the fields in the host destination register (HDAR) when the host is the source and accelerator 200 is the destination during a DMA initiated transfer;

FIG. 17G is a diagram of a next page address word defining the next page in memory to be accessed;

FIG. 17H is a diagram of the next page control word;

FIG. 17I is a diagram of the physical byte address loop-begin address word;

FIG. 17J is a diagram of the physical byte address of the page after loop-begin;

FIG. 17K is a diagram of an address to the scatter/gather page table;

FIG. 26C is a diagram of a diagram of the auxiliary input port;

FIG. 26D is a more detailed diagram emphasizing the timing inputs and outputs to the serial ports 207;

FIG. 31 is a diagram of a further configuration possibility for accelerator 200 where accelerator 200 is driving multiple DACs;

FIG. 32 is a diagram of the serial port master control register 1;

FIG. 33 is a diagram of a conceptual serial port master control register 2 (SERMC 2);

FIG. 34 is a diagram of the bitfields for the serial port configuration register (SERC 1);

FIG. 35 is a diagram of a serial port configuration register 2 (SERC 2);

FIG. 36 is a diagram of the bitfields for the serial port configuration register 3 (SERC 3);

FIG. 38 is a diagram of a simple two pin connection used when the EEPROM serial clock (EECLK) is exchanged to EEPROM 3800;

FIG. 49 is a diagra, of the interrupt model of accelerator 200;

FIG. 50 is a diagram of the host interrupt status (HISR) register;

FIG. 51 is a diagram of the host signal (HSRO) register;

FIG. 53 is a block diagram of a performance modeling subsystem for accelerator 200 which allows for real-time monitoring key internal system and device performance indicators;

FIG. 54 a diagram of the performance control register (PFMC);

FIG. 55A is a diagram of the performance counter one value register (PFCV 1);

FIG. 55B is a diagram of performance counter 2 value register (PFCV 2);

FIG. 56 is a diagram of the bitfields of the stream processor control register (SPCR);

FIG. 57 is a diagram of the bitfields for the debug register index (DREG) register;

FIG. 58 diagrams the bitfields of the group register 1 (FGR 1);

FIG. 59 diagrams the register controlling the DMA stream requestor array state write port (DSWP);

FIG. 60 is a diagram of the stream processor clock status register (SPCS);

FIG. 61 is a diagram of the stream processor DMA requester status register (SDSR);

FIG. 62 a diagram of the trap write port register (TWPR);

FIG. 63 a diagram of the stack pointer write register (SPWR);

FIG. 64 is a diagram of the bitfields for the frame timer register (FRMT);

FIG. 65A, 65B, 65C are is a diagram of the frame time current count (FRCC) register;

FIG. 66 is a diagram representing the host interface programming model;

FIG. 68F is a diagram of the AC 97 input slot valid register (ACISV);

FIG. 68G is a diagram of the AC 97 status address register (ACSAD);

FIG. 68H is a diagram of the AC 97 status data register (ACSDA);

Figure 70A:
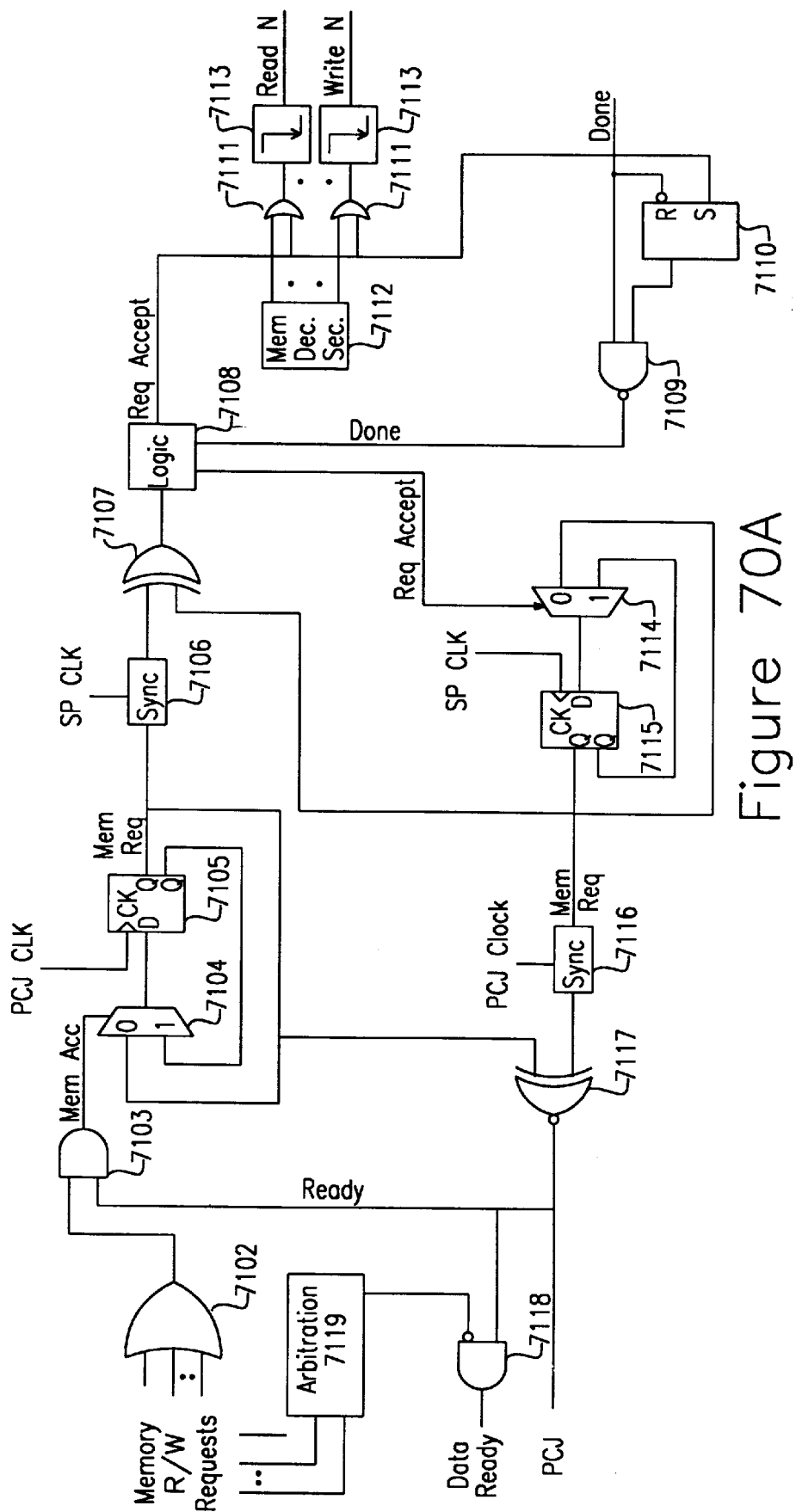
Figure 70B:
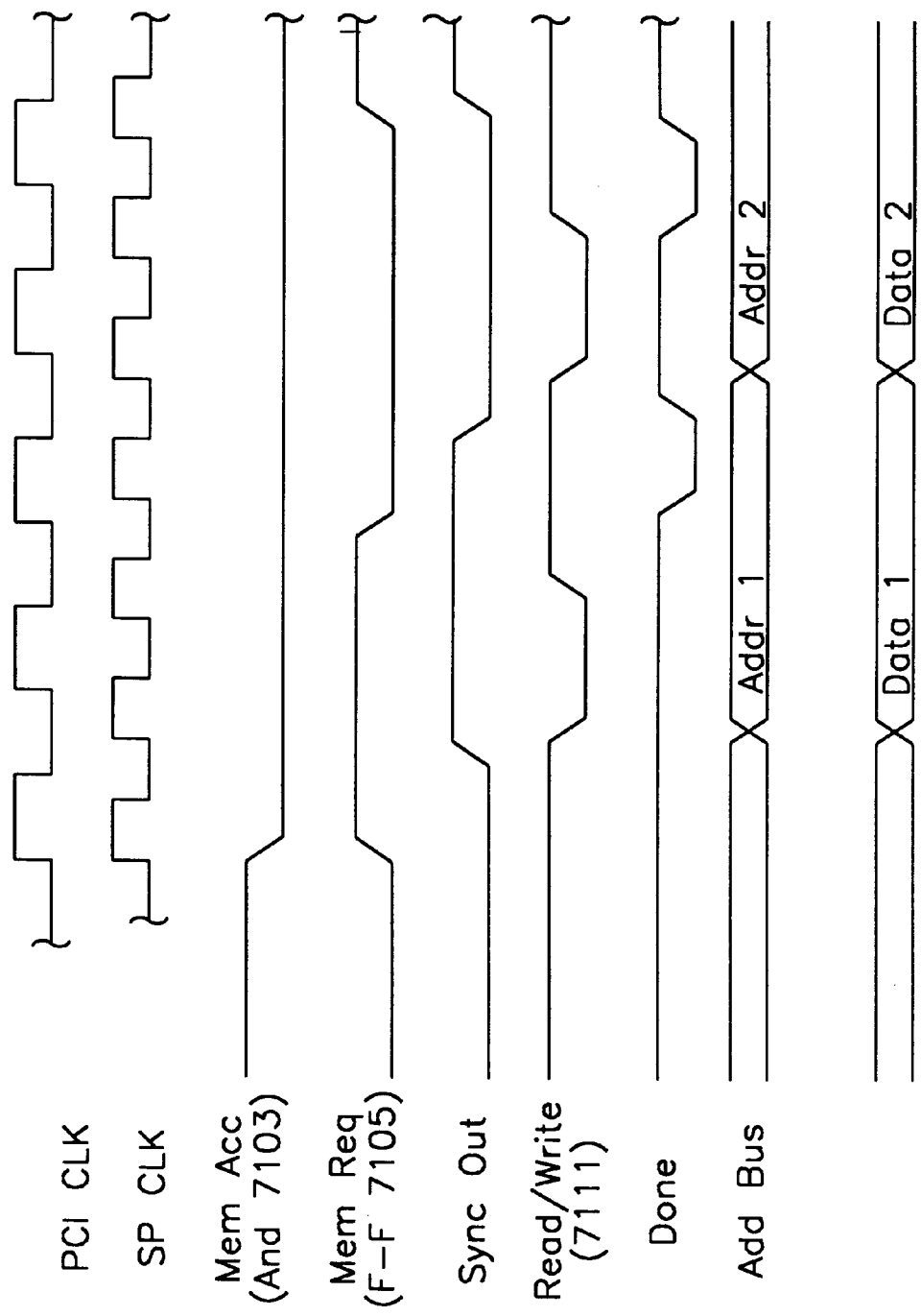
Figure 70C:
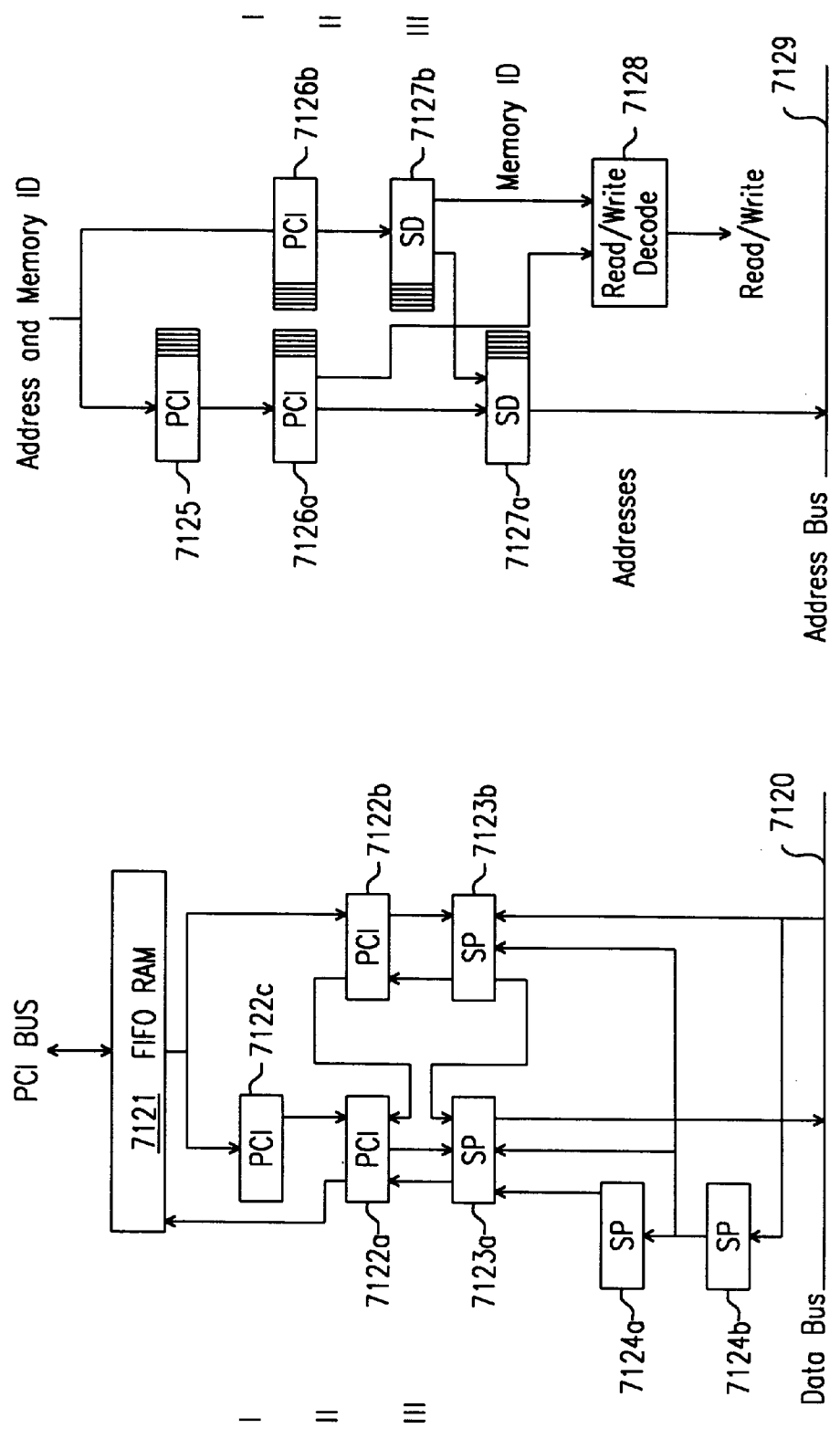
Figure 70D:
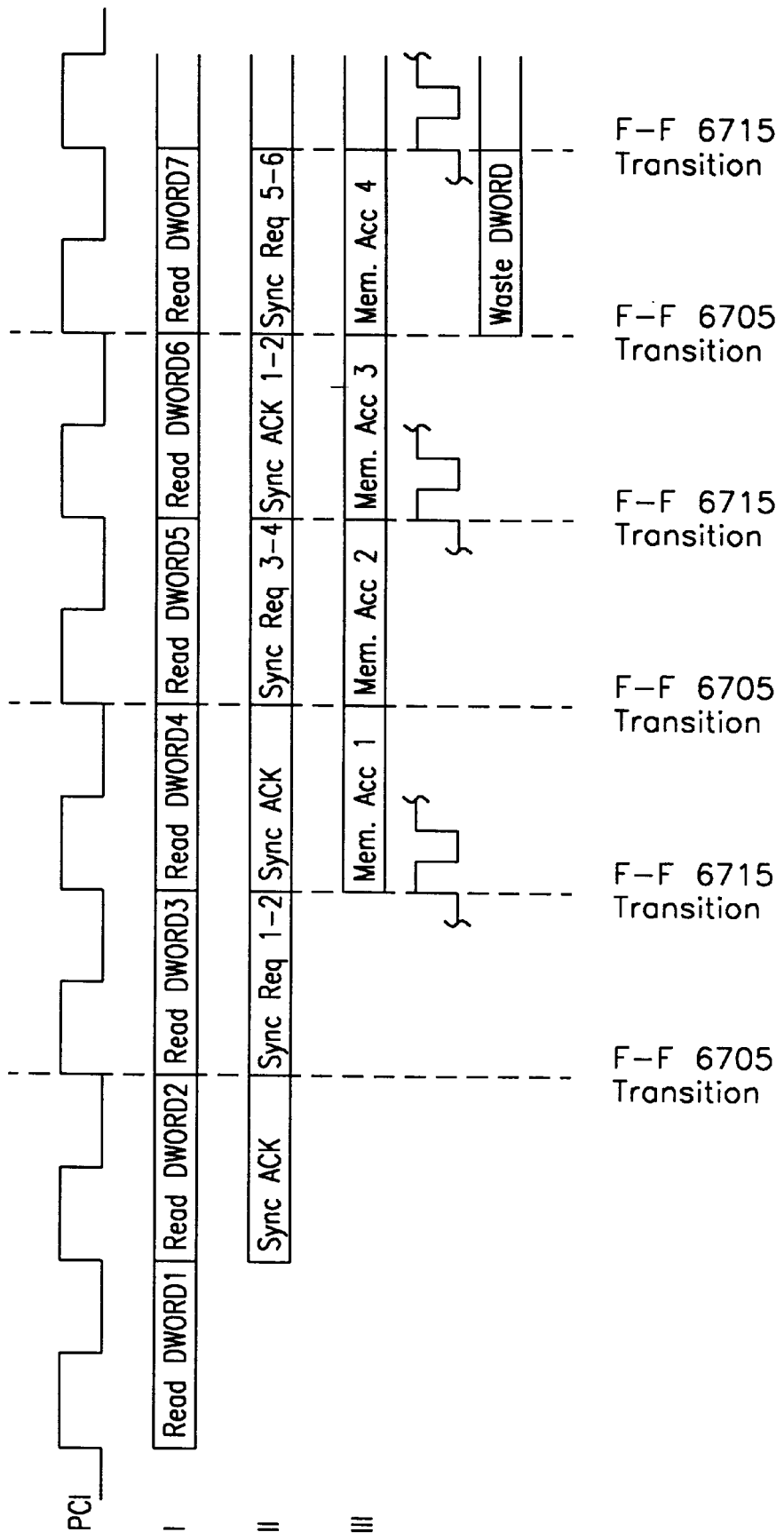
Figure 71A:
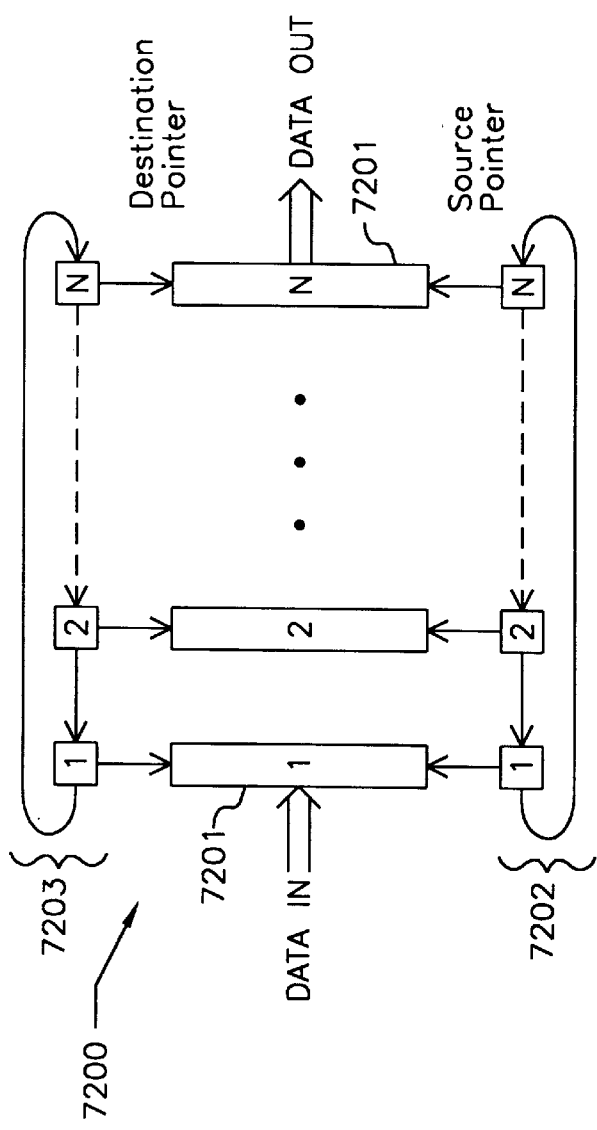
Figure 71B:
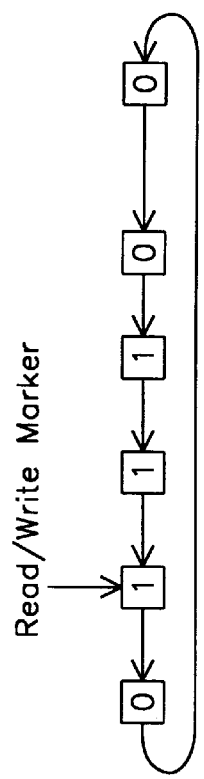
Figure 71C:
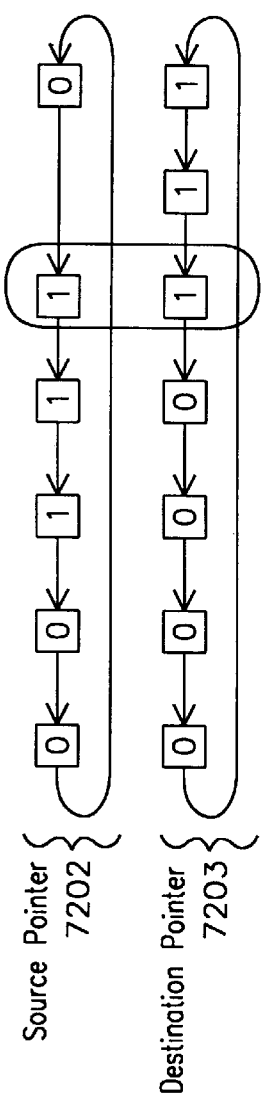
Figure 71D:
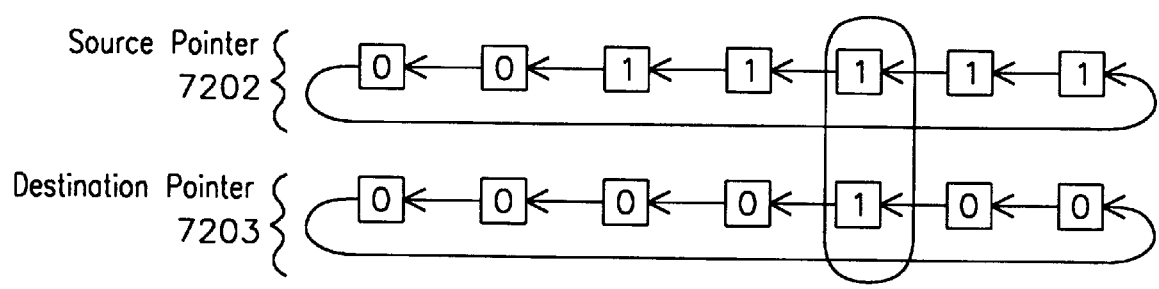
Figure 71E:
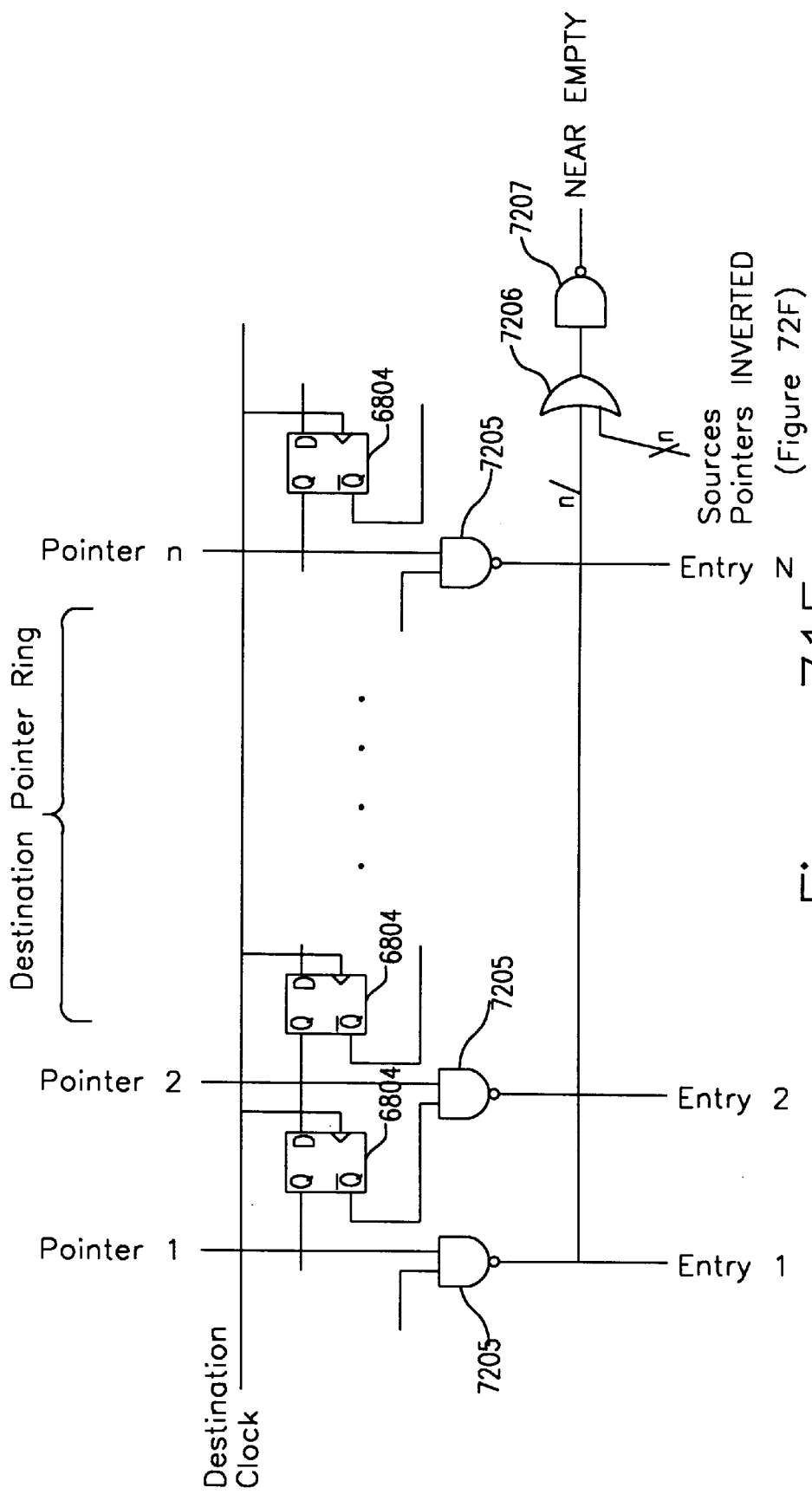
Figure 71F:
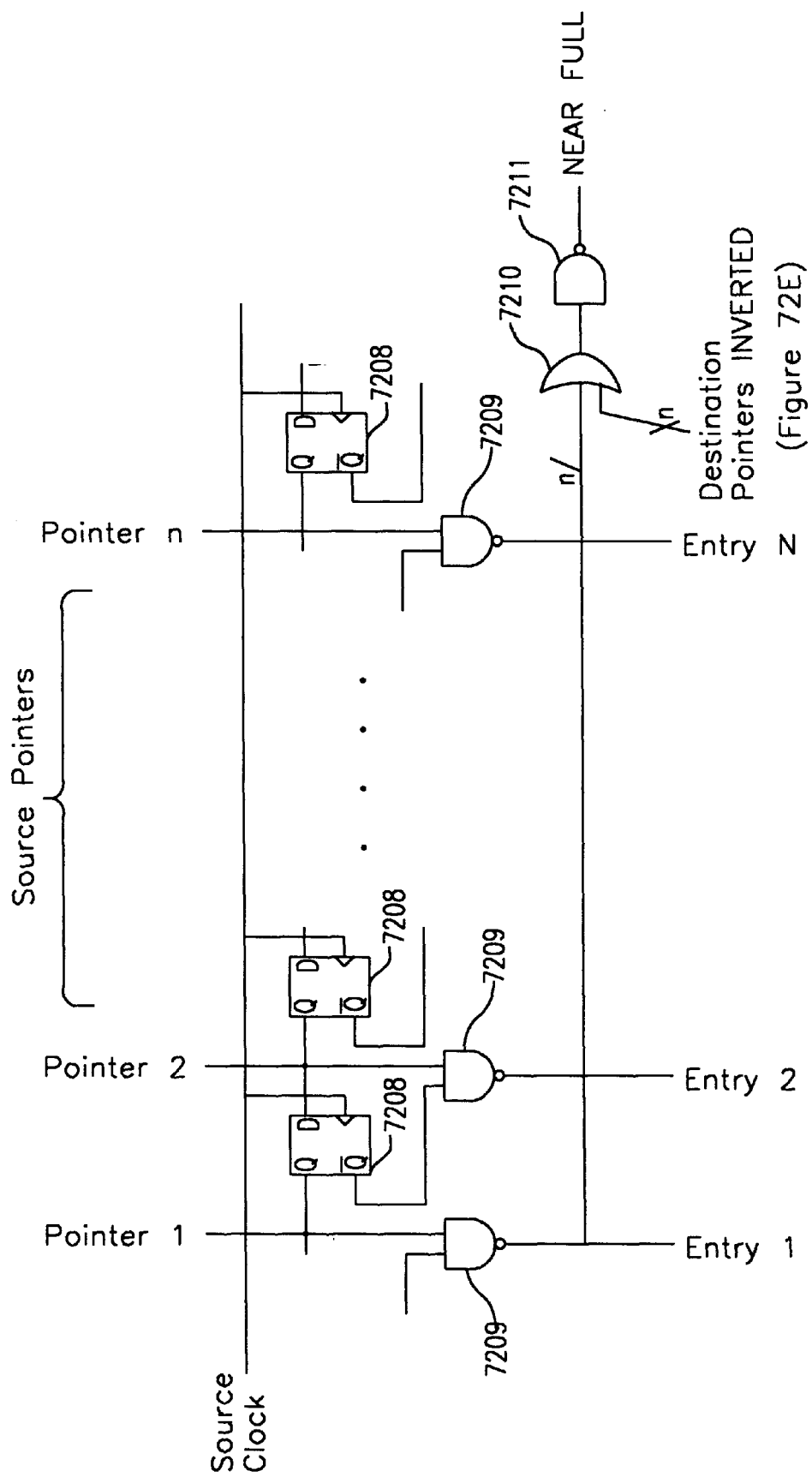

TABLE 68i generally describes the features available through the AC 97 interface;

FIG. 69A is a diagram of the MIDI input/output port 6900;

FIG. 69B is a diagram of the MIDI control register (MIDCR);

FIG. 69C is a diagram of the host MIDI status register (MIDSR);

FIG. 69D is a diagram of the SPMIDI status register;

FIG. 69E is a diagram of the MIDI write port (MIDWP) register;

FIG. 69F is a diagram of the MIDI read port (MIDRP) register;

FIG. 70A is a diagram of the joystick poll/trigger register (JSPT);

FIG. 70B is a diagram of the joystick control register (JSCTL);

FIG. 70C is a diagram of the joystick coordinate register 1 (JSC 1);

FIG. 70D is a diagram of the joystick coordinate register 2 (JSC 2);

FIG. 70E is a diagram of the joystick GPIO register (JSIo);

FIG. 71A is an electrical schematic diagram of synchronizer circuitry 7101 embodying the principles of the present invention;

FIG. 71B is a timing diagram illustrating the operation of synchronization circuitry shown in FIG. 71A;

FIG. 71C is a diagram of the address and data pipelines provide for the exchange of data between accelerator 200 and PCI bus and the exchange of addresses from the PCI bus to accelerator 200;

FIG. 71D illustrated the typical timing of data and address flow through the circuitry of FIG. 71C;

FIG. 72A is a diagram of a FIRST-IN-FIRST-OUT register system;

FIG. 72B illustrates an initialized portion of a selected one of the pointer rings shown in FIG. 72A;

FIG. 72C shows the overlap of the source and destination pointers when a near empty signal is generated;

FIG. 72D shows the overlap of the source and destination pointers when an approaching full signal is generated;

FIG. 72E is a diagram of one possible embodiment of the destination pointer ring and the gating which generates the near-empty signal; and FIG. 72F is a diagram of one possible organization for the source pointer ring.

DESCRIPTION OF THE PREFERRED EMBODIMENTS

Figure 1:
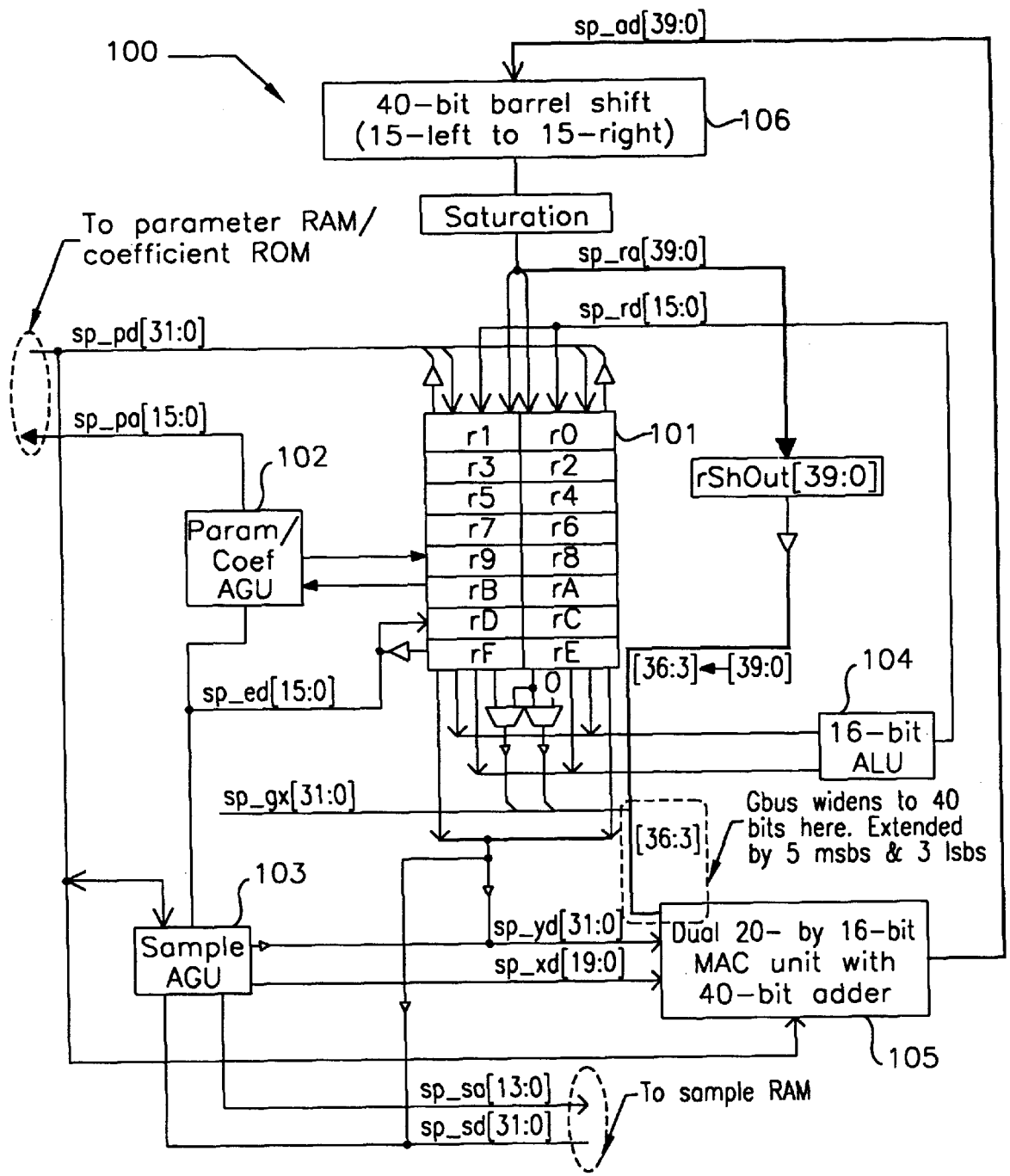
FIG. 1 is a diagram of stream processor 100 according to the present invention.

The principles of the present invention and their advantages are best understood by referring to the illustrated embodiment depicted in FIG. 1–72 of the drawings, in which like numbers designate like parts.

FIG. 1 is a more detailed functional block diagram of a stream processor (core) 100 embodying the principles of the present invention. The primary functional components of stream processor 100 include a register file 101, a parameter/coefficient address generation unit (AGU) 102, a sample address generation unit (AGU) 103, a 16-bit arithmetic logic unit (ALU) 104, a dual 20- by 16-bit multiply accumulate unit (MAC) with 40-bit adder 105, and a 40-bit barrel shifter 106. Each of these subsystems will be discussed in further detail below.

In the illustrated embodiment, register file 101 comprises a 16-entry register file, with registers accessible either as individual 16-bit registers (r0, r1, . . . , rF) or as pairs of 32-bit registers (r10, r32, r54, r76, r98, rBa, rDC, rFE). Stream processor 100 further includes a number of additional command and data registers which are discussed further below. A brief description of substantially all of the available data (non-command) registers within stream processor (core) 100 is provided in TABLE 1 and a similar description of the stream processor command registers is provided in TABLE 2.

Stream processor 100 is a very long instruction word (VLIW) machine operable to decode and execute two or three instructions concurrently. TABLE 3 briefly designates and describes each of the instruction fields. The instruction field encodings for the preferred embodiment are given in TABLE 4. The instruction pipeline is preferably a 4-stage pipeline with a visible multiply-accumulate unit. Preferably, while it takes four cycles to complete execution of any single instruction, four instructions are pipelined together to provide an effective throughput of one instruction per cycle. TABLE 5 is a pipeline diagram of various signal processing operations available in the illustrated embodiment. Conditions (orthogonality)on the use of the registers in the instruction set are similarly set forth in TABLE 6.

Figure 2A:
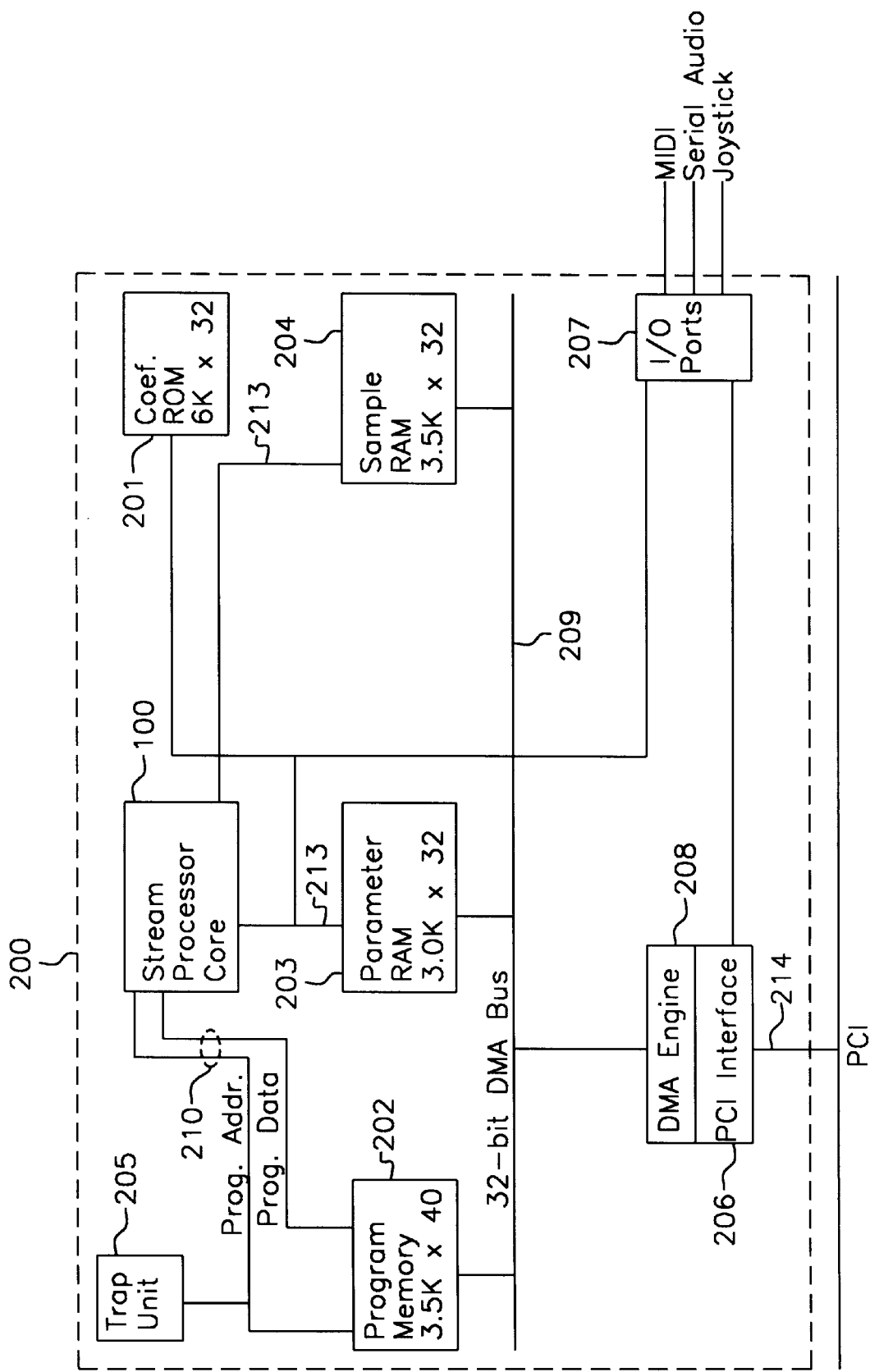
FIG. 2A is a block diagram of digital audio data accelerator controller 100 including the stream processor 101 according to the present invention.

Referring to FIG. 2A, a direct memory access (DMA) signal processing accelerator 200 according to the principles of the present invention is shown. In the illustrated embodiment, signal processing accelerator 200 is fabricated as an integrated circuit (chip) device on a single substrate, although the principles of the present invention are not limited thereto. For example, those skilled in the art would recognize that the accelerator 200 could be constructed as a multi-chip module on an integrated rigid structure. It should also be noted that system 200 is only one possible application of stream processor.

DMA accelerator 200 implements a stream processor core 100, which will be discussed in further detail below, and a number of memory subsystems. The memory subsystems include a coefficient read-only memory (ROM) 201, a program memory 202, parameter random access memory (RAM) 203, and a sample RAM 204. Connected to stream processor core 100 and program memory 202 is a trap unit 205 which monitors program addresses being transferred from program memory 202 to stream processor core 100 over bus 211.

For purposes of this document, the following terms and definitions apply. "Doubleword" (dword) is preferably a 32-bit data word for use in defining PCI and DMA bus width, and stream processor 100 word size. "Word" will denote 16-bit data and "byte" will denote 8-bit data. The host will be defined as the CPU of a host personal computer (PC) system such as an Intel x 86™ or Pentium system™. "PCI transfer" shall mean the movement of a single doubleword across the peripheral components interface (PCI) bus in accordance with the industry standard. "PCI transaction" denotes a series of consecutive PCI transfers which occur during a single ownership of the bus (i.e., the time between being granted the bus and being forced to relinquish the bus). "DMA transaction" means the movement of all requested data via direct memory access (DMA), which, if accessing host memory, can require one or more PCI transactions to complete. "DMA read-transaction" defines a transaction in which data is transferred from the host CPU's memory to on-chip memory within system 200 (i.e., data is read from host memory). "DMA write transaction" denotes a transaction in which data is transferred from on-chip memory within system 200 to the host CPU's memory (i.e., data is written to host memory). A "DMA local transaction" denotes a DMA transaction in which data is transferred between two of the random access on-chip memories within system 200, such as program memory 202, parameter memory 203, and sample RAM 204. Internal debug registers may also be accessed via the DMA data bus during a local transaction.

Accelerator 200 is preferably adapted to interface with a PCI bus and therefore further includes a PCI bus interface 206. PCI interface 206 is also coupled to input/output ports 207 which provide for the exchange of serial audio data, MIDI commands and joystick information. A DMA engine (controller) 208 controls direct memory accesses between host memory and program memory 202, parameter RAM 203, and sample RAM 204, as well as between the on-chip memories 202/203/204 themselves, via 32-bit DMA bus 209.

Coefficient ROM 201 is preferably a 6K word by 32-bits/word device which generally maintains coefficients and parameters required for the execution of various signal processing algorithms. For example, coefficients for sample rate conversion, a sine wavetable for music synthesis, $\mu$-law and A-law decompression tables, Dolby filtering coefficients and an ADPCM decoding table are maintained in coefficient ROM.

Accelerator 200 is based upon a Harvard architecture having a program memory 202 and associated program bus 111 separate from the data memory and its associated data bus. Preferably, program memory 202 is organized as 3.5K words×40 bits per word. The data memory is arranged in two address spaces, with each providing operands to stream processor (core). One address space includes parameter RAM 203 along with coefficient ROM 201, previously discussed. Parameter RAM 203 preferably has a 3.2-K word×32-bit per word organization. Parameter RAM 203 contains, among other things, stream parameters for audio sample streams, wavetable parameters for voice, 3-D sound parameters and 3-D sound head related transfer function (HRTF) filtering parameters. A second address space includes sample RAM 105 which receives and manages data over DMA bus 211 and PCI interface 207, and also receives data to and from stream processor 100 across bus 213.

Each of these memories 203/204 possesses two interfaces, one for stream processor 100, and the other for DMA engine 208. DMA 208 is responsible for providing instructions and data to stream processor 100 via the DMA memory interface, and for transferring results from these memories back out to the host. Each of the functional memories 202/203/204 is structurally composed of two physical memories, with all data and instructions to odd addresses residing in one memory and all data and instructions to even addresses residing in the other memory. of the two memory interfaces included with each physical memory, the SP interface is the higher priority interface, with the DMA interface being of lower priority. It should be noted that each of these memories is not truly two-ported, rather, they are single port RAMs having two control and data interfaces.

RAM may be accessed only one time each clock cycle, either by SP 100 or DMA engine 208, but not by both. If an access is made by SP 100 to one of these memories at the same time that a DMA request is issued, the DMA request is not serviced, while the SP access proceeds. However, in the next clock cycles in which the SP makes no request, the DMA access will proceed, and indication is supplied to the DMA via a "done" signal. A "done" signal is supplied from each of the RAMs. When DMA 208 makes an accesses, it must continue to request the same access until the "done" signal is returned from the RAM being accessed. At this point, a RAM write via the DMA interface has completed, or valid READ data is available on the DMA interface.

The fact that the memories are interleaved insures that, on average, the DMA will be capable of getting access to any one RAM every other cycle. Further, code profilers can guarantee that the DMA will never be starved with regard to each of these memories.

The second data address space includes sample RAM 204. In the illustrated embodiment, the sample RAM 204 has a 3K word×32-bits per word organization. Sample RAM 204 includes sample rate conversion buffers, wavetable FIFO buffers, wavetable effects (chorus and reverb) buffers, 3-D sound buffers and 3-D sound SRC buffers.

Either the host CPU or stream processor (core) 100 can initiate direct memory accesses to any of accelerator 200 on-chip RAM. In each case, the requesting device or subsystem loads registers within DMA engine 208. DMA engine 208 provides the loading device with priority to perform automatic block transfers to and from internal RAM 202/203/204. DMA engine 208 also provides an ability for the host to perform one-by-one accesses ("peeks and pokes") to accelerator RAM 202/203/204. These accesses are essentially conventional reads and writes to individually addressed memory locations within RAMs 202/203/204.

The host cannot directly read and write to program memory to modify code that may be executing (although it can request a direct memory access to copy data to program memory). For example, the host cannot write to program memory to insert a break point. Thus, trap unit 205 is provided coupled to the program memory bus. Preferably, trap unit 205 is integrated into stream processor (core) 100, but is shown in FIG. 2 as a separate block to emphasize its operation. Trap unit 205 monitors the address bus for the transmission of one of up to eight predetermined addresses. When one of the specified addresses appears on the bus, a trap is issued which causes stream processor 100 to branch during program code execution. Those skilled in the art will recognize that trapping could also be provided for ROM 201, since code in ROM 201 cannot be modified to perform similar tasks, such as inserting breakpoints.

Stream processor core 100 is essentially a 16-bit machine; however, its accumulator is full width to handle the full product, along with guard bits. Coefficient ROM 201, parameter RAM 203, and sample RAM 204 are consequently 32-bit wide devices to provide read and write bandwidth and to support simultaneous multiplies and adds within the dual multiply-accumulate units discussed below. This feature advantageously provides for the processing of stereo audio. In general, coefficients are accessed from ROM 201 in 20-bit words and sample data pipelined as two 16 bit words and paired into single 32-bit sample memory locations.

When the host accesses accelerator 200 memory, such as during peeks and pokes, accelerator 200 acts as a slaved device on the PCI bus (i.e. slave accesses are being performed). When accelerator 200 is driving the PCI bus during a DMA operation (initiated by either the host or accelerator 200), accelerator 200 is the bus master, no matter if data is being sent to, or being received from, host memory.

DMA engine 208 provides the base capability filling and draining buffers set-up in sample RAM 204. Up to 96 such buffers can be set-up to support 96 individual data streams. Specifically, DMA engine 208 defines a modulo buffer for each stream in sample memory 204 (for example) and corresponding circular buffers within host memory. Typically, stream processor 100 requests that DMA engine 208 to fill the modulo buffers in sample memory 204 when it has become less than half full when reading out 16 words at a time.

A stream processor 100 based request to DMA engine 208 is initiated with the addressing of a requestor structure stored in parameter memory 203. The requester defines such things as the size of the transfer, the beginning address (assume in the host memory) and a destination (assume in sample memory). While in this example it is assumed that the host memory is the source and sample memory 204 the destination, other combinations of memories involved in a DMA transfer are always possible. Thereafter, DMA engine 208 can update both source and destination information, only the source or only the destination, as defined by the requestor. Advantageously, a circular buffer that moves in sample memory 204 and a buffer that advances in the host can be set up which are not required to be locked together during the transfer.

DMA engine 208 advantageously includes the facility that in the event it is transferring data between accelerator memory 202/203/204 and the PCI bus, DMA engine 208 can selectively interrupt and allow the host to perform peeks and pokes. DMA engine 208 also supports scatter/gather accesses to host memory which allows the access to data which are logically contiguous in host memory but physically discontiguous in physical memory. In this case, a table is resident in host memory which identifies the location of scattered pages. When DMIA engine 208 reads a page in host memory, it determines that it is reading a stream and therefore immediately sets a request for the next page, including the request to the page table. The request for the next page is normally serviced before access to the current page is complete. Then, when the DMA completes the current page, it checks to see if the page table request for the next page has been completed, and if it has, DMA engine 208 simply skips generating the request to the next page. The advantage to this process is that the priority of page table reads can be pushed down since it takes a relatively long time to move through a page of data during an access (a page is typically 4K bytes long, or with regards to stereo samples, 1K samples). In other words, it takes long enough, reading 16 samples at a time, that the scatter/gather page table reads can be delayed until higher priority operations are performed to host memory since they do not need to be performed immediately.

For purposes of the present discussion, the basic characteristics of a PCI bus are an important consideration. PCI real-time bandwidth available to a device coupled to a PCI bus is specified not in bytes per second or words per second but in transactions per second. This implies that a transaction involving a small amount of information may consume as much time as a transaction involving a large amount of data. In most PCI transactions, information is transferred in bursts.

In the present audio applications, audio streams are in some cases presented in bursts to an accelerator 200 at a relatively high rate, which determines the rate at which data must be read off the bus into memory. One means of optimizing system performance is by keeping unnecessary transactions off the PCI bus during times when a significant number of very quick transactions are required to fill the buffers in sample RAM 204. Buffer size in sample memory must also be minimized since the larger each buffer is for storing an audio stream, the smaller the total number of streams which can be handled. For example, in applications such as music synthesis, 32 or 64 streams may be required just for the music synthesis itself, not to mention perhaps 16 to 20 streams required for other tasks being performed. In other words, the total number of streams may be quite large and therefore attempting to support all of those streams without making the buffers too large is a significant design challenge.

The scatter/gather feature according to the principles of the present invention, at least in part, is directed to the problems of transferring bursts of data into the sample memory buffers. In particular, the instantaneous bandwidth can be increased by pushing down the priority of the page table reads. By initiating the next request for access early, the next page table read can be performed at anytime during the current page accesses, the page table read priority reduced, and the bus freed to transfer bursts of audio stream data. A PCI bus, although it has an aggregate, best case bandwidth of 133 Mbytes per second, may make available bandwidth to a single device on the bus as little as 10 Mbytes per second. Among other things, a given device on the bus may have to compete with 6 or more other devices on the bus which also require bandwidth.

A typical host initiated DMA transfer according to the principles of the present invention generally proceeds as follows. The host writes information defining the transfer into a set of register in host memory. At the same time, stream processor core 100 initiates the host DMA at PCI interface 206 and when the PCI interface is ready, signals DMA engine 208 to fetch the set up information from the registers in host memory. In response to the set-up information, DMA engine 208 issues a request to access the PCI bus via PCI interface 206. Once the request is granted and DMA engine 208 has control of the bus, DMA engine 208 begins transferring data from host memory in accordance with the set-up information.

Once the host has granted the PCI bus to DMA engine 208, but before DMA engine 208 has made a request for data, DMA engine 208 sends an address to the host for host comparison. The host confirms that the address is within the address space of the host and then accepts the transaction. The host then checks its cache to determine if the required data has already been encached or whether the access must proceed from the host system memory. When the data has been located, the controller in the host PCI bridge begins reading data from memory and delivering it onto the PCI bus.

In the case of a write to accelerator 200 program memory, the request which is issued defines the number of 32-bit words to be loaded into RAM, up to a limit of 2014 32-bit words. Preferably, DMA engine 208 sends requests to the PCI bus in bursts of 64 32-bit words and then alternates between reading from the PCI bus and writing to memory until it completes the full transaction. Upon completion of the access, DMA engine 208 signals the accelerator 200 interrupt control logic to transmit an interrupt to the host indicating that the host DMA is completed.

It should be noted that depending on what program file is being executed on the host, an initial value may be loaded into parameter memory or sample memory. Generally, parameter memory 203 will be initialized by a driver rather than by a program per se; initialization is application specific and is done by proxy for the DSP application running on the host. For example, one of the algorithms which may be installed in parameter memory is the AC 3 Dolby filtering algorithm. Assuming that the Dolby AC 3 algorithm has already been loaded, code within the host signals a driver within accelerator 200 and that driver in effect initializes memory for the AC#3.

Once all subsystems have been initialized, accelerator 200 is ready to start and therefor releases reset and stream processor core (SP) 100 begins running. SP first starts executing at a "background task" which in is addressed on program memory address 0040h; however, the background task preferably always starts at the beginning of a frame time and therefore the first word executed actually is the foreground interrupt vector which is at program memory address 0020h. The "foreground task" then executes to completion and processing returns to background task. In other words, from a software standpoint, the division of tasks (operations) performed by stream processor 100 is between the foreground and background tasks.

The background tasks in run at an 8 kilohertz rate and the foreground tasks run on an 8 kilohertz frame interrupt. Algorithms such as Dolby AC#3 audio filtering for example operate on audio blocks which are not fractions of a millisecond but maybe 32 or 48 milliseconds long. Such operations become fairly inconvenient to do at an 8 kilohertz frame interrupt rate since the program must be broken into very small pieces for execution. Advantageously, such operations are run in the background. During the foreground, the bulk of the processing takes place, with the exception of the processing of time consuming algorithms like Dolby AC#3 audio filtering.

Figure 2B:
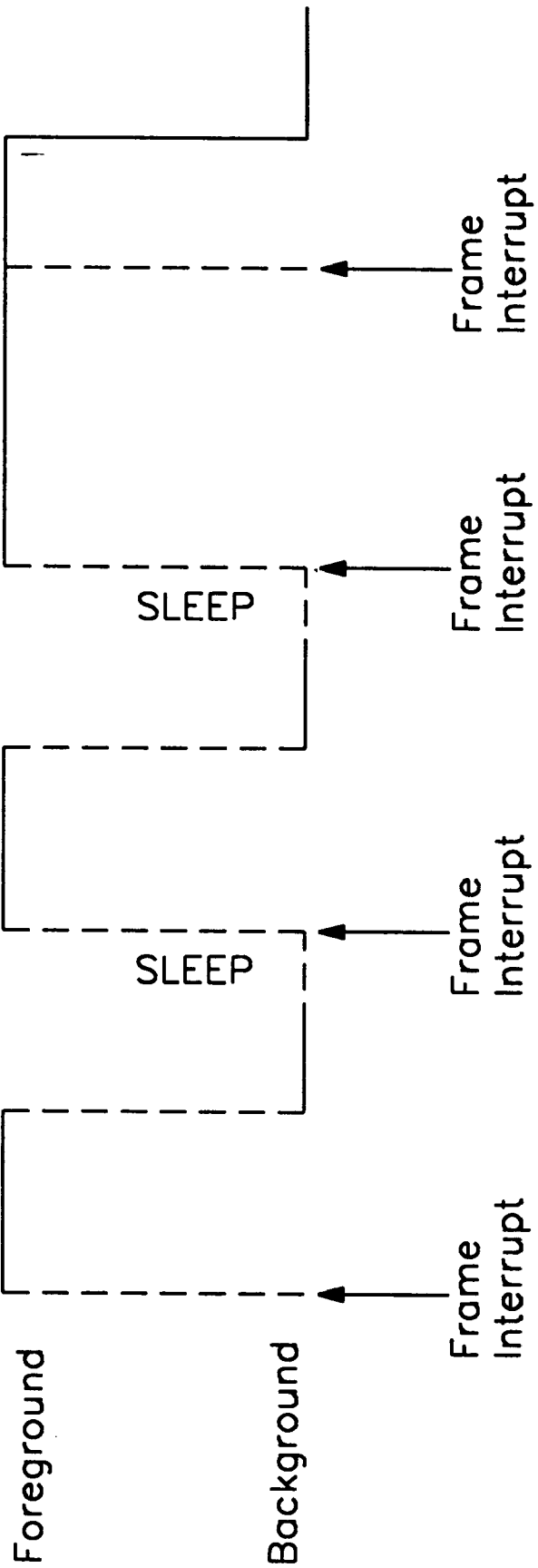
FIG. 2B is a diagram depicting selected operating cycles demonstrating foreground and background partitioning.

FIG. 2B is an execution diagram depicting a selected number of operating cycles for discussion purposes. In FIG. 2B the lower level lines labelled BG indicate background tasks and the higher level lines labelled FG indicate foreground tasks. After processor reset, processing starts in the background and then immediately transitions to the foreground. The foreground tasks then run to completion and processing returns to the background. This sequence repeats itself with each processing frame initiated by a frame interrupt.

The time required for the foreground and background tasks may vary. For example, assume for discussion purposes that the frame rate is 8 kilohertz. If a data stream is incoming at 44.1 kilohertz (which is not a multiple of 8), processing may have to vary between 5 and 6 sample processing and therefore the timing of the foreground tasks may consequently also vary as required to process the changing numbers of samples taken per frame. It should be noted that other streams may be running at every different rates, such as 32 kilohertz or 22.05 kilohertz, all of which will be integrated into a single sound and thus foreground time may also vary between streams.

Sample rate conversion mixing preferably is the primary operation upon which the structure of the foreground task is based. In sample rate conversion mixing, samples are combined at a given sample rate. For example, the samples may be mixed together, subjected to volume control at a given level, and then the mixed up to the 44.1 kilohertz rate (the final rate set up by the host software). Alternatively, the final rate may be 32 kilohertz and therefore, if data is already running at the 32 kilohertz rate, the mixing up step can be eliminated and processor overhead saved. From a digital signal processing standpoint, rate conversion from 8 kilohertz to 44.1 kilohertz or from 32 kilohertz to 44.1 kilohertz is the equivalent operation. A polyphase filtering approach is implemented in software. The input samples are passed to 128 polyphase filters and an interpolation is performed between the two nearest responding filters to achieve high resolution. In other words, the process physically interpolates by 128 and then linear interpolates to up to 44.1 kilohertz, with one of the points from the linear interpolation is chosen to map to the output. A phase increment is specified as an increment over time and additionally a small correction factor is applied since a power of two interpolation has been used; when mixing from 8 kilohertz to 44.1 kilohertz, an insufficient number of multiples of two are involved as coefficients (factors) and therefore some interpolation factors (coefficients) such as 7,3,1 close degree, around 44.0995 kilohertz which is less than 30 parts per million off the target rate of 44.1 kilohertz.

A preferred method is provided according to the principles of the present invention to account for the creeping error which occurs because the interpolation generally only employs coefficients which are powers of two. With every frame, a correction of a selected number of LSBs is added to the phase which maintains the phase accumulation, over a selected number of frames. For example, assume an interpolation between 8 kilohertz and 44 kilohertz. Analysis of the prime factors reveals that over 80 8-kilohertz frames there are 441–44.1 kilohertz samples. From this, a common divisor can be extracted. The equivalent amount of time is then computed and the error resulting over that time is calculated. Correction is then made on a 8-kilohertz basis, wherein every 8 kilohertz a small correction is added until the end of the period for 80 frames has passed. After 80 frames, the correction process is repeated.

The foreground is an interrupt in the traditional sense. As is shown in FIG. 2B, the foreground/background partition results from a frame interrupt, with the foreground task initiated on the interrupt and return made to the background on completion of the foreground task. In the typical case, there is no processing to run in the background and the background task runs momentarily, determines that there are no operations to be performed and then enters sleep. During sleep, clocks can be stopped to reduce power. The background can be revived by a processor interrupt; otherwise, processing returns to the foreground task at the next frame interrupt.

However, if a determination is made that a task must be performed during the background, for example the host has written a word to memory that requires processing or continued execution of an algorithm initiated before the interrupt is required, the processing occurs during the background. The background task is interrupted with the next frame, even if it is still executing a task, and enters sleep. In this case, the foreground tasks runs, and if relatively simple operations are being performed, CPU cycles are saved. The background task is then basically able to consume CPU cycles not consumed in the foreground. The ability to use unused cycles from the foreground for performing background operations allows the processing of algorithms in the background which require substantial amounts of processing time, while still maintaining real time processing for high data rate sample processing. For example, the AC3 algorithm has a frame period of between 32 and 48 milliseconds. 32 milliseconds, for example, is the equivalent of 256 foreground frames. Over that amount of time the foreground interrupts (tasks) require a certain number of the processor MIPs. Therefore, for a MIPs standpoint, a computation is made for the background task to determine whether adequate MIPs remain from the foreground task to complete the contemplated background task in time. The time allocated to the foreground task can then be varied as required to accommodate the background tasks.

It is also possible for the foreground task to use more than its allotted time for a given frame. In this case however, during the next frame the foreground task must use less than its allotted time. In effect, the foreground task starts with an interrupt of the background and then continues on in the foreground until it finishes, at which point in returns to the background task. The third cycle in FIG. 2B illustrates this feature.

This flexible framing feature is advantageous when tasks are run at very low rates. This may occur for example during the processing of 8 kilohertz or 4 kilohertz samples. If 4 kilohertz samples are being processed and a very long filter is being used, filtering may only be necessary on every other frame. The filtering task can then be allotted a time period very near the average task time instead of allotting it a worst case time. Allotting the average case time works so long as the given task has the property that it requires more time during one frame and less time in the immediately following frame. A single frame overrun is typically allowable, however if two frame overruns occur, error conditions may be created. For example, it may become impossible to fill the input/output pipelines.

At the end of the frame interrupt a return from interrupt occurs. During each frame everything in the foreground task may executed. Wherein the background task maintains continuity across frame interrupts, the foreground task executes programs during each frame independently. Tasks that run in the foreground may perform some work one frame and not the next, although the opportunity is provided for every foreground task to be executed on every frame.

Figure 2C:
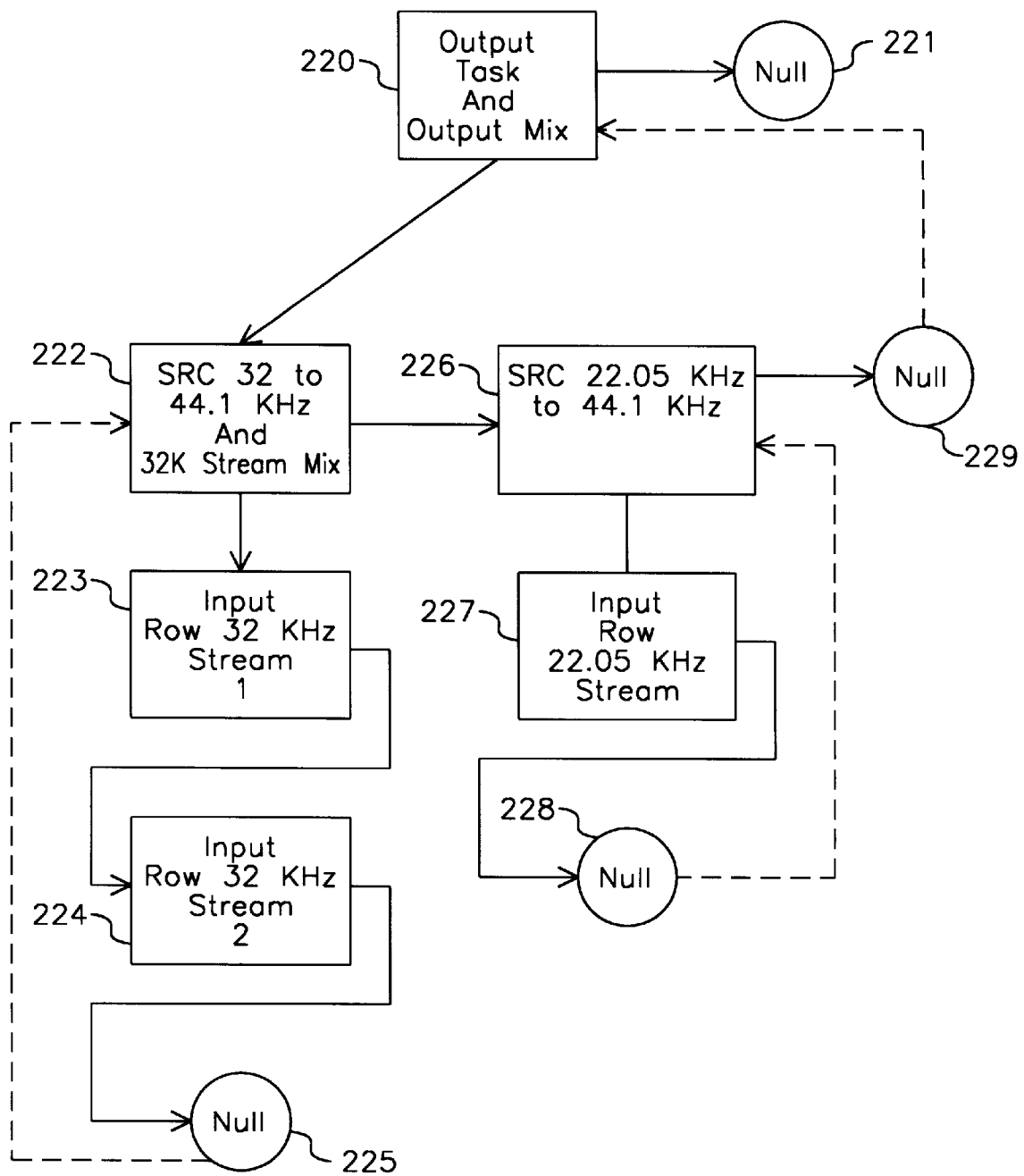
FIG. 2C is a diagram depicting a typical software operation performed on the system of FIG. 2A according to the present invention.

The preferred software supporting the foreground tasks implements a tree structure using a global pointer. FIG. 2C is block diagram illustrating this principle. In this case an output is calling for two 32 kilohertz and one 22.05 kilohertz streams to be retrieved from sample memory 204, up-converted to 44.1 kilohertz and mixed for output. Generally, the program first calls the first task on the sublist, the first task in turn calling for all the required inputs necessary for its execution. In the illustrated operation, first task is the output task at block 220 which calls for mixed 44.1 kilohertz data streams and volume control, including amplitude envelope generation. Initially a null and return occurs at 221 since no data is available to output; the host guarantees that any raw inputs are always on the end of the task list.

Data for mixing and output is first called from 32 kilohertz sample rate conversion (SRC) and stream mixing task 222. In the case of the raw 32 kilohertz data, the mixing task requires two streams of data from the corresponding sample buffers in sample RAM 204. In the illustrated operation, raw 32 KHz data for stream 1 is read at block 223 followed by a read for stream 2 at block 224. When the samples are read, the sample address generation unit generates requests to retrieve data whenever space is available in the sample buffer for the next buffer full of data to be input. This task is preferably allocated to the conversion/mixer task because the mixer is also responsible for advancing the input pointer as it retrieves data from the in sample RAM. The sample buffers are sized appropriately as a function of the stream rates. When the 32 kilohertz buffers are filled at blocks 223 and 224, processing reaches a null 225 and returns to the mixing/conversion task 222 for mixing.

The results of the mixing of the 32 kilohertz streams are stored in an intermediate buffer. Sample rate conversion (block 222) is then performed on the 32 kilohertz samples retrieved from the intermediate buffer to convert the mixed data stream from 32 kilohertz to 44.1 kilohertz. The preferred sample rate converter is a 24 tap filter implemented with twenty-four 128 polyphase filters or 3K filter coefficients. The results of the sample rate conversion are then sent to an output buffer.

The next task called is the 22.05 KHz to 44.1 KHz sample rate conversion at block 226. This task in turn calls for the input of raw 22.05 KHz data at block 227 (in this case only a single 22.05 KHz stream is being processed). The 22.05 kilohertz input sample buffers are filled with raw data and processing continues until a null is reached at 228. With the input data available, processing returns to the sample rate conversion task at 226. The 22.04 kilohertz streams are retrieved from buffer, mixed and then converted to a 44.1 kilohertz rate using sample rate conversion. This processing preferably uses the same code as for the 32 kilohertz but a different control block and different data. The results of the mixing and conversion of the 22.05 KHz data is stored in an output buffer.

Once all the sample rate conversions have been performed, a null is reached at 229 and processing returns to output mixing task 220. The data is mixed and then sent to an output buffer for transmission, for example, to the host, and the next task is performed.

Figure 2D:
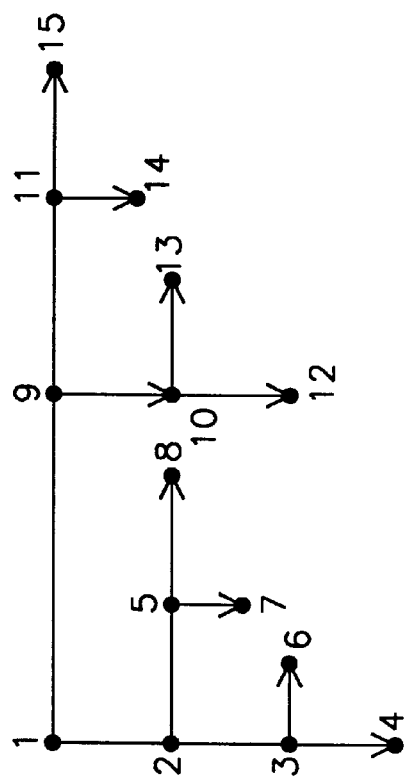
FIG. 2D is a diagram illustrating a general method of executing software tasks according to the present invention.

The processing discussed immediately above follows a tree structure. A child task is pointed to, and then under the child task, pointers point to siblings. This allows implementation of a multi-branch tree with only two pointers required per node. An exemplary generalized tree structure is shown in FIG. 2D. The processing starts a Node 1, and proceeds to Node 2 which requires its input from a sublist. Node 2 calls Node 3 for its input. Node 3 requires input and in turn calls on Node 4. Node 4 performs the necessary processing to obtain the required data and returns to Node 3. Node 3 completes its output to Node 2 and then branches to Node 6. Node 6 completes its processing and a null is reached which returns to Node 2.

Node 2 then branches to Node 5 and the process is repeated similar to that performed at Node 3. After Node 2 completes its tasks and return is made to Node 1, Node 1 branches to Node 9 and processing repeats similar to that performed at Node 2 through the remaining nodes.

Figure 2E:
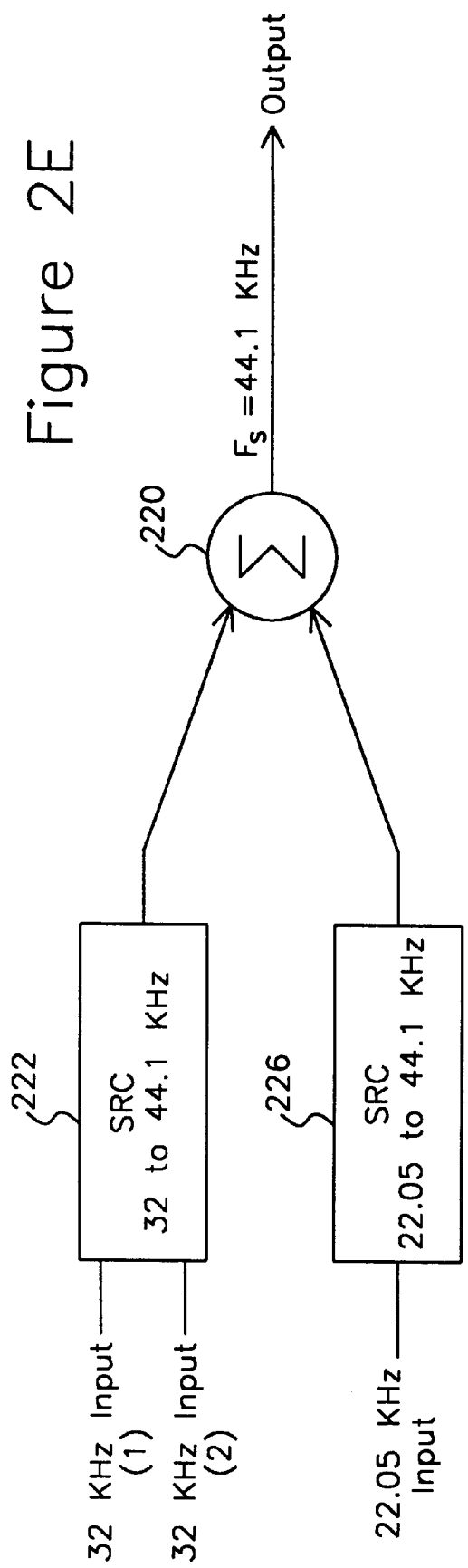
FIG. 2E is a diagram representing the execution of the tasks of FIG. 2C by accelerator 200.

FIG. 2E is a filter diagram of the implementation of the processing procedure depicted in FIG. 2C by stream processor 100, where like numbers represent like operations. Two 32 kilohertz raw data streams are input to sample rate converter 222 and a 22.05 kilohertz raw data stream is input into second sample rate converter 226. The 44.1 kilohertz outputs from the sample rate converters are input to a mixer/output 220.

The tree structure requires priority of execution. In the processing discussed above, tasks execute through the tree shown in FIG. 2D from left to right. The tree structure advantageously provides a means of organizing the tasks. A task is executed and then the processing falls down the tree, as each task higher up the tree calls on the tasks lower on the tree for input. It should be recognized that the amount of data required by the higher level tasks will differ from that required by the lower tasks on the tree. For example, if six output samples are required at the top of the tree and 32 to 44.1 kilohertz converting is being performed, only 4 input samples may be required at the bottom of the tree. Thus, by appropriately organizing the tree, it is possible to drive multiple processing paths from the master output.

The host software is responsible for constructing the trees, which is a link structure in SP program memory 202. The trees then reside in program memory and when an application running on the host requests a stream at a given sample rate, the host checks to determine whether the sample rate converter tree, such as the one shown in FIG. 1C, required to convert the sample in sample memory to the required output is available. If the required sample rate converter is available, that converter is used, otherwise the host creates a sample rate converter tree and links it to the rest of the system. In this case, the tree is traversed twice, one for sample rate conversion and once for mixing. Thus, extra samples have to provided to the output task to insure that the output needs are met.

The host can only write in 32-bit words. For example, for volume control, the host writes an entire volume value, with 16 bits for the left channel and 16 bits for the right channel. These two 16-bit words cannot become separated. Accelerator 200 then updates the left and right channel volume words, which the host can change at any time by writing a 32-bit word to accelerator 200. It should be noted that the left and right channels do not have to be set to the same volume. In other words, the two volume control words are unique to their respective channels, although paired together into a single doubleword. To obtain a larger range of volume the left/right volume doubleword is multiplied by a left/right sample pair in a single multiplier-accumulator. For stereo volume control the dual multiply-accumulate units are used.

Figure 2F:
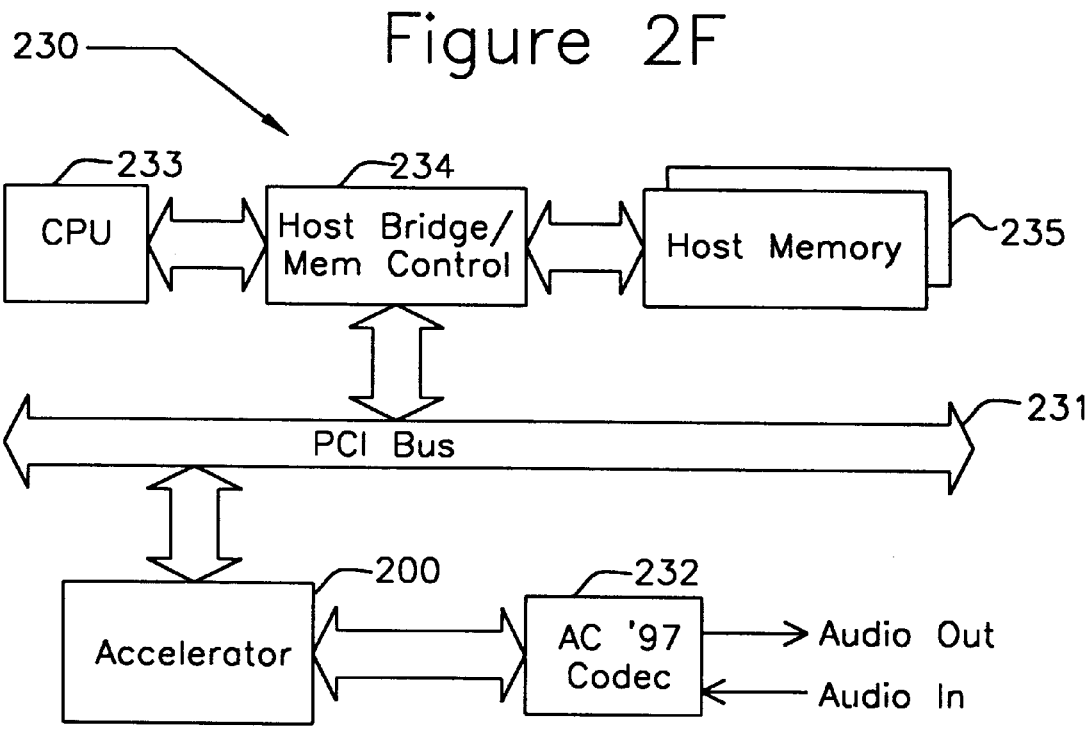
FIG. 2F is a diagram of a first information processing system in which accelerator 200 can be suitably employed.
Figure 2G:
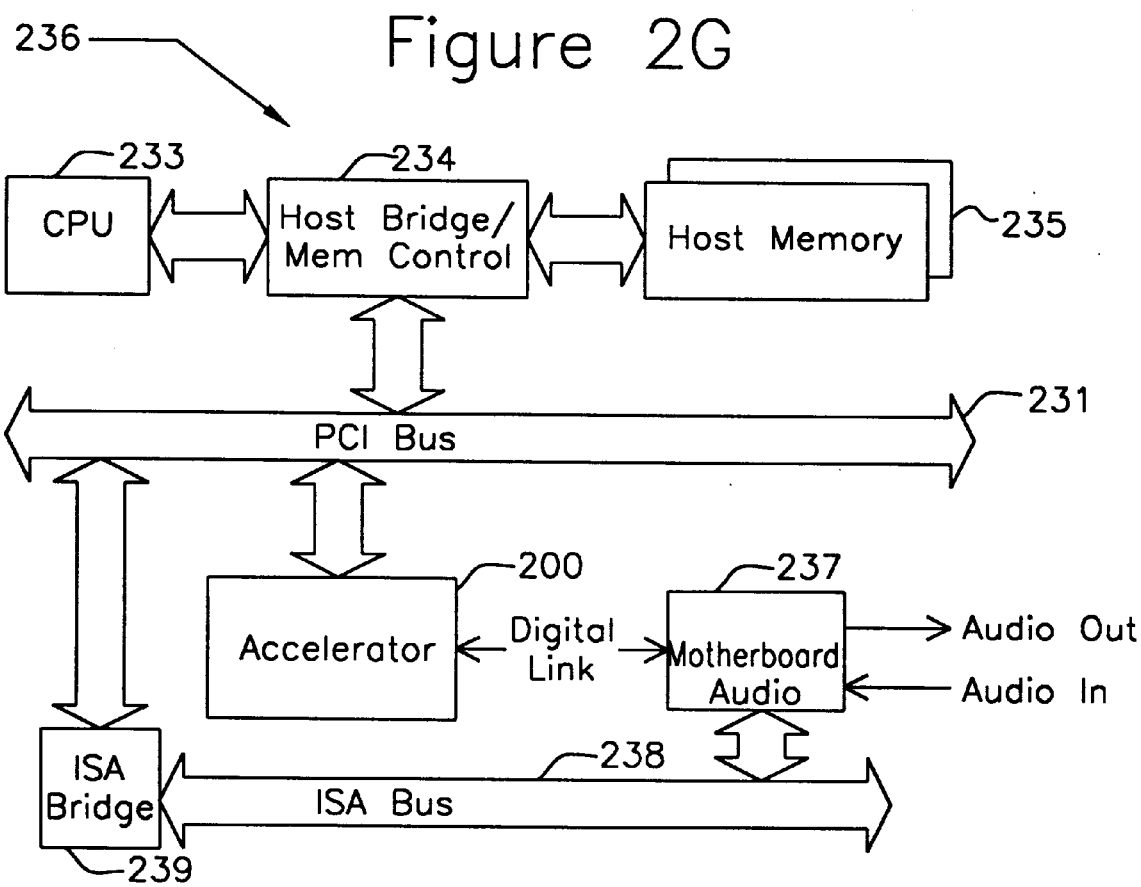
FIG. 2G is a diagram of a second information processing system in which accelerator 200 can be suitably employed.

FIGS. 2F and 2G depict two exemplary information processing systems in which accelerator 200 can be suitably employed. Those skilled in the art will recognize that accelerator 200 is applicable in a number of information processing systems and thus the principles of the present invention are not limited to systems such as those shown in FIGS. 2F and 2G.

In system 230, shown in FIG. 2F, accelerator 200 is coupled to a PCI bus 231 as discussed in detail above. This system is preferably employed in systems where Sound Blaster capability is not required. Accelerator 200 is also directly coupled to an AC-'97 audio Codec 232 by a serial data link. System 230 also includes a CPU such as an Intel X86™ or Pentium™, ULTRASPARC, or PowerPC class processor which is coupled to a PCI bus 231 through a host bridge/memory controller 234. CPU 233 is also coupled to host memory 235 through host bridge/memory controller 234.

The serial link between accelerator 200 and Codec 232 supports 12 channels in each direction, with a 12 megahertz clock and a 48 KHz frame rate. This interconnection advantageously provides for telephony based audio, including telegaming, and other communications applications which cannot be supported with current modems.

A second system 236 is shown in FIG. 2G. In system 236, audio is input and output to the system through the audio motherboard, preferably a Crystal Semiconductor CS4237B motherboard audio 237. Motherboard audio 237 is coupled directly to accelerator 200 through a digital link and is further coupled to PCI bus 231 through an ISA bus 238 and an ISA bus bridge 239. System 236 generally supports Sound Blaster processing and similar operations which are more easily performed using an ISA bus. In this configuration, accelerator 200 resides on the PCI bus primarily to achieve high bandwidth and low latency accesses with host memory, which are not available through the ISA bus. The digital link primarily provides a bidirectional link between accelerator 200 and motherboard 237. Preferably, the link includes a link from accelerator into the digital mixer on motherboard 237 and a post-mix and audio data input links from motherboard 237 to accelerator 200. All the data required for echo cancellation using algorithms on accelerator 200 can be provided by motherboard 237 via the digital link.

FIGS. 3A–3D depict the four basic instruction formats available in the illustrated embodiment along with thed TABLES 7a–7 are corresponding Opcode maps; each instruction word is 40-bits long.

FIG. 3A depicts a preferred mOp, aOp and ALUop instruction format. The move operation code (mOp) field is preferably decoded and executed concurrently with the specified aOp and ALUop fields. The mOp field along with the associated move operand filed (mpy/mem/moveOperands) specifies a multiply, parameter 203 memory load/store, accumulator load (multiply-accumulator unit 105) or sample 204 memory store operation. The multiply-accumulate (aOp) field along with its associated multiply-accumulate operand field (addOpers) specifies a 40-bit bit operation within multiply accumulate unit 105. This operation either adds or subtracts two accumulators or adds the product from the multiplier to an accumulator or a rounding constant. The map for the mOpcode field is given in TABLE 7a and the map for the aOp field is given in TABLE 7b.

The ALU operation codes/operands, "ALUop", fields include the ALU operation code (aluOpcode) and ALU operands (aluOperands) fields, which specify 16-bit ALU 104 arithmetic instructions, 16-bit ALU 104 shift instructions, and 16-bit ALU 104 logic instructions. The map for the ALUop fields are given in TABLE 7c. The arithmetic instructions include add/subtract with optional saturation on overflow, add/subtract with carry/borrow and optional saturation on overflow, compare, and conditional add. Preferably, each of these instructions may be executed conditionally on a test bit and a special conditional add may be executed conditionally upon any ALU status flag. The shift instructions include shift-left up to 15-bits with optional saturation on overflow and shift-right up to 15-bits with optional sign extension. These shifts may be executed conditionally on a test bit. The 16-bit logical instructions include AND, ANDNOT, OR, XOR, test, and conditional-move (each of which may be executed conditionally on a test bit). Conditional-move, like the special conditional-add instruction, may be executed conditionally upon any ALU status flag.

Further, move, load and store instructions in the ALUop fields provide partial doubleword load/store capability and may be executed conditionally on a test bit. Only one load/store and one move may be performed concurrently.

FIG. 3B depicts an exemplary parallel extended load/store and ALUop instructions format. In this case, the mOp field is preferably decoded and executed concurrently with the specified operation in the ALUop field. Either the mOp or the ALUop specifies an indexed parameter memory load or store, the index for the load/store being extended from four bits unsigned to eight bits signed.

FIG. 3C depicts a wideOp instruction format. Table 7d is a preferred mapping of the wideOp instruction field. The wideOpcode/sideOperands fields are preferably decoded and executed singly. This instruction format is used to specify the program control instructions such as conditional branches, calls, returns and zero-overhead FOR loops, 16-bit immediate ALU arithmetic and logical instructions, load and store using direct addressing mode, and special purpose instructions that are only occasionally needed. These instructions hold off the completion of the immediately previous multiply instruction, if a multiply was already pending when the previous multiply instruction was issued. Advantageously, this permits these instructions to be interspersed through the pipelined multiply/add processing.

FIG. 3D depicts the format for a dual packed ALUop instruction format. The aluOpcode2 and aluOperands2 (ALUop2) fields are decoded and executed one cycle after the aluOpcode1 and aluOperands1 (ALUop1) fields are decoded and executed. Advantageously, this form allows for efficient packing of control code. Both ALUop1 and ALUop2 fields execute as a unit, (i.e., an interrupt cannot be taken between the two packed instructions fields).

Figure 4:
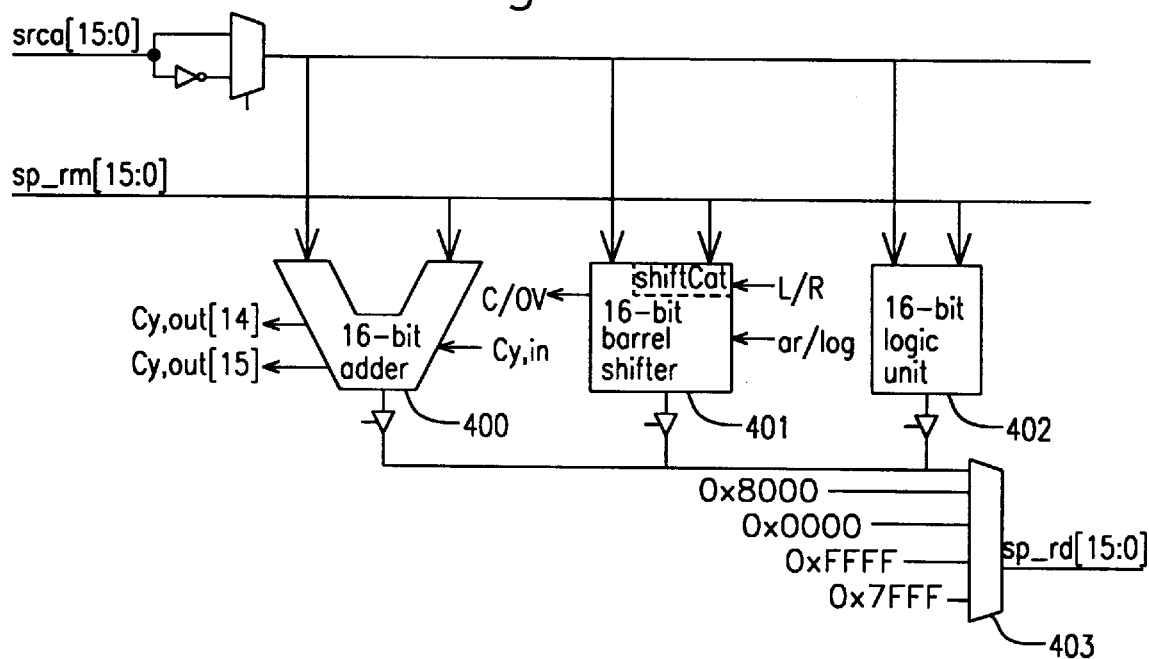
FIG. 4 is a diagram of 16-bit ALU 104.

FIG. 4 is a functional block diagram of 16-bit ALU 104. In the illustrated embodiment, ALU 104 includes a 16-bit adder 400, a 16-bit barrel shifter 401, a 16-bit logic unit 402, and an output selector 403. The arithmetic function instructions of ALU 104 are provided in APPENDIX 1 hereto. The basic instructions include add, subtract, compare and conditional add instructions. The majority of the instructions are in the aluOp and wideOp formats. Among other things, instructions are given for add (no saturation on overflow), add with saturation on overflow, add with carry (no saturation on overflow), add with carry and saturation on overflow, conditional-add with saturation on overflow, compare and set test bit according to desired condition, subtract (no saturation on overflow), subtract with saturation on overflow, subtract with borrow (no saturation on overflow) and subtract with borrow and saturation on overflow.

The ALU shift instructions are set out in Appendix 2. The basic shift operations include shift left logical, (no saturation on overflow), shift left logical with saturation on overflow, shift right logical (unsigned right shift, insert zero bits) and shift right arithmetic (signed right shift, extends sign bit).

The logical instructions for ALU 104 are given in APPENDIX 3 hereto. The basic logical operations include logical AND, logical ANDNOT, logical inclusive-OR, logical exclusive-OR, bit set and clear, logical test and optionally set test bit according to desired condition, logical bit test and optionally set bit according to desired condition, and conditional move.

ALU 104 takes receives all of its source data from register file 101, although it can also take immediate data from an instruction and write back the result to the register file. ALU 104 operates on 16-bit data, therefore, two concurrent inputs are provided to ALU 114 from the register file, with a register from the left column of register file 101 sourcing one input and a register from the right column of register file 101 sourcing the second input. The results are written back to a single 16-bit destination in register file 101. For example, the contents of register R4 can be added to the contents of register R8 and the result stored in register R3. In addition to an adder, ALU 104 includes barrel shifter 401 such that right or left barrel shifts can be performed in saturation.

Further operations such as AND/OR—store are also supported in the logic unit 403. The ALU also sets flags in a flag register as part of the results of given operations.

Figure 5:
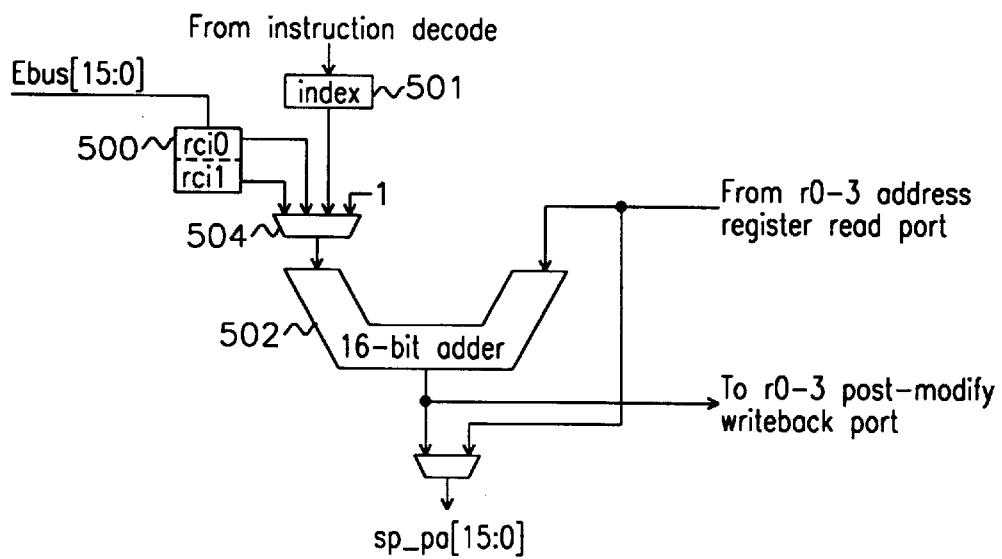
FIG. 5 is a more detailed diagram of parameter/coefficient address generation unit 102.

FIG. 5 is a more detailed functional block diagram of parameter/coefficient address generation unit 102. Parameter/coefficient address generation unit 104 allows parameter RAM 203 and coefficient ROM to be accessed using alternate address modes. Three such modes are provided: indirect post-increment addressing, register indirect index addressing, or direct addressing, where the address is specified directly in the instruction.

Index addressing is a very useful for accessing the data structure used for parameter RAM and coefficient ROM data storage. In index addressing, a pointer points to the beginning of the structure and by indexing by a given value from the pointer, data can be randomly accessed within that structure. Most DSP's require that data be organized in memory in the order it will be required and then a post-increment performed to move through each data structure. However, data structures which include a number of different parameters which require random accessing, post-increment addressing is inefficient. Thus, index addressing is provided for parameter RAM and coefficient ROM. Index addressing is also valuable in accessing special registers. The programmer has two instructions available, one which moves to the index register and one which moves from the index register. Using these instructions, the programmer can access specific registers through index addressing.

The addressing mode is selected through a multiplexer 504, the output of which is presented to a first input of adder 502. For increment addressing, multiplexer 504 selects between one the values in increment registers 500 for increment addressing and for index addressing passes the value in index register 501. Adder 502 then adds selected increment or index value passed by multiplexer 504 to an address received from the read port of a selected one of the file registers r0–r3.

The output of adder 502 is returned back to the post-modify writeback port of the selected register r0–r3 which provided the original address. Multiplexer 503 also allows for direct addressing. Specifically, multiplexer 503 selects between the output of adder 502 or the address received directly from the selected register in register file 101.

Figure 6A:
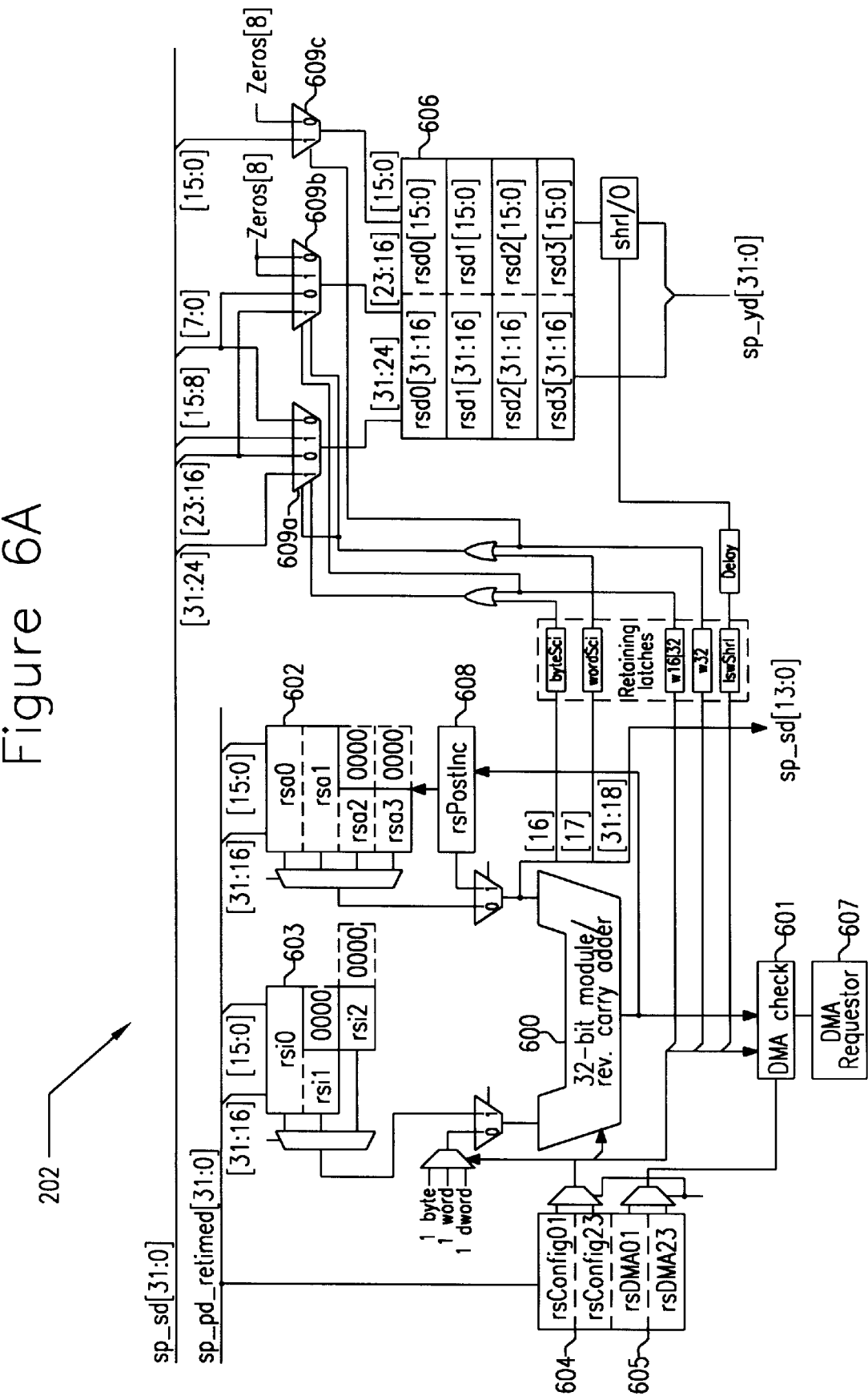
FIG. 6A is a block diagram of sample AGU 103.

FIG. 6A is a functional block diagram of sample address generation unit (AGU) 103. Sample address generation unit 103 includes a 32-bit modulo/reverse carry adder 600, a DMA check 601 and a series of registers, which are more fully described in TABLE 1. These include sample memory address registers (rsa) 602, sample memory increment registers (rsi) 603, sample AGU configuration registers (rsConFig) 604, sample AGU DMA address registers 605, and sample AGU data registers 606. DMA requestor 607 which will be discussed in further detail below, also forms a part of sample address generator unit 103.

A Codec is generally coupled to serial I/O ports 207 for direct inputting and outputting of serial audio data. Accelerator 200 is also capable of sending that data back to the PCI bus.

An address is loaded into address registers 602 defining where the next DMA to sample memory 204 will be performed. That address is updated each time DMA engine 208 issues a DMA request. Sample RAM AGU 103 determines from the first address, along with information indicating whether stream processor 100 is reading or writing, whether there is enough data already available in sample memory 204 for a write to the host or during a read from host, whether there is enough space in sample memory to read the next data in. If these conditions are met, the DMA request is issued. Sample RAM AGU 103 evaluates these conditions based on parameters provided as part of the sample address. This advantageously allows a programmer to essentially ignore when a DMA occurs; all that must be done is to load the appropriate registers and after the address has been advanced for the last time during the current processing frame, trigger a DMA if requested to do so by the programmer.

When sample RAM AGU 103 determines that a request can be serviced, the DMA request is issued to requestor 607, which prioritizes the requests being output to DMA engine 208. Only one DMA request can be issued at a time, although 96 entries are available in the requestor array to support the 96 possible streams of audio going to or from the host (although not bidirectionally). The requestor block retrieved from parameter memory specifies the direction of all the addresses in host memory and accelerator 200 memory.

Both DMA requester 607 and sample address generator unit 103 advantageously support multiple types of data streams. DMA requestor 607 and sample AGU 103 support 16-bit/8-bit stereo/mono pulse code modulated (PCM) streams for sampling and playback and 16-bit/8-bit looped samples for wavetable synthesis playback. Preferably, each DMA channel consumes sixteen 32-bit words and stream processor 100 can process up to 96 DMA channels. 1536 32-bit words (DMA channels) support 96 streams.

Increment registers 603 include 32-bit register rsi0, and 16-bit registers rsi1 and rsi2. Register rsi2 is loaded with the low 16 bits from parameter memory via bus sp_pd, but is read as if those bits were the upper 16 bits of a 32-bit register.

Address registers 602 include 32-bit registers rsa0 and rsa1 and 16-bit registers rsa2 and rsa3. An address retrieved from a selected one of address registers 602 is incremented with a value from a corresponding increment register 603 by adder 600. The post-increment address can be written back to the address register from which the original address came, or directly presented back to the input of adder 600. Further, sample AGU 103 has the additional capability of incrementing a given address from address registers 602 by 1 byte, 1 word or 1 doubleword, under control of bits set in the configuration registers 604.

FIG. 7 depicts the preferred fields of an exemplary DMA channel. In FIG. 7, DMAprio stands for DMA priority (wherein 1,1=high, 1,0=mid-high, 0,1=mid-low, and 0,0=low priority). The D field is the DMA enable field. The maxDMAsize field defines the maximum DMA transfer size in doublewords. The streamNUM field defines the stream number identifying the given stream. The dir field defines the direction of DMA transfer (wherein preferably 0 defines a transfer to sample RAM and 1 defines a transfer from sample RAM). The ds field specifies the size of data in the sample FIFO buffer pointed to the sample phase accumulator. A preferred decoding of the ds field is shown in TABLE 8.

The shr1 field in FIG. 7 defines a shift first word right. This is a non-sign extending shift to enable double precision arithmetic using the dual multiply-accumulate units 105. The revCy field is the reverse carry mode select bit and when selected, the MODULO is ignored and only the upper 14 bits of the address register are computed using reverse carry mode, the lower eighteen bits of the result are cleared. The MOD field is encoded as defined in TABLE 9.

The functions of the registers of sample address generation unit 103 can generally be described as follows with regards to FIG. 8, with further reference to TABLE 1. Generally, the upper fourteen bits of registers rsa 0–3 specify the current address into 32-bit sample RAM 204. If 16-bit signed data size is selected, then the next least significant bit (rsa 0–3 [17] or sample byte PTR [1]) specifies whether the current 16-bit sample is in the low or high 16-bit word of the specified doubleword location in sample RAM 204. Samples are stored least significant bit first (little-endian), so if rsa 0–3 [17]=0, the least significant 16-bit word is selected; otherwise, the most significant 16-bit word is selected. Similarly, if 8-bit signed data is selected, then the next two least significant bits (rsa 0–3 [17:16] or sampleBytePtr [1:0]) specify which of the four bits contained in the current 32-bit doubleword is to be selected.

In FIG. 8, sampleBytePtr represents the pointer into sample RAM 204 capable of resolving down to byte samples. The fracBytePtr field is the fractional part of a pointer into sample RAM 204 used to accumulate a fractional phase for sample rate conversion (either polyphase or linear interpolation). The sample ByteIncr field defines an increment down to byte resolution (integer part of phase increment). The fracByteIncr field defines the fractional part of the increment (for sample rate conversion).

Configuration register rsConfig01 is used to, among other things, configure the data stream modulo, data size and data type for data addressed in address registers rsa0 and rsa1. Configuration register rsConfig23 does the same for data addressed through address registers rsa2 and rsa3. With regards to data size, it should be noted that four data sizes are available, 8-bit signed data, which is typically used for input of samples stored in sample memory, dual 8-bit mode data which provides for 8-bit stereo samples paired together, 16-bit mono mode data, and 32-bit mode data which is essentially 16-bit stereo mode. These data size definitions are mode supporters, with the actual use of the data, for example mono or stereo, determined by the application. In other words, the data size definition allows for the more efficient storage and processing of samples, the programmer needing only to select the data size to set-up the sampling and processing.

Bits written into configuration registers 604 also enable and disable DMA operation. The stream number is sent to DMA requestor 607 to generate a request for the corresponding data stream. The stream number is preferably the address of the external stream control block shifted right by 4 bits. The stream number is 8 bits, although the overall design is implemented to only process 96 streams.

DMA registers 605 includes registers rsDMA01 and rsDMA23, respectively associated with address registers rsa 0–1 and rsa 2–3, hold the next DMA addresses.

DMA check unit 601 checks for underflow and overflow, underflow being measured with regards to the input stream and overflow with regards to the output stream. The configuration registers set-up information about the relevant data stream. When data is accessed from sample memory, the address from the selected address register is post-incremented, using a value from a selected increment register, by adder 600. The output of adder 600 goes to post-increment register 608 and to DMA check unit 601. DMA check unit then takes the DMA address from the corresponding DMA register, which is the address for next the DMA, and the address which was just generated, and determines whether a write-back to one of the registers, rsa [0–3] of the newly generated address should be allowed. If an overflow condition exists, the access is held until the destination memory is ready to accept data. This prevents looping and unwanted write-overs. Essentially, DMA check unit 601 determines whether or not the addressed location after post-increment is already filled.

The sp_sd bus returns 32-bits data from sample RAM 204 and presents it the three multiplexers which select between a single byte, an up-shifted byte, a 16-bit word (which is shifted into the upper 16 bits of the 32-bit doubleword), or a full 32-bit doubleword. Multiplexers 609 select bytes or words as a function of the low order address bits from the address registers 602 and the actual data width is selected as a function of data size bits set-up in the corresponding configuration register 604.

All data received on the sp_sd bus is then loaded into a data register 606 acting as a first pipeline stage. On the next cycle, the data is sent via the sp_yd bus to an accumulator or the multiplier in multiply-accumulate unit 105. The data holding section provided by data registers 606 is substantially advantageous. For example, if data is required multiple times, the data registers 606 are used for the access rather than by a re-read of sample memory. This in turn frees up processing cycles to be used as store cycles.

Figure 6C:
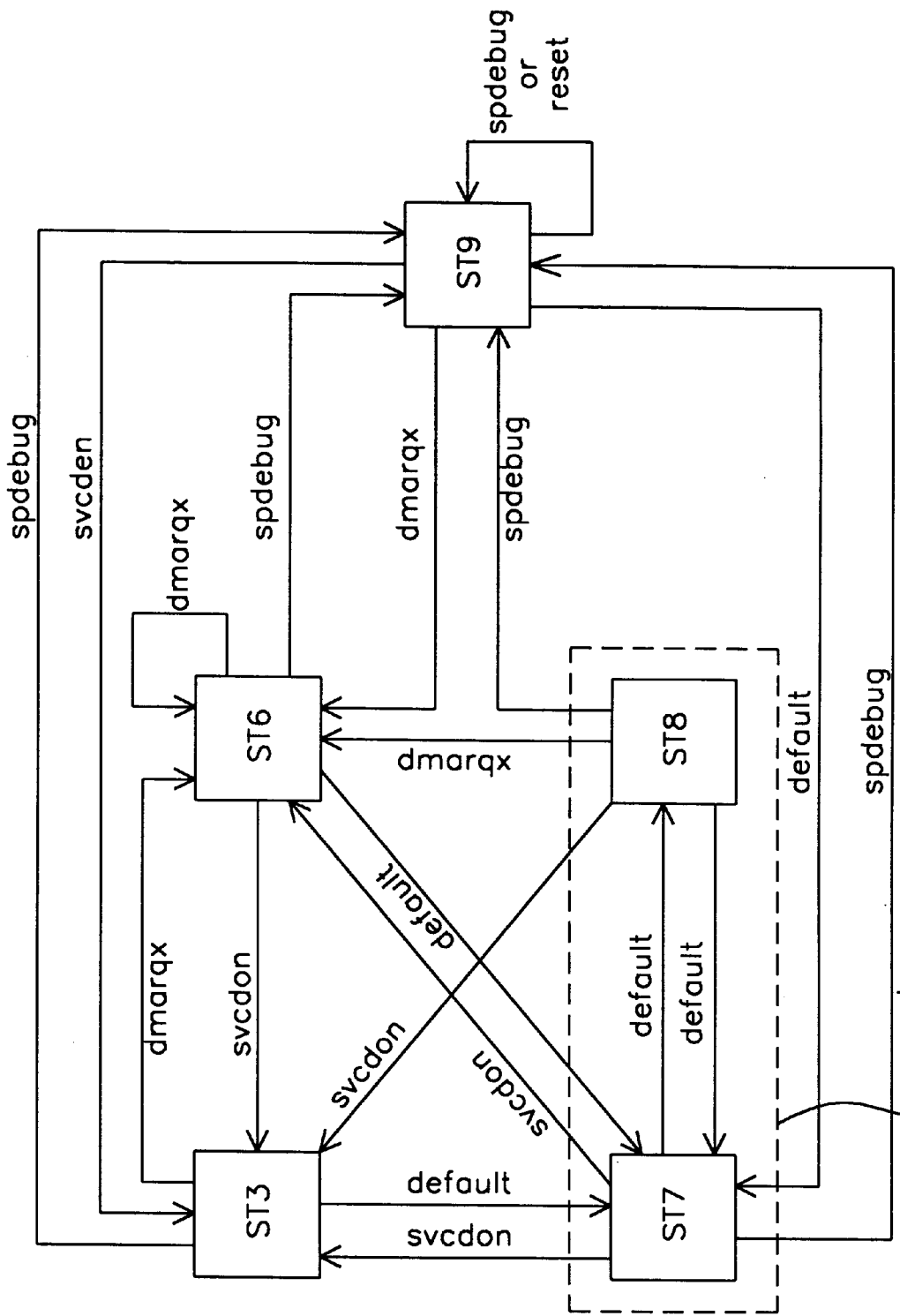
FIG. 6C is a diagram depicting operation of the requester.

DMA requestor 607 is preferably a block of logic which receives DMA requests, stores those requests, and then reissues them asynchronously. A preferred FIG. 6B is preferred layout of the requestor array and FIG. 6C is preferred diagram of the operation of requestor 607. In FIG. 6C, the signals are preferably described as follows:

| | | |
|---|---|---|
| dmatgx | → | Has the program requested a DMA? |
| Svcdon | → | The DMA engine has indicated that the requested DMA has completed. |
| spdebug | → | in debug mode jump to indicated state |
| reset | → | in "reset" mode jump to indicated state. |

Advantageously, when DMA requests are generated faster than DMA engine 208 and PCI bus interface 206 can service the, DMA requestor 607 is able to account for the difference.

Generally, DMA requestor 607 is designed around an array of 96 bit field locations each for storing a 4-bit value which describes the DMA request for a corresponding stream. Each 4-bit value is stored in a location in the array corresponding to the stream number of the associated stream. Each stream number is represented by 8-bits, although only 7 bits are actually used. The most significant 4 bits of the 7 used bits identify the row in the array and the least significant 3 bits identify the column in the array. Each 4-bit stored value includes a request pending bit, 2 bits representing the priority level and 1 bit representing a page table request bit. Those skilled in the art will recognize that the requestor array can be expanded such as to 128 or 256 streams.

DMA requester 607 is controlled by registers rsCON-FIG01 and rsCONFIG23. The preferred fields loaded into these registers are depicted in FIG. 7. In particular, when these registers are loaded, DMA requestor 607 performs a test to determine whether there is a pending request for the stream number loaded. If there is a current pending request, a flag is set and all DMA requests for that stream are masked until these registers are re-loaded. DMA requestor preferably already has this information about the next transfer to trigger the next request.

In FIG. 9, the DMA sample doubleword (Dword) address contains a doubleword address to sample RAM 204 loaded into DMA registers 605. The SE flag is set to one after DMA engine 208 fetches the last sample in the current data stream. The E flag (bit) is set to indicate that an error has occurred. A logical OR of the SE and E flags masks any DMA requests for the current stream.

By adding the maxDMAsize specified in registers reCONFIG01/23 to the next DMA address, according to the modulo specified in the mod field, a pointer is obtained pointing past the ending address for the next DMA transaction. Thus, a determination is preferably made if the base sample address lies outside of this range and if so, a DMA request for the stream (contingent upon any masking being set) is triggered.

Figure 10:
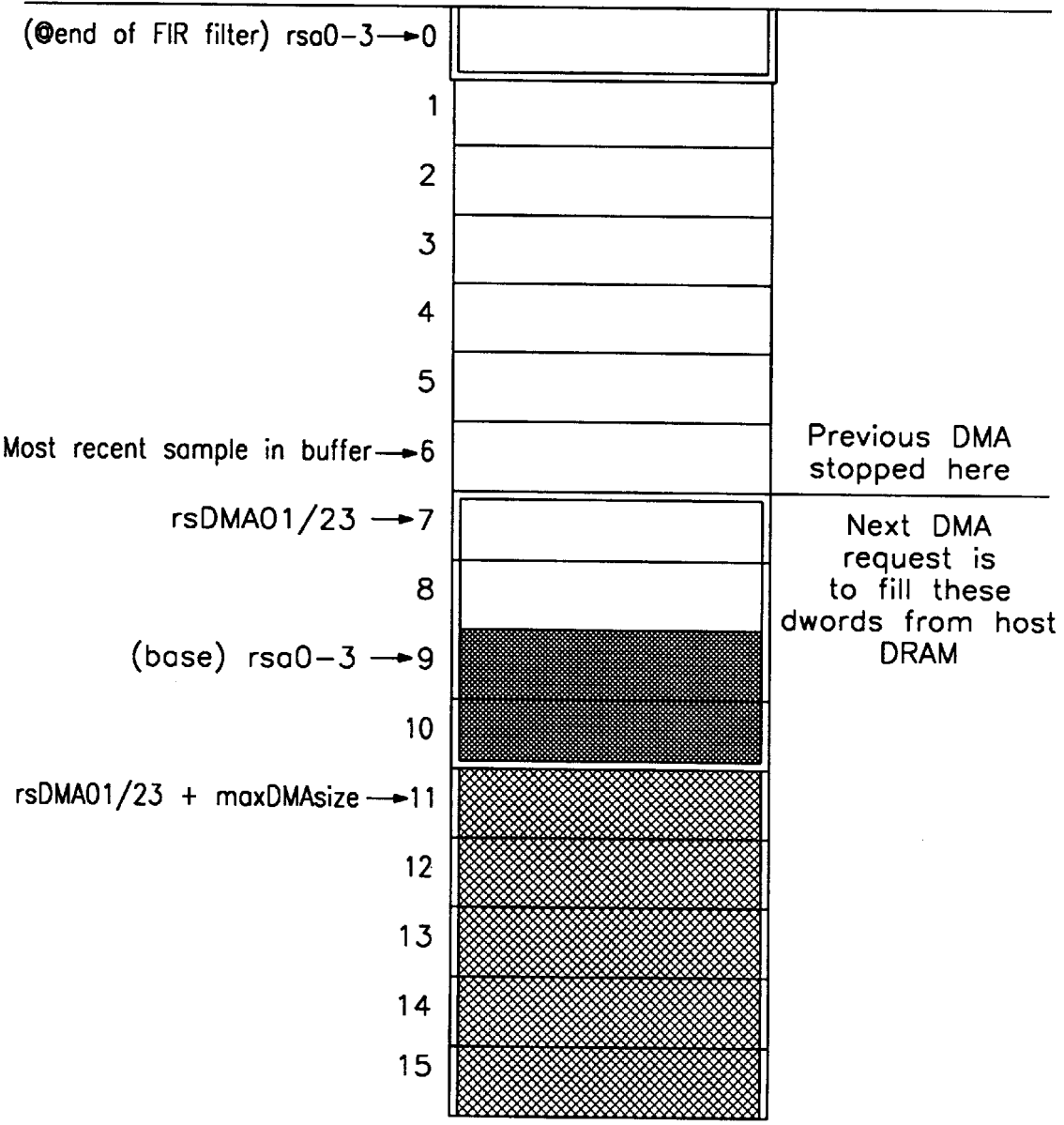
FIG. 10 is a diagram of a modulo buffer and various pointers.

FIG. 10 depicts a modulo buffer 1001 and various pointers implemented in DMA engine 109. Modulo buffer 1001 includes a stack of registers 0–15. Among the pointers are the pointer to the sample address registers rsa0–3 after filtering, a pointer to the most recent sample stored in buffer, a pointer at the value in register rsDMA01/23, a pointer to the base value from registers rsa 0–3, and a pointer to the value in register rsDMA01/23 plus the value in register maxDMAsize. These pointers are shown for a given instance in time and relationship between pointers and registers corresponds to the values loaded into the registers at that point in time.

In addition to triggering a DMA request whenever the base rsa 0–3 is past the end of the block to be filled (or drained), it is also necessary to prevent the rsa 0–3 pointers from advancing beyond the most recent sample in the buffer. Typically, this could occur when the last sample in a wavetable sample buffer has been played or if the DMA engine 208 is unable to keep up with the DMA requests for the current channel. For Example, sample AGU 103 will cancel any increment which results in the advancing the current sample pointer from outside the advancing the current sample pointer from outside the region defined by rsDMA 01/23 and maxDMAsize to that region (this corresponds to buffer underflow for input buffers and overflow for output buffers). The data read will be that at the unincremented address. If the current stream is enabled for DMA requests, an error is signaled to the host via a special interrupt signal. The DMA requestor includes a number of internal registers, including a pending DMA request register array which is as wide as the maximum number of streams to be supported by stream processor 100 (e.g. 96 streams). As indicated above, each element contains four bits including one request pending bit, two DMA priority bits, and one page-table request pending bit. The request pending field is set to one to indicate a pending request for data/samples on the corresponding stream. The DMA priority field specifies the priority to be given for a pending request on the identified stream. The DMA priority bit is set upon each request from the DMA priority field in the rsCONFIG01/23 register. The page table request pending field is set to one to indicate a pending request for the next page-map entry to be read for the corresponding stream. DMA engine 208 informs stream processor 100 upon completion of a direct memory access in which the next page-map entry should be read ahead.

The 96 available streams also correspond to an array of 96 stream control blocks based at address zero in parameter memory 203. Each stream control block begins with a DMA description, a data structure that is interpreted by DMA engine 208 and describes the stream data source, destination transfer size, and signalling.

The state machine of DMA requestor 607 constantly scans the internal DMA requestor register array shown in FIG. 6B for the highest priority pending request (i.e., the next request to be served). When DMA engine 208 completes a transaction, it signals requestor 607 which then passes the stream number of the next stream on to DMA engine 208 to initiate the next DMA transfer. Sample AGU 103 reads the DMA requestor block in the specified stream control block in parameter RAM 203 and then performs the next transfer (normally to replenish an on-chip FIFO buffer). On completion, DMA engine 208 updates the DMA requestor block in parameter memory 203 before reporting DMA complete to DMA requestor 607. Specifically, the request pending and priority bits are cleared for the array register corresponding to serviced stream. DMA requestor 607 then continues by sending the next request according to priority until all the current requests have been served. It should be noted that after all the "regular" priority requests are complete, the state machine steps through the page table (map) request bits, and if any active page table request bits are found, services those requests. As discussed above, the page table requests have the lowest priority for bandwidth reasons.

Figure 11:
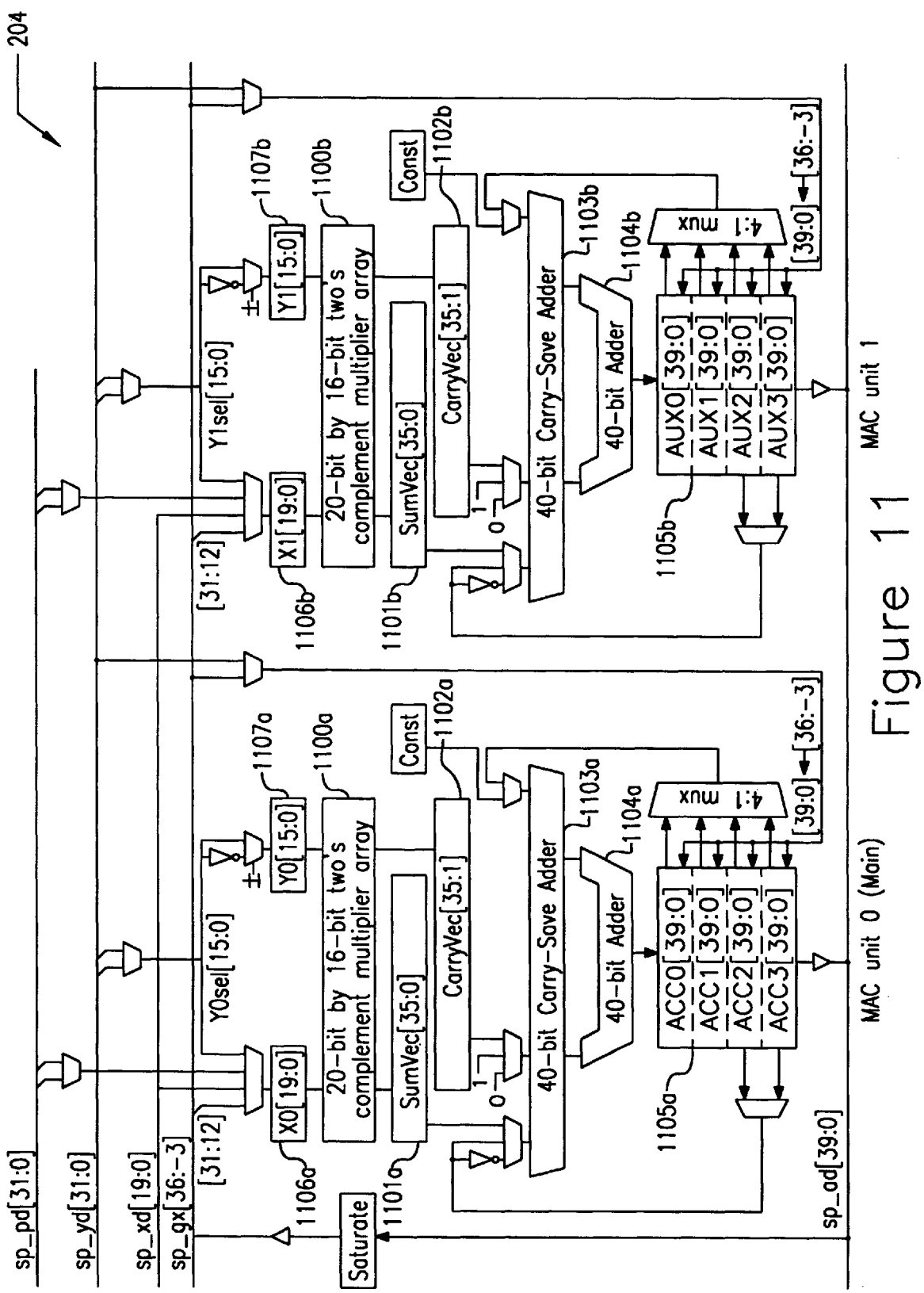
FIG. 11 is a diagram of dual multiply-accumulate units 105.

FIG. 11 is a functional block diagram of the dual multiply-accumulate units 105. The primary circuits forming each multiply accumulate unit include a 20-bit by 16-bit two's complement multiplier array 110, a sum vector register 2091, a carry vector register 2092, a 40-bit carry-save-adder 2093, a 40-bit adder 2094 and a set of accumulators/registers 2095.

In the present inventive system architecture, two multiply-accumulate units (MACs) operate concurrently on parallel data to allow processing of 3-D sound with low sample rate conversion. The need for unique left and right coefficients and the processing of left and right channels for 3-D sound determines also the size of the parameter and sample memories. In the preferred 16-bit 3-D sound processing, the sample size is 16 bits and the coefficients are also 16 bits each. Those skilled in the art will recognize that since left and right channels are concurrently being processed, 2 16-bit coefficients and 2 16-bit samples are required at a time. As a result, the parameter and sample memories are each 32 bits wide and each MAC performs parallel 16-bit operations.

Dual multiply-accumulate units are further advantageous in implementing sample rate conversion. In sample rate conversion of 16-bit data, the coefficients which are multiplied with the data must be quantized at a higher resolution than 16-bits. Thus, the present architecture can also perform a 20-bit by 16-bit multiplication for sample rate conversion. Since both the right and left channel data are multiplied by the same coefficients, the same 32-bit doubleword retrieved from memory can provide 20-bit coefficients to both MAC units simultaneously or a pair of 16-bit coefficients to each MAC unit when two data words are sent individually to each MAC unit.

The performance requirements of 3-D and separate wavetable conversion dictate a highly pipelined architecture where the multiply-accumulate units require at least two cycles to perform multiply and add operations. According to the principles of the present invention, the dual multiply-accumulate units, which provide for left and right channel serial processing, operate concurrently in the same cycle. Both units are fully pipelined such that only one multiply-accumulate cycle is required. This architecture has substantial advantages for applications such as 3-D processing which may consume 50 MIPs; using dual multiply-accumulate units for stereo processing in the present system is the equivalent of 200 MIPs on a traditional processor.

In wavetable synthesis (typically music synthesis), there are further considerations. For example, volume control and filter cut-off coefficient updates occur at the same rate, additional filtering is required, and more accumulate operations must be performed. In general, wavetable synthesis requires substantially different processing. 40-bit instructions are employed to provide the flexibility required to perform both 3-D sound processing and a wavetable synthesis. From these instructions, the multiply-accumulate units allow for parallel multiplication and addition.

Further, generally during wavetable synthesis a different type of parallelism is required. Among other things, multiply-accumulates are required in parallel with general purpose data movement and conditional operations. General purpose ALU 104 provides for the processing of data in parallel with MAC units 105. The multiply/add fields of the ALU instructions provide the flexibility required to code for wavetable synthesis. ALU instruction field generalization further allows stream processor core 100 to execute additional signal processing algorithms, as required.

Multiplier 110 inputs may be provided from either the register file 101, parameter/coefficient AGU 102 or sample AGU 103. Dual multiply accumulate units 105 are driven in a single instruction multiple data (SIMD) fashion which permits dual data parallel operations such as stereo audio, complex, or double precision data processing to be processed efficiently. Multiply and add instructions may be issued to either unit independently or both concurrently. The MAC-unit mode change instruction controls the mode of multiply/add instructions. Results computed in a given MAC unit are read out for storing or further processing through 40-bit barrel shifter 106 which provides optional saturation on overflow. A preferred instruction set for dual multiply accumulate units 105 is given as APPENDIX 4.

Data is received by MAC units 105 from sample AGU 103 on the sp_yd bus and is presented to multipliers 110. Multipliers 2091 do not produce a final product, but rather sum and carry vectors which are then added by the 40-bit carry-save adders 2093. This helps save a pipeline stage and a adder flag but makes it more difficult to subtract the product from a value in the accumulators. However, the Y inputs can be inverted such that, along with inverting a bit below the LSB which is used in the multiplier (not shown), a negative product can be generated such that the product of two numbers can be subtracted.

The sp-yd bus primarily configures Y registers 2096, although data from the sp_yd bus is presented to both the X registers 2096 and the Y registers 2097 such the multipliers 110 can square the y input. Accumulators 2095 can also be loaded directly from the sp_yd bus.

The sp_pd bus presents data directly from parameter ROM to X input registers 2096. Data can also be presented to the X inputs from register file 101 across the sp_gx bus and from the special purpose bus sp_xd. The X registers are loaded from parameter memory with single router file registers or register pairs. Preferably, X registers 2096 are 20 bits wide to provide precision for various operations. 20 bits in this case come from bits 31 to 12 of the sp_gx bus, which carries either the upper 20 bits of a register pair or the upper 20 bits from parameter memory.

One feature of MACs 105 is the ability to multiply a fractional part of data retrieved from the sample memory address registers (rsa) 602, which is useful for linear interpolation (for linear interpolation, the multiplication by fractional part and one minus the fractional part produces two of the required factors). Sample address generator 103 passes the fractional part of, for example, register rsa0, to MACs 105 via the sp_yd bus.

Trap unit 205 comprises a built-in interrupt controller and de-bugger trap mechanism which provides for up to eight vectored interrupts and eight traps. The eight available trap vectors are maintained in program memory 202. Each trap vector contains up to four instruction words of code for execution when the corresponding trap is encountered (typically a branch with register saves in the afterclause of the branch). In addition, eight trap address registers are provided to hold the desired program memory address at which to trap. The eight interrupt vectors are preferably located at program memory 202 addresses 0x20-0x3F in steps of four 40-bit instruction words. Similar to the traps, each interrupt vector contains up to four instruction words of code to be executed when the corresponding interrupt is triggered.

Interrupts may be inhibited under certain circumstances. Among other things, interrupts are inhibited for one cycle when the first instruction of a dual, packed aluOp instruction pair is decoded, for three cycles when a branch, call, or return is decoded, or four to six cycles when a multiply instruction is decoded. Interrupts may also be inhibited for one cycle when the rsCONFIG01/rsCONFIG23 registers are loaded using indexed or post-increment addressing (direct load/store and direct IO addressing do not inhibit interrupts in the preferred embodiment).

An interrupt inhibit occurs for six cycles when a multiply instruction is decoded to allow code to use the product register (which cannot be saved/restored by an interrupt service routine). Thus, there is a maximum length of time during which interrupts may be disabled during a background task. The upper bound typically is less than the periodic framing period.

A parameter memory load may not take advantage of the delay in loading an address register, r0/3, or an increment register, rci0/1, before becoming valid in the parameter/ coefficient AGU. Similarly, a sample memory load or store may not take advantage of the delay in loading a sample address register, rsa0–3, or increment register rsia-0, before becoming valid in the sample AGU.

The traps are provided to aid in debugging RAM- or ROM- resident program code. Each of the traps consists of a trap address register (iAGUtrapN) and a trap vector (address 4*N in program memory). Additionally, a global trap enable is available under host control.

The debugger can use traps to implement breakpoints and to insert code "snippets" to implement scopes and probes. If the traps are enabled and the instruction pointer comes to match any of the trap address registers, an unconditional call is inserted into the instruction stream to call the code at the trap vector instead of the instruction at the trap address. Simultaneously, the current interrupt enable status is saved while interrupts are disabled. Stream processor core 100 thereafter begins executing the code in the corresponding trap vector. If this is a breakpoint, this code sets a global variable to indicate which trap (breakpoint) was encountered and branches to a common breakpoint handler. The breakpoint handler would then signal the host and place stream processor 100 in deep sleep. When the host acknowledges the interrupt and determines the cause, it signals the debugger. Under debugger control, the user may single step out of deep sleep and continue executing the program. A return from trap instruction returns to the trapping instruction after restoring the interrupt enable status and inhibiting traps for one cycle (to allow the trapping instructions to be executed).

APPENDIX 6 demonstrates a preferred set of program control instructions for stream processor 100. These instructions control conditional branch column, call, and return, zero overhead looping, interrupt-related, and special instructions, including trap calls and returns. The branch, call, return, zero-overhead looping and interrupt related instructions all require three delay slots before they execute (or begin executing in the case of four-loops). These delays are specified in an "after" clause which specified the sequence of instructions to execute after the desired instruction is coded, but before it completes execution. No instruction requiring delay slots may execute in the delay slot of another instruction. Since it can be difficult to fill three delay slots after a conditional branch, call, or return, an instruction encoding is provided that specifies the first delay slot to be filled by hardware inserted NOP) for loops do not allow this option. Preferred set of move/load/store instructions are provided in the Appendix 5.

Figure 12A:
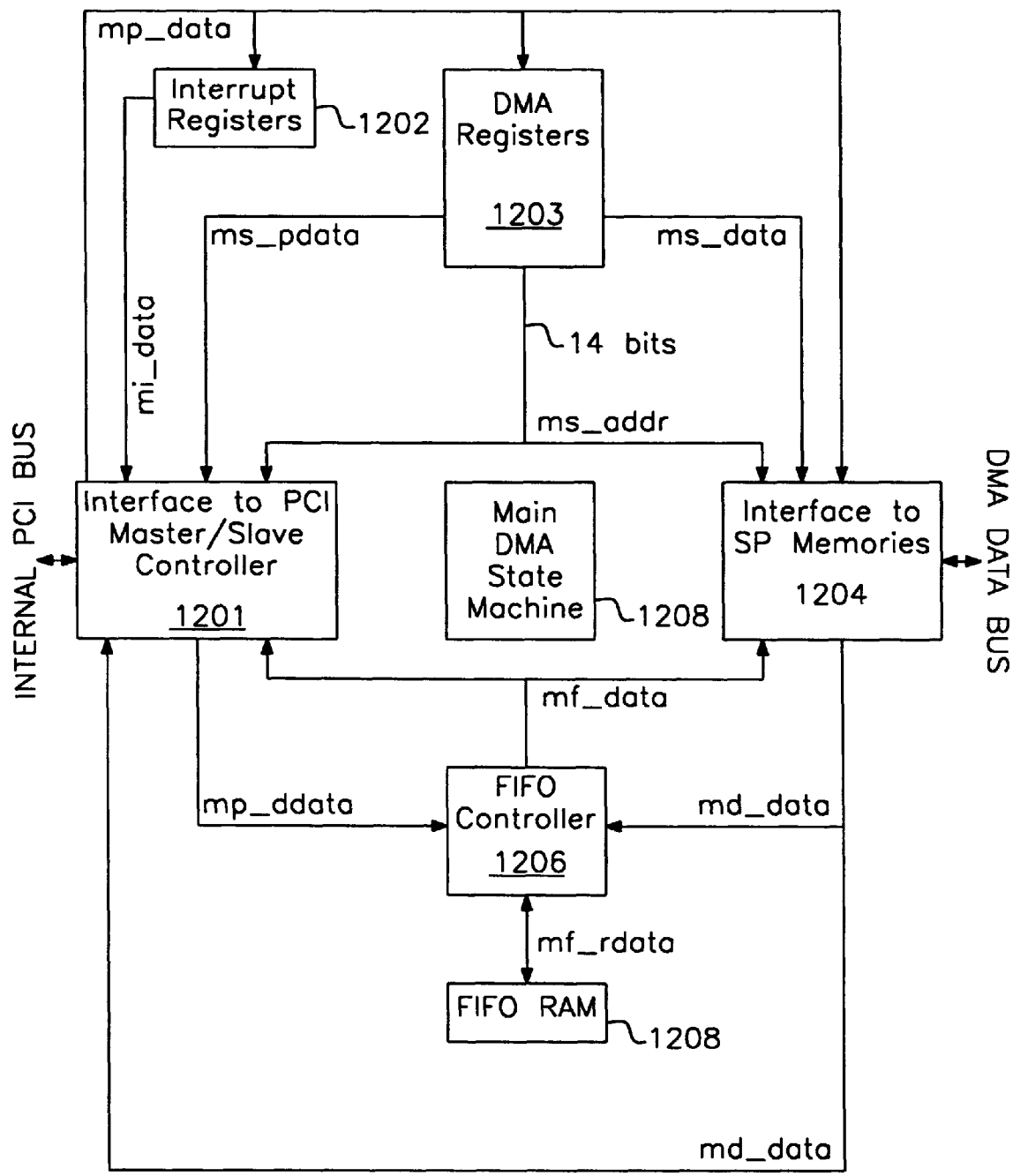
FIG. 12A is diagram of the DMA controller 109 structure.

FIG. 12A is a diagram of the DMA controller 109 structure. An interface to PCI master/slave controller 1201 is provided which allows the DMA engine to transfer addresses and data to and from the PCI pads, via the internal PCI bus 214. Interface 1201 provides address decoding for access to internal DMA/interrupt registers 1202 and 1203, and interprets control signals from the PCI slave control logic, to allow register reads/writes, and SP 203/204/205 memory peeks/pokes.

Interface to SP memories 1204 allows the DMA to transfer data to and from the SP memories via the internal DMA address and data buses (14 and 32 bits, respectively.) Interface 1204 contains an arbiter to select between access requests for DMA transfers, and single peeks/pokes from the interface to PCI master/slave controller. Interface 1204 also contains a pipelined synchronizer structure (discussed later) which transfers data from the PCI clock domain to the SP clock domain.

DMA registers 1202 and Interrupt registers 1203 contain all host-accessible DMA registers (DMSR, HSAR, HDAR, HDMR, HDCR), and interrupt registers (HISR, HSRO, HICR). Registers 1202/1203 also contain inaccessible registers used by DMA control logic for counting addresses and doubleword count during a DMA transfer.

FIFO controller 1206 contains control and datapath logic for performing all audio conversions as well as an interface to the FIFO RAM. Generally, FIFO controller 1206 controls transfer of DMA data between the FIFO ram, interface to PCI controller, and SP memory interface.

FIFIO RAM 1207 is a single static memory which is organized as 64 entries by 32-bits.

Figure 12B:
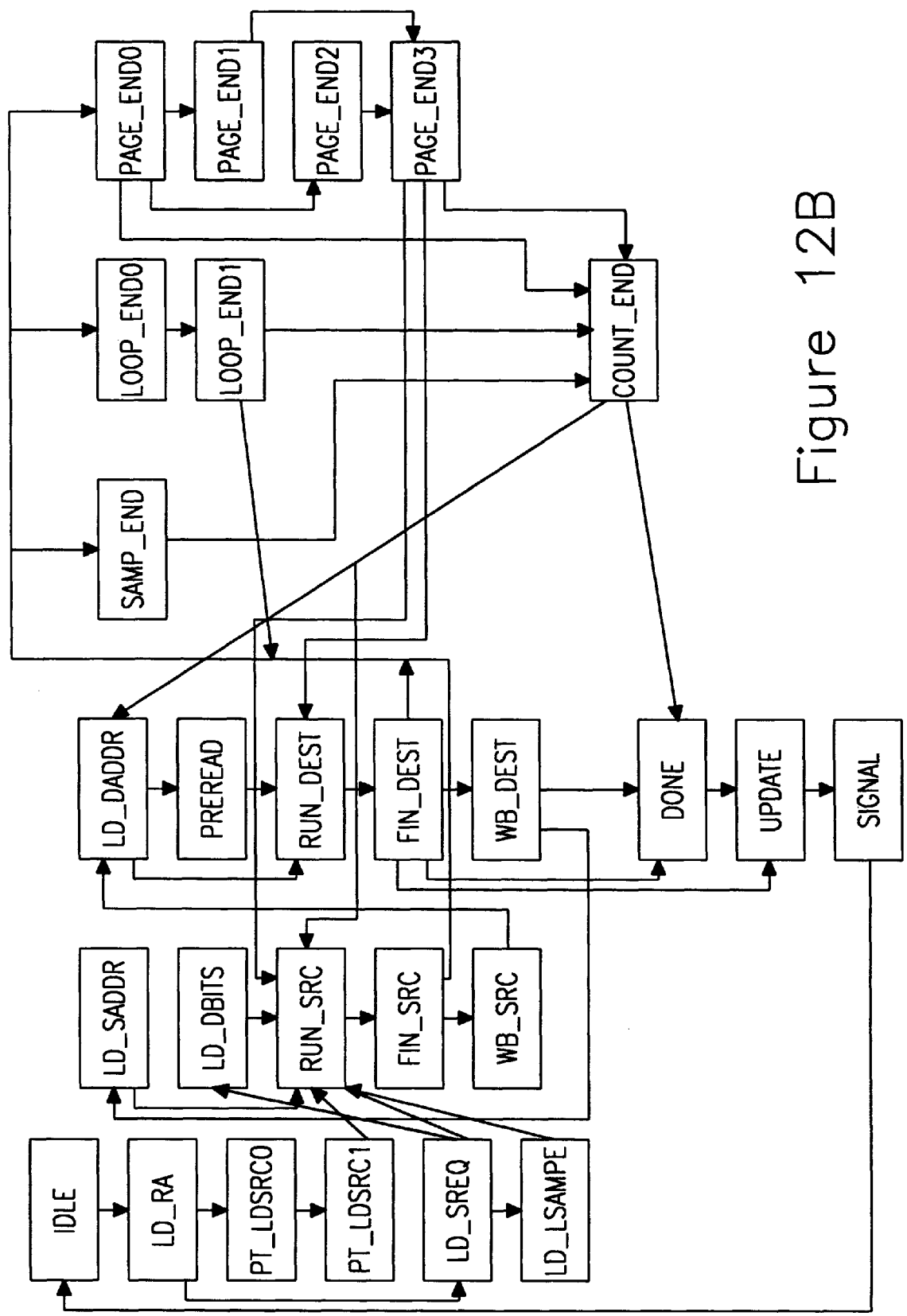
FIG. 12B is a diagram of the address storage functions of DMA engine 209.

Main DMA state machine 1208 provides high level control for normal and scatter/gather DMA requests. The state machine is shown in FIG. 12B. This state machine responds to a DMA request from either the host or SF 100, reads the DMA information from either the host registers or SP requestor, controls the loading and storing of DMA data (by sending appropriate signals to the PCI master interface 1201, FIFO controller 1206, and the interface to SF memories), and controls the updating of register/requestor information when the transfer is complete. There is also a smaller controller which simplifies the reading/writing of information from the SP requestor.

FIG. 12B is a state diagram depicting the preferred operating sequences of DMA engine 208. A brief description of each of the signals is shown in Table 10A. DMA engine (controller) 208 provides for the transfer of data between any one of the on-chip memories (i.e., program memory 202, parameter RAM 203, or sample RAM 204) and the host system CPU, as well as between the on-chip memory subsystems 202-105 themselves via DMA bus 210. Advantageously, DMA engine 208 eliminates the need for constant involvement in the transfer by any of the processors in the system including the host and stream processor core 100. Data being transferred by DMA is moved across a 32-bit DMA bus 209 coupled to each of the memories 202-105. Additionally, DMA engine 208 includes facilities for reporting access to streaming data buffers scattered across a host memory space of 4096-byte pages. In other words, buffers in host memory are mapped by a host resident page mapping table to which the on-chip DMA requester points providing the "scatter/gather" DMA mechanism.

"Scatter/gather," generally can be described as follows. Specific data structures are discussed further below. Each audio stream which is transferred between host and SP memory 202/203/204 is specified by a scatter/gather DMA Requester structure, resident in SP Parameter memory 203. The first 8 doublewords of the requestor contain information which is used by the DMA controller 208 to transfer the right amount of data between the appropriate buffers in host and SP memory, and additional information which allows the transfer of data with minimal demands on the PCI bus.

During scatter/gather DMA, audio data is spread across one or more 4 Kbyte "pages" in host memory, and a page-mapping table is resident in host memory which specifies the starting byte address on each of these pages, and also identifies a page which contains the end of a loop in the audio stream, and which contains end of the entire audio sample.

Because this page table (containing the starting address for each page) is stored in host memory, each new entry must be transferred to SP memory before it can be used. Once resident in SP memory, it can be relatively quickly retrieved when it is needed (when the DMA reaches the end of a page and must begin the new one). Because it requires a PCI-bus access to transfer the page-table information from host to SP memory, which could require a significant amount of time in a busy system, the DMA mechanism and requestor structure are designed to allow these transfers to occur at any time over a large time period, and at a lower priority than normal DMA of sample data. Specifically, it is designed so that the DMA engine will never require a page-table update to have completed in less time than it takes for the DMA to traverse a full page of sample data for that stream. See FIG. 2.

Normally, the DMA will indicate to the sample-AGU 103 that a page-table update is needed for the next page of the active stream as soon as the stream has begun a new page. This gives the sample-AGU 103 plenty of time to request the page-table DMA, since it won't be needed until the stream reaches the end of the page which was just begun. However, because of the arbitrary positions of loop-begin and loop-end addresses, the stream can sometimes rapidly cross several pages, without providing much time for the required page-table updates to occur for each page traversed. To avoid this problem, additional information is included in the DMA requestor for each stream in SP memory.

In addition to the "normal" DMA information such as doubleword count, source/destination addresses, and scatter/gather state (PM, LS, SS fields) the following additional information is stored in the requestor structure, which is used by the DMA controller to reduce its need to load page-table entries too quickly:

Loop-begin byte address; Because the loop-end point could be located near the beginning of a page, there could be insufficient time to load a new requestor entry from the time the loop-end page is started to the time the loop-end point is reached. Therefore the loop-begin address is stored in the requestor when the stream is initialized, so that upon loop-back, the DMA may continue on the loop-begin page without delay.

Starting byte address on the page after loop-begin; Likewise, because the loop-begin point could be located near the end of a page, there could be insufficient time to load a new requestor entry for the page following the loop-begin page when the DMA loops back and quickly reaches the end of the loop-begin page. Therefore, the starting address of this page (post-loop-begin page) is stored in the requestor also.

Page-map entry offset for 2nd page after loop-begin page; When the post-loop-begin page is started, the DMA resumes its normal behavior of indicating to the sample-AGU that another page-table update is needed. When the sample-AGU requests a page-table DMA, the DMA controller normally uses the information from the previously-loaded page-table entry to determine which index in the host page table to transfer from (the next page of the stream). However, on loop-back DMA controller 208 has skipped two page-table updates, opting instead to get the required addresses from the requestor fields described above. The requestor therefore also stores the index number for the page table which identifies the page-table entry for the 2nd page after loop-begin. When the sample-AGU requests a page-table DMA under these conditions, DMA controller 208 will use this index to find the page-table entry for the next page of the stream.

During operations, such as wavetable synthesis for example, DMA engine 208 is responsible looping. In wavetable synthesis, a sample is played, assume for discussion a piano note. The attack of a note from a piano is unique and must be captured for some period of time. Once the sustained part of the note is reached however the note takes on a relatively regular waveform. At this point, a loop can be created for one period of that waveform and then all that is necessary is to provide an amplitude envelope which will gradually scale the volume of the note waveform in the natural decay of a piano. In other words, a loop is implemented which loops back to the sample point which results in a stream of samples and the amplitude envelope operates on that stream. Thus, during operations such as wavetable synthesis, it is possible to reduce memory requirements by eliminating the need to take up to several seconds to perform samples to emulate the full decay.

Looping by DMA engine 208 additionally aids in the decoupling the processing of data pipelined through accelerator 200 relatively slowly compared with the data exchanged with the PCI bus, which typically occurs in bursts. Generally, problems could arise if a point is reached when data is required but that data is not contiguous in memory with that which is already stored in buffer. Normally, in this case, the buffer would be flushed and reloaded from the beginning of the loop. By passing the looping tasks off to DMA engine 208, stream processor 100 is free to process the bursts of data from the PCI bus. This feature is particularly advantageous of music synthesis and 3-D audio processing, where sample rate conversion is required. For example, 3-D sound requires a high performance filter to be applied with unique coefficients to both the left and the right channel.

Although data may be transferred in 8-, 16- or 32-bit bytes, transaction links are preferably integer numbers of doublewords. For example, in the illustrated embodiment, DMA engine 208 is capable of buffering up to sixty-four doublewords of data in an internal FIFO or can pack 8-bit bytes or 16-bit words into the same space, allowing up to 256 bytes or 128 16-bit words to be buffered.

Although DMA engine 208 controls DMA transfers, either the host CPU or stream processor 100 can initiate a DMA transaction. The host CPU can request a DMA transaction by writing to four 32-bit registers which are mapped into the host system's memory space (the HSAR, HDAR, HDMR, and HDCR registers discussed further below). Preferably, the registers are physically located within DMA engine 208 and may be written to via single-data PCI transactions in which the host's PCI bridge chip is the PCI master, and system 200 is the target. If the transfer involves the host system memory, a new PCI transaction is started to transfer the data, in which accelerator 200 is the master and the host PCI bridge chip is the target. As the transaction progresses, the selected on-chip memory 202/203/204 is continually accessed for read or write via the DMA bus, whenever that memory is available (not currently being accessed by a higher-priority source). At the end of the transfer, after the last data has been written to the destination memory, DMA controller 208 interrupts either the host (via PCI interface 206) or signals DMA requester logic 607 to issue the request with the next highest priority.

Stream processor 100 may request a DMA transaction on a single hardware DMA channel, allowing transactions of up to sixty-four words. In this instance, stream processor core 100 first creates a structure in memory for DMA requester 607 to operate from. Next, the stream number and desired priority is written into the DMA request register array which queries the DMA request for service according to its priority. Direct memory accesses may alternatively be queued through the use of sample address generation unit 103 and a conditional DMA request. When the DMA request is selected for service by DMA requestor logic 607, its address is presented to DMA engine 208. DMA engine 208, then reads the address pointer and uses it to read the DMA requestor structure from on-chip memory to generate the request to the source/destination memory and/or PCI bus interface 206 in order to complete the transaction. At the end of the transfer, after the last data has been written to the destination memory, DMA controller 208 writes the updated source and destination addresses back to the requestor structure, if specified. DMA requestor 607 receives a signal indicating the completion of the current request, at which time it signals the next request, if any are queued.

Scatter/gather direct memory accesses may be initiated in a similar manner by system 200. These transactions preferably require an additional five doublewords to be specified which describe loop points and map the next host page location in the stream.

Both the host initiated requests and stream processor based requests are maintained at an equal priority and are served on a first come, first served basis. Plus, preferably, all DMA requests are executed as a unit and are never pre-preempted.

Data is transferred between the host system DRAM and on-chip memories through the on-chip PCI bus interface 206. 32-bit PCI data is latched in PCI interface 206 for both input/output, and transferred to/from DMA engine 208 using handshaking signals.

Availability of the PCI bus, the readiness of the target (host PCI bus chip) and latency inherent in the host bridge chip may affect PCI and DMA throughput. If a PCI target, such as the host bridge chip encounters large enough delays, it can be forced to either disconnect or terminate (abort) the transaction. If the PCI target generates a simple disconnect, on-chip PCI interface 206 advantageously will automatically attempt to re-start a new transaction at the last untransferred address. If the PCI target aborts the transaction, the entire transaction stops instantly and all buffer data is lost. An aborted transaction represents a catastrophic system error, which PCI interface 206 will indicate by interrupting the host CPU.

For non-scatter/gather streams, data being transferred to/from the host system memory is stored in the host memory in a circular buffer which is constantly filled and drained. Hence, PCI transactions in this situation are burst transfers which range over a contiguous set of doubleword memory addresses, the DMA controller 208 requesting a new PCI transaction each time the position in the circular buffer wraps around to the starting address. The maximum size of these circular buffers is set at 2014 doublewords or one host page.

Scatter/gather streams may transfer data to/from the host system memory locations scattered across multiple host pages. A page mapping table is supplied by the host to map all pages of the buffer after the first two pages. The first two pages along with the loop-begin and endpoint information are included in the DMA requestor array. If page boundaries are encountered, the DMA will access the next page information already in the on-chip DMA requestor block. This page information is refreshed by the stream processor using low priority request in DMA requestor logic 607 which advantageously keeps higher priority transactions from being delayed by page-table reads.

As discussed briefly above, DMA engine 208 includes a set of registers which can be written to by the host processor via the PCI bus. A list of the preferred DMA registers provided with a DMA engine 208 are given in TABLE 10B.

Two independent DMA channels are provided, specifically the host DMA channel and the signal processor DMA channel. Each of these channels can be described in detail as follows.

The host DMA channel is controlled by the host DMA registers HSAR, HDAR, HDMR, and HDCR. Preferably, each of these registers is a 32-bit register physically located within DMA engine 208 and mapped into the host CPU's memory space. Preferably, writes to these registers can only be made by the host CPU via PCI bus interface 206 to provide a means for the host to initiate a DMA transaction.

The host writable 32-bit host source address register (HSAR) allows the user to define the address to be used for the source memory of a host initiated DMA transaction. A preferred register format is shown in FIGS. 13A and 13B respectively, wherein FIG. 13A shows the fields when the host is the source and FIG. 13B the fields when accelerator 200 is the source. A brief description of the HSAR fields are given in TABLE 11. The HDAR register allows the user to define the destination memory for a host initiated DMA transfer. FIG. 13C depicts the HDAR register fields when the host is the destination, and FIG. 13D the fields when the accelerator 200 is the destination. TABLE 12 presents a preferred encoding.

Figure 14:
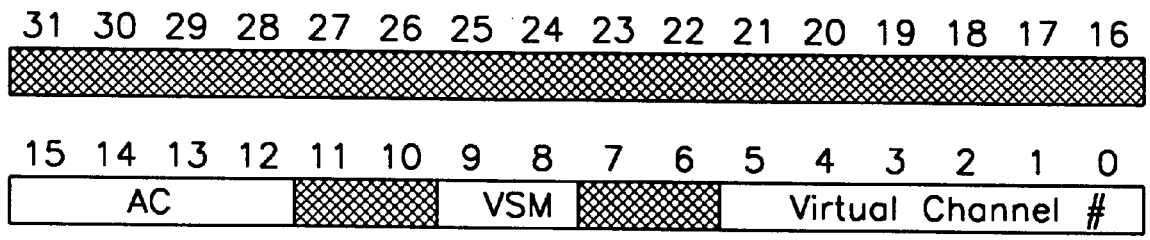
FIG. 14 depicts the format for the host DMA register (HDMR)

FIG. 14 depicts the format for the host DMA register (HDMR) register. This register defines such parameters as the transfer mode to be used to manipulate the data, and the generation of the virtual channel signal to be generated at the end of the transaction. TABLE 13 sets forth a preferred bit encoding.

Figure 15:
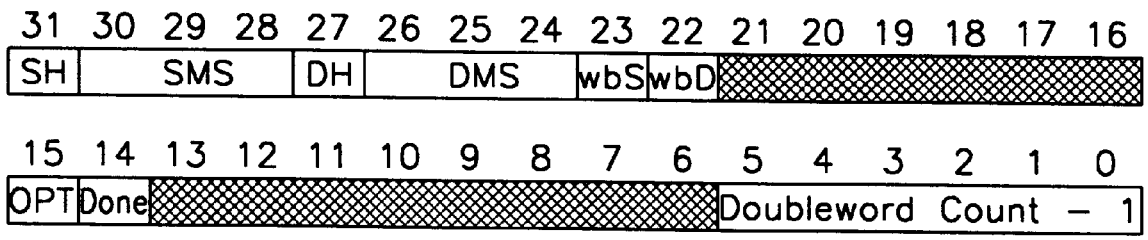
FIG. 15 is a diagram of the fields of the host DMA control register (HDCR)

The host DMA control register (HDCR) is used to describe several parameters for a host-initiated DMA transaction, such as the source and destinations memory locations and modulo buffer sizes. Also included are bits for enabling the selective write back of the source and destination address registers and a bit to enable optimized 16/32-dword access mode. Further, a field is enabled which specifies the number of doublewords to transfer, from 1–64. Writing to this register automatically causes a host-initiated DMA request. FIG. 15 shows a preferred format for the field/register and TABLE 14 a corresponding bit encoding.

Figure 16:
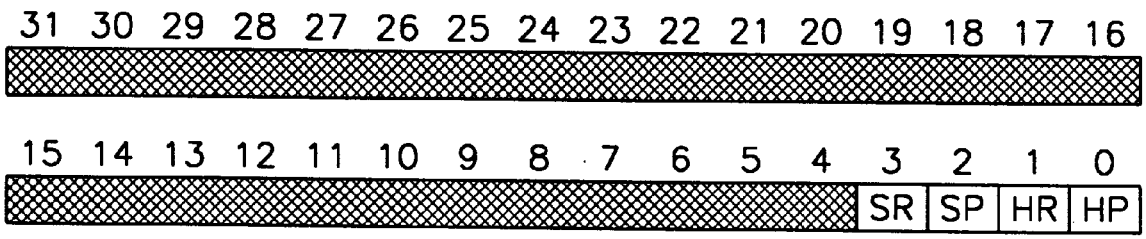
FIG. 16 depicts the fields of the DMA status register, (DMSR)

FIG. 16 and corresponding TABLE 15 describe the format encoding for the DMA status register, (DMSR). This is a host readable register which includes two status-bits for both DMA channels. When a transfer action is requested on a given channel, a corresponding pending bit is set to 1. When a transaction begins, the running bit for the given channel is set. Since all transactions execute without interruption, once a running bit is set, it will not be cleared until the transaction is complete. After the given transaction has completed, both pending and running bits for that channel are reset to zero. The host can read this register to determine which DMA channel has requests pending and which channel is currently running. Further, the host can poll this register and monitor the HP bit to determine when its own DMA transaction completes as an alternative to being interrupted at the end of the transaction.

Figure 17A:
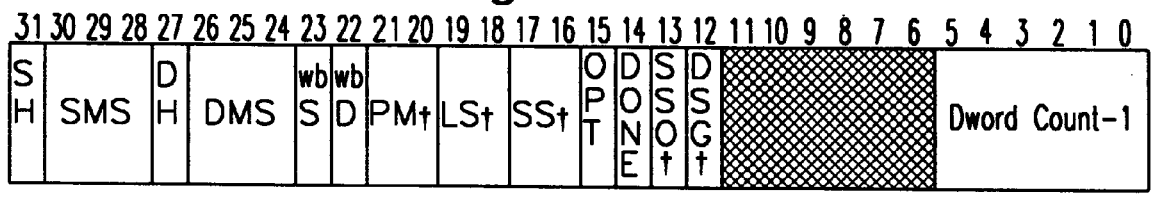
FIG. 17A is a diagram of an address string to parameter RAM 203.
Figure 17B:
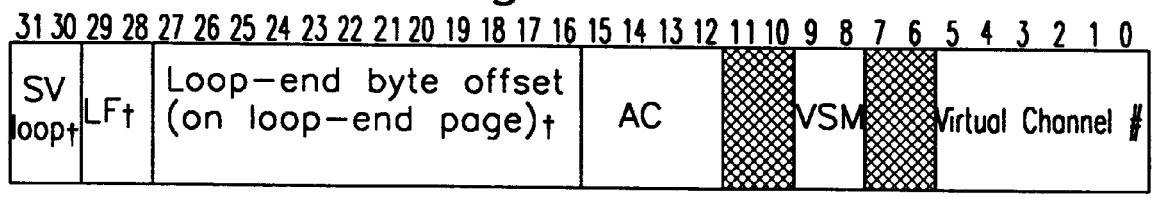
FIG. 17B is a diagram of a destination address word.
Figure 17C:
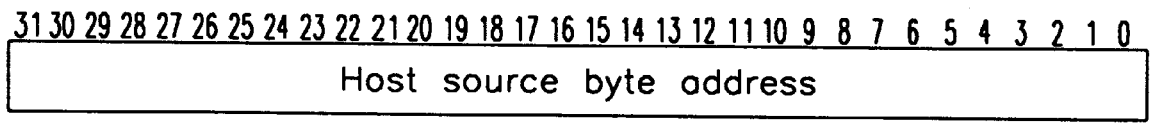
FIG. 17C is a diagram of a host source byte address.
Figure 17D:
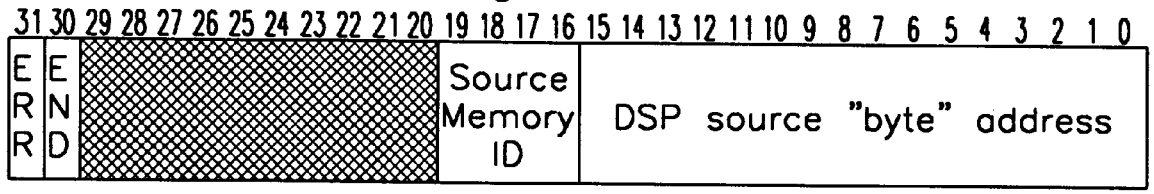
FIG. 17D is a diagram of the source byte address word, if the source is in a DSP memory.
Figure 17E:
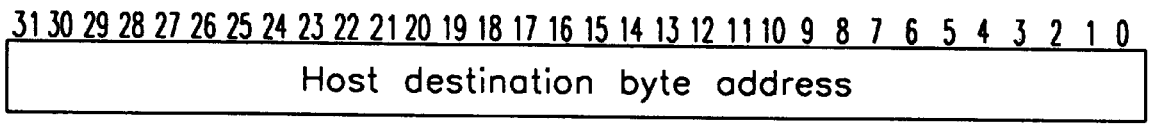
FIG. 17E is a diagram of the destination address word when the host is the destination.
Figure 17F:
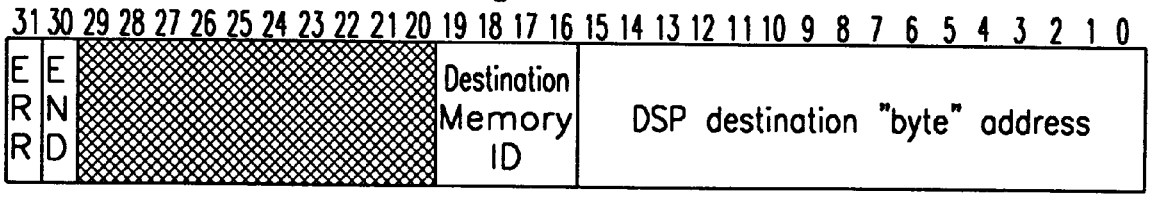
FIG. 17F is a diagram of the destination address word when the destination is in an accelerator 200 memory.

The signal processor DMA channel uses its own DMA requestor structure, which includes the source and destination addresses, memory identifiers and modulo buffer sizes, transfer mode and doubleword count (1–64 dwords). The basic requestor is four dwords long and may specify any non-scatter/gather request. An additional five dwords are required to support scatter/gather request and involve the dwords common to all SF initiated DMA requests. FIGS. 17A through 17K depict a preferred stream processor DMA requestor structure. FIG. 17A depicts an exemplary address to parameter RAM 203, which preferably is the initial address. FIG. 17B depicts the destination address of word issued at initial address plus one. At the initial address plus two, source address word is issued. If the source is the host memory the source address word takes the form shown in FIG. 17C otherwise, if the source is in a DSP memory, the source address word as depicted in FIG. 17D.

At initial address plus three, a destination address word is issued. If the destination is within host memory, the destination address word takes the form shown in FIG. 17E. If the destination is in an accumulator 200 memory, the destination address word takes the form in FIG. 17F.

Additional DMA requestor doublewords are used only for scatter/gather DMA. At initial address plus four, the next page address word defining the next page in memory to be access is issued, preferably as shown in FIG. 17G. At initial address plus five, the next page control word is issued as shown in FIG. 17H. FIG. 17I depicts the loop-begin address word issued at initial address plus six. At initial address plus seven, the next page after loop-begin word is issued. Finally, at initial address plus eight, address to the page containing the page mapping table and a page map tree offset for second page after loop-begin are defined.

The memory address fields used for the source and destination memory addresses specify either host system memory or accelerator 200 memory addresses, depending on how the H and DH bits are set in the DMA control word/register. If Host memory is selected, the full 32-bit words are interpreted as a host-byte address. When an accelerator 200 on-chip memory is, the requestor, word includes a memory ID filed and byte address selected (source or destination) the appropriate on-chip memory and addresses that memory in bytes. For DSP addresses the ERR and END bits provide an error and end of sample flags. The memory ID bits are provided to define which of memories 202-105 being addressed. A preferred memory ID decode is provided in TABLE 16. The DSP byte address specifies the address for the given memory in bytes. Advantageously, this addressing scheme allows a 32-bit address to map a maximum host memory size of up to 40-gbytes and a DSP memory size of 64-K bytes.

The source and destination addresses loaded in the host DMA registers and the stream processor requestors are assumed to point to the starting location within memory buffers located in host RAM or in the on-chip memory 202-105 as specified. A 3-bit field defined in TABLE 17 defines the size of the modulo buffer specified in doublewords (where DMS is the destination modulo buffer size and SMS is the destination modulo buffer address see FIG. 17A). The first option (000) indicates that the buffer is not circular and addressing should proceed progressively through memory until the transaction is complete. The other options will cause the transaction to wrap around to the buffer's starting address (least significant bit=0) when the address crosses the boundary of the buffer of a given size, ranging from 16 to 2014.

A 4-bit audio convert (AC) field (FIG. 17B) defines how audio data is transformed before they are written into the destination memory during a DMA transaction. Bit 0 is used to define 8- to 16 - bit audio conversion wherein each byte of audio-data is padded on the least-significant end with a 0 byte, to form a 16-bit word. Bit 1 is used to perform mono to stereo conversion wherein each 16-bit word of audio data is duplicated (written twice) to convert mono-audio data to stereo format. Bit 2 defines a big- to little-endian conversion wherein each 16-bit word being written has its low and high bytes swapped, to convert incoming bytewise big-endian audio to little-endian audio, or vice versa. Bit 3 defines signed/unsigned conversion in which each 16-bit word being written has its most significant bit inverted, to convert incoming unsigned audio data to signed format, or vice versa.

8-bit data is first converted to 16-bit data, and then the mono data will be duplicated to generate stereo data. Next the bytes of each word are exchanged to convert between little- and big-endian formats. Finally, the most significant bit of each resulting word will be inverted to convert between signed and unsigned formats.

Interrupts within system 200 are supported by a "virtual channel" mechanism within the device. Each stream which is read from or written to a modulo buffer is assigned to a "virtual channel number" (FIG. 17B). The virtual channel number is signaled by DMA engine 208 any time the modulo buffer pointer passes the midpoint or wraps around. An interrupt to the host is triggered when certain virtual channels are signaled (e.g., channel 0–15). This permits immediate signalling of the buffer conditions. Virtual channels are used to set a virtual channel signaling bit which may be read by the host at a later time. A summary of the actions taken by the signal receiver when a virtual channel is signaled is provided in TABLE 18.

For all DMA requestors, 2-bit VSM fields (FIG. 17B) specifies whether and when to signal the specified virtual channel upon completion of the DMA transactions. TABLE 19 describes the various settings for the VSM field. The doubleword count field (FIG. 17A) specifies the number of doublewords for the transaction, minus 1. Thus, a value of 0 will transfer one doubleword, a value of 1 will transfer two doublewords, etc. All DMA transactions involve an integer number of 32-bit doublewords up to a maximum transfer size of 1024 doublewords.

The OPT bit, in the DMA control word (FIG. 17A) is used to select an optimized mode for determining the number of dwords to read at each DMA request. This operating mode is provided to reduce the variance in instantaneous PCI bus transaction rate for such operations as wavetable synthesis. Specifically, optimization insures that the optimal number of doublewords can be transferred across the PCI during a given processing loop. These samples may be 8- or 16-bit wide and they specify arbitrary loop-beginning and endpoints where the sample repeats until the note is released.

Figure 18:
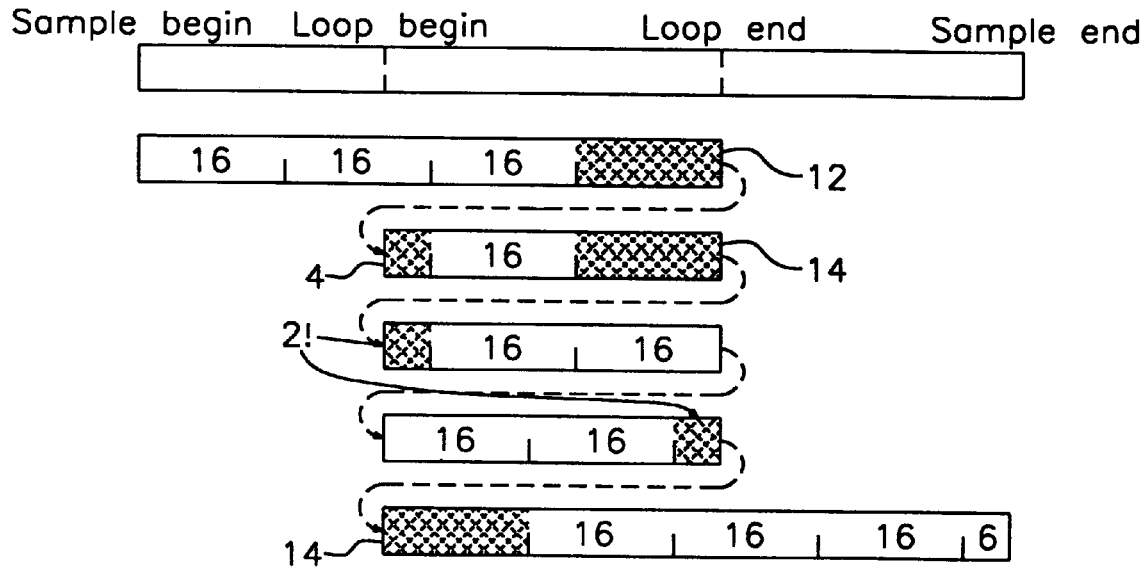
FIG. 18 is a diagram illustrating a problem caused by arbitrary loop points when the optimization mode is disabled.

FIG. 18 illustrates a problem caused by arbitrary loop points when the optimization mode is disabled. In this example, 16 doublewords are being read at each DMA request during a single PCI transaction. Essentially, because the loop ending point is not anticipated by DMA controller 208, the DMA controller must initiate two PCI transactions to satisfy a DMA request that normally requires only one transaction (when the loop end is not encountered). The second PCI transaction becomes necessary because a PCI transaction must start with a single beginning address and thus to initiate an access only to the data which was cut-off, a new address must be issued. In other words, a loop arbitrarily begins during a DMA request and more significantly, ends during a DMA request; to satisfy the ending DMA request, an additional request and PCI transfer must be made for the doublewords cut-off at the last loop-end point. Similarly, problems can occur when a sample spans pages in host memory. In this case, the page boundary, like the loop end position, is not anticipated and therefore may require an additional PCI transaction when the page boundary is reached and the pending DMA request is not complete.

According to the principles of the present invention, each loop endpoint is aligned to an even 16- or 32- dword boundary. The DMA controller 208 is then given the flexibility to choose a different transaction size based on the alignment to the appropriate 16- or 32-dword boundary in order to optimize the number of requests per loop. Specifically, the programmer specifies the minimum number of doublewords to be read during each DMA transaction in the normal dword count field. Then when the OPT bit is set, DMA engine 208 will read between the specified minimum and a maximum of 18 doublewords, if the specified minimum is less than 16, or a maximum of 36, if the specified minimum is greater than 16. In this fashion, DMA engine 208 insures additional requests are not required when the end of a loop is reached.

Figure 19A:
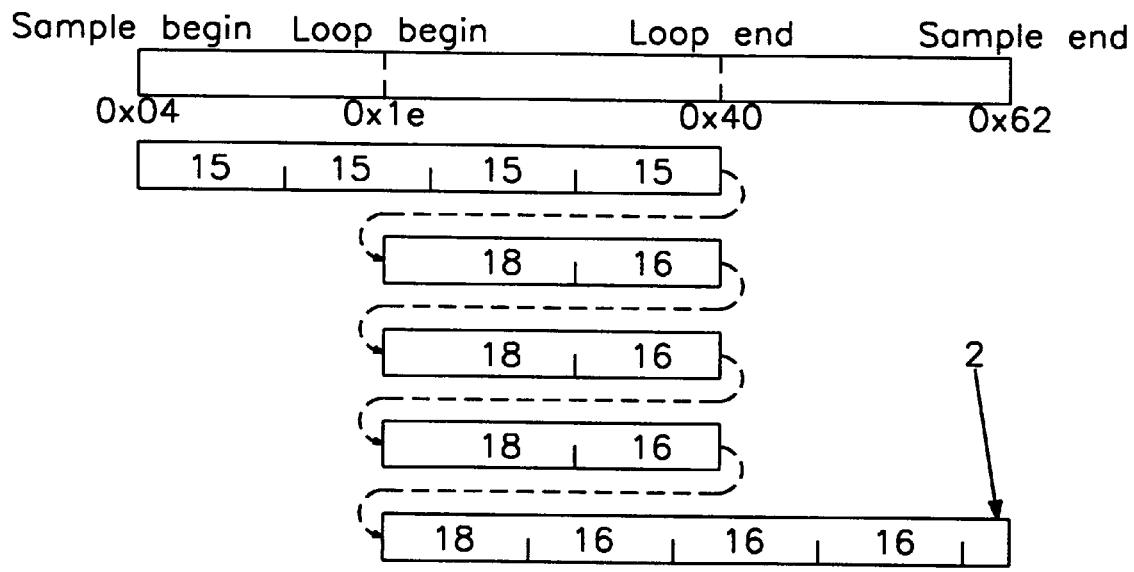
FIG. 19A is a diagram illustrating playback of the same looped sample stream shown in FIG. 18 in the optimized 16-dword mode where the minimum dword count is set to 15.

FIG. 19A illustrates the playback of the looped sample in the optimized 16-dword mode where the minimum dword count is set to 15. As shown in FIG. 18, in the unoptimized case, an offset of four (4) has been introduced. In the optimized case of FIG. 19A, the loop ends have been aligned to a 16 doubleword boundary, after four DMA requests. The offset is determined by examining the address issued by the DMA requestor to the host. Assume for example, that the address is to host memory (either as a source or a destination). Preferably, bits 5:2 are used to determine the current displacement modulo 16. Then a minimum number of doublewords per request, in this example 15, is selected. A maximum number of doublewords per request is automatically set at 18 since the minimum is below 16. The maximum number of requests required to align is then calculated as:

$$\text{MaxReqs To Align} = \max\left(\left\lceil \frac{9}{16-\min} \right\rceil, 3\right)$$

for 16-doubleword mode.

For the 32-doubleword mode, the maximum number of requests to align is:

$$\text{MaxReqs To Align} = \max\left(\left\lceil \frac{9}{32-\min} \right\rceil, 3\right)$$

In sum, optimization is based only on the specification of the minimum number of doublewords and knowledge of the current DMA address to the host.

Figure 19B:
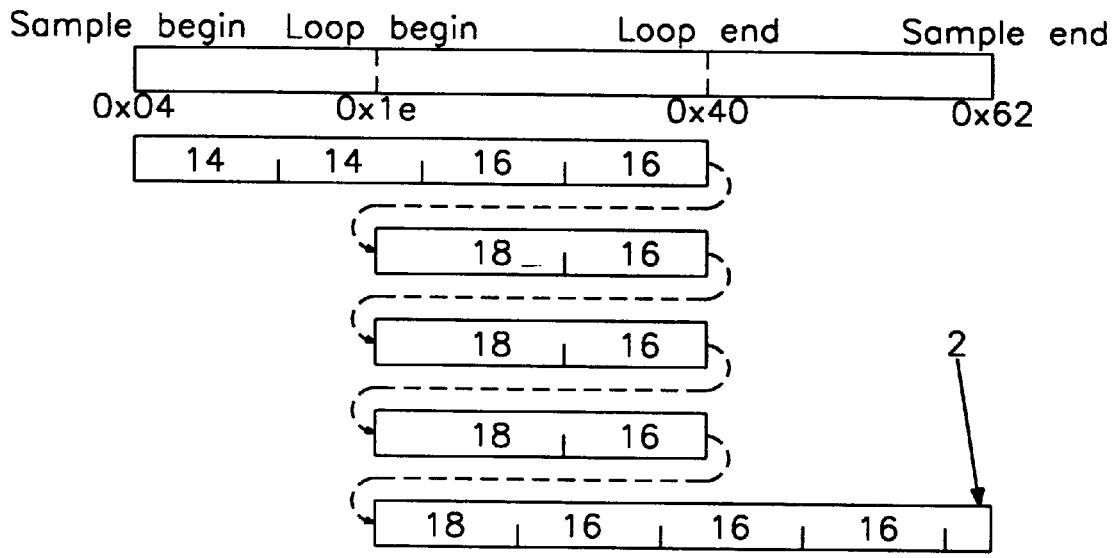
FIG. 19B is a diagram illustrating the playback of the same looped sample stream of FIG. 18 where the minimum dword count has been set to 14.

FIG. 19B illustrates the playback of the same sample stream where the minimum dword count is set to fourteen. It should be noted that the lower the minimum is set, the quicker alignment occurs. In this case, alignment is reached after two DMA reads.

Figure 20:
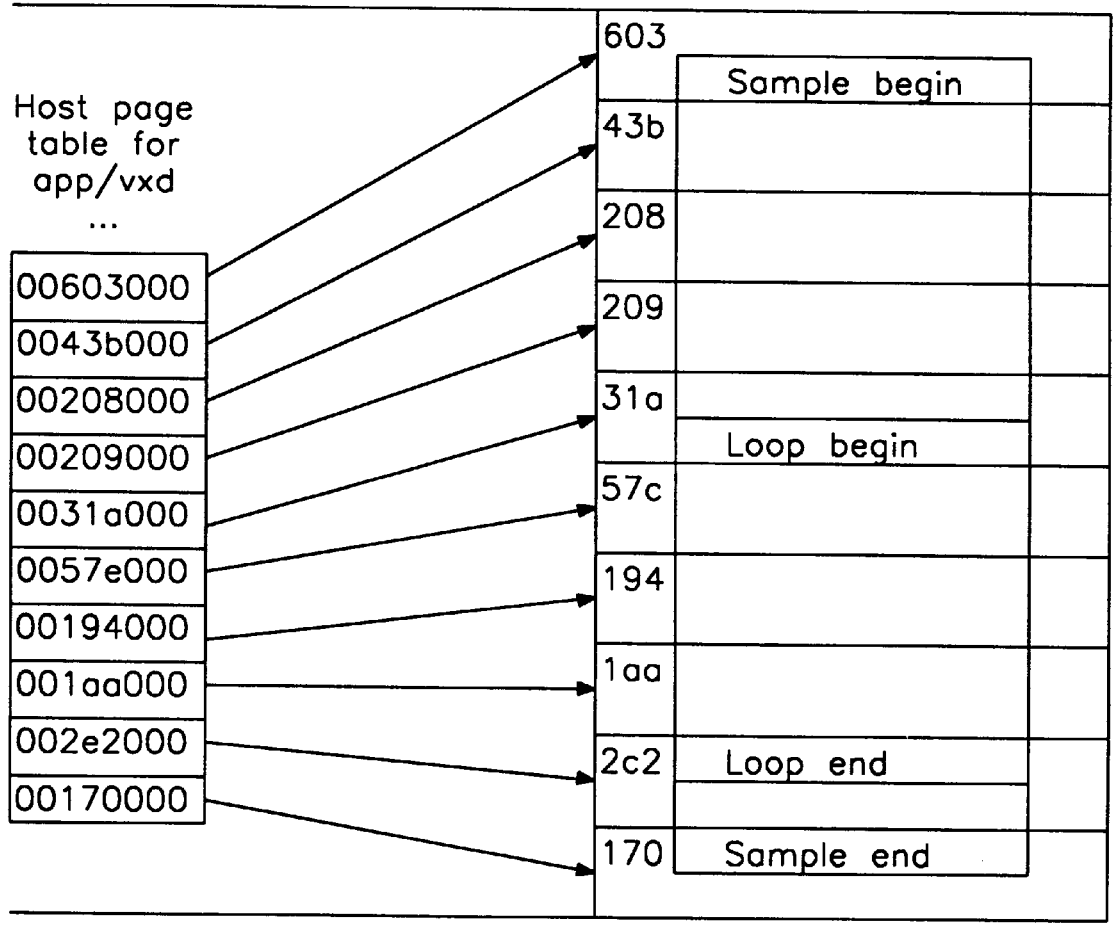
FIG. 20 is a diagram illustrating a data sample containing a looped segment which spans three full memory pages to illustrated the operation of the scatter/gather DMA abilities.

FIG. 20 illustrates a data sample containing a looped segment which spans three full memory pages to illustrated the operation of the scatter/gather DMA capabilities according to the principles of the present invention. As briefly indicated above, the page boundary, like the loop end position, is not anticipated by DMA controller 208 and therefore two Pci transactions may be needed to meet a request when the page boundary is reached. While pages are already aligned at doubleword boundaries, the technique of setting a range of words per request and allowing DMA engine 208 to vary the words per request within the range is applicable here.

As discussed above, in FIGS. 17A–K, the requestor words are extended to support the scatter/gather feature. The PM field (FIG. 17A) is a flag indicating a pending read of the next page map (table) entry. The LS field (FIG. 17A) indicates the loop ending DMA state, the SS field (FIG. 17A) indicates the sample - ending DMA state, and SSG field (FIG. 17A) is a flag indicating whether the source is a scatter/gather buffer. The DSG field represents a flag indicating whether the destination is a scatter/gather buffer, the SV loop field (FIG. 17B) maintains virtual channel signaling flags for loop-back and the LF field (FIG. 17B) are the looped flags. TABLE 20 is a preferred encoding of the PM field, TABLE 21 is a decoding of the LS field, TABLE 22 an encoding of the SS field, TABLE 23 an encoding for the LF field, and TABLE 24 is an encoding of the SE field.

Figure 21A:
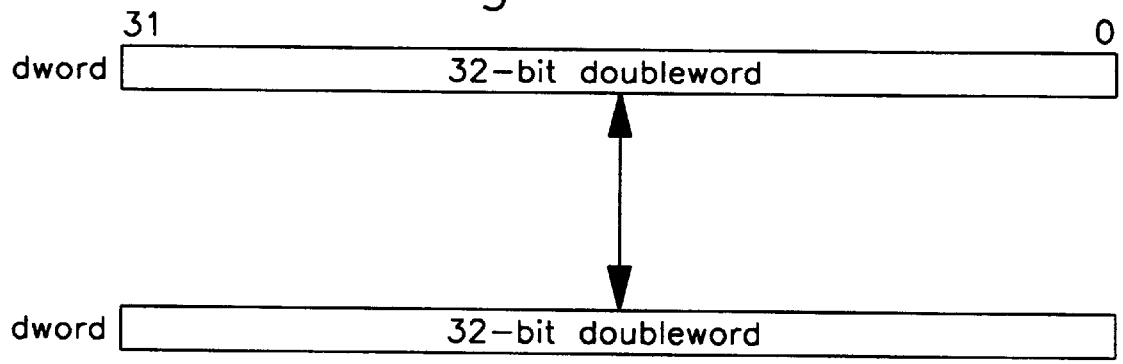
FIG. 21A is a diagram illustrating a representative data transfer between 32-bit memories.
Figure 21B:
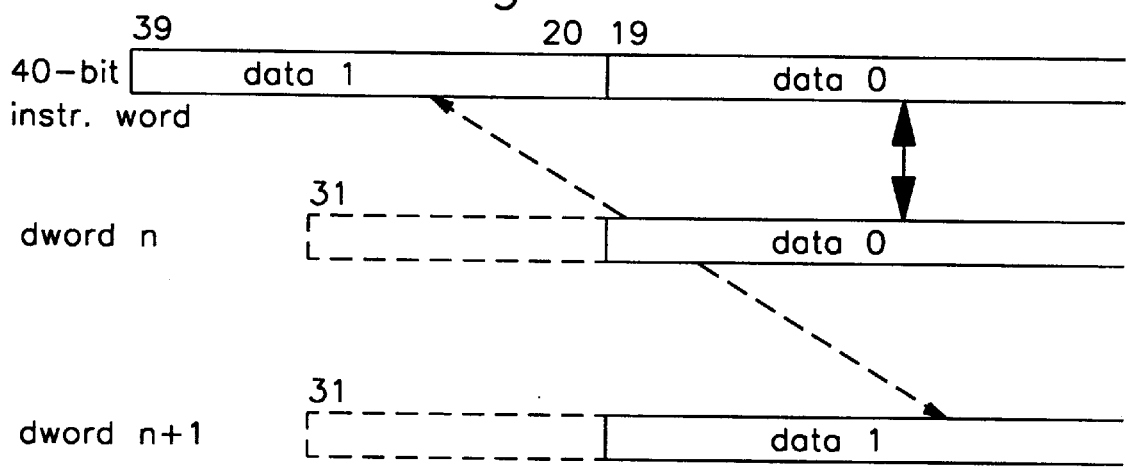
FIG. 21B is a diagram illustrating a representative data transfer between 40-bit memories.

DMA engine 208 is operable to pack, unpack and steer data being transferred in several different ways. The AC field in the DMA registers/requestors (FIG. 17B in the case of a requestor and FIG. 14 in the case of a host DMA request) allows special operations on data being transferred to convert them between various types of digital audio data. The options variable are targeted at transforming several different audio formats into the format expected by the signal processor core 100 (e.g., 16-bit stereo, little-endian signed audio data). FIG. 21a and 21b respectively show the transfer between 32- and 40-bit memories. In particular, FIG. 21a shows a 32-bit to 32-bit transfer while FIG. 21b depicts a typical transfer of a 40-bit word from a 40-bit memory to a 32-bit memory.

Figure 22A:
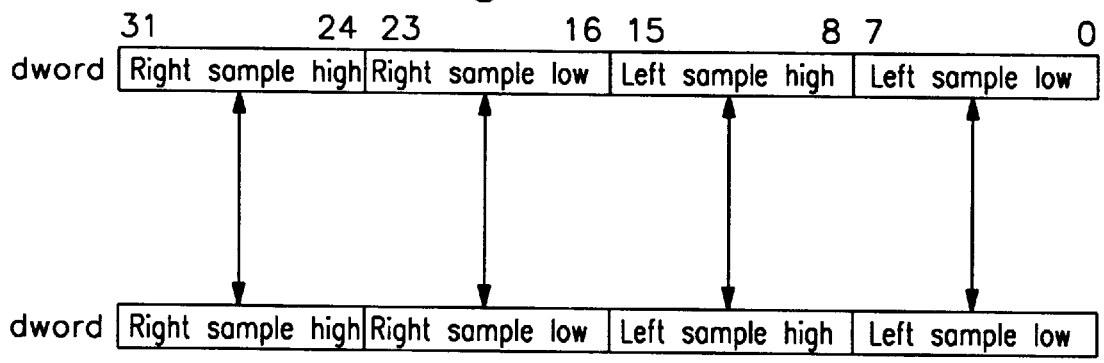
FIGS. 22A is a diagram of the situation where 16-bit stereo is being transferred between 32-bit memories in a little-endian format and no conversion is necessary.
Figure 22B:
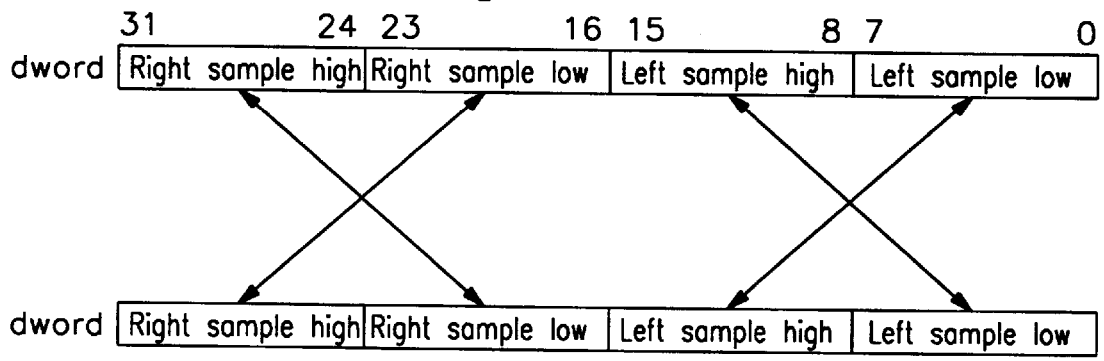
FIG. 22B is a diagram of a transfer between 32-bit memories with conversion from 16-bit stereo big-endian to 16-bit stereo little-endian.
Figure 22C:
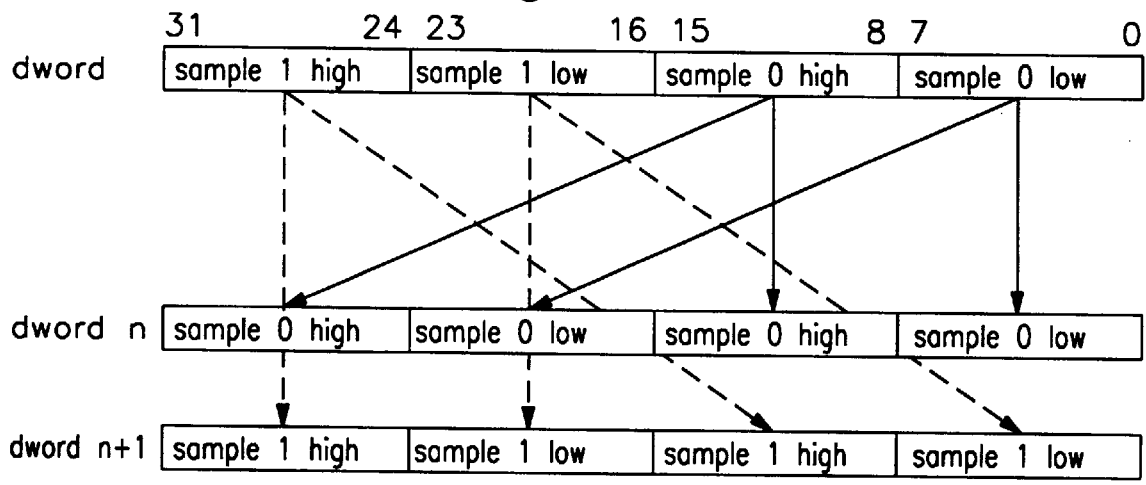
FIG. 22C is a diagram of the transfer between 32-bit memories with conversion from 16-bit mono, little-endian into 16-bit stereo, little-endian.
Figure 22D:
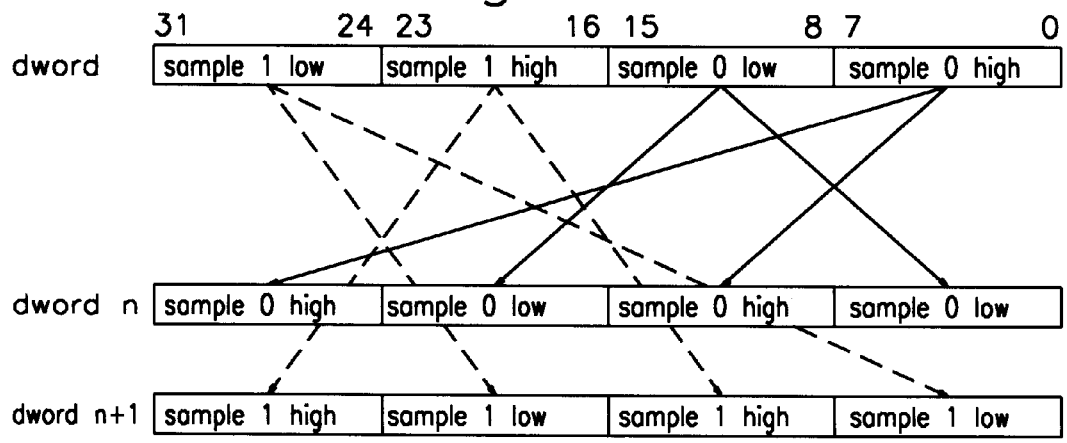
FIG. 22D is a diagram of a transfer between 32-bit memories with conversion from 16-bit mono, big-endian to 16-bit stereo, little-endian.
Figure 22E:
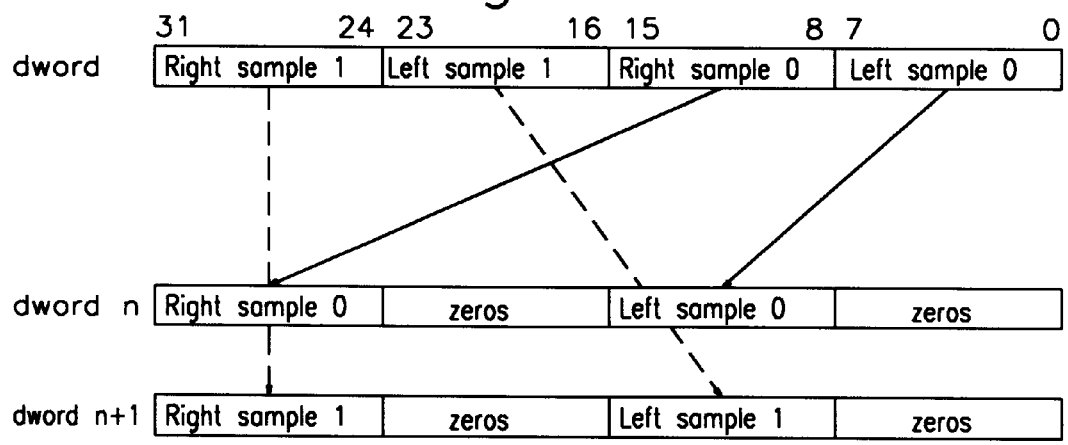
FIG. 22E is a diagram of a transfer between 32-bit memories with conversion from 8-bit stereo, signed to 16-bit stereo, little-endian, signed.
Figure 22F:
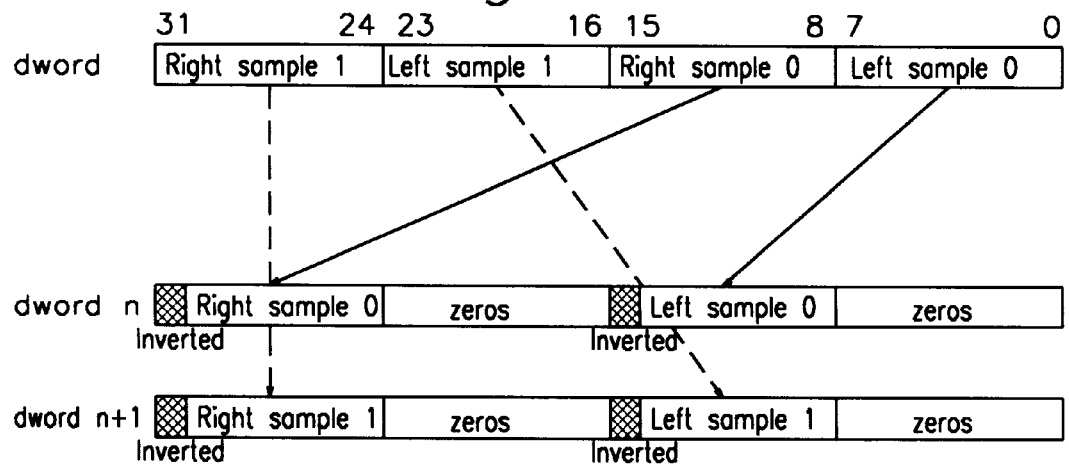
FIG. 22F is a diagram of a conversion from 8-bit stereo, unsigned to 16-bit stereo, signed.
Figure 22G:
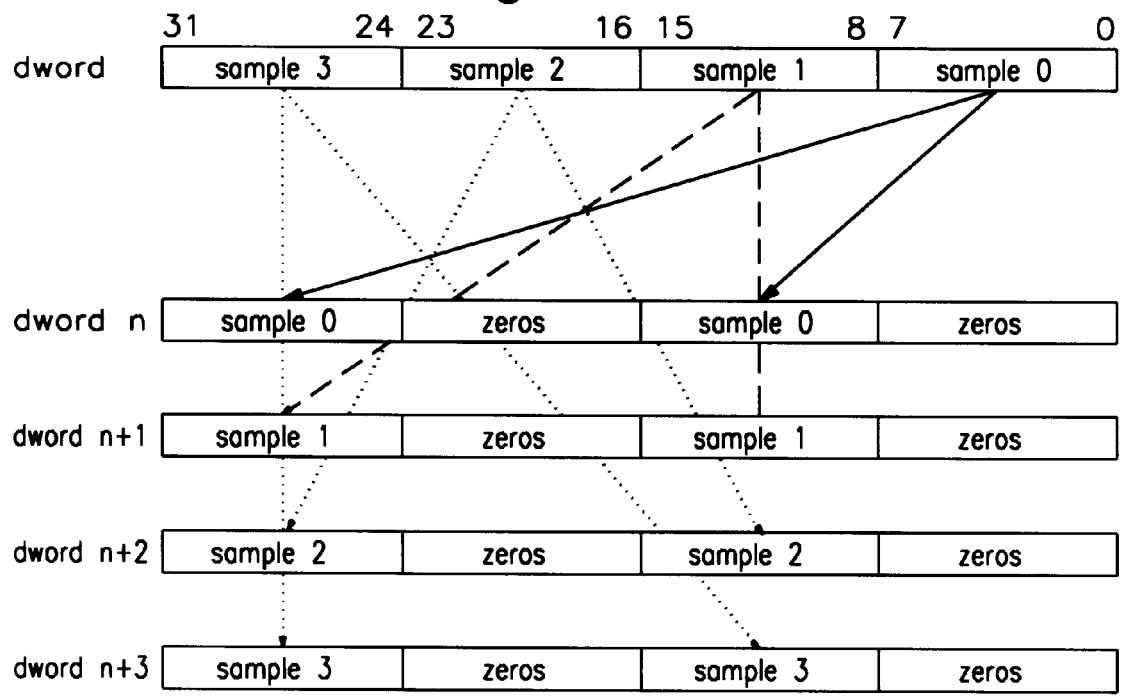
FIG. 22G is a diagram of a typical transfer between 32-bit memories with conversion from 8-bit mono, signed to 16-bit stereo, signed.
Figure 22H:
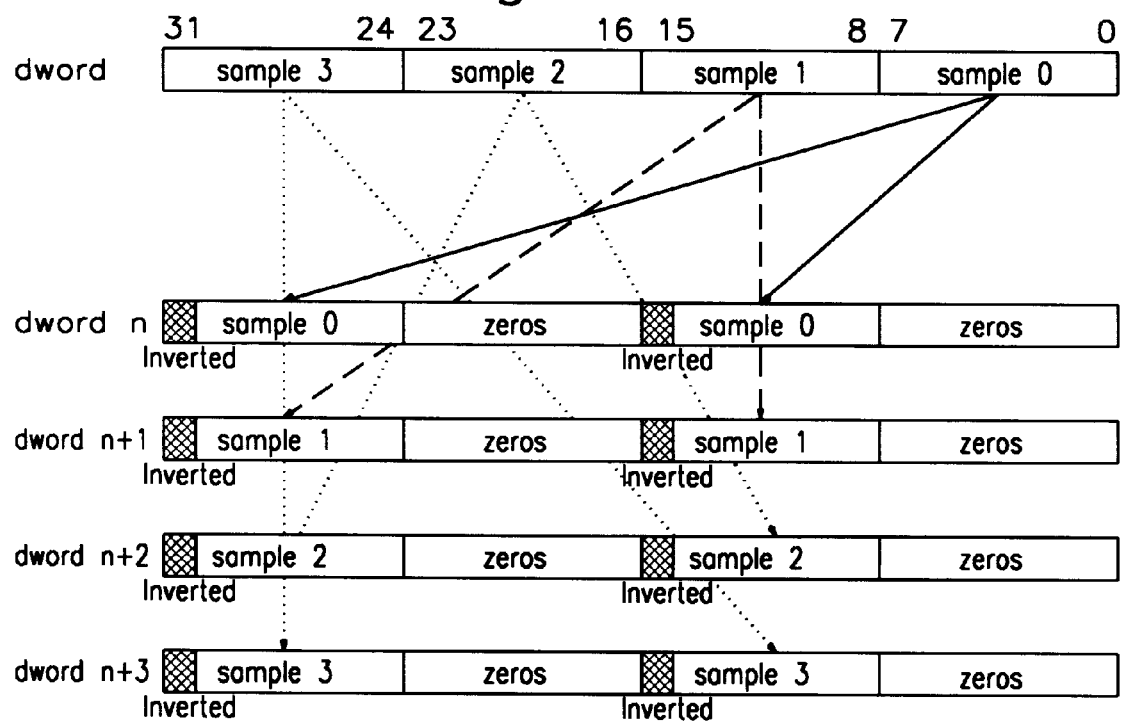
FIG. 22h is a diagram of a transfer between 32-bit memories with conversion from 8-bit mono, unsigned to 16-bit stereo, signed.

FIGS. 22A–22H depicts typical audio data transfers between 32-bit memories. FIG. 22A shows the situation where no conversion is needed for 16-bit stereo being transferred in a little-endian format. FIG. 22B depicts an exemplary transfer with conversion from 16-bit stereo big-endian to 16-bit stereo little-endian. FIG. 22C depicts a transfer with conversion from 16-bit mono, little-endian into 16-bit stereo, little-endian. FIG. 22D depicts an exemplary transfer with conversion from 16-bit mono, big-endian to 16-bit stereo, little-endian. FIG. 22E depicts a transfer with exemplary conversion from 8-bit stereo, signed to 16-bit stereo, little-endian signed. FIG. 22F illustrates a transfer with conversion from 8-bit stereo, unsigned to 16-bit stereo, signed. FIG. 22G depicts a typical transfer with conversion from 8-bit mono, signed to 16-bit stereo, signed, while FIG. 22h depicts a transfer with conversion from 8-bit mono, unsigned to 16-bit stereo, signed.

Figure 22I:
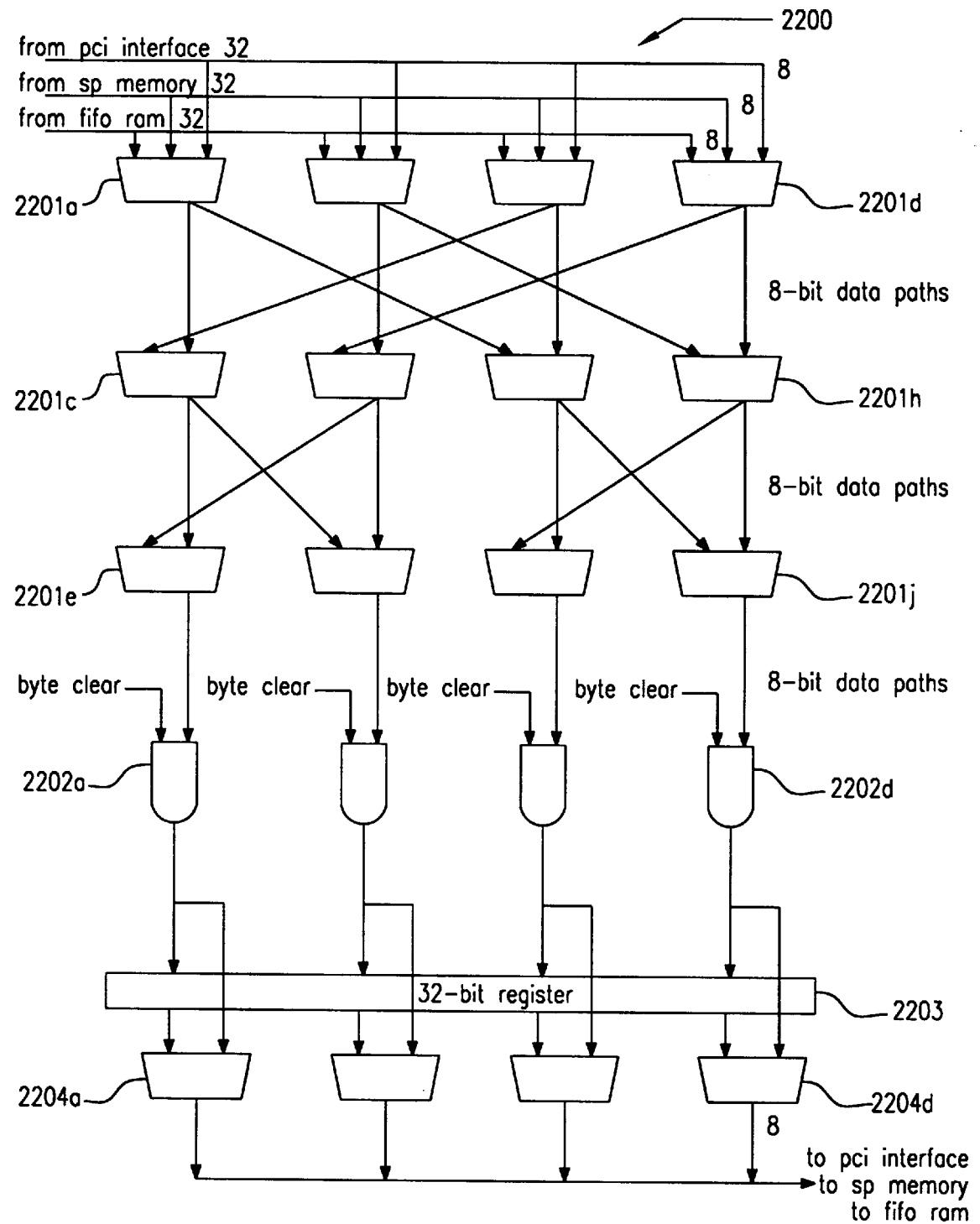
FIG. 22i is a diagram of circuitry for implementing the data manipulations depicted in FIGS. 21A and 21B and FIGS. 22A–22H.

FIG. 22i is a conceptual block diagram of the preferred circuitry 2200 for performing the information manipulations shown in FIGS. 21 and 22. DMA controller 208 is responsible for transferring 32-bit data doublewords between the PCI interface 206 and the 32-bit SP memories 202/203/204. DMA controller 208 allows addresses in host memory and SP memory to be specified as byte addresses rather than requiring that all addresses be aligned to doubleword (32-bit) boundaries. Because data transferred on the PCI bus must always align to a doubleword boundary in host memory (per PCI bus specification) and data transferred to SP memory must address doubleword quantities (it's a 32-bit memory), a mechanism for left and right-shifting the 32-bit data by 0, 1, 2, or 3 bytes during transfer is required. This allows a given byte or bytes to originate at any byte address in host memory, and be transferred to any byte address in SP memory, even though the datapath always transfers 32 bits at a time.

Just before data enters the FIFO memory, and just after it leave the FIFO memory, the data passes through the circuit 2200 shown in FIG. 22i. Each multiplexer 2201 selects between two or more 8-bit quantities and outputs a single 8-bit quantity. When the FIFO is being filled, data comes from either the PCI interface 206 or sp memory 202/203/204, and when the FIFO is being drained, data comes from the FIFO RAM. The first set of four muxes 2201 select among these three inputs. AND gates 2202 allow for 8-bit bytes to be selectively masked.

The second and third rows of muxes 2201 are interconnected in a structure which allows the incoming data to be shifted by 0, 1, 2, or 3, bytes in either direction. This would ordinarily be done with a commonly used circuit called a barrel shifter. This circuit is not a barrel shifter, but a variation which allows the data to be audio-converted at the same time it is shifted.

Audio conversion requires certain input bytes to be replicated on the output (to convert mono to stereo data), requires different bytes to be left-shifted by different amounts at the same time (to convert 8-bit to 16-bit audio) and requires the ability to replace one or more bytes with a "zero" byte.

A complex control circuit is provided (not shown), operating to generate the sequences shown in FIGS. 21 and 22, which controls the select lines on each mux 2201, and allows the datapath to be shifted by one or more bytes while simultaneously routing the bytes as needed to perform the audio conversions.

The 32-bit register 2203 is used to hold the previous doublewords transferred, so that bytes can be combined between successive doublewords to produce a single output doubleword.

In Circuit 2200, all audio conversion is done during the draining of the FIFO only. During the filling of the FIFO, data is simply right-shifted to compensate for an offset of 1, 2, or 3 bytes in the source memory (either host or SP memory). On the draining of the FIFO, data is both left-shifted (to align to a byte offset) and converted to a new audio format if necessary.

Figure 23:
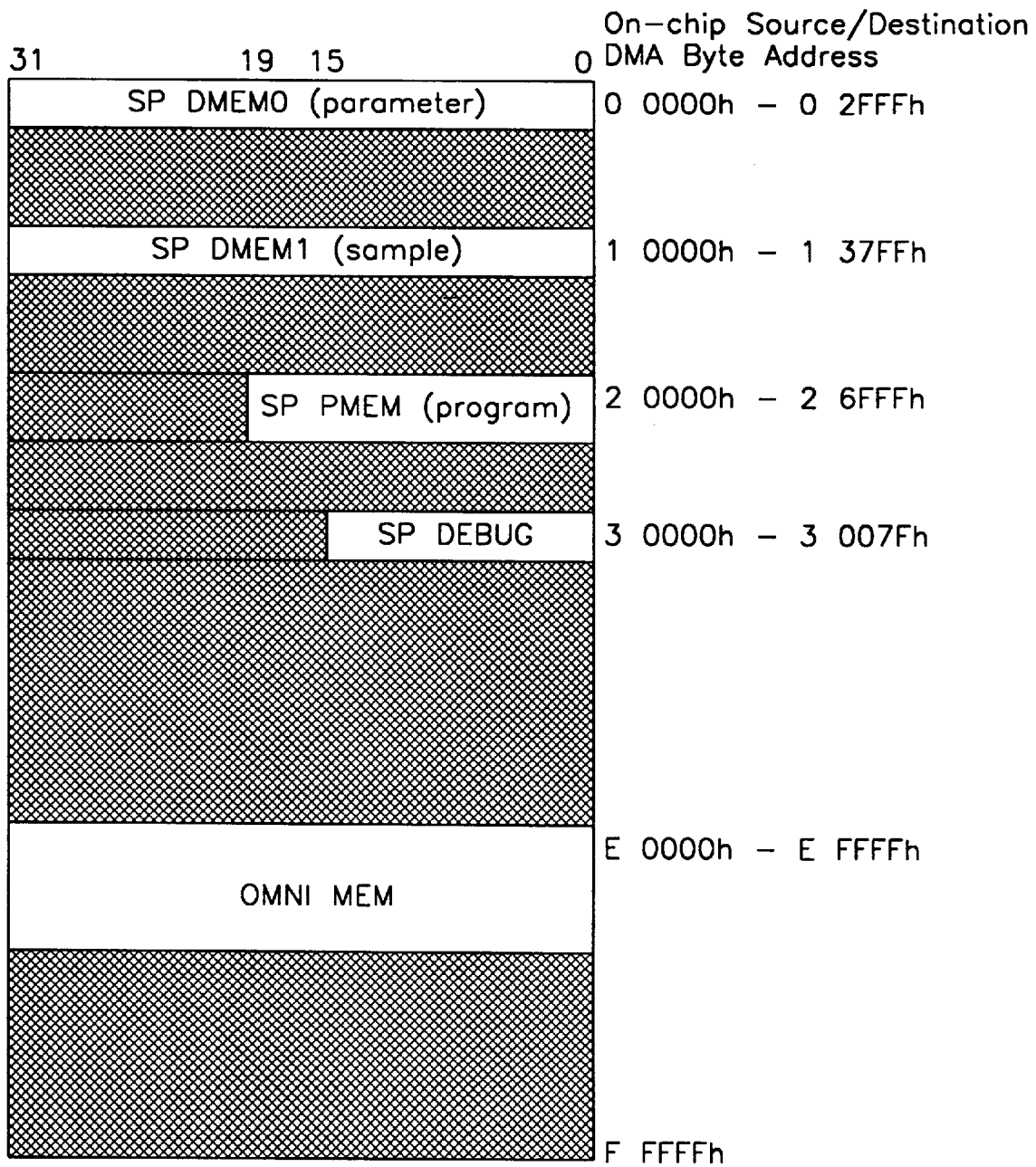
FIG. 23 is a diagram of the memory space of accelerator 200.

FIG. 23 is a block diagram depicting a preferred mapping of the memory system of accelerator 200. As can be seen in FIG. 23, for DMA purposes the entire memory system can be viewed as a single memory space.

Figure 25B:
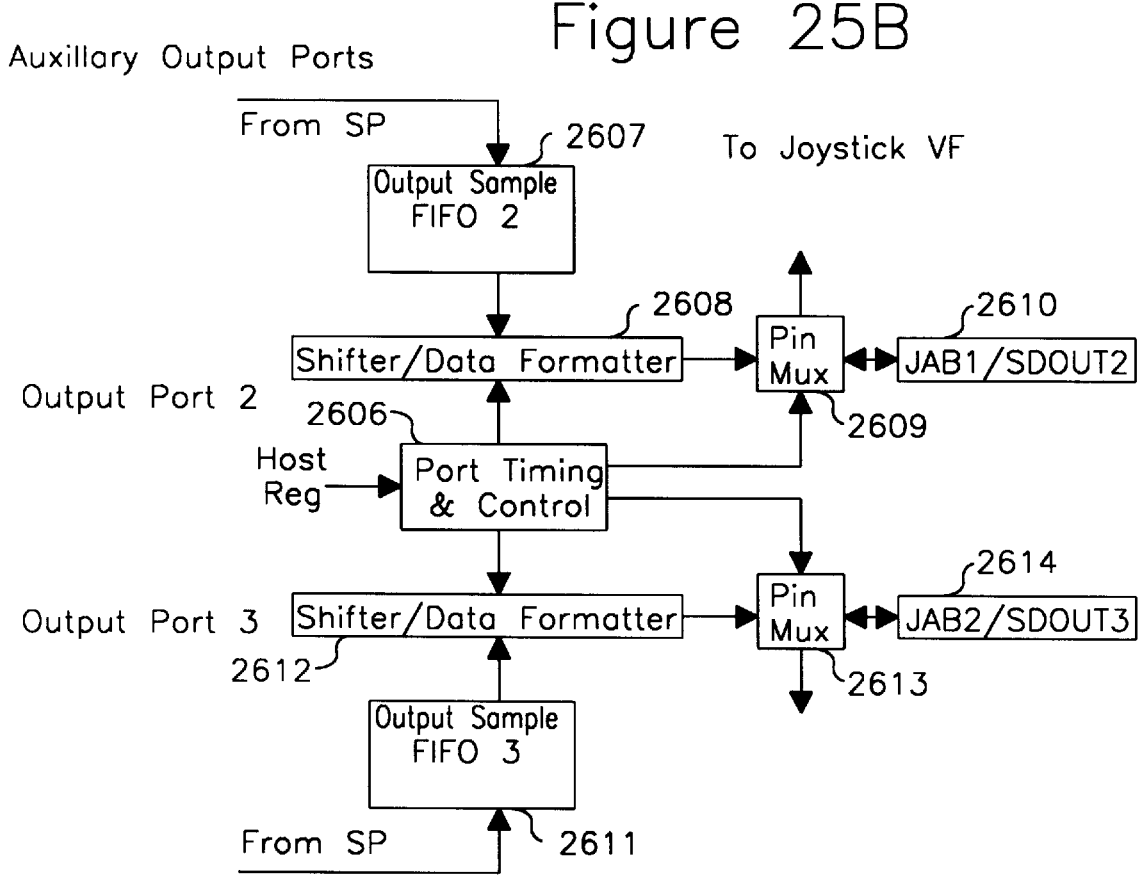
FIG. 25 is a top plan view of accelerator 200 depicting a packaging (pin-out)
Figure 25C:
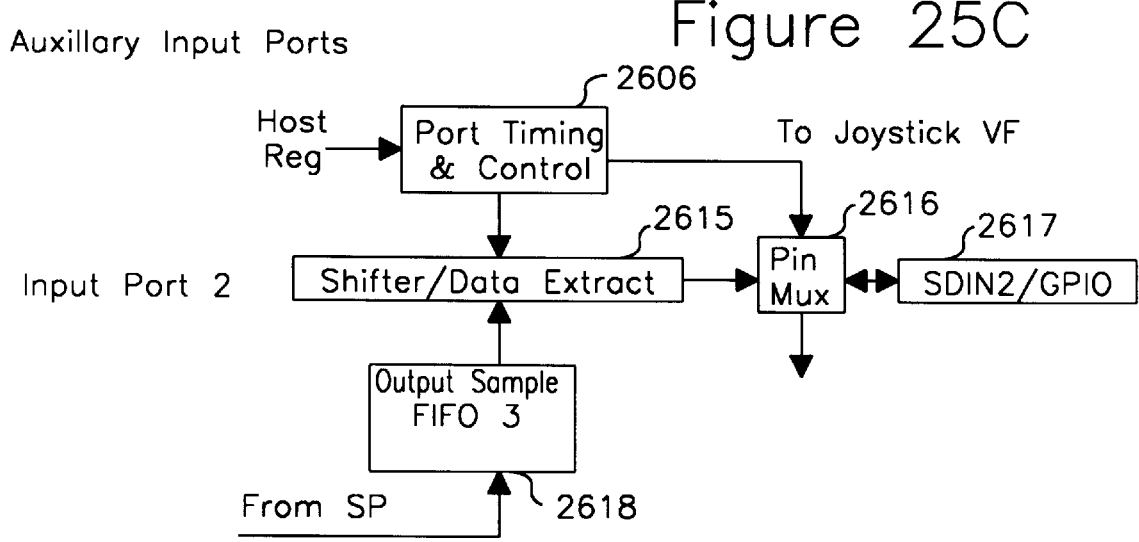

FIG. 25 is a top planned view of accelerator 200 depicting a preferred 200-pin PQFP. Functional descriptions of the pins of the pin-outs shown in plan view 25 is provided in TABLES 25A–25D for reference. For purposes of the following discussion, the pin-outs shown on FIG. 25 and the corresponding functional descriptions in TABLE 25 will be assumed. Those skilled in the art will recognize that the physical configuration as well as both the functional and nomenclature may vary.

Serial 10 ports 207 (FIG. 1) provide digital audio data paths in and out of accelerator 200, since the main function of accelerator 200 is to process multiple streams of audio data in various formats (e.g., DirectSound buffers, synthesis voice streams). Advantageously, input/output ports 207 allow for several operational modes in order to support a multiple system and chip configuration.

IO block 207 consists of a set of primary input/output ports, a pair of auxiliary output ports and a master timing and control port. The primary input/output ports comprise a dedicated set of serial data pins while the auxiliary ports port up to four more digital audio output streams as two stereo streams. It should be noted that the auxiliary ports are optional ports which are multiplexed with the joystick button input functions.

Figure 26A:
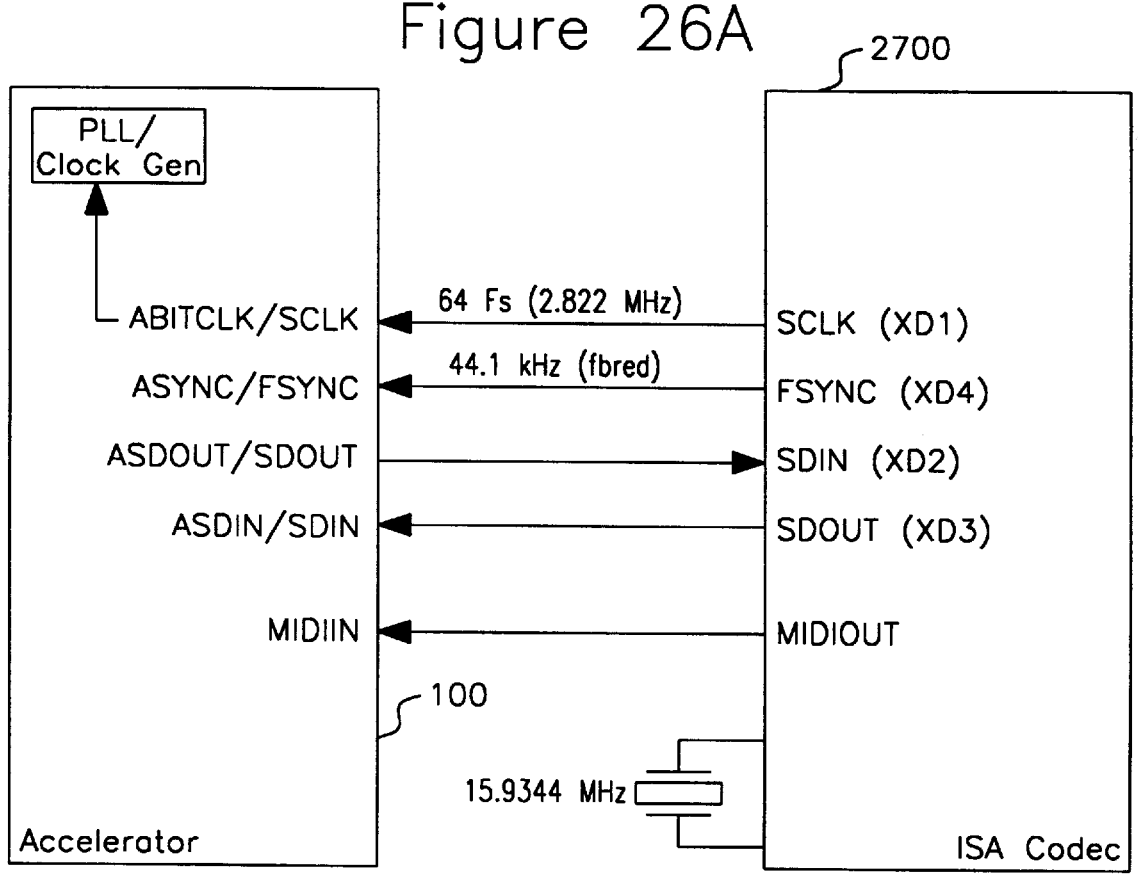
FIG. 26A is a diagram of the primary serial input and output ports.

FIG. 26A is a conceptual block diagram of the primary serial input and output ports. The primary output port includes a set of first in/first out registers 2600 for pipelining data received from stream processor 100. The data pipelined from output sample FIFOs 2600 are provided to a data shifter/formatter 2601 under the control of command addresses and data presented through port timing and control 2606. Serial data is then output from shifter/formatter 2601 through the serial output port (SDOUT) 2602.

Data is received through the serial data input port (SDIN) 2603. The received data is then passed to a shifter/data extractor 2604 and then the resulting extracted samples are provided to the input sample FIFO 2605. The outputs from input sample FIFOs 2605 is sent on to stream processor 100 along with status address and data. The timing and control of data through the primary serial input is controlled by a port timing and control circuitry 2606 common with the serial output block.

Figure 26B:
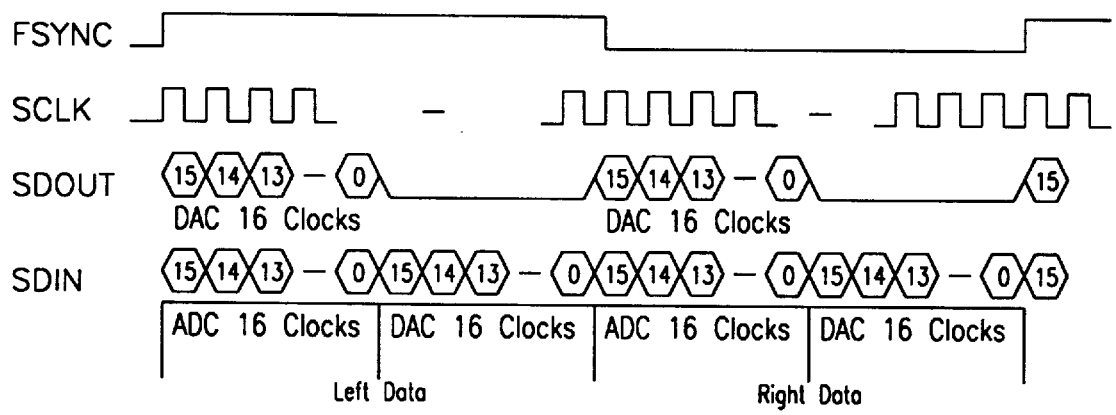
FIG. 26B is a diagram of the auxiliary output ports.

The preferred organization of the auxiliary output ports is provided in FIG. 26B. The first auxiliary output port (OUTPUT PORT 2) includes an output sample first-in-first-out memory 2607 and a shifter/data formatter 2608. The output of shifter/data formatter 2608 is controlled by a multiplexer 2609. Multiplexer 2609 allows serial data and joystick information to be multiplexed through a single pin (JAB1/SDOUT2) 2611. The auxiliary output ports are also controlled by port timing and control circuitry 2606.

The structure of this second auxiliary output port (OUTPUT PORT 3) is similar to that of output port 2. Output port 3 includes output sample FIFO 2611, a shifter/data formatter 2612 and a multiplexer 2613 multiplexing a further IO pin (JAB2/SDOUT3) 2614.

FIG. 26C depicts a preferred structure of the auxiliary input port. The auxiliary input port, which is also timed by port timing and control circuitry 2606, includes a shifter/data extractor 2615 receiving data through multiplexer 2616. Multiplexer 2616 multilpexes IO pin 2617 (SDIN2/GPIO) which receives serial input data or it can be used as a general input/output pin.

FIG. 26D is a more detailed block diagram emphasizing the timing inputs and outputs to the serial ports 207. The clock generation will be discussed further below. Pin 2619 (ABITCLK/SCLK) is primarily for the exchange of the master timing clock for serial audio data. When Accelerator 200 is used with an Intel™ AC'97 Codec, pin 2619 receives the bit rate clock from AC'97 Codec. When accelerator 200 is used with an audio motherboard, pin 2619 receives a serial audio data clock (Sclock) from the audio motherboard. In External DAC configurations, pin 2619 can be used to output a serial bit clock.

Pin 2620 (ASYNC/FSYNC) provides for the exchange of the framing clock for serial audio data. In configurations using an AC'97 Codec, pin 2620 is an output which defines the framing for the AC 97 link. In Audio motherboard configurations, pin 2620 is input for receiving the frame synchronization signal FSYNC. In external DAC configurations, pin 2620 is an output for providing the LRCLK frame clock.

Pin 2621 is a multiplexed pin which receives information from the Joystick B, button No. 1. For non-AC 97 Codec system configuration, pin 2621 is used to output an alternate framing clock LRCLK for the auxiliary output ports SDOUT2 and SDOUT3.

Pin 2622 is provided as an input pin for joystick B, button 2. In non-AC 97 Codec system configurations, pin 2622 can be used to provide a master output clock when enabled.

Figure 27:
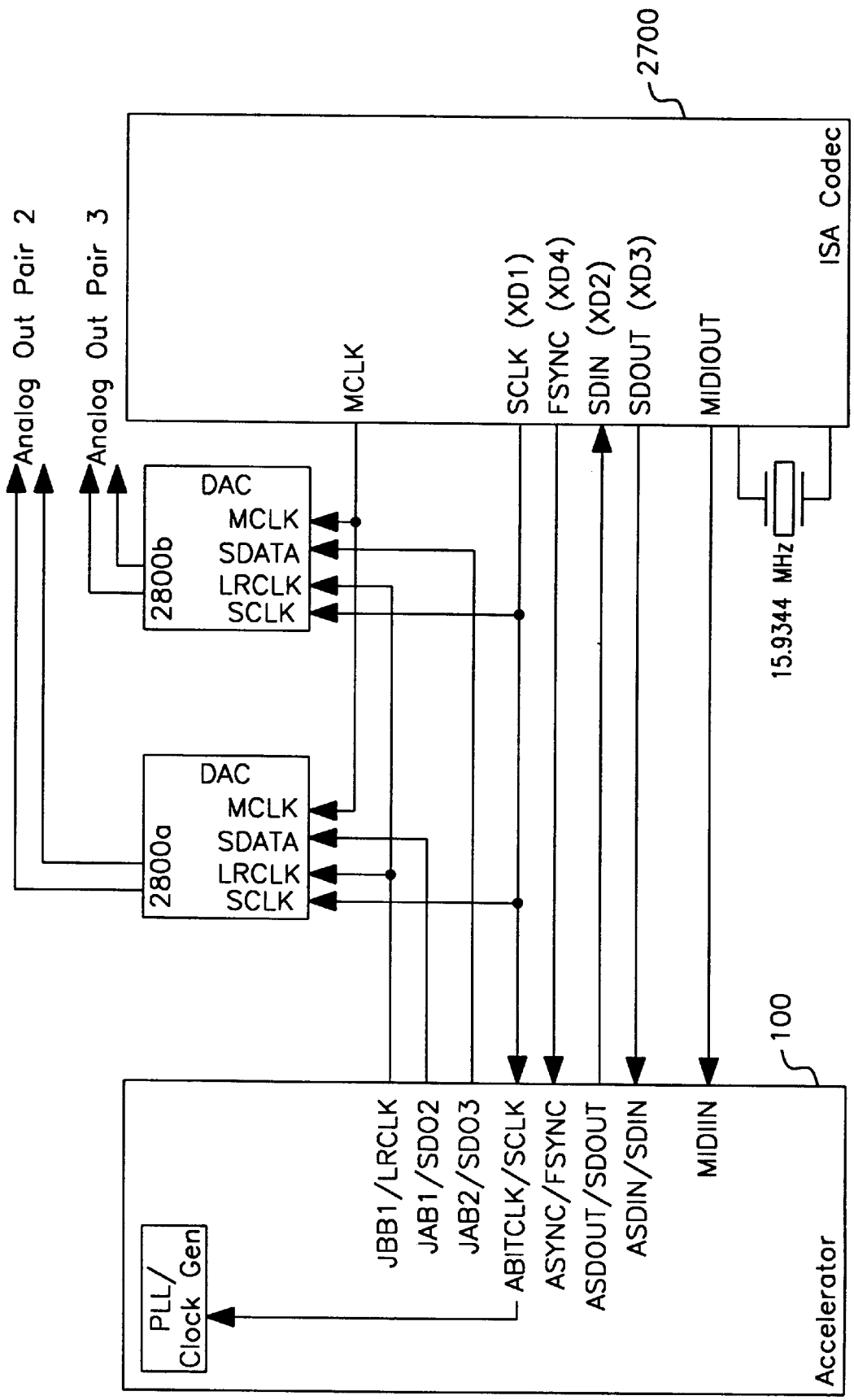
FIG. 27A is a diagram depicting a configuration where accelerator 200 is functioning as a PCI accelerator on a audio motherboard.
FIG. 27B is a diagram depicting selected clocks and signals to demonstrate the typical exchange of clocks and signals between Codec and accelerator 200 in the configuration of FIG. 27A.

FIG. 27A is a conceptual connection diagram depicting a configuration where accelerator 200 is functioning as a PCI accelerator on a audio motherboard. In this illustration, accelerator 200 is coupled to a Crystal Semiconductor 42373b ISA Codec 2700. In this case, the link sample rate is 44.1 KHz and the phase lock loop clock source is providing an SCLK at 2.822 megaHertz. Preferably, ISA Codec 2700 is the timing master in this configuration. The master timing source in the configuration of FIG. 27A is a 16.9344 MHz crystal oscillator. The serial bit rate clock (SCLK) provided by the PLL/Clock control section of accelerator 200 for internal clock generation, which will be discussed in further detail below.

FIG. 27B is a timing diagram depicting selected clocks and signals to demonstrate the typical exchange of clocks and signals between the Codec and accelerator 200 in the configuration of FIG. 27A. Again, frame synchronization signal FSYNC is running at a fixed 44.1 kHertz, which is the link sample rate. The SCLK is running at 2.822 megaHertz, which provides a 64× sample rate (i.e., 64 SCLK periods per FSYNC). An explanation and description of the clocks and signals shown in FIG. 27B is provided in TABLE 26.

In the configuration of FIG. 27A, and as shown in FIG. 27B, the output format is 16-bits per output channel (left and right), MSB first with 16-bits of padded 0's following the output sample. The MSB shift preferably is output the same clock as the transition in the FSYNC signal. The left channel is output with FSYNC rising and the right channel is output with FSYNC falling. The target for the accelerator 200 serial output port is the serial input port to Codec 2700.

The accelerator 200 primary serial input port is enabled in the configuration of FIG. 27A. The input format consists of four data fields in the two (left/right) channels. Preferably, for the left channel data, the first 16-bit ADC data is received MSB first, then the 16-bit DAC data is received, also MSB first. Next, the right channel data, another ADC/DAC pair, is shifted into the serial input port. The left channel is framed by the FSYNC logic high time, and the right channel is framed by the FSYNC logic low time. In this configuration, the auxiliary input and output ports are not required.

Figure 28:
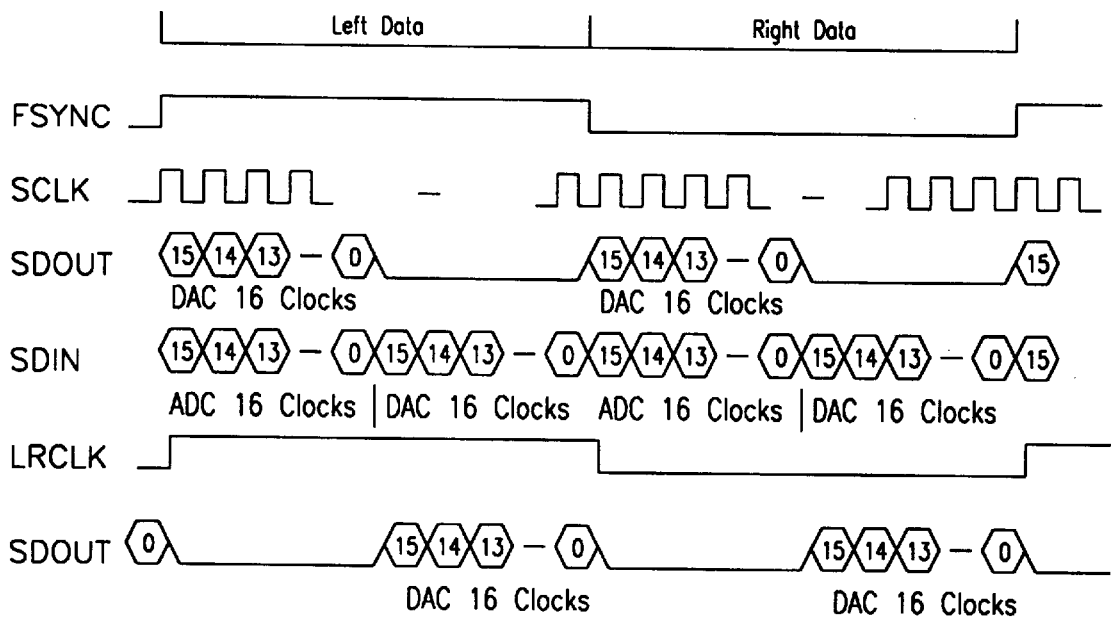
FIG. 28 is a diagram of an expanded version of the configuration option depicted in FIG. 27A.

FIG. 28 is an expanded version of the configuration option depicted to FIG. 27A. In this case, two digital analog converters 2800a and 2800b are employed for example. Digital-to-analog converters 2800, for example, are Crystal Semiconductor 433x digital-to-analog converters. Accelerator 200 in the configuration of FIG. 28 is functioning as a PCI accelerator for a co-resident multimedia audio subsystem, such as a Crystal Semiconductor 4237B motherboard, with an additional set of stereo DACs. A preferred timing diagram illustrating the typical operation of the configuration shown in FIG. 28 is given in FIG. 29. A brief description of the corresponding signals are given in TABLE 27.

Figure 29:
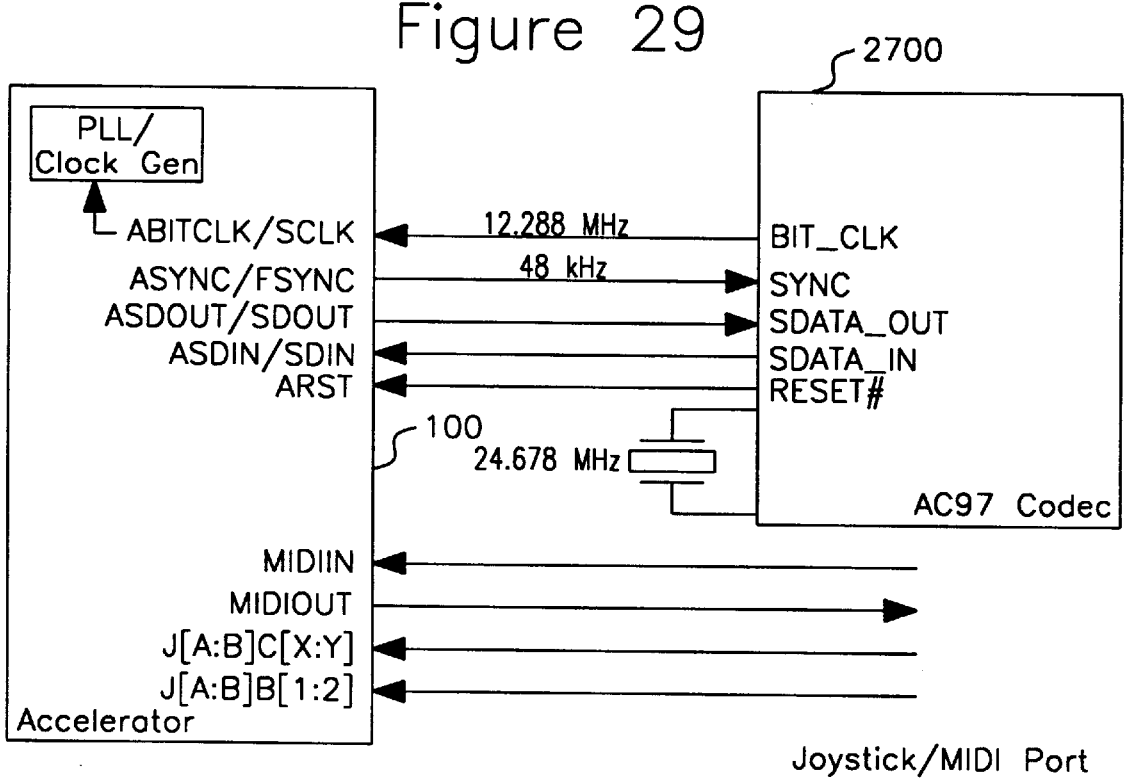
FIG. 29 is a timing diagram illustrating the typical operation of the expanded configuration shown in FIG. 28.

In the system of FIG. 28 the primary serial input and output ports are configured and function as discussed above with regards to configuration of FIG. 27A. However, in the embodiment of FIG. 28, the serial output 2 (FIG. 26B) is also enabled and operates as shown in FIG. 29. The output format is 16-bits per output channel MSB first, with 16-bits of padded zero's preceding the output sample. Preferably, the MSB is output 16 clock periods following the transition of FSYNC. The left channel is output with LRCLK high and the right channel is output with LRCLK low. The target for serial output port 2 is the input of a selected one of the DACs 2800.

Serial output port 3 coupled to the other DAC 2800 provided in the configuration of FIG. 28 and is enabled. The operation of serial port 3 is similar to that of serial output port 2. In this configuration, the second serial input port, serial input port 2, is not used.

Figure 30:
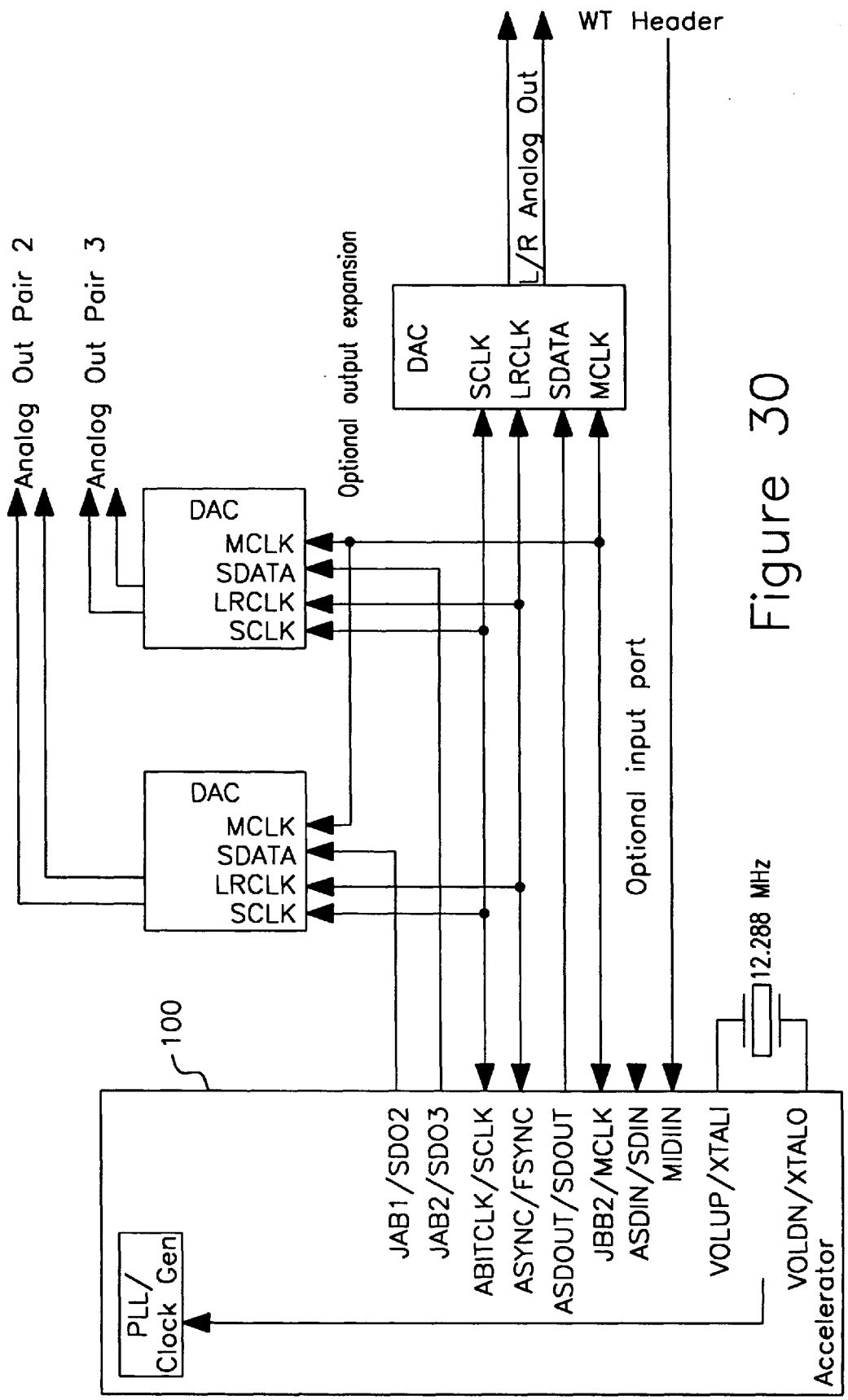
FIG. 30 is a diagram of the interconnection of an AC 97 Codec 2800 with accelerator 200 where accelerator 200 is driving multiple DACs.

FIG. 30 depicts the interconnection of an AC'97 Codec 2800 with accelerator 200. In this case, the link sample rate is preferably 48-kHertz, the PLL clock source, the clock ABITCLK which is running at 12.288 megaHertz. Preferably, Codec 2800 provides the master clocking signals from a 24.576 crystal oscillator.

FIG. 31 shows a further configuration possibility for accelerator 200. IN the configuration of FIG. 31, accelerator 200 is functioning as a "direct sound" accelerator. In this case, accelerator 200 drives three digital-to-analog converts 2900, each of which is preferably a crystal semi-conductor 433x digital-to-analog converter. In this case, the timing is generated by accelerator 200 in response to a master clock from a 12.288 megaHertz crystal oscillator. Preferably, the link sample rate for the configuration of FIG. 31 is 48 kHertz.

Input/output ports 207 are selectively configured and enabled by register set within accelerator 200. For purposes of the discussion below, it will be assumed that all four of the exemplary configurations above can be supported. Those skilled in the art will recognize that the available registers can also support further configurations, as desired.

FIG. 32 is a preferred diagram of the serial port master control register 1. This register includes bits for enabling and disabling input/output serial port functions and for controlling the timing of data transfers through IO ports 207. A brief bit description for the bit field of the serial port master control register of FIG. 32 is given in TABLE 28.

The serial port master control register 2 (SERMC2) is conceptually depicted in FIG. 33. A brief description of the bitfields of the serial port master control register shown in FIG. 33 is provided in TABLE 29. Generally, the bits in this register enable and disable the LRCLK and MCLK clock outputs provide for the selection of the MCLK frequency.

FIG. 34 depicts the bitfields for the serial port configuration register (SERC1). This register controls the configuration of the primary output port including enabling and disabling primary output port (OUTPUT1) and defining the data output format. A brief description of the register bitfields is also given in TABLE 30.

Serial port configuration register 2 (SER2) of FIG. 35 similarly configures the primary input port. This includes enabling primary input port (INPUT1) and defining the data is to be received thereby. A brief bit description corresponding to FIG. 35 is shown in TABLE 31.

FIG. 36 depicts the bitfields for the serial port configuration register 3 (SERC3). This register controls the configuration in enabling of auxiliary serial output port (OUTPUT2). A brief description of the bitfield functions are found in TABLE 32A.

Figure 37:
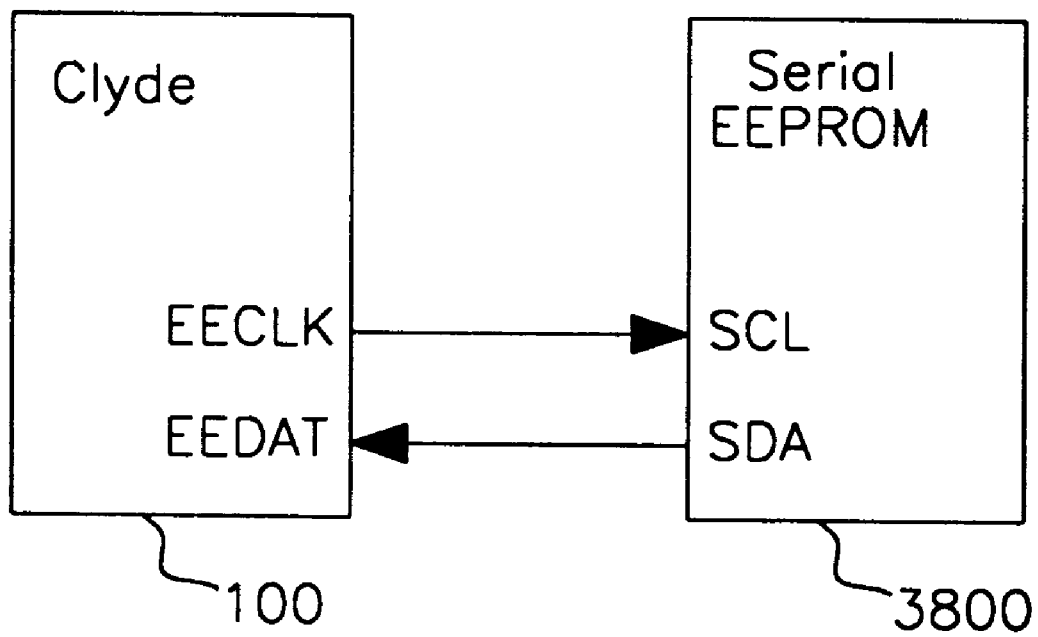
FIG. 37A is a diagram of the bitfields for serial port configuration register 4 (SERC 4)
FIG. 37B is a diagram of serial port configuration register 5 (SERC 5)

FIG. 37A generally depicts the bitfields for serial port configuration register 4 (SERC4). TABLE 32 generally described the functions of the bits stored in serial port configuration register 4. Generally, this register enables the second auxiliary output (OUTPUT 3) and defines the output data format for the port. The bitfields for this register are provided in FIG. 32B.

FIG. 37B depicts serial port configuration register 5 (SERC5). Generally, this register controls the configuration of the auxiliary input port (INPUT PORT 2) including enablement and input data format definition. A brief description of the functioning of each bitfield is provided in TABLE 33.

Accelerator 200 provides for the interface with an external serial EEPROM memory subsystem which provides power-up configuration information. FIG. 38 is a conceptual functional block diagram emphasizing the connections between accelerator 200 and a serial EEPROM 3800. While EEPROM 3800 is depicted as a single block, it may in actuality be constructed from one or more separate devices. It should be noted that while the serial EEPROM is not required for proper operation of accelerator 200, it may be required to support specific operating system compatibility requirements. For example, it may contain vendor and part ID fields such that the host software can properly configure. If a serial EEPROM is not present, accelerator 200 is generally enabled for use on the PCI bus and the subsystem id fields (ID and vendor ID fields) in the primary configuration registers are set to zero.

The presence of an external EEPROM is detected by attempting to load and check for valid header on power-up. A simple two pin connection is used as shown in FIG. 38 in which serial clock EECLK is exchanged to EEPROM 3800. Serial data IO is exchanged through the EEDAT pin.

Figure 40:
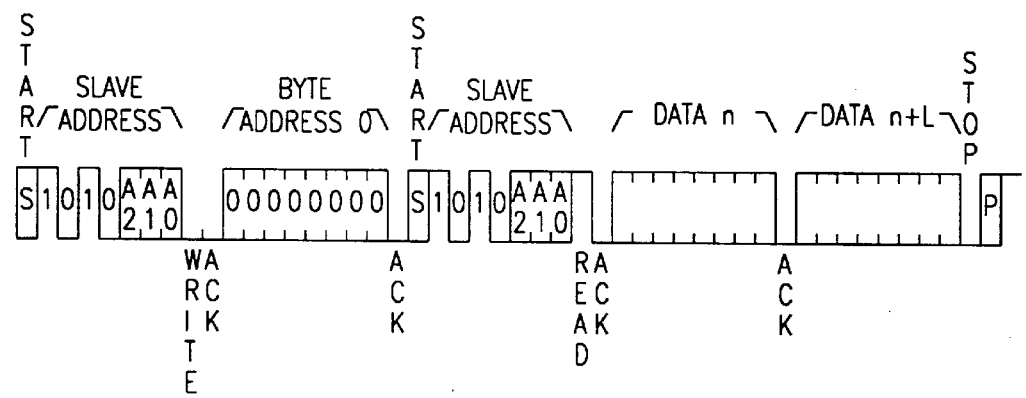
FIG. 40 a diagram of a minimum timing relationship between the clocks and data during an exchange with the optional EEPROM subsystem.

Accelerator 200 only accesses EEPROM 3800 after a hard reset or on power-up. In particular, accelerator 200 only reads from EEPROM device 3800; writing to EEPROM 3800 is accomplished using the PCI bus EEPROM access port in the configuration interface register. A preferred minimum timing relationship between the clocks and data is shown in FIG. 40. Preferably, the state on the data line changes only when the clockline is low. A state change on the data line (EEDAT) during the time that the clock time is high in this case is used to indicate START and STOP conditions.

Figure 41:
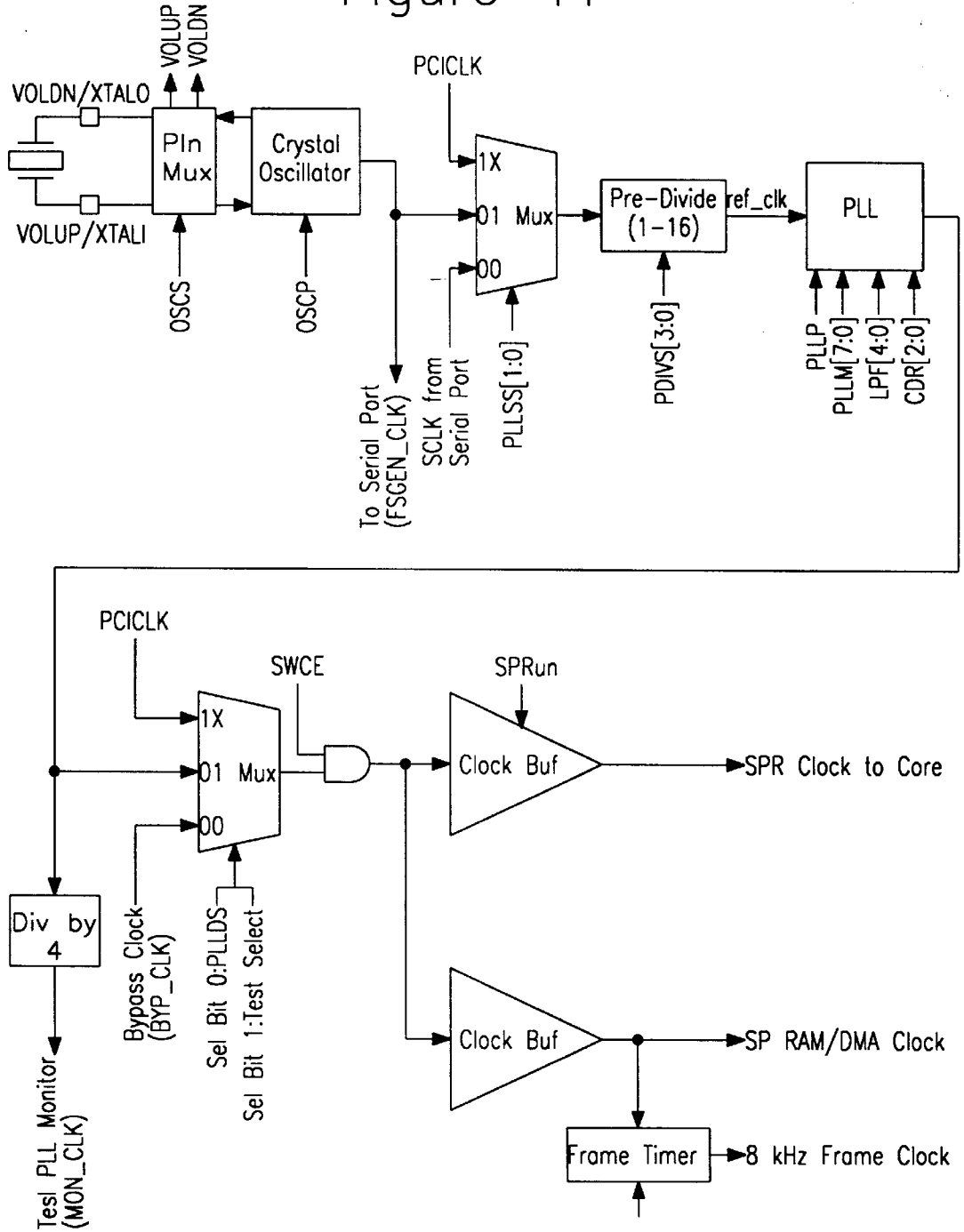
FIG. 41 is a diagram of a read access sequence to the optional EEPROM.

FIG. 41 depicts a preferred read access sequence from EEPROM 3800. The timing generally follows that of a random read sequence. Accelerator 200 first performs a dummy write operation, generating a START condition followed by the slave device address and the byte address of zero. The slave address is made up of a device identifier (0×A) and a bank select bits. Bank select bits select from among eight 256-byte blocks of EEPROM devices. The bank select bits may also be used to select from among 256-byte blocks within a single device memory (i.e., a 1-K byte memory comprised of a single 1-K byte EEPROM with four 256-byte banks). Accelerator 200 begins the access at byte address 0 and continues the access a byte at a time. The byte address automatically increments by one until a STOP condition is detected.

Figure 39:
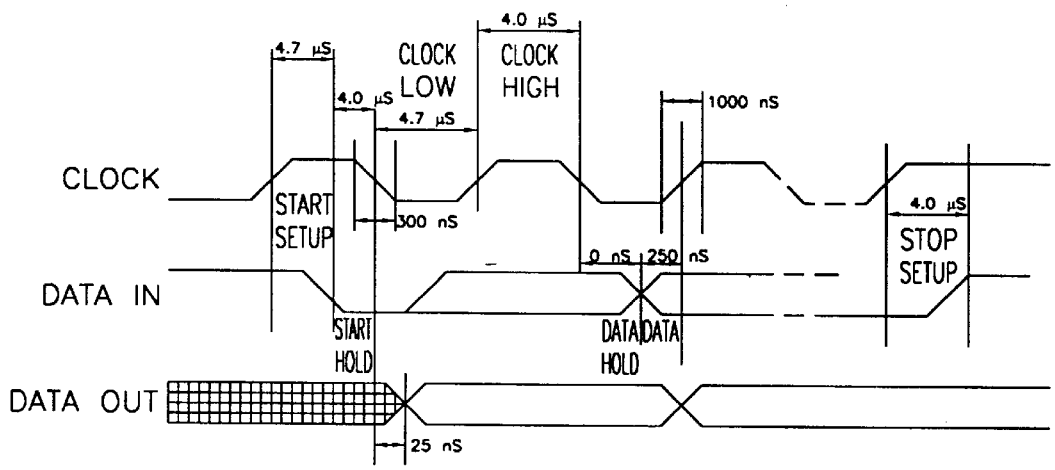
FIG. 39 is a diagram of the configuration register (CFGI) that contains the control bits for host-software based manipulation of an external EEPROM subsystem, when attached.

FIG. 39 is a diagrammatical representation of the configuration register (CFGI) that contains the control bits for host-software based manipulation of external EEPROM subsystem 3800, when attached. A brief description of the bitfields are defined in TABLE 34.

PCI (host) access to EEPROM 3800 is also enabled via the DIN/EEN bit in the configuration interface register. When the DIN/EEN bit is written to a 1, then the CLK and DOUT bits are enabled at the EECLK and EEDAT pins, respectively. Timing of the clock and data signals preferably are completely determined by the host-based software program.

TABLE 35 describes the contents of EEPROM 3800, when used. The configuration space loads in doubleword alignment.

Figure 42:
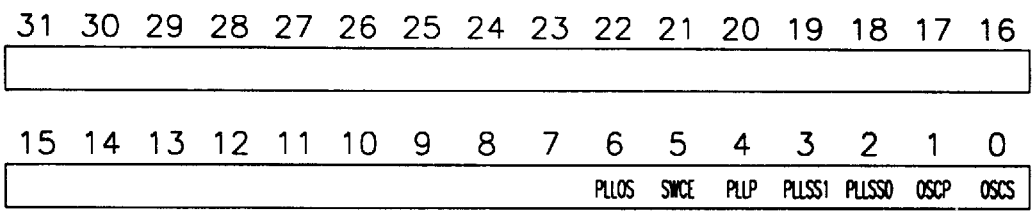
FIG. 42 is a diagram of the configuration register (CFGI) that contains the control bits for host-software based manipulation of the external EEPROM, when attached.

As discussed above, accelerator 200 includes a programmable clock control, to allow it to interface in various configuration, depending on the functionality of the associated devices. The clocking model is shown in FIG. 42. This clocking design has several advantages. Among other things, it supports an independent timing environment where accelerator 200 is essentially acting as a stand alone system. The design also uses a phased-locked loop (PLL) which generates a variable speed clock in the 60–100 Megahertz range for core processor 100 from the 12.288 MHz or 2.822 MHz incoming clocks. Advantageously, stream processor 100 does not drift from the master incoming clock as a result. The preferred design further provides for clean clock shutdown, as required for power saving when no clock intensive processing is being performed.

The clocking model is based around a crystal oscillator 4200 and a phase lock loop 4201. Multiplexer 4202 allows for the selection between either the input through the crystal oscillator 4200 or output volume up and volume down control information. A second multiplexer 4203, under software control, selects between the output of crystal oscillator 4200, the serial port bit clock, or the PCI bus clock for passage on to pre-dividers 4204. Pre-dividers 4204 and operable to divide the signal input thereto by any divisor in the range of 1 through 16. The output of the predivider is connected to phase lock loop 4201.

The output of phase locked loop 4201 passed through a divide by two circuit 4206 onto a divide by 4 circuit 4207 and a multiplexer 4208. The divide by 4 circuit 4207 provides an output to monitor the phase lock loop for testing purposes. A multiplexer 4208 selects between either the PCI clock, the output from divide by two circuit 4206 and a test SPCLK. The ability to input a test clock advantageously allows for tests of stream processor 100 directly. The output of multiplexer 4208 is simultaneously presented to the inputs of a pair of clock buffers 4209 and 4210.

Clock buffer 4209 drives stream processor core 100 while clock buffer 4210 drives the on-chip memory and DMA engine 208. Clock buffer 4210 further drives frame timer 4211 which provides the 8K kilohertz frame clock. The frame clock defines processing periods; within each 8 kilohertz frame clock period, time allotted to various tasks such as wavetable or synthesizer algorithms execution.

Figure 43:
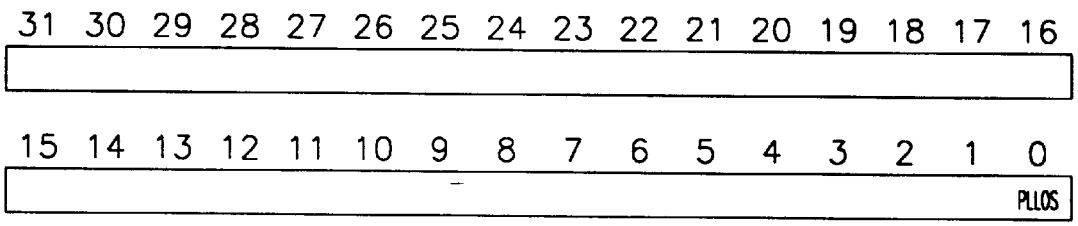
FIG. 43 is a diagram representing clock control register 1 (CLKCR 1)

Clocking is controlled by a set of clock registers. Clock control register 1 (CLKCR1) controls the oscillator pin select, oscillator power up, phase lock loop source select, PLL power up and the software clock enable, and output clock select, shown in FIG. 42. FIG. 43 is a diagram representing clock control register 1 and TABLE 36 provides a brief description of the function of each bit in the register bit fields.

Figure 44:
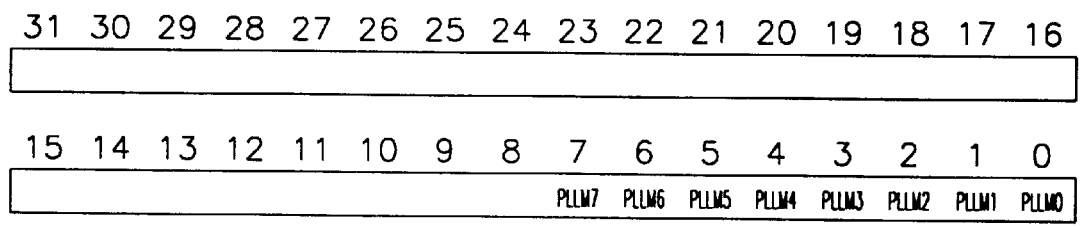
FIG. 44 diagrammatically describes the clock control register 2 (CLKCR 2)

FIG. 44 diagrammatically describes the clock control register 2 (CLKCR2), which controls the pre-divide count of the source clock for PLL 4201. Bitfield shown in FIG. 44 is further described in TABLE 37.

Figure 45:
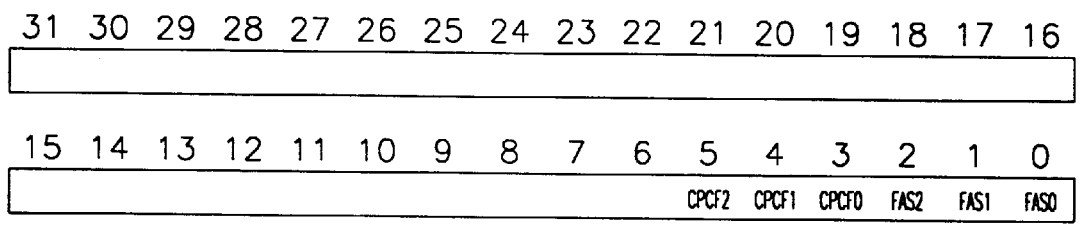
FIG. 45 is a diagram of the phase lock loop multiplier register (PLLM)

FIG. 45 depicts the phase lock loop multiplier register and table 38 describes the functioning of the bitfield therein. In particular, the register holds bits which select the multiplier for the phase lock loop conversion.

Figure 46:
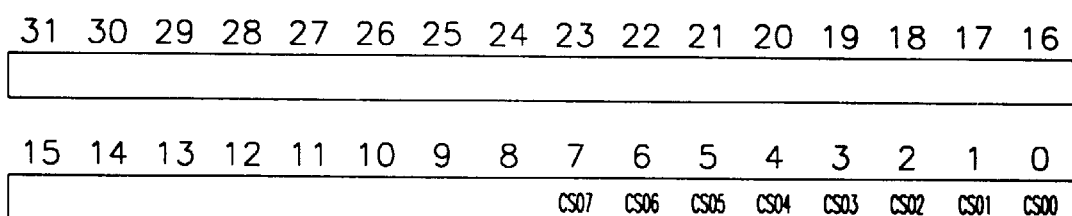
FIG. 46 is a diagram of the feature reporting register (FRR)

Accelerator by 200 includes a feature reporting register and configuration of load registers which contain feedback bits for software based detection of various device and device family configuration options. FIG. 46 is a diagrammatical depiction of the feature reporting register. TABLE 39 is a brief description of the bitfields. Generally, the feature reporting register identifies the type of fabrication processes used to construct accelerator 200 and a field for which identifies up to 8 configuration options available for a given device.

Figure 47:
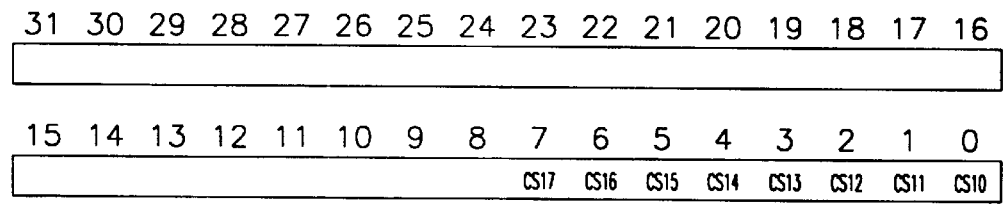
FIG. 47 is a diagram of configuration load register 1 (CLFR 1)
Figure 48:
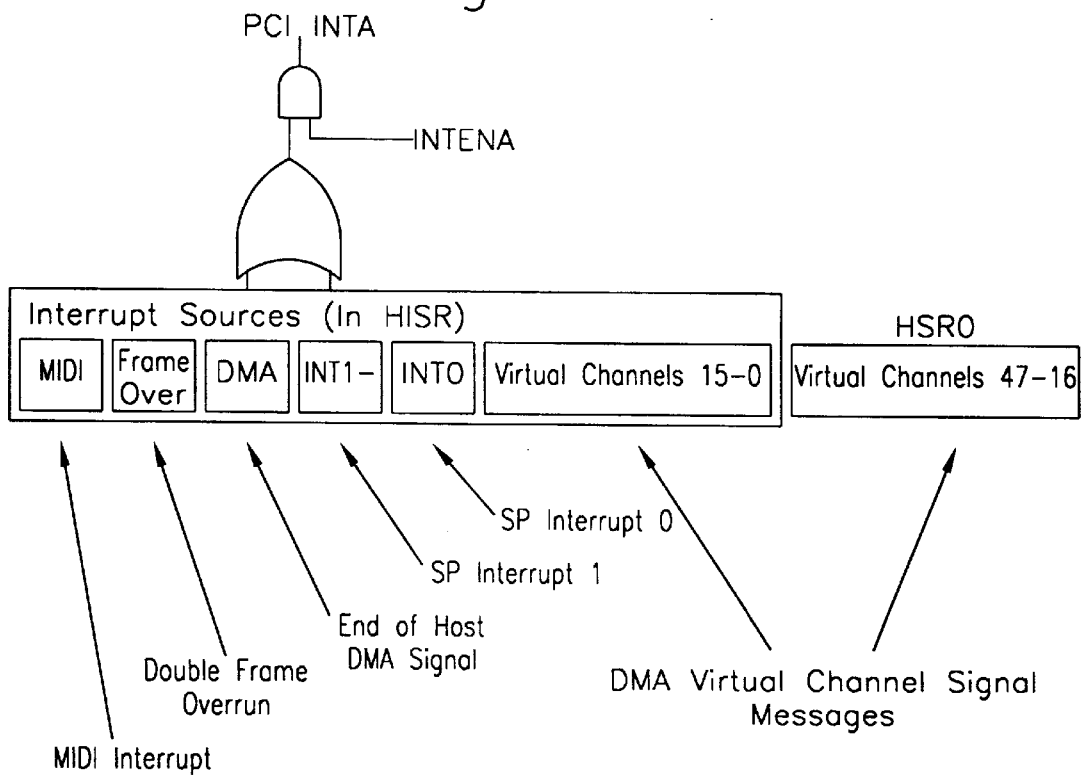
FIG. 48 is a diagram of configuration load register 2 (CLFR 2)

The configuration load register 1 (CLFL 1) and configuration load register 2 (CLFL 2) are depicted in FIGS. 47 and 48 respectively. These registers generally provide a host for reading bytes of device configuration options from or during a BIOS pre-load. General description of the bitfield is provided in TABLES 40 and 41.

Accelerator 200 includes an interrupt controller which receives interrupt requests from multiple sources on chip and in response presents a single interrupt line (INTA) to the host system via the PCI bus. The interrupt control registers provide a host interrupt service routine port for a source identification and methods for clearing the sources and indicating end-of-interrupt (EOI).

FIG. 49 is a general depiction of accelerator 200. The interrupt sources includes virtual channels 0–15, the end of DMA for host initiated transfers, SP interrupt channel 0, SP interrupt channel 1 SP double frame overrun, and MIDI interrupt.

The available registers include the host interrupt status register (HISR) which reports pending interrupt sources, the host signal register 0 (HSR0) which reports virtual channel signals, and host interrupt control register (HICR), which is the command register for end of interrupt control and initialization.

The master interrupt enable bit, INTENA, controls the assertion of the interrupt line (INTA) at a global level. When INTENA is clear, no interrupt will be granted as a result of any of the interrupt sources going active. When INTENA is set, any interrupt source assertions will generate an external interrupt. INTENA is set (i.e. interrupts are enabled) and EOI command is received in the HICR register. INTENA is then cleared (i.e. the interrupts are disabled) in response to a number of conditions; a host read of the HISR register if any interrupt source bits are set; explicit clear by write of the HICR command register; or a device hardware reset. It should be recognized that if the HISR register is read and no interrupt source bits have been set, INTENA is not effected.

The preferred interrupt model is further supported by a "virtual channel" mechanism. Generally, virtual channels are a signalling mechanism used to extend the single interrupt channel for given processor concept into a multi-channel stream handling and messaging architecture. (The register fields for virtual channeling have already been discussed above.) Each stream which is read from or written to a modulo buffer in sample memory is assigned a virtual channel number. The virtual channel number is signaled by the DNA engine 28 anytime the modulo buffer pointer passes the midpoint or wraps around indicating that the buffer is filling or emptying and interrupting the host until data is available.

An interrupt to the host is also triggered when certain virtual channels 0–15 are signalled. This permits immediate signalling of buffer conditions. The other virtual channels set a virtual channel data that may be read by the host or stream process core 100 at a later time. This scheme is advantageously used for 3-D sound and DACSRC source buffers. Any critical buffers in this instance would use a virtual channel that immediately interrupts the destination processor. (e.g. the host CPU).

The virtual channels may also be used for message passing. In this case, each message cue would be assigned to its own virtual channel in software. Some messages are urgent, and are assigned to interrupting virtual channels 0–15; other messages require service eventually and would be assigned to non-interrupting virtual channels. TABLE 43 summarizes the actions taken by the signal receiver in response to given virtual channel signals.

To use the vertical channels to signal when sample stream buffers need servicing, a byte in the DMA requester block reflects whether the selected virtual channel is signaled at the end of each DMA transaction, or only at the end of a DMA transaction which cost a half-way point in a modular buffer. Periodic polling of the signal register bank is provided to determine which buffers need to be refilled and those buffers can be consequently refilled when necessary.

FIG. 50 is a diagrammatical depiction of the HISR register. Generally this host interrupt status register provides interrupt source information to the host interrupt service routine. Reading does not have side effects. A description of each of the byte fields is found in TABLE 44.

FIG. 51 depicts the HSR0 register. This host signal register reports the virtual channels which have been signaled since the last read of the register. The set of virtual signals does not interrupt the processor upon assertion, but depends on the periodic polling by the host. A description of the byte fields for register HSR00 are provided in TABLE 45.

Figure 52:
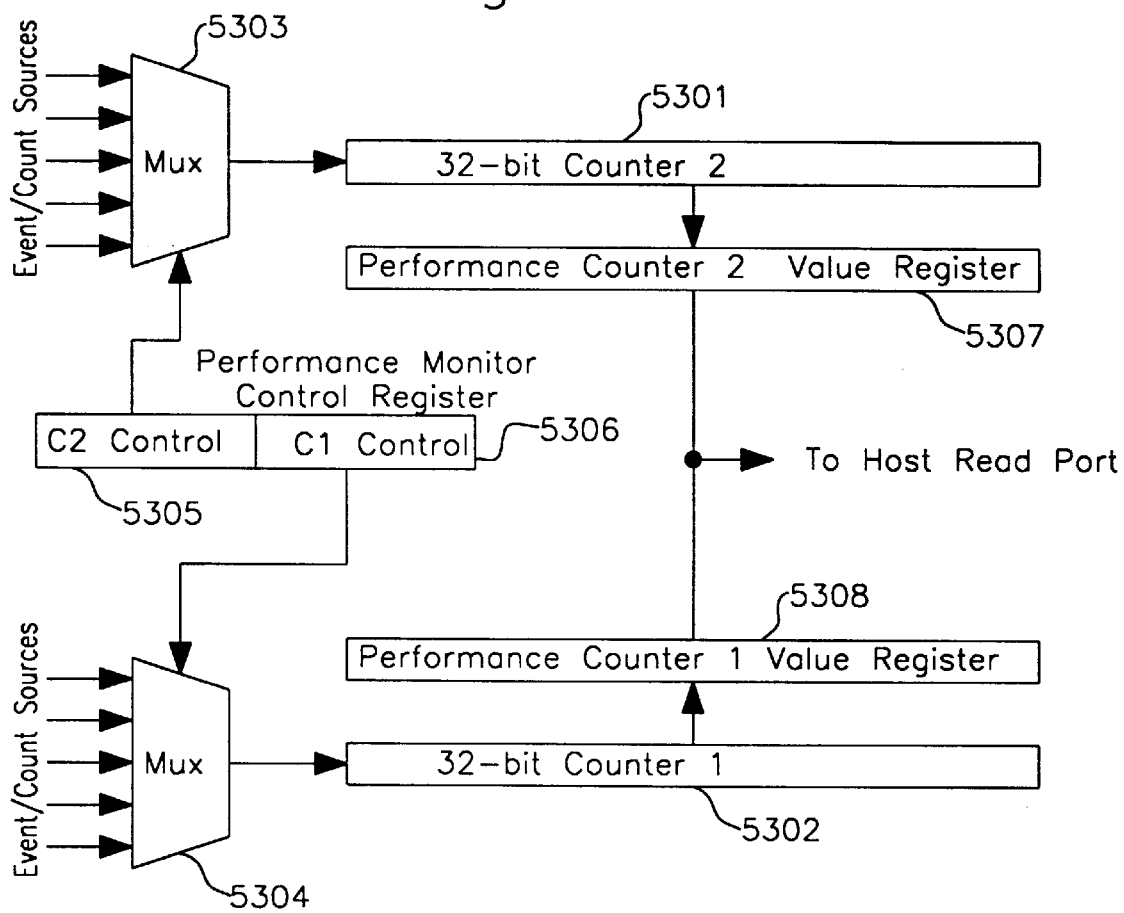
FIG. 52 is a diagram of the host interrupt control (HICR) register.

FIG. 52 is similarly a diagrammatical representation of the HICR register. This host interrupt control register provides a host write port for end of interrupt signalling period and discrete masking of interrupts. It also provides a read port for INTENA status of the byte fields of the HICR register are described in TABLE 45.

FIG. 53 is a functional block diagram of a preferred performance monitor model for accelerator 200 which allows for real-time monitoring key internal system and device performance indicators. The performance monitor of FIG. 53 forms a portion of PCI Interface 206. The basic performance monitor model is based on a pair of counters 5301 and 5302 with programmable count sources. The event count sources presented to counters 5301 and 5302 by respective multiplexers 5303 and 5304. These multiplexers are in turned controlled by corresponding set of control registers of 5305 and 5306. The output of counter is held in performance counter value register of 5307 and the output of counter 5302 held in a performance counter value register 5308, respectively. The output of these registers are presented to the host read port.

The performance monitor allows the user to identify such factors as bandwidth use and PCI transactions per second required, by accelerator 200. This monitor can be critical in situations where accelerator 200 is acting as the PCI bus monitor in order to access the host memory. The loading of resources and tasks can more fully be appreciated based on the performance monitor. For example, if accelerator 200 is being used in a lower performance system and the required bandwidth is formed by monitoring not to be available, tasks on accelerator 200 can be re-allocated as required to optimize performance.

The dual counter of the present system allows for different parameters to be compared. For example, one counter may monitor the number of PCI transactions being consumed and the other counter may monitor the number of clocks. From this, a value for the average number of clocks per transaction which is one gauge of system performance, is calculated.

It should be noted that the dual counter approach provides a further advantage. Counters 5301 and 5302 can be used to determine the stability of the phase locked loop discussed above. During the start-up of a phased locked loop there is always a period of instability. By repeatedly counting the number of clocks output from the phase locked loop over a given period of time relative to a known frequency (clock), a determination can be made as to stability. By incorporating this function with the performance monitor, separate counters associated with the clock generation circuitry previously discussed can be eliminated thereby saving silicon.

The performance control register 5305/5306 PFMC diagrammatically depicted in FIG. 54. TABLE 46 is a brief description of the PFMC bitfields. This register generally provides the host control port for the performance monitor counters 5301 and 5302.

FIG. 55A depicts the performance counter one value register (PFCV1) 5308. This register is generally a read back register for counter 5302 results. During active, performance monitoring (C1RS=1), this register is not updated real time and its contents are undefined while counting. This register contains a valid count only when the counting is stopped. TABLE 47 is a description of the bit fields for the performance counter 1 value register of 308.

FIG. 55B is a depiction of performance counter 2 value register (PFCV2) of 5307. Generally, this register is a read back register for counter 2 5301 results. During active performance monitoring (C2RS=1) this register is not updated in real time and its contents are undefined. This register contains a valid count only when counting is stopped, preferably. TABLE 48 is a description of the bit fields of performance counter 2 value register 5307.

Both counters 5301 and 5302 preferably go with the same set of input events for use as count sources. TABLE 49 defines the event select and codings.

Starting a performance monitor consists of selecting count sources for the intended performance metric and enabling counters 5301 and 5302. Initialization and start-up of counters 5301 and 5302 is accomplished as follows. A write is performed to performance monitor control registers 5305 and 5306 with the intended source selects and with bits assuring that both counters are stopped, cleared, and ready to count. In a write performed to the performance monitor control registers with the source selects and both counters are enable. TABLE 50 depicts a preferred set of source selects for performance monitoring.

Stopping and readback to determine system status is accomplished by the following procedure. A write is performed to the performance monitor control registers 5305/ 5306 with the same source selects used to initiate the monitoring along with bits to stop the counters. On the transition from a logical 1 to a logical 0 in the RS (run-stop) bits, counting stops and the counter contents are transferred to the value registers 5307–5308, and the counter then cleared to 0. The results are then read from the performance count value registers 5307 and 5308.

PCI interface controls the exchange of data between accelerator 200 and the PCI bus. TABLE 51 defines the transfers available through PCI interface 206. These data transfers include transfers initiated by the host for accessing the on-chip memories of accelerator 200 and DMA engine 208 initiated transfers for reading and writing to host-memory. TABLE 52 defines the primary PCI configuration space for accelerator 200.

Accelerator 200 has stream processor capabilities to facilitate start up and shut down of stream processor 100 and for debugging.

The signal processor control features include a soft reset, master run/stop, stop at next frame, run at next frame, "tick" (i.e., stop processor by a single clock), frame boundary emulation during tick stepping, DMA request engine pause/ continue, frame divider programmability which sets the number of clocks per frame, and trap registers providing instruction breakpoint capability.

Among the status facilities and status-accessible elements provided in accelerator 200, are registers r0–rF (FIG. 2) accumulators for the multiply-accumulate units, multiplier inputs from the Ybus, instruction trap registers, the top of the stack, sample AGU state, CPU status register, MAC mode register, stack pointer, DO loop counter, and DMA register structures. These facilities are operable in the debug mode with a stream processor 100 stopped.

Also included are stream processor status facilities and status-accessible comments which can be updated and read in real-time. These include a stream processor clock status register, program counter, DMA current stream number and frame timer current count. Additionally, DMA stream requestor array, instruction trap registers, and the stack pointer are state writable by the host.

FIG. 56 is a diagrammatical depiction of the stream processor control register (SPCR). Generally, the steam processor control register maintains bits for controlling stream processor 100 operation, including de-bugging support. A brief description of the functioning of each bitfield as shown in FIG. 57 is given in TABLE 53. Included are master run/stop bit, stop and start at frame bits, a single clock "Tick" bit, DMA request enable bit, and a reset bit.

FIG. 57 depicts the bitfields for the debug register index (DREG) register. This register contains the master debug access enable flag, seven bit register ID indexing field, and 3-bit register block used to specify which debug state register to access. Descriptions of the bitfields as shown in FIG. 57 is provided in TABLE 54. Functional group of register one (FGR1) is a register which is dependent upon the status of the debug bit in the DREG register shown in FIG. 57. If debug=0, then this register provides a real-time in processor program counter monitor. If debug=1, then this register provides processor state formation according to the RGBK and REGID fields in the DREG register. The bitfields for this register are provided diagrammatically in FIG. 58.

When the RGBK field in the debug index register is set to zero, the register file 101 contents are returned in functional group register 1 in response to the REGID field in accordance with TABLE 55.

When the RGBK field is set to a 001, the instruction RAM address generation unit can be accessed for state determination. In particular, the contents of the instructions trap registers and the top of stack register are accessible in accordance with the bits written into the REGID field, as shown in TABLE 56.

When the RGBK register is set to 010, the registers of the sample address generation unit can be accesses as described in TABLE 57.

TABLE 58 shows the CPU state access monitoring instruction which is invoked when the RGBK field is set to 011. Similarly, TABLE 59A describes the available DMA requestor state access invoked when the RGBK field is set to a 200. TABLE 59B describes the case where the RGBK bits have been set to 209, allowing access to the MAC unit state registers.

The DMA stream requestor array state write port (DSWP) is controlled by the register diagrammatically depicted in FIG. 59. This register preferably is a write only port for the DMA stream requestor array. The DRS[3:0] field defines the DMA requestor state. When this field is written, state of the DMA requestor for a given stream is set, with the stream number specified by row and column in the REGID field according to TABLE 60. In this case, the RGBK field is set to 200. For the DRS [3:0] field, bit 3 is defined as the request pending bit, bit 2 is a priority [1], bit 1 is priority [0] and bit 0 represents a background request.

FIG. 60 is a diagrammatical depiction of the stream processor clock status register (SPCS). This register is a read-only status register for the stream processor clock control state machine. Preferably, the SP clock status register is a "real-time" status register that can be read at any time, regardless of the in-process run state or the debug bit state. This register could, for example, be monitored after a write to SPCR to detect when the signal processor state actually changes, since many state machine transitions occur at frame boundaries. TABLE 61 describes the functioning of each of the bitfields in the SP clock status register of FIG. 60.

The stream processor DMA requestor status register (SDSR) is depicted in FIG. 61. The stream processor DMA requestor status register is preferably a read-only status register for the DMA stream requestor engine. Preferably, this register is also a "real-time" status register that can be read at any time, regardless of the stream processor run state and debug bit state. Bitfield description is provided in TABLE 62.

The trap write port register (TWPR) is diagrammatically depicted in FIG. 62. This register provides the write-port for instruction breakpoint trap registers. Individual registers are selected by the value of REGID in the DREG register. The RGBK register is set to a 100. Read access is provided through the functional group register 1 discussed above. Preferably, this register can be written to in "real-time" while stream processor 100 is running. Additionally, the state of signal TRAPEN does not affect the ability to write to this register. TABLE 63 defines the instruction trap register accessed with each relevant value of REGID. The TW[15:0] field receives the trap write of a 16-bit breakpoint address.

The stack pointer write register (SPWR) is diagrammatically depicted in FIG. 63. This register provides access to the stack pointer when DEBUG=1. Where the top of the stack is visible in the debug mode, the entire stack may be examined by sequencing the stack pointer through all 16 principle values. The field STKP[3:0] defines the stack pointer.

FIG. 64 depicts the preferred bitfields for the frame timer register (FRMT). The frame timer register provides a host port for setting a frame timer preload value and can be read to or written from at any time, regardless of the stream processor 100 run state. The bitfield FTV[15:0] defines the frame timer value (i.e., the number of SP clocks between frames).

The frame time current count (FRCC) register is depicted in FIG. 65A. The frame time current count register provides a host port reading the frame timer current value and can be read in "real-time". The field FCC[15:0] defines the frame timer value, the number of SP clocks between frames. FIG. 65B depicts the frame timer (FRSC) register which provides a host port for reading the frame timer's saved value, which is saved when SP 100 enters deep sleep. In the FRSC register shown in FIG. 65B, bits FCS[15:0] hold the frame timer save value.

A number of preferred procedures for controlling stream processor 100 are provided according to the principles of the present invention. Those skilled in the art will recognize that alternate procedures may be used in alternate embodiments.

In the preferred start-up procedure, program memory is loaded through either a host BA1 memory poke mechanism or a host initiated DMA. Then, parameter RAM 202 is loaded with an initialization image (program), is required by the previously loaded SP program image in program memory 203, through either a host memory poke mechanism or host initiated DNA. The RUN and SPRUN bits in the SPCR register are set. Processor 100 then starts running at the next frame boundary. Monitoring of RUNFR can then take place since hardware will reset this bit after is starts running.

A preferred procedure for stopping stream processor operation at the frame boundaries for debugged purposes is also provided. In this case, the STPFR bit in SPCR (FIG. 56) register is set. The STFR bit is monitored in the SPCR register (FIG. 60) for one to zero transitions. Stream processor 100 is now stopped and emulated frame mode is automatically switched on. The STPFR bit in the SPCR register is cleared by hardware when the SP stops at the next frame. Then the SDSR byte is monitored until the current stream equals zero (to make sure all pending DMAs are complete). Next, the DRQEN bit in the SPCR register is cleared to prohibit new DMA request generation. Finally, to verify that the stream processor 100 has stopped at the frame boundary and not in response to a deep sleep instruction, the program memory is examined to assure that deep sleep did not cause the STOP condition.

The SP has four interrupts. These are controlled by the SPIR. Interrupt 0 provides an emulate frame. While SP 100 is stopped, setting this bit to "1" will cause an emulated frame on the next tick.

Interrupt 1 is the double frame overrun interrupt. This bit will be set by hardware when two frame interrupts have been seen before completing the foreground task list. If IP1 is set, then this interrupt will actually interrupt the foreground task so that the task manager can reduce the SP loading dynamically.

Interrupt 2, 3 are general purpose interrupts used to communicate information between the host CPU and the SP. IF IP2/3 is set then the respective interrupt has the ability to interrupt the foreground tasks, otherwise it must wait for a transition to the background tasks.

Interrupt to the SP execute a CALL to an interrupt vector addressed by 0000 0000 001X XX00 B where XXX is the interrupt number.

Advantageously, stream processor 100 after it has been stopped, can be "single stepped" a clock at a time and status can be monitored between steps. In the preferred procedure, the TICK bit in the SPCR register is set to "1" each time a tick is to be performed. The hardware will reset the bit to "0". The emulated frames mode is automatically enabled when stream processor 100 is stopped. Then, the DEBUG bit is set to zero in the DREG register (FIG. 57) and thereafter the TICK bit in the SPCR is set. Stream processor 100 executes a single clock tick on the transitions from zero to 1 of the TICK bit. The DEBUG bit is set to one and the stream processor state is accessed from the registers as described above. During TICK-based stepping, the normal stepping procedure is modified to include setting an FRI bit in the SPIR.

The stream processor clock can also be stepped with the frame boundary procedure. In this case, the TICK bit in the SPCR register is cleared to prepare for transition and the FRI bit in SPRI is set for a frame boundary execution cycle. The DEBUG bit is set to 0 in DREG register and then the TICK bit is set in the SPCR register. Stream processor 100 executes a single clock tick on the 0 to 1 transition in the TICK bit along with a simulated frame boundary. The DEBUG bit is set to 1 and access to the stream processor state can be made, as required, according to the tables set forth above.

The stream processor 100 must be re-started at a frame boundary after it has been stopped and stepped. In the preferred procedure for re-starting at a frame boundary, the SP should be TICKED the number of clock cycles left in the FRSC register to bring it to a frame boundary.

The DEBUG bit is set to 0 is the DREG register. Thereafter the RUNFR bit in the SPCR is set. A check is made also to assure that the STPFR bit is cleared. Processor 100 will begin running at the next frame boundary. The RUNFR bit in the SPCR register monitored for a 1 to 0 transition to indicate the SP has taken the command.

Stream processor 100 may also be stopped at a frame boundary, examine state/register contents, and restart at frame without the use of any TICK commands. Such a stop/examine/restart procedure is as follows. The standard frame boundary stop procedure described above is performed to stop stream processor 100. The DEBUG bit set to 1 and the stream processor state is accessed as required in accordance with the TABLES described above. The DEBUG bit in the DREG register is set to zero. Thereafter, the RUNFR bit and DRQEN bits in the SPCR are set. The STPFR bit is cleared automatically by hardware. Thereafter, stream processor 100 will begin running at the next frame boundary. The RUNFR bit in the SPCR register monitored for a 1 to 0 transition to indicate the SP has taken the command. Exactly one frame can be executed by setting both RUNFR and STPFR in SPCR in the same command.

After the stream processor 100 has been stopped, the stream processor debug registers can be read using the following preferred procedure. It should be noted that the program counter, top of stack register, and the SPDMA requestor status register do not require that the stream processor be stopped or that the DEBUG bit be set, as they can be accessed at any time. At first, the DEBUG bit is set to 1 and a specific word is written into the REGID field and DREG. The functional group register is read to retrieve the desired state information. These two steps are repeated until all the desired state data is acquired. A zero is written to the DREG register to disable the DEBUG mode. Stream processor 100 can be reset at any time by software using the soft reset bit in the SPCR register. Preferably, the RSTSP bit in the SPCR register is set and the RUN, RUNFR, and DRQEN bits are cleared. Stream processor 100 will immediately be reset. Then the RSTSP bit in the SPCR register is cleared and stream processor 100 will be reset but stopped with the run bit cleared to zero.

Stream processor 100 can be placed in a deep sleep, which is essentially a software-initiated clock stop providing for the break points. To exit deep sleep, preferably the procedure used to restart at the next frame, discussed above, is employed.

As discussed above, accelerator 200 contains an instruction level trap mechanism implementing code breakpoints by a debugger. Eight trap address registers are provided which monitor the current in processor program counter in real time and upon detecting a match, BRANCH is substituted for the current instruction. The BRANCH address is a fixed trapped vector of 000h "0000 0000 000TT00" Binary with the trap register number in the bits TTT (i.e. trap zero goes to address 000h, trap 1 goes to address 0004h, and so on). Several trapping rules apply. Among other things, the trap registers can be written to in real time through the debug DREG register access method but the DEBUG bit cannot be set. The trap registers can also be written to when the TRAPEN bit is set to 1 also. The trap register contents consist of a 16-bit trap address with the lower 16 bits of the register, with trapping enabled via a global control bit, TRAPEN in the DREG register. The TRAPEN bit enables program counter comparisons against all 8 trap registers. There are no individual enable/disable per trap register, so unused trap address registers should be set to an address outside of the physical code space of signal processor 100. The trap registers can be manipulated by the host or stream processor 100 itself, although preferably there is no arbitration between the two. The trap registers are not readable in real time, but are readable through an independent DEBUG access register when the stream processor 100 is stopped and DEBUG equals one. All branching rules apply to trap addresses set.

A preferred procedure for setting instruction breakpoints via the trap registers through the host is as follows: DEBUG register is set up to access to the trap register desired through a write in which TRAPEN is set to zero, RGBK is set to 100, DEBUG is set to zero, and REGID is set to select the trap register number. A 16-bit trap address is written to the trap write port register (TWPR). These two steps are repeated until all the trap registers are set. Trapping is then enabled by writing to the DREG register wherein TRAPEN is set to 1 and DEBUG is set to zero. A host debugger can continue to modify the trap registers through the DREG and TWPR registers while TRAPEN is set to one. In addition to being used for breakpoints the trap register can be used to apply patch code to an embedded instruction ROM.

FIG. 66 is a diagram representing the host interface programming model. The accelerator 200 host interface is partitioned into 2 separate interface blocks which are memory mapped into the host memory address space. These interface blocks can be located anywhere in a 32-bit physical address space as defined by the address programmed into the base address registers, BA1 and BA2. These base addresses are set up by a "Plug and Play BIOS" initiated by the host. The first interface block BA0, located at base address zero, contains general purpose configuration, control and status registers for the device. Preferred register map for these registers is found in TABLE 64. The second interface block BA1 located at base address 1, maps all of the accelerator 200 RAMs into host memory space, along with the DEBUG registers. This advantageously allows the host to directly peak and poke the RAM locations on accelerator 200. A memory map for this second interface block is found in TABLE 65.

Accelerator 200 includes registers within I/O port 108 which allows for the host to write to the FIFO RAM 2600 and 2605 (FIG. 26A). Seven registers provide for configuring and statusing the serial audio input and output ports for backdoor operation.

FIG. 67A depicts the serial port backdoor sample pointer (SERBSP). TABLE 67A describes the bitfields for SERBSP register. Generally, this register provides a host and stream processor 100 accessible port for initialization and real time monitoring of the internal sample pointer for the input and output sample pointers.

FIG. 67B is a diagram of the serial port backdoor status (SERBST) register. TABLE 67B describes the bitfields for the SERBST register. Generally, the serial port backdoor status register provides a host port for checking the readiness of the host port for data register to or from the sample FIFOs following a transfer command.

FIG. 67C is a diagram of the serial port backdoor command register (SERBCM). The SERBCM register bitfields are described in TABLE 67C. The SERBCM register generally provides a host port for initiating a data transfer to or from the sample FIFOs.

FIG. 67D is a diagram of the serial port backdoor address (SERBAD) register. THe bitfields for the serial port backdoor address register are described in TABLE 67D. This register provides a host port for specifying the FIFO address for a host backdoor data transfer.

FIG. 67E is a diagram of the serial port backdoor configuration register (SERBCF). Table 67E is a corresponding description of the SERBCF bitfields. Generally, this register provides a host port for configuring the serial ports for backdoor operations.

Figure 67F:
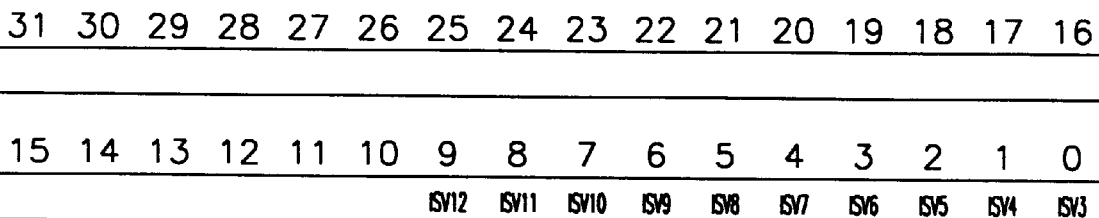
FIG. 67F is a diagram of the serial port backdoor write port (SERBWP) register.

FIG. 67F is a diagram of the serial port backdoor write port (SERBWP) register. TABLE 67F describes the bitfields of the SERBWP register, which provides a host port for specifying the FIFO data for a host backdoor data transfer.

Figure 67G:
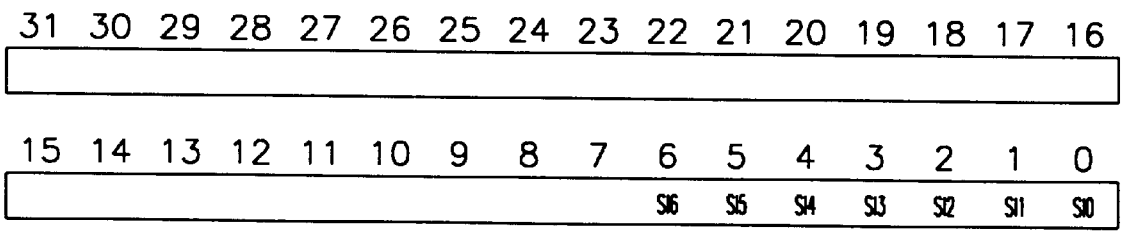
FIG. 67G is a diagram of the serial port backdoor read port (SERBRP) register.
Figure 67H:
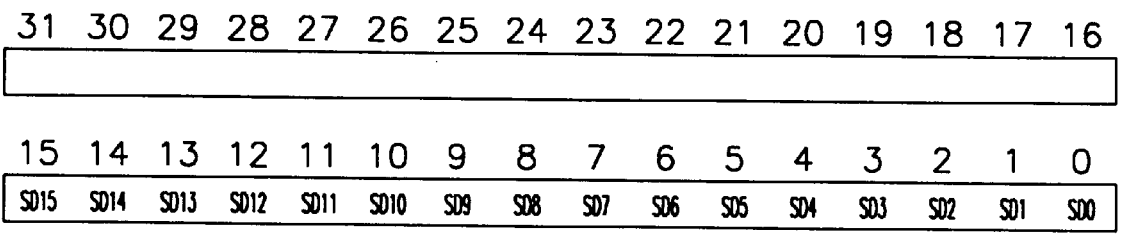
FIG. 67A depicts the serial port backdoor sample pointer (SERBSP)
FIG. 67B is a diagram of the serial port backdoor status (SERBST) register.
FIG. 67C is a diagram of the serial port backdoor command register (SERBCM)
FIG. 67D is a diagram of the serial port backdoor address (SERBAD) register.
FIG. 67E is a diagram of the serial port backdoor configuration register (SERBCF)

FIG. 67G is a diagram of the serial port backdoor read port (SERBRP) register. The bitfields for this register are described in TABLE 67G. Generally, the serial port backdoor read port provides a host port for accessing the FIFO RAM data for a host backdoor data transfer.

To initialize the serial ports for host backdoor load operation, the serial ports are first configured by writing to the SERC1–SERC5, and SERMC1 and SERMC2 registers, as described above. The FIFO sample pointer is then initialized in the SERBSP register. The host backdoor bypass bit (HBP) in the SERBCF register is then set. The MSPE bit in the SERMC1 register is then set and the serial ports will now start running, with FIFO transfers occurring. The serial ports are now configured for host read and write operations to the FIFOs.

To write to a 20-bit sample to FIFO RAM, the write busy bit (WBSY) in the SERBST register is set to zero such that the host write port is ready to accept another entry. A FIFO RAM address between 0–255 is written into the SERBAD register followed by a write of the 20-bit sample data into the SERBWP register. A 0000000 2h is written into the command register SERBCM and the write of the sample data into FIFO RAM is synchronized and executed with the internal clocks.

To read a 20-bit sample to a location in FIFO RAM, a FIFO RAM address between 0–255 is written into the SERBAD register. The write command register SERBCM command register is loaded with a 0000000 1h (the read command bit, RDC, is active.) The read operation is then synchronized to the internal clock and execution begins. The post waits for the read data ready bit (RRDY) in the SERBST register to transition to a Logic 1, which indicates that the host read port contains the requested data. The 20-bit sample data is then read out of the SERBRP register by the host.

As discussed above, stream processor 100 and accelerator 200 are compatible with an INTEL AC97™ audio Codec. To implement this feature, accelerator 200 includes a set of registers for controlling the interface between accelerator 200 and the AC97 audio c. odec.

Figure 68A:
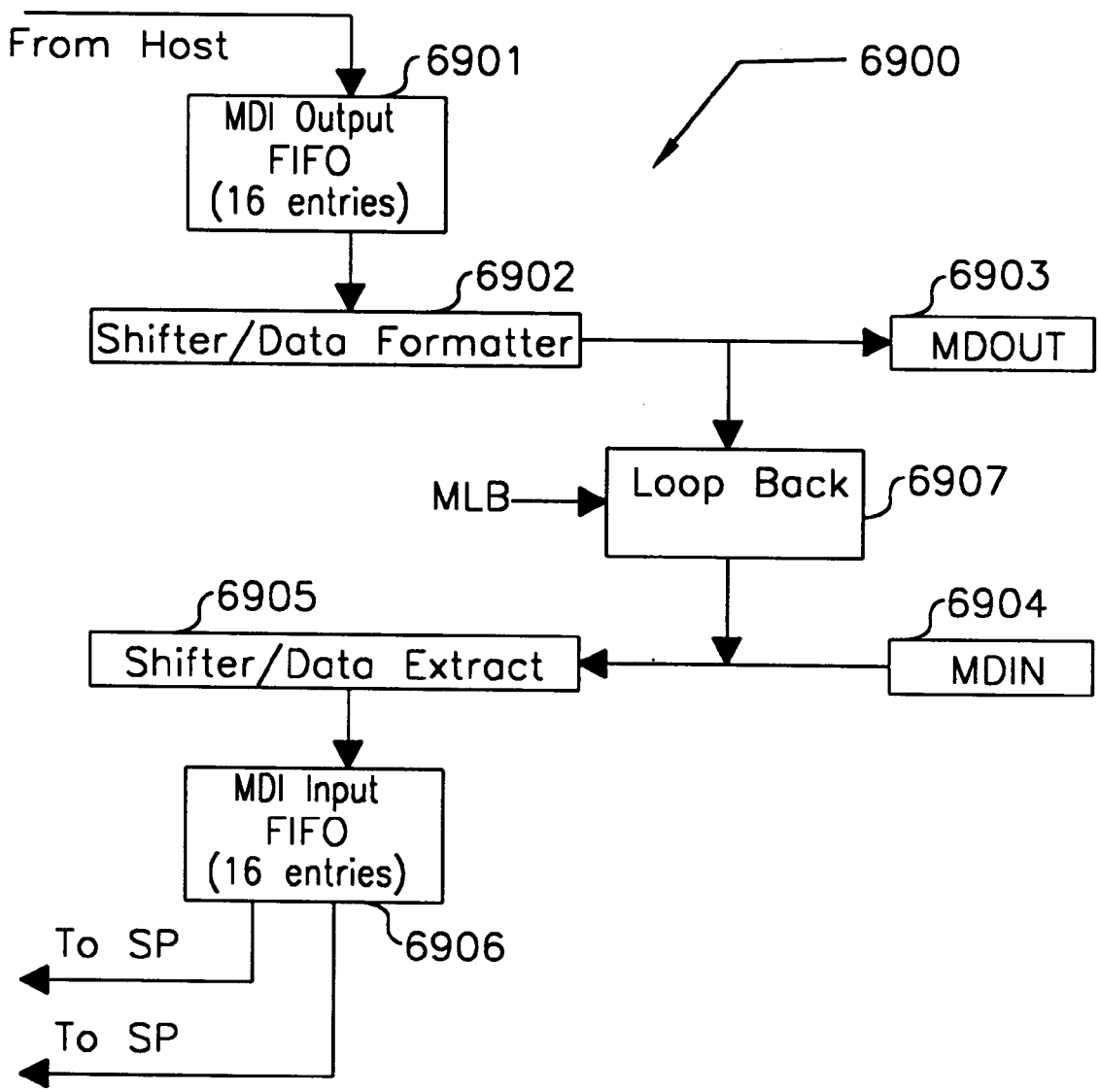
FIG. 68A is a diagram of the AC 97 control register (ACCTL)

FIG. 68A is a diagram of the AC97 control register (ACCTL). TABLE 68A describes the bitfields of the ACCTL register. Generally, this register provides the host control port for the link between the AC97 device and accelerator 200.

Figure 68B:
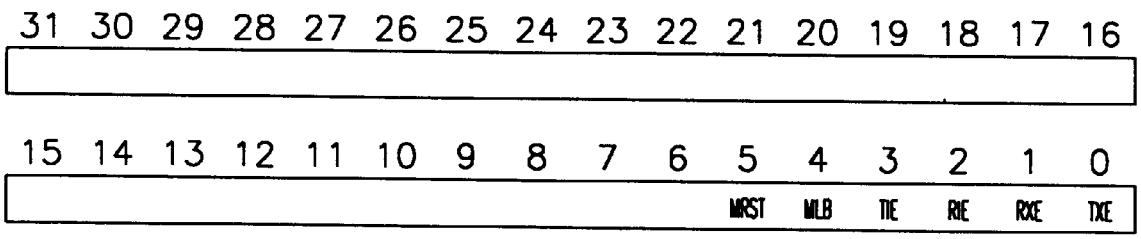
FIG. 68B is a diagram of the AC 97 status register (ACSTS)

FIG. 68B is a diagram of the AC97 status register (ACSTS). The bitfields for the ACSTS register are provided in TABLE 68B. Generally, this register provides a status port for the host and monitor the AC97/accelerator 200 link.

Figure 68C:
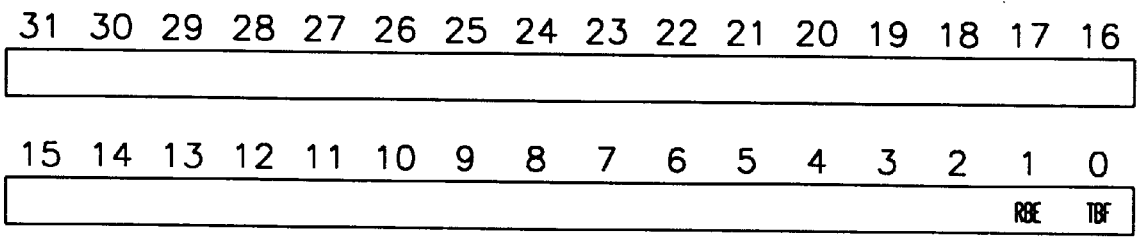
FIG. 68C is a diagram of the AC 97 output slot valid register (ACOSV)

FIG. 68C is a diagram of the AC97 output slot valid register (ACOSV). TABLE 68C describes the bitfields of the ACOSV register. This register provides the host the ability to set the static slot valid signals for the AC97 tag phase (slot0).

Figure 68D:
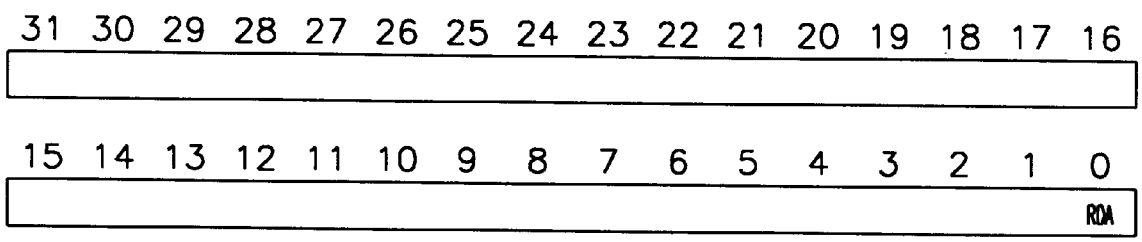
FIG. 68D is a diagram of the AC 97 command address register (ACCAD)

FIG. 68D is a diagram of the AC97 command address register (ACCDA). The corresponding bitfields are described in TABLE 68D. This register generally allows the port to set the command address field for an AC97 frame.

Figure 68E:
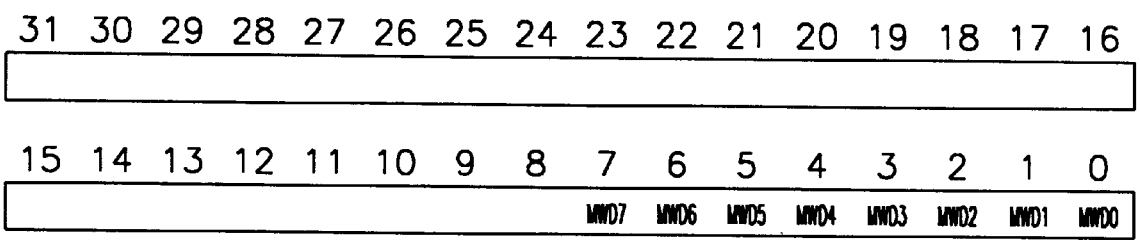
FIG. 68E is a diagram of the AC 97 command data register (ACCDA)

FIG. 68E is a diagram of the AC97 command data register (ACCDA). The ACCDA bitfields are described in TABLE 68E. This register allows the host port to set the command data field for an AC97 frame.

FIG. 68F is a diagram of the AC97 input slot valid register (ACISV). TABLE 68F describes the ACISV bitfields. This register allows the host to sense the input slot valid signals for the AC97 tag phase (slot0).

FIG. 68G is a diagram of the AC97 status address register (ACSAD). TABLE 68G describes the ACSAD bitfields. The AC97 status address register allows the host to capture the status address field for an AC97 input frame.

FIG. 68H is a diagram of the AC97 status data register (ACSDA). The bitfields for this register are described in TABLE 68H. The AC97 status data register allows the host to capture the status data field for an AC97 input frame.

Table 68i generally describes the features available through the AC97 interface, as configured by the registers described above.

FIG. 69A is a diagram of the MIDI input/output port 6900. Data from the host is output to a MIDI device through a MIDI output FIFO (16 entries)6901, a shifter/data formatter 6902 and MIDIout port 6903. Data input from a MIDI source is passed through pin 6904, shifter/data extractor 6905 and a 16-entry input FIFO 6906. Loop back 6907 is provided to loop back data from the host through shifter 6905 and FIFO 6906.

MIDI input/output port 6900 has two major roles, depending on the system configuration. In the AC97 configuration, the MIDI port provides a basic bi-directional external MIDI interface for connection to "outside of the box" musical instruments. If an audio motherboard is used, the MIDI input port is used to connect the motherboard output port for the purpose of providing ampu-401 data to the MIDI controller/synthesizer.

FIG. 69B is a diagram of the MIDI control register (MIDCR). The bitfields for this register are described in TABLE 69A. The MIDI control register allows the host to control the MIDI input and output ports.

FIG. 69C is a diagram of the host MIDI status register (MIDSR). TABLE 69B describes the bitfields for the host MIDSR. This register allows the host to check the status of the MIDI input and output ports.

FIG. 69D is a diagram of the SPMIDI status register. Bitfields for this register are described in TABLE 69C. The SPMIDI status register provides the stream processor 100 access to the status for MIDI input port.

FIG. 69E is a diagram of the MIDI write port (MIDWP) register. TABLE 69D describes the MIDWP register bitfields. This register provides the host port for writing to the MIDI transmit FIFO.

FIG. 69F is a diagram of the MIDI read port (MIDRP) register. TABLE 69E describes the bitfields for this register. The MIDI read port register provides the host port for reading the MIDI receive FIFO. A stream processor 100 accessible version of this register is also provided.

The joystick port of I/O ports 108 provide four "coordinate" channels and four "button" channels for input capability. The coordinate channels provide a means for providing positional joystick information to the host system. The button channels provide user event information to the host. This port can operate in a traditional polled mode, or in a "hardware accelerated" mode where counters are provided for coordinate determination.

FIG. 70A is a diagram of the joystick poll/trigger register (JSPT). This register provides the host port for polling the button inputs and coordinate comparator outputs. A write to this port also triggers the coordinate charge/discharge cycle for polled measurements of coordinate values. The bitfields of the joystick poll/trigger register are provided in TABLE 70A.

FIG. 70B is a diagram of the joystick control register (JSCTL). This register provides the host port for controlling joystick port operations. The bitfields for the joystick control register are provided in TABLE 70B.

FIG. 70C is a diagram of the joystick coordinate register 1 (JSC1). This register provides the host port for reading digital assist coordinate counter values for the first joystick coordinate pair. The bitfields for this register are provided in TABLE 70C.

FIG. 70D is a diagram of the joystick coordinate register 2 (JSC2). TABLE 70D describes the bitfields for this register. The joystick coordinate register 2 provides the host port for reading digital assist coordinate counter values for the second joystick coordinate pair.

FIG. 70E is a diagram of the joystick GPIO register (JSIO). This register provides the host port for using the joystick coordinate pins for general purpose input of open-drain outputs in non-AC97 this register.

FIGS. 71A–71D illustrate a preferred system for transferring data between systems, subsystems, or components operating at different clock rates. For example, the circuitry of FIGS. 71A–71D could be employed to control the exchange of data between the accelerator 200, operating on a time base established by own master clock rate and the PCI bus, operating at the PCI bus clock rate. While the circuitry of FIG. 71 can be applied to many applications, for illustrative purposes, the structure and operation of this circuitry will be discussed in the context of exchange between accelerator 200 and the PCI bus, although the principles of the present invention are not limited thereto.

FIG. 71A is an electrical schematic diagram of synchronizer circuitry 7101 embodying the principles of the present invention. Memory read/write requests are received from the PCI bus through an OR gate 7102. The output of OR gate 7102 is gated with the signal READY by an AND gate 7103. As will be discussed further below, synchronizer circuitry 7101 is essentially a loop. The READY signal is basically a return signal or acknowledge which indicates that accelerator 200 memory is ready to accept a new memory request from the PCI bus.

The output of AND gate 7103 drives the control input of a multiplexer 7104 which in turn controls the toggling of a flip-flop 7105. It should be noted that multiplexer 7107 and flip-flop 7105 could be replaced with a single T-flip-flop. In this case, the control line to the mux 7105 toggles the T-flip-flop. When an active memory request is gated through OR gate 7102, and the READY signal is active (logic high), the output of AND gate 7103 is consequently logic high and the Logic 1 input mux 7104 selected. On the next PCI clock, the Logic 1 held at the D input flip-flops 7105 is clocked through to the Q output. On the other hand, if there are no pending memory requests or the signal READY is not active, the output of AND gate 7103 selects the Logic 0 input of multiplexor 7104. In this case, the Logic 0 is maintained at the Q output of flip-flop 7105.

The Q output of 7105 passes to the input of synchronizer 7106 which is clocked by the stream processor (SP) (accelerator 200) master clock. Synchronizer 606 comprises a falling edge triggered flip-flop followed by a rising edge triggered flip-flop. In this case, the output from flip-flop 7105 is clocked through the data inputs of the flip-flops and the clock inputs of the synchronizer flip-flops are controlled by the signal processor clock.

The output of synchronizer 7106 passes to one input of an exclusive OR gate 7107. The other input of exclusive OR gate 7107 is received from the return portion of the loop, also discussed below. Generally, an active signal (logic high) signal out of synchronizer 7106 is only passed by exclusive OR gate 7107 when the memory acknowledge signal (Mem Ack) indicates that the previous access to the target memory has been completed. This function is performed by Logic 7108, one input of which is the output of exclusive OR gate 7107.

The other input to Logic 7108 is a memory DONE signal received from AND gate 7109 and flip-flop 7110. Only when the previous access to accelerator 200 memory is complete is the next request passed through Logic 7108. When a new memory request is available and the last access is complete, Logic 7108 outputs to a series of OR gates 7111. A pair of OR gates 7111 are provided for each accelerator 200 memory, one for gate initiating a read and one gate for initiating a write. In FIG. 71A only two gates controlling reads and writes to memory N are shown for brevity and clarity. The control signal from Logic 7108 gates the output of memory decoder select circuitry 7112. In this example, memory decode select circuitry 7112 decodes the source ID and destination ID fields in the HSAR and HDAR registers. Thus, when Logic 7108 signals that memory request can be serviced, a control signal identifying the accelerator 200 memory to be accessed (as well as whether the access is a read or a write), is gated from decoder 7112 through the corresponding OR gate 7111. The outputs of each OR gate 7111 is output through a corresponding falling edge triggered latch 7113.

The output of Logic 7108 is also input to the set (S) input of flip-flop of 7110. The request acceptance (REQ ACC) signal from Logic 7108 sets flip-flop 7110 and active DONE signal (logic low) resets a flip-flop 7110. In essence, Latch 7110 latches the DONE signal and gate 7109 passes that signal back to Logic 7108 indicating that the previous request is complete and the new request can go forward.

Logic 7108 also provides the request acceptance signal to a multiplexer 7114 in the return loop which controls the toggling of a flip-flop 7115. Flip-flop 7115 is clocked by the stream processor clock.

In addition to being fed back to the Logic 0 input of multiplexer 7114, the Q output of flip-flop 7115 is sent to the second input of OR gate 7107 and a synchronizer 7116. This synchronizer synchronizes the output of flip-flop 7115 (memory acknowledge) with the PCI clock. Synchronizer 7116 also comprises a falling edge triggered flip-flop followed by a rising edge triggered flip-flop clocked by the PCI clock. The output of the synchronizer 7116 is then fed to a first input of an exclusive NOR gate 7117, the second input of which is the output of flip-flop 7105. The output of exclusive NOR gate 7117 is the signal READY which is passed to AND gate 7103 discussed above.

Thus, exclusive OR gate 7107 passes memory requests on to Logic 7108. Signal READY is also output to the PCI bus during reads from accelerator 200 to indicate that accelerator 200 is ready to accept a new DMA request. The READY signal is also gated by gate 7118 and arbitration logic 7119. Arbitration logic 7119 allows the host to arbitrate between the memory request, with peeks and pokes (single-dword accepted) having priority over direct memory burst accesses. Each time a new memory r/w request is accepted (7103 output is high) flip-flops 7105 and 7115 toggle their state, one after the other.

FIG. 71B is a timing diagram illustrating the operation of synchronization circuitry shown in FIG. 71A. Under the principles of the present invention, a read/write signal is sent to the identified accelerator 200 memory when the outputs of flip-flops 7105 and 7115 are both either in a logic low output state or in a logic high output state. The addresses and data shown in FIG. 71B are then passed on to the address and data buses discussed further with regards to FIG. 71C. For a write to accelerator 200 of memory, for example, three steps are essentially overlapped. First is the read of the source memory (host) memory with the PCI clock, synchronization of the data to the signal processing clock, and then a write into the destination memory in accelerator 200 with the signal processor clock.

FIG. 71C shows the data and address pipelines provide for the exchange of data between accelerator 200 and PCI bus and the exchange of addresses from the PCI bus to accelerator 200.

Data is exchanged with the PCI bus through a FIFO RAM 7121. The pipeline consists of three stages of registers. The first register stage (I) comprises a single register 7122 clocked by the PCI clock. Where pairs of 32-bit doublewords can be pipelined, first stage register 7122 acts as a temporary buffer (during transfers into accelerator 200) for the first address in the pair until the second address in the pair is ready for latching into the second stage. The second stage registers (II) 7122a and 7122b comprise two parallel 32-bit registers clocked by the PCI bus clock base. In particular, data being transferred (in either direction), is latched into second stage registers 7122 each time flip-flop 7105 toggles.

The third stage (III) of the pipeline also comprises two parallel 32-bit registers, but are instead clocked by the stream processor (SP) clock base. In particular, third stage registers 7123a and 7123b toggle each time flip-flop 7115 toggles. Registers 7123a and 7123b also interface with the accelerator 200 internal 32-bit data bus 7120, which is preferably a part of the DMA bus 210 (FIG. 1).

The address pipeline which operates in parallel with the data pipeline, is similar. First stage register (I) 7125 provides for temporary storage of the 16-bit address for the first doubleword of each doubleword pair along with corresponding source ID or destined ID bits from the HSAR and HDAR registers. Data are latched into first stage address register 7115 in response to the PCI clock.

The second address/memory ID stage (II) consists of two parallel registers 7126a and 7126b. These registers are clocked on the PCI clock base and receive the first address/ ID word held in register 7125 and the second address/ID word received directly from the input. In particular, address/ ID information is latched into registers 7126a and 7126b each time flip-flop 7105 toggles. The memory ID bits from the first address/ID word in register 7126a passed on to read/write decoder 7128.

The third stage (III) comprises registers 7127a and 7127b, each clocked signal processor clock base. In particular, addresses are latched into register 7127a and registers and memory ID bits are latched into register 7127b each time flip flop 7115 toggles.

The memory ID bits from register 7127b are presented to read/write decode 7128 and the address bits pipelined through register 7127a on the next toggle of flip-flip 7105. In a register 7127a turn pipeline address bits to the address bus 7129 which is preferably part of DMA bus 210.

FIG. 71D is a timing diagram illustrating the pipelining through the address and data pipelines of FIG. 71C. In this case, data is being read off the PCI bus and written into a selected memory in accelerator 200 for illustrative purposes.

In FIG. 71C, the data path pipeline shows 32-bit data latches, 16-bit address latches, and implies 4-bit memory-identifier latches.

An additional set of bits are also associated with each address latch:

write valid—indicates latch contains address/data for write;

read valid—addr latch contains address for read;

read data valid—data latch contains returning read data;

last—indicates that this request is the last of a series;

rlast—propagates back to PCI clock from sp clock to indicate "last" access has completed.

Read requests and write requests can be paired together, but write requests must be held off for two pipeline advances after a read request, since the returning read data will use up the only data latches (data latches are used to pass data in both directions.)

As shown in FIG. 71C, data and address is read into stage I with each rising edge of the PCI clock. Each time flip flop 7105 with the PCI clock and memory READY, the corresponding memory core is passed to synchronized by, synchronizer 7106 to the stream processor clock. In other words, the first stage advances when the second word of a word pair is being written and the output of exclusive or gates 7107 is high on the rising edge of the PCI clock.

Each time flip flop 7115 toggles the memory acknowledge from the previous request is passed to synchronizer 7116 for synchronization to the PCI clock. The memory access to doublewords 1 and 2 is also initiated with this transition of flip-flop 7115. The actual write occurs several SP clocks later as the address and data are pipelined to the selected memory.

In sum, as shown in FIG. 71D, the reads occur with every PCI clock. The synchronization of the corresponding request occurs each time flip flop 7105 transitions. The corresponding memory accesses and the memory acknowledge synchronization then occur on the transit toggling of flip flop 2.

Those skilled in the art will recognize that the synchronization circuitry of FIG. 71 can be replaced with the first-in-first-out register system shown in FIGS. 72A–72F. In this embodiment, a First-in first-out memory system 7200 includes N number of entries 7201. There are N number of entries 7201, each of which is comprised of an M-bit wide linear array of latches. The entry to be loaded is selected by a source pointer 7202, which is preferably based upon a ring of N number of rising edge flip-flops clocked by the source clock, with one such flip-flop provided for each entry 7201 in FIFO 7200. In the case of data being transferred from the PCI bus to accelerator 200, the source pointer flip-flops would be clocked by the PCI clock.

Readouts from FIFO 7200 are controlled by a destination pointer 7203, which is preferably also based a ring of rising edge flip-flops with one flip-flop corresponding to each entry 7201. In the case of the destination to each entry 7201. In the case of the destination pointer, the flip-flops are clocked by the destination clock. In the example of a PCI to accelerator 200 memory transfer, the destination clock would be from the stream processor clock base.

Both the source 7200 and destination 7203 pointers are initialized to zero, with a short string of Logic 1s loaded as the access (read/write) marker. FIG. 72B illustrates an initialized portion of a selected one of the pointer rings 7202 or 7203. When the leading edge Logic 1 reaches a flip-flop in the given ring 7202 or 7203, the FIFO entry 7201 corresponding to that flip-flop is accessed.

A string of Logic 1s are loaded in to the flip-flops of a given ring, such that when a comparison is made between the destination pointer and the source pointer, an indication of whether the FIFO is approaching an empty or a full state can be determined. FIG. 72C shows the overlap of the source and destination pointers when an approaching empty signal is generated. FIG. 72D shows the overlap when an approaching full signal is generated. In each case, a string of Logic 1s is loaded, with the leading edge of Logic 1 being the read/write marker, since FIFO 7200 cannot be halted instantly. The string of 1s indicate that the full or empty state will be reached within a corresponding number of clock periods. Three Logic 1s are loaded into the pointers to at each marker since the full and empty signals are passed through a two flip-flop synchronizer after generation.

FIG. 72E depicts one possible embodiment of the destination pointer ring and the gating which generates the near-empty signal. The ring preferably is constructed of N number of rising edge triggered flip-flops 7204. It should be noted, that the flip-flops in FIG. 72E wrap around such that the output for the flip-flop corresponding to entry 1 couples to the input of the flip-flop for entry N. A NAND gate 7205 is associated with each flip-flop 7204 for detecting the leading edge Logic 1. To do so, the Q output of the corresponding flip-flop 7204 is input into each NAND gate 7205 along with the Q/ output of the previous flip-flop in the ring. The NAND gate 7205 associated with the first entry receives the Q/ output on the flip-flop associated with the N entry. The destination pointer bits of pointer 1 through pointer N are inverted and passed on to circuitry shown in FIG. 72F to generate the near-full signal discussed below.

The output of each NAND gate 7205 is provided to the corresponding input of an OR gate 7206 along with the inverted source pointers from the circuitry shown in FIG. 72F. The output of OR gate 7206 is inverted by a gate 7207 to become the near-empty indicator.

FIG. 72F depicts one possible organization for the source pointer ring. Similar to the destination pointer ring, the source pointer ring includes a ring of flip-flops 7208 each associated with a corresponding NAND gate 7209. Flip-flops 7208 are clocked by the source clock and the outputs of flip-flops 7208 wrap around to the corresponding flip-flop 7209 or NAND gate 7209.

The output of each NAND gate 7209 is provided to the input of an OR gate 7210. Also provided to the inputs of OR gate 7210 are the destination pointers from the circuitry shown on FIG. 72E, after being inverted. The output of OR gate 7210 is inverted by a gate 7211 to provide the near-full indicator.

Although the invention has been described with reference to a specific embodiments, these descriptions are not meant to be construed in a limiting sense. Various modifications of the disclosed embodiments, as well as alternative embodiments of the invention will become apparent to persons skilled in the art upon reference to the description to the invention. For instance, those skilled in the art will recognize that accelerator 100 may interface with a motherboard through one of several conventional bus connections or protocols such as PCI, ISA, VESA, et cetera. Alternatively, accelerator 100 and/or stream processor 101 may be integrated directly onto a microprocessor or other processor chip. It is therefore, contemplated that the claims will cover any such modifications or embodiments that fall within the true scope of the invention.

TABLE 1

| Register | Description |
| --- | --- |
| acc0, acc1, acc2, acc3, aux0, aux1, aux1, aux3 | 40-bit MAC-unit accumulators, Acc0–3 refer to the 4 accumulators in MAC-unit 0 and aux0–3 refer to the 4 accumulators in MAC-unit 1. Add instructions never explicitly reference aux0–3, but instead rely on the MAC-unit mode to specify the active MAC units (in single mode, only MAC-unit 0 is active in dual mode, both MAC units 0 and 1 are active; and in auxOnly mode, only MAC-unit 1 is active). |
| acc0-3X/H/L, aux0-3Y/H/L | acc/aux0–3X, H, and L allow for reading of bits [39:32] (as bits [7:0] of acc0–3X), [31:16], and [15:0], respectively, of acc/aux0–3 over Ebus. NOTE: these reads are only available at reduced clock rate; |

TABLE 1-continued

| Register | Description |
|---|---|
| | do not use except in special test cases. |
| acc:aux0–3 | Special construction that is useful to load the same data into the same accumulator number in both MAC units (note that MAC-unit results are always extracted one at a time from each MAC unit as each result usually requires saturation upon readout) |
| acc0$, acc1$, acc2$, acc3$ | MAC-unit 0 accumulators available on input to srcx of the multiplier. The specified accumulator is saturated, if any of the guard bits ([39:35]) are in use, before bits [34:15] of the specified accumulator are input to the multiplier (result is identical to that obtained by storing the accumulator into a register-pair and then muitiplying by hi20(reg-pair)). |
| c0, cr16, cr17, cr18, . . . , cr22 | Read-only rounding constants. c0, cr16, cr17, cr18, . . . , cr22 hold the following constant values: 0, $2^{-16}$, $2^{-17}$, $2^{-18}$, . . . , $2^{-22}$ (for reference, a 32-bit register pair is loaded into acc/aux0–3 at bits [34:3] corresponding to significance $2^0$, . . . $2^{-31}$) |
| c-1.0 | Read-only multiplier srex constant –1.0 (0x80000). When combined with the – sign specifier on a multiply, this copies the specified srcy operand into the product register (PR). This is useful to load or add unique 16-bit data into both the main and auxiliary accumulators as the accumulator load path is limited to data broadcasting. |
| fcnt | 16-bit free-running counter (used for task timing) |
| ind | The indirect program address register. To perform an indirect branch or subroutine call, this register is loaded from the register-file (over Ebus) and then a branch or call to *ind is issued. |
| r0, r1, r2, r3 | Register-file registers that may serve as parameter memory address registers, accumulator move/shift destination registers, as well as 16-bit ALU source and destination registers. When used in the parameter/coefficient AGU to load data from memory; these registers must be loaded at least 2 instructions prior to the load instruction. |
| r4, r5, r6, r7, r8, r9, rA, rB, rC, RD, rE, rF | Register-file registers that are generally accessible anywhere a register-file register may be specified (the only exception is that r4–r7 are unavailable to store to sample memory. |
| MACmode | The MAC-related mode register is defined as follows: |
| | [15]: sAGU route[1] — Sample data routing into srcy of MAC-unit 1 (0:lsw of sample data reg., 1:msw of sample data reg.) |
| | [14]: sAGU route[0] — Sample data routing into srcy of MAC-unit 0 |
| | [13]: pAGUroute[1] — Parameter/coef. data routing into srcx of MAC-unit 1 (0:lsw of memory data, 1:msw of memory data) |
| | [12]: pAGUroute[0] — Parameter/coef. data routing into srcx of MAC-unit 0 |
| | [11]: pAGUsize20b — Parameter/coef. data size (0:16-bit, 1:20-bit) |
| | [10]: yr32 — Register mode for MAC unit srcy (0:same reg.-file source is broadcast to srcy of both MACs, 1:unique register of 32-bit pair is loaded into srcy of each MAC) |
| | [9]: MACunitEnab[1] — Specifies whether MAC-unit 0 is active (0:inactive, 1:active) |
| | [8]: MACunitEnab[0] — Specifies whether MAC-unit 0 is active |
| | [7]: lockMAC1sign — Specifies whether the sign of multiplies in MAC-unit 1 is locked (0:unlocked, 1:locked). |
| | [6]: MAC1sign — Specifies the sign of multiplies in MAC-unit 1 when locked (0:positive, 1:negative) |
| | [5:0]: Reserved for future use |
| r10, r32, r54, r76, r98, rBA, rDC, rFE | 32 bit register-file registers constructed by pairing two 16-bit registers together where the 1st digit specifies the register containing the most-significant 16 bits of the 32-bit data (i.e. r10 implies r1 holds ms 16 bits and r0 holds ls 16 bits). r10–rFE may be specified as accumulator move/shift destination registers, and parameter memory load/store destination/source registers. r54–rFE may also be specified as 20-bit source registers for the X input of the multiplier, as 32-bit sources to load into an accumulator or store to sample memory. |
| r5:r4, r7:r6, r9:r8, rB:rA, rD:rC, rF:rE | Dual 16-bit pairs of register-file registers used to deliver unique 16-bit data to each of MAC units 0:1. Available on the multiplier srcx non-modally, and on srcy by setting the yr32 mode bit. In addition, the srcy input provides alternative routings (r4:r5, r6:r7, r8:r9, rA:rB, rC:rD, and rE:rF) to MAC units 0:1. |
| rci0, rci1 | Parameter/coefficient AGU increment registers. These register may be accessed over the Ebus permitting their loading from any 16-bit register-file register. As with parameter/coefficient AGU address registers, they must be loaded at least 2 instructions before being used in a load or multiply instruction (they only need to be loaded 1 instruction before being used in a store instruction). |
| rShOut, rShOutX, rShOutH, rShOutL | A 40-bit register that holds shifter outputs temporarily for accumulator shifts. This allows full 40-bit shift operations on the accumulators to be achieved. rShOutX, H, and L access bits [39:32] (as bits [7:0] of rShOutX), [31:16], and [15:0], respectively, of rShOut, over Ebus. This allows rShOut to be used to reload the full 40-bit value of any accumulator. |
| rsa0, rsa1, rsa2, rsa3, rsa0L, rsa1L, rsa1H, rsa1L | Sample memory address registers. These registers may be loaded from/stored to parameter memory as well as being accessible from the Ebus. rsa0 and rsa1 are both 32 bits wide providing for a full fractional phase accumulator/pointer. rsa2 and rsa3 are both 16 bits wide providing a sample memory byte pointer. When accessing rsa0/1 over the Ebus, they must be accessed in High and Low parts (e.g. rsa0H and rsa0L). rsa2 is paired with rsi2 when loading from/storing to parameter memory with rsa2 using bits [31:16]. The 16-bit rsa2 and rsa3 align with the upper 16 bits of rsa0 and rsa1 when addressing sample memory and the lower 16 bits are zeroed on input to the 32-bit post-increment adder. Whenever the upper 16 bits of rsa0–3 are loaded, a boundary check is performed to determine if the address register falls inside the region where the next DMA request will transfer data (see rsDMA01/23 on page 16 for info. on the boundary check). |
| rsa0frac | The fractional part of rsa0 considering the data size (byte, word, of dword). This is useful for linear-interpolation of sample data in music synthesis as well as for accessing the fractional sample position in polyphase sample-rate conversion. |
| rsConfig01, rsConfig23, rsConfig01H, rsConfig01L, rsConfig23H, rsConfig23L | Sample AGU configuration registers. rsConfig01 configures the DMA stream, modulo, data size and type for data addressed through rsa0 and rsa1. rsConfig23 similarly configures for data addressed through rsa2 and rsa3. Either may be used for input or output DMA streams; however, the 32-bit pointers along with rsi0 provide better support for variable-rate sample playback through rsConfig01. While the simple 16-bit pointers, rsa2 and rsa3, provide what is usually necessary for sample output streams (you don't store to a fractional address). These registers may be loaded from/stored to parameter memory. They are also accessible through the Ebus with the H and L suffixes (but the 16-bit Ebus requires two cycles to access these 32-bit register). Note that if there is a DMA stream associated with this sample AGU buffer, the DMA requestor is checked to determine if there is a pending request on this stream and, if so, no DMA request can be generated on behalf of this buffer until rsConfig is reloaded. By loading the config register first, this prevents edge conditions that could occur if a DMA request completes while the stream is being accessed. |
| rsd0, rsd1, rsd2, rsd3, rsd0H, rsd0L, rsd1H, rds1L, rsd2H, rsd2L, | Sample AGU data registers. These data registers are loaded according to the specified sample address register any time sample data is read from memory. This permits local reuse of the same sample data without reloading the data from sample memory each |

TABLE 1-continued

| Register | Description |
| --- | --- |
| rsd3H, rsd3L | time. Avoiding data reloading is crucial to obtaining adequate free cycles to store results back to sample RAM in small core loops that require simultaneous loading from and storing back to sample RAM (e.g. FFT). These registers may be loaded into an accumulator or into the srcy operand of the multiplier. They are also accessible (for debug purposes) over the Ebus. |
| rsDMA01, rsDMA23, rsDMA01e, rsDMA23e | Sample AGU DMA address registers. rsDMA01/23 must be loaded/stored in the cycle immediately after rsConfig01/23 is loaded/stored (they share a common parameter load/store operand encoding). Note that this restriction does not apply to the Ebus (but when accessing rsDMA01/23e over the Ebus, bits [15:14] came from bits [31:30] of a parameter memory load). In the cycle after these registers are loaded, the sample AGU adds the maxDMAsize (from rsConfig) to the DMA address to determine an upper bound for the next DMA transfer. The assembler must prevent the programmer from coding a sample AGU operation in the instruction 3 cycles after the DMA register is loaded. These bounds are subsequently used to detect sample FIFO under/overflow on input/output streams. The bounds check also determines when a DMA request may be issued (see the description of the Ereg, rsa0–3?regDMA). |
| rsi0, rsi1, rsi2, rsi0H, rsi0L | Sample memory increment registers. These registers may be loaded from parameter memory as well as being accessible from the Ebus. rsi0 is 32 bits wide providing for a full fractional phase increment. Both rsi1 and rsi2 are 16 bits wide. Note that rsi2 is paired with rsa2 when loading from parameter memory with rsi using bits [15:0]. The 16-bit rsi1 and rsi2 align with the upper 16 bits of rsi0 with the lower 16 bits being zeroed on input to the 32-bit post-increment adder. |
| sptr | Stack pointer/Repeat/Interrupt disable register. This register provides visibility into the current stack pointer (index to the element on the top-of-stack), the current repeat count, and the top 2 elements of the interrupt disable stack. The sptr register is read-only and the bitfields are defined as follows:<br>[15]: interrupt disable previous<br>[14]: interrupt disable current<br>[13]: In FOR-loop (1 indicates currently inside a FOR-loop)<br>[12.5]: current FOR-loop repeat count<br>[4]: always '0' (allows for possible extension of stack)<br>[3:0]: current stack pointer |
| stack | The program address call/return stack. This register when read over Ebus pops the call/return stack and returns the former top-of-stack. When written, the specified data is pushed onto the top of the stack. |
| sAGUstatus | The sample AGU status register defined as follows (bits [13:8] are cleared upon Ebus read):<br>[15:14]: Reserved for future use<br>[13]: ME Multiple stream errors flag<br>[12]: SE Stream error flag<br>[11]: MUV Multiple streams underflowed flag<br>[10]: MOV Multiple streams overflowed flag<br>[9]: SUV Stream underflow flag may be an error or at end of stream<br>[8]: SOV Stream overflow flag<br>[7:0]: Stream # of last stream of over/underflow or report an error (error condition is that loaded into rsDMA) |
| status | The ALU status register is defined as follows:<br>[15]: SM 16-bit adder saturation mode, 0 for signed, 1 for unsigned<br>[14:8]: Reserved for future use<br>[7]: TS Test-bit save flag, copies TB, when TB overwritten<br>[6]: TB Test-bit flag<br>[5]: LT N $\oplus$ OV, signed less than<br>[4]: C Carry flag<br>[3]: EX Extension-in-use/limit-compare result flag<br>[2]: OV Overflow flag<br>[1]: N Sign flag<br>[0]: Z Zero flag |

TABLE 2

| Command register | Description |
| --- | --- |
| iAGUtrap0–7 | Instruction AGU trap address registers |
| reqDMA | Request a DMA transfer on the specified stream, defined as follows:<br>[15:14]: DMA priority (see rsConfig01/23 for encoding)<br>[13:8]: Reserved for future use<br>[7:0]: Stream # to request DMA on |
| rsa0?reqDMA, rsa1?reqDMA, rsa2?reqDMA, rsa3?reqDMA | Conditionally request a DMA transfer on the stream and priority level specified in rsConfig01 and rsConfig23, respectively for rsa0/1?reqDMA and rsa2/3?reqDMA. The DMA request is only issued, if the specified pointer is outside the bounds of the next DMA transfer subject to the restriction placed upon this stream when its rsConfig register was loaded. |
| s01reqDMA, s23reqDMA | Unconditionally request a DMA transfer on the stream and priority level specified rsConfig01 and rsConfig23, respectively. |
| spInt0, spInt1 | SP-to-host interrupt command registers (distinguishable by host) |

TABLE 3

| Field | Description |
| --- | --- |
| AccDest | Destination accumulator select for accumulator load: acc0–3, aux0–3, acc:aux0–3 |
| accM | Source accumulator select for the MAC unit adder: acc0, acc1, acc2, or acc3 |
| accN | Source accumulator to add/subtract in the MAC unit adder: acc2 or acc3 |
| Asrc | Accumulator source for move/shift accumulator: acc0/1/2/3, aux0/1/2/3 |
| bit[N] | bit number specifier ranging from bit[0] to bit[15] (bit[0] is the least-significant bit) |
| bs | Base register select for indirect parameter/coefficient loads and stores: base address register r0, r1, r2, or r3 |
| bFlagOp | Desire bit/logical test bit condition: z, lz |
| cFlagOp | Desired comparison test bit condition: ex, lex, n, ln, ov, !ov, z, !z, c, !c, gte, lt, gt, lte, ugt, ulte |
| cond | Desired condition: tb, ltb, ex, !ex, n, !n, ov, !ov, z, !z, c, !c, gte, lt, always, never |
| condX | Desired extended condition: tb, !tb, ts, !ts, ex, !ex, n, !n, ov, !ov, z, !z, c, !c, gte, lt, gt, lte, ugt, ulte, always, never |
| constM | Source constant to add to the product in the MAC unit adder: c0, cr16, cr17, . . . , cr22 |
| daddr | a 16-bit direct address into parameter RAM or coefficient ROM |
| destAcc | Destination accumulator select for the MAC unit adder: acc0, acc1, acc2, acc3 |
| EregSrc | Internal 16-bit debug/peripheral bus source register specifier: AGUtrap0–7, fcnt, ind, MACmode, sptr, stack, rci0/1, status, spInt0/1, sAGUstatus, rsa0L/H, rsa1L/H, rsa 2/3, rsai0L/H, rsi1/2, rsConfig01L/H, rsConfig23L/H, rsDMA01e, rsDMA23e, rsd0–3L/H, rShOutL/H/X, acc0–3L/H/X†, aux0–3L/H/Z†<br>†Accumulator reads are only supported at reduced clock rates, they should not be used in any production code |
| EregDest | Internal 16-bit debug/peripheral bus destination register specifier: iAGUtrap0–7, fcnt, ind, MACmode, stack, rci0/1, status, spInt0/1, sAGU status, reqDMA, s01/23reqDMA, rsa0-3!reqDMA, rsa0L/H, rsa1L/H, rsa2/3, rsi0L/H, rsi1/2, rsConfig01L/H, rsConfig23L/H, rsDMA01e, rsDMA23e, rsd0–3L/H, rShOutL/H/X |

TABLE 3-continued

| Field | Description |
|---|---|
| Gsrc | Source register select for the general-purpose bus: r4, r5, r6, . . . rF, rShOut, r54, r76, r98, . . . , rFE |
| idx4 | a 4-bit unsigned index to be added to the base address register in the WideOp indirect, indexed load/store instructions |
| idx16 | a 16-bit index to be added to the base address register in the mOp and ALUop indirect, indexed load/store instructions |
| imm | a 16-bit immediate value |
| imm4 | a 4-bit immediate value ranging from 0 to +15 |
| ioaddr | a 16-bit direct address into I/O space |
| paddr | a 16-bit direct address to program memory |
| postInc | post-increment operator: bs, bs++1, bs++rci0, bs++rci1 |
| pr | Virtual product register in the MAC-units. It is used as the destination for multiplies and the source for adds. Note that the output of the multiplier is a separate sum and carry vector which must be added to obtain a useful result. |
| Radest | Destination register select for move/shift accumulator result: r0, r1, r2, . . . , rF, r10, r32, r54, . . . rFE, rShOut |
| Rdest | Destination register select for the 16-bit ALU result: r0, r1, r2, . . . , rF |
| Rldst | 32-bit register select for parameter/coefficient memory load/store (wsel == 11): r10, r32, . . . , rFE, rsa0, rsa1, rsa2:i2, rsa3, rsi0, rsi1, rsConfig01, rsDMA01, rsConfig23, rsDMA23 |
| RldstIO | 32-bit register select for direct parameter/coefficient memory load/store and input/output (wsel == 11): r10, r32, . . . , rFE, rsa0, rsa1, rsa2:i2, rsa3, rsi0, rsi1 |
| rldst16 | 16-bit register select for parameter/coefficient memory load/store (wsel != 11): r0, r1, r2, . . . , rF |
| Rm | Source register select for input A into the 16-bit ALU: r0, r1, r2, . . . , rF |
| Rn | Source register select for input B into the 16-bit ALU: r0, r1, r2, . . . , rF |
| Rss | Register to store to sample memory: r54, r76, . . . , rFE, r8, r9, rA, . . . , rF |
| s | a sign bit specifier for simm4 (only present in conjunction with imm4 field) |
| sample- | Source operands for sample AGU adder: rsaN + 1, |
| AGUadd | rsaN + rsiM where N = 0–3 and M = 0–2 |
| sample-AGUdest | Destination address register for sample AGU store: *rsaN++1, *rsaN++rsiM where N = 0–3 and M = 0–2 |
| sample-AGUsrc | Source for sample AGU address register for loading the accumulator: rsdN, (rsdN = *rsaN++1), (rsdN = *rsaN++rsiM) where N = 0–3 and M = 0–2 |
| sd | Destination register select for sample AGU: rsa0/1 (if source is rsa0 or rsa1) or rsa2/3 (if source is rsa2 or rsa3) |
| sidx8 | an 8-bit signed index to be added to the base address register in the extended indirect, indexed load/store instructions |
| simm4 | a 4-bit immediate value plus sign ranging from −16 to +15 |
| srcx | Source register select for the X-input of the multiplier: r8, r9, rA, . . . , rF, hi20(r54, r76, r98, . . . , rFE), r5:r4, r7:r6, . . . , rF:rE, acc0–3S, *r0–3, *(r0–3+1), *r0–3++1, *r0·3++rci0, *r0–3++rci1, rsa0frac, 1.0-rsa0frac, c-1.0, abs(srcy), square(srcy) |
| srcy | Source register select for the Y-input of the multiplier: r4, r5, r6, . . . , rF, rsdN, (rsdN = *rsaN++1), rsdN++rsiM) where N = 0–3 and M = 0–2 |
| wsel | Partial dword select for load/store: low, high, or both (32-bit) |

TABLE 4

Extended register (Ereg) encodings:

| Ereg | +0 | +1 | +2 | +3 | +4 | +5 | +6 | +7 |
|---|---|---|---|---|---|---|---|---|
| 00–07 | iAGUtrap0[1] | iAGUtrap1[1] | iAGUtrap2[1] | iAGUtrap3[1] | iAGUtrap4[1] | iAGUtrap5[1] | iAGUtrap6[1] | iAGUtrap7[1] |
| 08–0F | Reserved for future use by the instruction address generation unit (iAGU) | | | | | | ind | stack[2] |
| 10–17 | rci0 | rci1 | | | sptr[r] | fcnt | MACmode | status |
| 18–1F | reqDMA[3w] | s01reqDMA[4w] | | s23reqDMA[4w] | rsa07regDMA[5w] | rsa17reqDMA[5w] | rsa27reqDMA[5w] | rsa376reqDMA[5w] |
| 20–27 | rsa0L | rsa0H[6] | rsa1L | rsa1H[6] | | rsa2[6] | | rsa3[6] |
| 28–2F | rsi0L | rsi0H | | rsi1 | | rsi2 | | |
| 30–37 | rsConfig01L | rsConfig01H | rsConfig23L | rsConfig23H | rsDMA01e[8] | | nDMA23e[8] | |
| 38–3F | rsd0L | rsd0H | rsd1L | rsd1H | rsd2L | rsd2H | rsd3L | rsd3H |
| 40–47 | rShOutL[9] | rShOutH[9] | rShOutX[9] | | | | | |
| 48–5F | | | | | | | | |
| 60–67 | acc0L[10r] | acc0H[10r] | acc0X[10r] | | acc1L[10r] | acc1H[10r] | acc1X[10r] | |
| 68–6F | acc2L[10r] | acc2H[10r] | acc2X[10r] | | acc3L[10r] | acc3H[10r] | acc3X[10r] | |
| 70–77 | aux0L[10r] | aux0H[10r] | aux0X[10r] | | aux1L[10r] | aux1H[10r] | aux1X[10r] | |
| 78–7F | aux2L[10r] | aux2H[10r] | aux2X[10r] | | aux3L[10r] | aux3H[10r] | aux3X[10r] | |
| 80–F7 | | | | | | | | |
| F8–FF | | | | | | | spInt0[11w] | spInt1[11] w |

Notes:
r indicates the associated Ebus register is a read-only register
w indicates the associated Ebus register is a write-only (command) register
[1]The iAGUtrapN registers contain a program address at which to trap. When triggered, a trap branches to a fixed location in memory containing the trap handler (a different fixed location for each trap)
[2]Reads read the top element from the stack and pop the stack. Writes push the stack & write a new top elem.
[3]Writing to this register requests a DMA. Bits [15:14] specify the priority and bits [7:0] specify the stream #.
[4]Writing these registers triggers a DMA request for the stream already configured by rsConfig01/23
[5]Writing these registers triggers a DMA request if there is room in the input FIFO (or adequate data in an output FIFO) for the next DMA transfer
[6]Writing these address registers causes the sample AGU to update the DMA buffer position status (inside or outside) for that address register (just as loading them from parameter memory does)

TABLE 4-continued

[7] Reading this register clears the stream buffer over/underflow status bits
[8] Reading this register gives the entire retained contents of the rsDMA01/23 register as loaded from parameter memory where parameter bits [31:30] and [13:0] are mapped into bits [15:14] and [13:0] of this Ebus reg.
[9] The 40-bit rShout register is split into Lo, [15:0], Hi., [31:16], and eXtended, (8) '0' & [39:32], bit groups.
[10] The 40-bit accumulators are read-only and split into Lo, Hi, and Extended bit groups as rShOut, above. Unlike rShOut, the 40-bit accumulators may only be read when the processor is running at a reduced speed; these Ereg sources should not be used in ordinary user programs.
[11] Writing either of these registers requests an interrupt to the host processor (which can identify between the two SP-generated sources by reading the interrupt source register)

Other instruction field encodings:

| Field | msbs | Operand Encoding | | | |
|---|---|---|---|---|---|
| | | 00 | 01 | 10 | 11 |
| AccDest | 00 | | | | |
| | 01 | acc0 | acc1 | acc2 | acc3 |
| | 10 | aux0 | aux1 | aux2 | aux3 |
| | 11 | acc:aux0 | acc:aux1 | acc:aux2 | acc:aux3 |
| accM destAcc | — | acc0 | acc1 | acc2 | acc3 |
| accN | — | acc2 | acc3 | N/A | |
| Asrc | 0 | acc0 | acc1 | acc2 | acc3 |
| | 1 | aux0 | aux1 | aux2 | aux3 |
| bs | — | r0 | r1 | r2 | r3 |
| bFlagOp | — | Z | !Z | — | — |
| cflagOp | 00 | Z | !Z | N | !N |
| | 01 | OV | !OV | EX | !EX |
| | 10 | C | !C | LT[1] | GTE[2] |
| | 11 | ULTE[3] | UGT[4] | LTE[5] | GT[6] |

[1] LT defined as $(N \oplus OV)$
[2] GTE defined as $\overline{LT} = \overline{(N \oplus OV)}$
[3] ULTE defined as $(C|Z)$
[4] UGT defined as $\overline{ULTE} = \overline{(C|Z)}$
[5] LTE defined as $\overline{(LT|Z)}$
[6] GT defined as $\overline{LTE} = \overline{(LT|Z)}$

| Field | msbs | Operand Encoding | | | |
|---|---|---|---|---|---|
| | | 00 | 01 | 10 | 11 |
| cond | 00 | Z | !Z | N | !N |
| | 01 | OV | !OV | EX | !EX |
| | 10 | C | !C | LT | GTE |
| | 11 | TB | !TB | always | never |
| condX | 0xx | See coding for cond, above | | | |
| | 100 | | | | |
| | 101 | | | | |
| | 110 | TS | !TS | | |
| | 111 | ULTE | UGT | LTE | GT |
| constM | 0 | c0 | cr16 | cr17 | cr18 |
| | 1 | cr19 | cr20 | cr21 | cr22 |
| Gsrc | 000 | | | | |
| | 001 | r4 | r5 | r6 | r7 |
| | 010 | r8 | r9 | rA | rB |
| | 011 | rC | rD | Re | Rf |
| | 100 | | | | |
| | 101 | rShOut | r54 | | r76 |
| | 110 | rDC | r98 | | rBA |
| | 111 | | | rFE | |
| postInc | — | (no post-incr.) | 1 | rci0 | rci1 |
| Radest | 000 | r0 | r1 | r2 | r3 |
| | 001 | r4 | r5 | r6 | r7 |
| | 010 | r8 | r9 | rA | rB |
| | 011 | rC | rD | rE | rF |
| | 100 | | r10 | | r32 |
| | 101 | rShOut | r54 | | r76 |
| | 110 | | r98 | | rBA |
| | 111 | | rDC | | rFE |
| Rdest Rm | 00 | r0 | r1 | r2 | r3 |
| | 01 | r4 | r5 | r6 | r7 |
| Rn Rldst16 | 10 | r8 | r9 | rA | rB |
| | 11 | rC | rD | rE | rF |
| Rldst | 00 | rsa0 (int. frac) | r10 | rsa1 (int. frac) | r32 |
| | 01 | rsi0 (int. frac) | r54 | rsi1 (msw only) | r76 |
| | 10 | rsa2:i2 (ms:lsw) | r98 | rsa3 (msw only) | rBA |
| | 11 | sConfig01 rsDMA01 | rDC | rsConfig23 rsDMA23 | rFE |
| Rss | 00 | r8 | r9 | rA | rB |
| | 01 | rC | rD | rE | rF |

TABLE 4-continued

|  |  |  |  |  |  |
|---|---|---|---|---|---|
|  | 10 |  | r98 |  | rBA |
|  | 11 | r54 | rDC | r76 | rFE |
| sample-AGUadd | 0xx |  |  |  |  |
|  | 100 | rsa0 + 1 | rsa1 + 1 | rsa2 + 1 | rsa3 + 1 |
|  | 101 | rsa0 + rsi0 | rsa1 + rsi0 | rsa2 + rsi0 | rsa3 + rsi0 |
|  | 110 | rsa0 + rsi1 | rsa1 + rsi1 | rsa2 + rsi1 | rsa3 + rsi1 |
|  | 111 | rsa0 + rsi2 | rsa1 + rsi2 | rsa2 + rsi2 | rsa3 + rsi2 |
| sample-AGUdest | 0xx |  |  |  |  |
|  | 100 | *rsa0++1 | *rsa1++1 | *rsa2++1 | *rsa3++1 |
|  | 101 | *rsa0++rsi0 | *rsa1++rsi0 | *rsa2++rsi0 | *rsa3++rsi0 |
|  | 110 | *rsa0++rsi1 | *rsa1++rsi1 | *rsa2++rsi1 | *rsa3++rsi1 |
|  | 111 | *rsa0++rsi2 | *rsa1++rsi2 | *rsa2++rsi2 | *rsa3++rsi2 |
| sd | — | rsa0, rsa2† | rsa1, rsa3† | N/A |  |

†If the address register to sample AGU adder is rsa0 or rsa1, then sd selects between rsa0 and rsa1; otherwise, it selects between rsa2 and rsa3.

Operand Encoding

| Field | msbs | 00 | 01 | 10 | 11 |
|---|---|---|---|---|---|
| srcx0 | 00 | abs(srcy) | square(srcy) | C-1.0 | {1.0-}rsa0frac† |
|  | 01 | acc0$ | acc1$ | acc2$ | acc3$ |
|  | 10 | r8 | r9 | rA | rB |
|  | 11 | rC | rD | rE | rF |

†Sign of multiply selects: + selects rsa0frac, − selects - (rsa0frac-1.0) = 1.0-rsa0frac

Operand Encoding

| Field | msbs | 00 | 01 | 10 | 11 |
|---|---|---|---|---|---|
| srcx1 | 00 | *r0 | *r1 | *r2 | *r3 |
|  | 01 | *r0++1 | *r1++1 | *r2++1 | *r3++1 |
|  | 10 | *r0++rci0 | *r1++rci0 | *r2++rci0 | *r3++rci0 |
|  | 11 | *r0++rci1 | *r1++rci1 | *r2++rci1 | *r3++rci1 |
| srcx2 | 00: | *(r0+1) | *(r1+1) | *(r2+1) | *(r3+1) |
|  | 01 | r5:r4 | r54 | r7:r6 | r76 |
|  | 10 | r9:r8 | r98 | rB:rA | rBA |
|  | 11 | rD:rC | rDC | rF:rE | rFE |
| srcy | 000 | rsd0 | sd1 | rsd2 | rsd3 |
| sample-AGUsrc | 001 | r4 (r4:r5)† | r5 (r5:r4) † | r6 (r6:r7) † | r7 (r7:r6)† |
|  | 010 | r8 (r8:r9) † | r9 (r9:r8) † | rA (rA:rB)† | rB (rB:rA)† |
|  | 011 | rC (rC:rD)† | rD (rD:rC)† | rE (rE:rF)† | rF (rF:rE)† |
|  | 100 | (rsd0=*rsa0++1) | (rsd1 = *rsa1++1) | (rsd2=*rsa2++1) | (rsd3=*rsa3++1) |
|  | 101 | (rsd0=*rsa0++rsi0) | (rsd1=*rsa1++rsi0) | (rsd2=*rsa2++rsi0) | (rsd3=*rsa3++rsi0) |
|  | 110 | (rsd0=*rsa0++rsi1) | (rsd1=*rsa1++rsi1) | (rsd2=*rsa2++rsi1) | (rsd3=*rsa3++rsi1) |
|  | 111 | (rsd0=*rsa0++rsi2) | (rsd1=*rsa1++rsi2) | (rsd2=*rsa2++rsi2) | (rsd3=*rsa3++rsi2) |
| wsel | — |  | low [15:0] | high [31:15] | both [31:0] |

†Excluded from sample AGUsrc, parenthesized form is selected by setting the yr32 mode bit

TABLE 5

| SP operation | Fetch (F) | Decode (D) | Sample mem. (SM) | Execute (E) | Execute+1 (E+1) |
|---|---|---|---|---|---|
| 1. 16-bit add, subtract, shift, and, or, and-not, xor, & bit set/clear. | Fetch instruction word from program memory, increment program counter (cancel increment if preceding instruction was a dual, packed ALUop instruction and setup to decode | Decode fetched instruction | Setup immediate source operand, if specified | Read reg-file operand(s), execute the specified op. in the 16-bit ALU computing flags, and, if the instruction was unconditional or the test bit is set, update flags and writeback result to the destination register | — |
| 2. conditional add or move |  | Same | Same | As above, but evaluate cond. and only update flags (for add) and writeback result if condition is true | — |
| 3. compare, test, or bit test | ALUop2 instead discarding the instruction that was being read from program memory) | Same | Same | Read reg-file operand(s), execute the specified compare or test and update flags. | Update the test bit w/desired flag/condition in time to conditionally execute next instr. |
| 4. MAC-unit multiply |  | Same | Sample memory read into rsdN, read parameter addr reg, | Parameter/coef. memory read @ addr. register (or addr. reg + | Perform multiply of the data loaded into the X |

TABLE 5-continued

| SP operation | Fetch (F) | Decode (D) | Sample mem. (SM) | Execute (E) | Execute+1 (E+1) |
|---|---|---|---|---|---|
| | | | post-increment (or index), and writeback result to addr. reg., if post-incr. Read sample addr reg. presenting Addr. to samp. m., post-incr., write result to rsPostinc | index, if indexed) into X and/or read reg-file operand(s) into X and/ or Y regs. Check rsPostinc for DMA buffer underflow, writeback to sample address reg., if OK | and Y regs. and writeback the virtual product to the sum and carry vector registers |
| 5. MAC-unit add (40-bit) | Same | Same | Setup rounding constant operand, if specified | Read the source acc. and/or sum & carry, perform the 3-input, 40-bit add/sub., and writeback result to the destination acc. | — |

TABLE 6

| Instruction | Restriction | Issue leading to the restriction and any benefits resulting |
|---|---|---|
| ALU add w/carry, subtract w/ borrow conditional add | No short-signed immediate form like add/subtract without carry Rm is not specified independently (it must be the same as Rdest) No conditional add without saturation | ALU opcode space pressure. Note that add with carry and subtract with borrow are available with a 16-bit immediate in the wideOp opcode map. ALU operand space limitations. The cond field replaces the Rm field. ALU opcode space pressure. Due to the way test-bit assignment and short-immediates explode the number of opcodes required for conditional add (to 9), it was not worth the cost in opcode space. |
| conditional add and conditional move | Conditions are limited and exclude !/ts, lte, gt, ulte, and ugt | ALU operand space limitations (only room for a 4-bit field, not the 5-bit condX field) and a potentially more difficult speed path. lte, gt, ulte, and ugt are derived flags and require an extra state of logic. |
| Bit set/ clear | No bit set/clear for bit numbers contained in a register (only immediate) | ALU opcode space pressure. Since immediate bit numbers would seem to be more useful than register-based bit numbers and it is frequently possible to use a mask in the register instead of a bit number. |
| Logical test | The sign (N) bit may not be assigned to the test bit | ALU opcode space pressure. By allowing only the zero flag to be the condition for logical test, we were able to allow bit test where the bit number is contained in a register. If all you want to test is the sign of one register, perform a bit test on bit 15; otherwise, you must perform a logical AND (overwriting the destination register), then assign the sign bit to the test bit in a subsequent instruction. |
| Load accumulator | Gsrc excludes r0–3, r10, r32, r1:r0, and r3:r2 | The load path is shared with the register-file load path into the X register of the multiplier which has a similar restriction |
| | Gsrc collides w/multiplying by a reg.-file register specified in srcx | Gsrc and srcx both use the Gbus. |
| Parameter/ coefficient and sample RAM loads and stores | Loads may not immediately follow stores At most one parameter/ coefficient and one sample RAM load or store is allowed in parallel instrucs. | Both the design of the RAM and the instruction pipeline require this. There is only one port on parameter RAM/coefficient ROM and sample RAM. Additionally, the design of the RAMs preclude issuing a load and a store to the same RAM together. |
| Parameter/ coefficient loads and stores | The index on ALUop and mOp loads and stores is limited to 4 bits, unsigned | ALUop and mOp operand space and ALUop opcode space pressure. When not performing a 40-bit addition or subtraction, the aOp field extends the index of any indexed load/store from 4 bits, unsigned to 8 bits, signed. Additionally, a 16-bit index is available in the wideOp load/store instructions. |
| Sample RAM loads and | No indexed load/ store from/to sample RAM | Due to the piplining of sample RAM loads and stores, there is insufficient time to decode the instruction and add the index. |
| | Register-file data must be valid two cycles before a sample RAM store | Sample memory stores occur during the SM stage of the pipline requiring the data to be ready one cycle earlier (than the execute stage where parameter stores occur). Several tradeoffs were balanced here with the goal of keeping the sample RAM interface simple. The chosen alternative has the advantage that other than this special requirement, sample memory accesses behave just like parameter memory accesses. |

TABLE 7a

| mOp [39:38] | mOp[37:36] 00 | 01 | 11 | 10 |
|---|---|---|---|---|
| 00 | NOP (mOp) Select WidOp instr. format AccDest = Gsrc † (lo\|hi) *bs(++postInc) = Rldst(16) | lo *(bs + idx4) = Rldst)6 †‡ | Rldst16 = lo *(bs + idx4)†‡ | AccDest = Gsrc † Rldst(16) = (lo\|hi) *bs(++postInc) |
| 01 | pr = +/− srcx ⁻srcy | | | AccDest = sampleAGUsrc sampleAGUdest = Rss |
| 11 | | | selects dual-ALUop instruction form | |
| 10 | hi *(bs + idx4) = Rldst16 †‡ | *(bs + idx4) = Rldst ‡ | Rldst = ⁻(bs + idx4) ‡ | Rldst16 = hi *(bs + idx4) †‡ |

†AccDest[3] is determined by mOp[37], thus this instruction is split across two mOps
‡If aOp specified to b a NOP, the 4-bit unsigned index (idx4) is extended to an 8-bit signed index (sidx8)

TABLE 7b

| aOp [23] | aOp[25:24] 00 | 01 | 11 | 10 |
|---|---|---|---|---|
| 0 | NOP/ext. load/store | destAcc = accM + | destAcc = constM + | destAcc = accM − |
| 1 | destAcc = accM + pr | accN | pr | accN |

TABLE 7C

| [6:2] | aluOpcode[1:0] 00 | 01 | 11 | 10 |
|---|---|---|---|---|
| 000.00 | NOP (ALUop) mode({MuSatM}, {yr32}, {... \|sampleAGU route, paramAGU route, param. size}) | EregDest = Rm | Rm & Rn tb = bFlagOp( Rm & Rn ) tb \|= bFlagOp( Rm & Rn ) tb &= bFlagOp( Rm & Rn ) Rm & bit[Rn] tb = bFlagOp(Rm & bit[Rn] ) tb \|= bFlagOp( Rm & bit[Rn] ) tb &= bFlagOp( Rm & bit[Rn] ) | tb = condX tb \|= condX tb &= condX Rm & bit[N] tb = bFlagOp( Rm & bit[N] ) tb \|= bFlagOp( Rm & bit[N] ) tb &= bFlagOp( Rm & bit[N] ) |
| 000.01 | if (cond) Rdest $+= Rn | if (cond) Rdest = Rn | tb &= cFlagOp( Rn − Rm ) | tb = cFlagOp( Rn − Rm ) |
| 000.11 | {if (tb)} Radest = Asrc $+>> Rn | {if (tb)} Radest = Asrc +>> Rn | | tb = cFlagOp ( Rn − Rm) |
| 000.10 | {if (tb)} Rldst {16} = {lo \| hi} *(bs + idx4) | | | {if (tb)} {lo \| hi} *(bs + idx4) = Rldst(16) |
| 001.10 | {if (tb)} Rdest = Rm & Rn | {if (tb)} Rdest = Rn &~Rm | {if (tb)} Rdest = Rm \| Rn | {if (tb)} = Rm \| Rn |
| 001.11 | {if (tb)} Rdest = Rm << Rn | {if (tb)} Rdest = Rn >> Rn | {if (tb)} Rdest = Rm +>> Rn | {if (tb)} Rdest = Rm $<< Rn |
| 001.01 | {if (tb)} Rdest = Rm + Rn | {if (tb)} Rdest = Rn − Rm | {if (tb)} Rdest = Rn $− Rm | {if (tb)} Rdest = Rm $+ Rn |
| 001.00 | {if (tb)} Rdest = Rm +c+ Rn | {if (tb)} Rdest = Rn −b− Rm | {if (tb)} Rdest = Rn $−b− Rm | {if (tb)} Rdest = Rm $+c+ Rn |
| 011.00 | {(tb)} Rdest = Rm + simm4 | {if (tb)} Rdest = simm4 − Rm | {if (tb)} Rdest = simm4 $− Rm | {if (tb)} Rdest = Rm $+ simm4 |
| 011.01 | | | | |
| 011.11 | {if (tb)} Rdest = Rm << imm4 | {if (tb)} Rdest = Rm >> imm4 | {if (tb)} Rdest = Rm +>> imm4 | {if (tb)} Rdest = Rm $<< imm4 |
| 011.10 | {if (tb)} Rdest = Rm &~ bit[N] | | | {if (tb)} Rdest = Rm \| bit[N] |
| 010.10 | {(tb)} Radest = Asrc $+>> simm4 | {if (tb)} Radest = Asrc +>> simm4 | | tb = cFlagOp( simm4 − Rm) |
| 010.11 | | | | |
| 010.01 | if (cond) Rdest $+= simm4 | if (cond) Rdest = simm4 | tb &= cFlagOp( simm4 − Rm) | tb \|= cFlagOp( simm4 − Rm) |
| 010.00 | | | | |
| 100.00 | Rldst{16} = {lo \| hi} *bs{++postInc} RldstIO{16} = {lo \| hi} IO(*bs{++postInc}) | Rdest = EregSrc | AccDest = Gsrc AccDest = sampleAGUsrc sample AGUdest = Rss sd = sampleAGUadd | {lo \| hi} *bs{++postInc} = Rldst{16} {lo \| hi} IO(bs{++postInc}) = RldstIO{16} |
| 100.01 | tb = cond. if (cond) Rdest $+= Rn | tb = cond, if (cond) Rdest = Rn | tb = !cond, if (cond) Rdest = Rn | tb = !cond, if (cond) Rdest $+= Rn |
| 100.11 | Same as opercodes 0xx,xxxx (where x's correspond with this region) except these are conditional on the test bit | | | |
| 100.10 | | | | |
| 101.10 | | | | |
| 101.11 | | | | |
| 101.01 | | | | |
| 101.00 | | | | |

TABLE 7C-continued

| | aluOpcode[1:0] | | | |
|---|---|---|---|---|
| [6:2] | 00 | 01 | 11 | 10 |
| 111.00 | | | | |
| 111.01 | | | | |
| 111.11 | | | | |
| 111.10 | | | | |
| 110.10 | | | | |
| 110.11 | | | | |
| 110.01 | tb = cond, if (cond) Rdest $+= simm4 | tb = cond, if (cond) Rdest = simm4 | tb =! cond, if (cond) Rdest = simm4 | tb =! cond, if (cond) Rdest $+= simm4 |
| 110.00 | | | | |

TABLE 7D

| | wideOpcode[1:0] | | | |
|---|---|---|---|---|
| [6:2] | 00 | 01 | 11 | 10 |
| 000.00 | | | Rm & imm<br>tb = bFlagOp( Rm & imm )<br>tb \|= bFlagOp( Rm & imm )<br>tb &= bFlagOp( Rm & imm ) | |
| 000.01 | if (cond) Rdest $+= imm | if (cond) Rdest = imm | tb &= cFlagOp( imm − Rm ) | tb \|= cFlagOp (imm − Rm) |
| 000.11 | | | Reserved for ALUOp −> wide Op | tb = cFlagOp( imm − Rm ) |
| 000.10 | {if(tb)} Rldst{16} = {lo \| hi} *(bs + idx16 | Reserved for ALUop −> wideOp | Reserved for ALUop −> wideOp | {if(tb)} (lo \| hi) *(bs + idx16) = Rldst{16} |
| 001.10 | {if(tb)} Rdest = Rm & imm | {if(tb)} Rdest = imm &= Rm | {if(tb)} Rdest = Rm imm | {if(tb)} Rdest = Rm \| imm |
| 001.11 | {if(tb)} RldsIO{16} = {lo \| hi} daddr | {if(tb)} RldsIO{16} = {lo \| hi} IO(ioaddr) | {if(tb)} {lo \| hi} IO(ioaddr) = RldsIO{16} | {if(tb)} {lo \| hi} daddr = RldstIO{16} |
| 001.01 | {if(tb)} Rdest = Rm + imm | {if(tb)} Rdest = imm − Rm | {if(tb)} Rdest = imm $− Rm | {if(tb)} Rdest = Rm $+ imm |
| 001.00 | {if(tb)} Rdest = Rm +c+ imm | {if(tb)} Rdest = imm −b− Rm | {if(tb)} Rdest = imm $−b− Rm | {if(tb)} Rdest = Rm $+c+ imm |
| 011.00 | if (condX) goto paddr after { } | if (condX) paddr( ) after { } | disableIntr | enableIntr |
| 011.01 | if (condX) goto *ind after { } | if (condX) *ind( ) after { } | sleepForever | sleep |
| 011.11 | return FromIntr after { } | if (condX) return after { } | | |
| 011.10 | | Reserved for ALUop −> wideOp | Reserved for ALUop −> wideOp | |
| 010.10 | | | Reserved for ALUop −> wideOp | |
| 010.11 | | | Reserved for ALUop −> wideOp | |
| 010.01 | | | | |
| 010.00 | for (i=Rm; i >= 0; −i) after { } {i1; i2; . . . paddr: iN;} | for (i=rcnt; i >= 0; −i) after { } {i1; i2; . . . paddr: iN;} | | |
| 100.00 | | | | |
| 100.01 | tb = cond, if (cond) Rdest $+= imm | tb = cond, if (cond) Rdest = imm | tb = !cond, if (cond) Rdest = imm | tb = !cond, if (cond) Rdest $+= imm |
| 100.11 | | | Reserved for ALUop −> wideOp | Reserved for ALUop −> wideOp |
| 100.10 | Same as opcodes 00x,xxxx (where x's correspond with this region) except these are conditional on the test bit | | | |
| 101.10 | | | | |
| 101.11 | | | | |
| 101.01 | | | | |
| 101.00 | | | | |
| 111.00 | tb = condX, if (condX) goto paddr after { } | tb = condX, if (condX) paddr( ) after { } | tb = \|condX, if (condX) paddr after { } | tb = \|condX) goto paddr after { } |
| 111.01 | tb = condX, if (condX) goto *ind after { } | tb = condX, if (condX) *ind( ) after { } | tb = !condX, if (condX) *ind( ) after { } | tb = !condX, if (condX) goto *ind after { } |
| 111.11 | | tb = condX, if (condX) return after { } | tb = \|condX, if (condX) return after { } | |
| 111.10 | | Reserved for ALUop −> wideOp | Reserved for ALUop −> wideOp | |
| 111.10 | | | Reserved for ALUop −> wideOp | Reserved for ALUop −> wideOp |
| 110.11 | | | Reserved for ALUop −> wideOp | Reserved for ALUop −> wideOp |
| 110.01 | | | | |
| 110.00 | | | | |

TABLE 8

| ds | Description |
|---|---|
| 00 | 8-bit signed data (msbyte-aligned in 32-bit dword), stored little-endian |
| 01 | Dual 8-bit signed data (first byte loads into bits [15:8], second byte loads into bits [31:16]), pairs stored little-endian |
| 10 | 16-bit signed data (msword-aligned in 32-bit dword), stored little-endian |
| 11 | 32-bit dword data (or dual 16-bit data) |
| shr1 = | Shift lsword right by 1 (a non-sign-extending shift to enable double-precision arithmetic using the dual MAC units) |

TABLE 8-continued revCy = Reverse carry mode select (when selected, modulo is ignored and only the upper 14 bits of the address register are computed using reverse carry mode, the lower 18 bits of the result are cleared)

mod = Modulo field encoded as follows (must match the DMA buffer size specified in the DMA descriptor):

TABLE 9

| mod | Description | mod | Description |
|---|---|---|---|
| 0000 | No modulo | 1000 | Modulo 4 dwords |
| 0001 | Modulo 16 dwords | 1001 | Modulo 8 dwords |
| 0010 | Modulo 32 dwords | 1010 | Reserved |
| 0011 | Modulo 64 dwords | 1011 | Reserved |
| 0100 | Modulo 128 dwords | 1100 | Reserved |
| 0101 | Modulo 256 dwords | 1101 | Reserved |
| 0110 | Modulo 512 dwords | 1110 | Reserved |
| 0111 | Modulo 1024 dwords | 1111 | Reserved |

| Field | Width | Description |
|---|---|---|
| Request pending | 1 bit | This field is set to 1 to indicate a pending request for data/samples on the corresponding stream. |
| DMA priority | 2 bits | This field specifies the priority to be given to a pending request on this stream. The DMA priority is set upon each request from the DMA priority field in the rsConfig01/23 register. Priority encoding is the same as that specified in the rsConfig01/23 description. |
| Page-map entry request pending | 1 bit | This field is set to 1 to indicate a pending request for the next page-map entry to be read for the corresponding stream. The DMA engine is responsible for informing the SP upon completion of a DMA in which the next page-map entry should be read ahead. |

TABLE 10A

IDLE
DMA controller is inactive. Peeks/pokes of SP memory may be occurring via PCI interface, but no DMA transactions have been requested.
LD_RA (load requestor address)
A DMA transaction has been requested. If the request comes from the Stream Processor (rather than the host) then the address of the DMA requestor structure in SP memory is obtained from the Sample AGU. The Sample-AGU actually provides the stream number, which is multiplied by 16 to provide the address of the requestor in SP Parameter memory.
PT_LDSRC0 (load count register for page-table DMA)
If the requested DMA is for an update from the host page-table (scatter/gather DMA only) then load the first doubleword of the DMA requestor. This information is only required because this doubleword must be written back at the end of the page-table DMA, when the page-map (PM) bits are updated.
PT_LDSRC1 (load page-table address and index for page-table DMA)
For page-table DMA, the source data comes from the scatter/gather page-table located in host memory. In this state the address of the page table itself, and the index into the page table (either for the next page, or the 2nd page after the loop-begin page) are loaded from the SP requestor.
LD_SREQ (load source info from requestor)
For normal (non page-table) DMA requests, load the first 3 doublewords of DMA information (from the requestor in SP memory for SP-initiated transfers, or from PCI-accessible registers for host-initiated transfers).
LD_LSAMPE (load loop end and sample-end byte addresses)
For scatter/gather DMA, if the current DMA requestor indicates we are on the host page containing sample-end or loop-end (indicated by LS and SS fields in requestor), then load the loop and sample-end byte offsets from the requestor. By comparing the current host address to these values, the end of a loop or sample buffer can be detected.
LD_SADDR (load source address)
Transfers of greater than 64 doublewords in length are actually broken up into two or more smaller transfers. Although the source address was

TABLE 10A-continued already loaded along with other information in the LD_SREQ state, this state allows the address to be more quickly loaded when we return to it after transferring 64 doublewords in an earlier portion of the DMA transaction. This state is only used during transfers of more than 64 doublewords.
LD_DBITS (load destination address bits for optimized mode)
Normally the destination address is not loaded from the SP requestor or host register until it is ready to be used (when we are ready to drain the fifo). However, when "optimized" mode is selected and the transfer is from SP memory to host memory, the destination (host) address is required prematurely, to allow the size of the transfer to be computed. Only the five least-significant address bits are needed to compute the correct dword count in optimized mode, so only those bits are latched.
RUN_SRC (run the source)
In this state the source transfer is begun. Either a PCI transaction is stated, or the data is read from SP memory, and the data is written to the FIFO memory. The transfer continues and the controller remains in this state until either the requested doubleword count has been satisfied, or the transfer reaches the end of a page, loop, or sample in host memory.
FIN_SRC (finish the source)
The source portion of the transaction has finished, and the decision is made to branch to the appropriate end-of-transaction handler. This can be end of sample, loop, or page for scatter/gather transfers, or the completion of the requested number of doublewords.
WB_SRC (write back the source address)
When the source portion of the DMA transaction completes, the source address is written back to the SP requestor or host register. This state is skipped if the "WBS" (writeback source) bit is not set in the first doubleword of the requestor.
LD_DADDR (load destination address)
Before the destination portion of the DMA transaction is run, the destination address (in either host or SP memory) is loaded from the SP requestor or host register
PREREAD (pre-read a doubleword of data from SP memory)
If the destination is not doubleword-aligned in SP memory (it has a byte offset of 1, 2, or 3) then a 32-bit write would corrupt one or more bytes of data preceding the destination byte address. In this case, the doubleword currently surrounding the first address to be written is loaded into the fifo output register. When the first write occurs, one or more of the least-significant bytes come from this register, so no bytes corrupted in SP memory.
RUN_DEST (run the destination)
In this state the destination transfer is begun. The data is read from FIFO memory, and either a PCI transaction is started, or the data is written to SP memory. The transfer continues and the controller remains in this state until either the requested doubleword count has been satisfied, or the transfer reaches the end of a page, loop, or sample in host memory.
FIN_DEST (finish the destination)
The source portion of the transaction has finished, and the decision is made to branch to the appropriate end-of-transaction handler. This can be end of sample, loop, or page for scatter/gather transfers, or the completion of the requested number of doublewords.
WB_DEST (write back destination address)
When the destination portion of the DMA transaction completes, the destination address is written back to the SP requestor or host register. This state is skipped if the "WBD" (writeback destination) bit is not set in the first doubleword of the requestor.
DONE (set the 'done' bit)
In this state, the 'done' bit is set in the internal version of the 'count' register (first doubleword of the requestor). This bit is not set for DMA transfers from the host-resident scatter/gather page table, bit is set for all other transactions to indicate their completion.
UPDATE (update DMA state in requestor or host registers)
In this state the 'count' register is written back to the first doubleword of the SP requestor, or the host count register (HDCR). This doubleword contains updated state information for the current audio stream (PM, LS, SS fields) as well as a 'done' bit to indicate the transaction has completed.
SIGNAL (assert selected end-of-dma interrupts and virtual-channel signals)
Send a signal on the selected virtual channel according to the specified conditions (end-of-dma, loop wraparound, modulo buffer wraparound, etc.) and interrupt the host via the PCI interrupt signals. If a scatter/gather transaction, signal completion to the sample-AGU, and specify whether a page-table update is needed for this stream.
SAMP_END (end of scatter/gather sample)
The current DMA transfer has reached the end of the sample buffer.

TABLE 10A-continued

Set the SS state in an internal register (to be written back in UPDATE state) to indicate that the sample has finished.
LOOP_END0 (end of scatter/gather loop, load loop-begin address)
The current DMA transfer has reached the end of a scatter/gather loop, and
looping was enabled. Update the internal loop state (LS bits) and load the loop-begin address from the requestor so that the transaction may continue.
LOOP-END1 (clear sample-end state)
If the loop spans 2 or more pages, reset the sample-end state (in case we were on sample-end page) and branch back to the RUN_SRC or RUN_DEST states to continue the transfer at the loop-begin address.
PAGE_END0 (end of scatter/gather page, check for needed page-table entry)
DMA gas reached the end of a host page. If another page table entry is needed and is not available (indicated by PM field) then signal an error, otherwise proceed to the next state.
PAGE_END1 (load address for start of post-loop-begin page)
Load the starting address of the page after the loop-begin page from the DMA requestor in SP memory. This address is stored in the requestor because there is not time to load it when the loop-begin point occurs near the end of a page.
PAGE_END2 (load address for start of next page)
Load the starting address of the next page from the page-table entry stored in the SP requestor, as well as the sample-end/loop-end state info from the page-table entry.
PAGE_END3 (load loop-end/sample-end byte offsets)
The page-table entry just read from the DMA requestor has indicated that the transfer is on the sample-end or loop-end page, so load the loop-end and sample-end byte offsets from the DMA requestor. This allows the DMA controller to monitor for the approaching loop/sample end immediately by comparing the current host address to these values.
COUNT_END (scatter/gather: all requested doublewords have been transferred)
The entire scatter/gather DMA transaction has completed, since the requested doubleword count has been satisfied. Return to either the WB_SRC or WB_DEST states of writeback of the address is specified, or else return to the states following these states to finish either the source or destination portion of the DMA transaction.

TABLE 10B

Host CPU

| Abbr. | Name | Access type | Page offset | Purpose |
|-------|------|-------------|-------------|---------|
| DMSR | DMA Status Register | read only | 100h | Allows Host CPU to read current status of DMA controller |
| HSAR | Host Source Address Register | read/write | 110h | Allows Host CPU to define and initiate a DMA transaction. |
| HDAR | Host Destination Address Register | read/write | 114h | |
| HDMR | Host DMA Mode Register | read/write | 118h | |
| HDCR | Host DMA Control Register | read/write | 11Ch | |

TABLE 11

| SH in HDCR | Bits | Name | Description |
|------------|------|------|-------------|
| 1 (source is host) | [31:0] | Host source byte address | Source byte address in host memory for the transfer. See Section 3.3.1 on page 13 for further description of source addresses. |
| 0 (source is on-chip) | [31] | Error flag | Flag indicating an error in the requestor block. |
| | [30] | END flag | Flag indicating sample-end encountered in scatter/gather DMA (never set for host requests since the host cannot issue scatter/gather DMA requests). |

TABLE 11-continued

| SH in HDCR | Bits | Name | Description |
|------------|------|------|-------------|
| | [29:20] | reserved | |
| | [19:16] | Source Memory ID | Selects on-chip DSP memory for transfer. See Table 3 on page 14 for a description of the memory IDs. |
| | [15:0] | DSP source "byte" address | Source byte address in on-chip DSP memory. See Section 3.3.1 on page 13 for further description of source addresses. |

TABLE 12

| DH in HDCR | Bits | Name | Description |
|------------|------|------|-------------|
| 1 (dest. is host) | [31:0] | Host destination byte address | Destination byte address in host memory for the transfer. See Section 3.3.1 on page 13 for further description of destination addresses. |
| 0 (dest. is on-chip) | [31] | Error flag | Flag indicating an error in the requestor block. |
| | [30] | END flag | Flag indicating sample-end encountered in scatter/gather DMA (never set for host requests since the host cannot issue scatter/gather DMA requests). |
| | [29:29] | reserved | |
| | [19:16] | Destination Memory ID | Selects on-chip DSP memory for transfer. See Table 3 on page 14 for a description of the memory IDs. |
| | [15:0] | DSP destination "byte" address | Destination byte address in on-chip DSP memory. See Section 3.3.1 on page 13 for further description of destination addresses. |

TABLE 13

| Bits | Name | Description |
|------|------|-------------|
| [31:16] | reserved | |
| [15:12] | Audio Convert (AC) | Method of converting each word of audio data transferred. See Section 3.3.3 on page 16. |
| [11:10] | reserved | |
| [19:16] | Virtual channel Signalling Mode (VSM) | Specifies under which conditions to signal the specified virtual channel at end of transaction. See Section 3.3.4 on page 17. Since the host is the only processor that may be signalled by the DMA controller, this in not very useful for host-initiated DMA's |
| [7:6] | reserved for virtual channel # extension | |
| [5:0] | Virtual Channel # | Specifies which virtual channel to signal at the end of transaction, if the condition specified by VSM are met. |

TABLE 14

| Bits | Name | Description |
|------|------|-------------|
| [31] | Source is Host flag (SH) | Specifies whether the source is from the host or an on-chip DSP memory. See Section 3.3.1 on page 13. |
| [30:28] | Source Modulo Size (SMS) | Specifies the size of the buffer in source memory. See Section 3.3.2 on page 14. |
| [27] | Destination is Host flag (DH) | Specifies whether the destination is to the host or an on-chip DSP memory. See Section 3.3.1 on page 13. |
| [26:24] | Destination | Specifies the size of the buffer in destination |

TABLE 14-continued

| Bits | Name | Description |
|---|---|---|
| | Modulo Size (DMS) | memory. See Section 3.3.2 on page 14. |
| [23] | Writeback Source flag (wbS) | Specifies whether or not to writeback the source address to HSAR upon completion of the DMA. |
| [22] | Writeback Destination flag (wbD) | Specifies whether or not to writeback the destination address to HDAR upon completion of the DMA. |
| [21:16] | reserved for scatter/gather use | |
| [15] | Optimized access mode flag (OPT) | Specifies the desired memory access mode. See Section 3.3.6 on page 18. |
| [14] | Done flag (DONE) | Set upon completion of the DMA transaction (normally not used by the host since the host is interrupted upon DMA completion). |
| [13:12] | reserved for scatter/gather use | |
| [11:6] | reserved | |
| [5:0] | Doubleword Count − 1 | Number of 32-bit doublewords to transfer, minus one. The minimum transfer is 1 dword, and the maximum is 64 dwords. All DMA transactions must specify an integer number of doublewords. |

TABLE 15

| Bits | Name | Description |
|---|---|---|
| [31:4] | reserved | |
| [3] | Stream Running (SR) | 1: Stream processor transaction is currently running |
| [2] | Stream Pending (SP) | 1: Stream processor is requesting DMA transaction |
| [1] | HP Running (HR) | 1: Host CPU transaction is currently running |
| [0] | HP Pending (HP) | 1: Host CPU is requesting DMA transaction |

TABLE 16

| MID | Selected DSP Memory |
|---|---|
| 0000 | SP DMEM0 (parameter RAM) |
| 0001 | SP DMEM1 (sample RAM) |
| 0010 | SP PMEM (program RAM) |
| 0011 | SP DEBUG (access to SP debug regs.) |
| 1110 | OMNI MEM (special address range which writes to ALL writable memory blocks for testing) |
| others | reserved |

TABLE 17

| SMS or DMS | Modulo Buffer Size | SMS or DMS | Modulo Buffer Size |
|---|---|---|---|
| 000 | No modulo (linear addressing) | 100 | 128 dwords |
| 001 | 16 dwords | 101 | 256 dwords |
| 010 | 32 dwords | 110 | 512 dwords |
| 011 | 64 dwords | 111 | 1024 dwords |

TABLE 18

| Virtual Channel | Signal Receiver | Action taken by signal receiver |
|---|---|---|
| 0–15 | host | Set the corresponding bit in the HISR (interrupting the host, if not masked) |
| 16–47 | host | Set the corresponding bit in the host signal register array (HSR0). |
| 48–255 | — | Reserved for future interprocessor signaling |

TABLE 19

| VSM | Signal generated by DMA engine |
|---|---|
| 00 | Virtual channel signaling is disabled for modulo buffers (scatter/gather signals, if specified, are still sent) |
| 01 | Signal the specified virtual channel upon completion of every DMA transaction |
| 10 | If the source modulo buffer crosses the mid-point or wrap-around point, signal the specified virtual channel upon completion of the DMA transfer in which the event occurred. |
| 11 | If the destination modulo buffer crosses the mid-point or wrap-around point, signal the specified virtual channel upon completion of the DMA transfer in which the event occurred. |

TABLE 20

| PM | Description |
|---|---|
| 00 (initial value) | No page-map entry read is pending |
| 01 | Normal, next page-map entry read is pending (offset is found in the current page-map entry and NV is guaranteed to be valid) |
| 10 | reserved |
| 11 | Next page-map entry after post-loop-begin page is pending (offset is found in the word 8 of the generic 32-bit requestor) |

TABLE 21

| LS | Description |
|---|---|
| 00 (initial value, if not starting on loop-end page) | Current page does not contain the loop-end or we have passed the loop-end offset and looping was disabled. |
| 01 (initial value, if starting on loop-end page) | Current page contains the loop-end, but the current offset on the page has not yet reached the loop-end. |
| 10 | Current page is the loop-begin page and loop spans exactly 2 pages. |
| 11 | Current page is the loop-begin page and loop spans more than 2 pages. |

TABLE 22

| SS | Description |
|---|---|
| 00 (initial value, if not starting on sample-end page) | Current page ends at the last byte of page (i.e. 0xFFF). |
| 01 (initial value, if starting on sample-end page) | Current page contains the sample-end, but the current offset on the page has not yet reached the sample-end. |
| 10 | DMA detected an error in DMA requestor or page-map |

TABLE 22-continued

| SS | Description |
|---|---|
|  | entry was needed, but had not been read. |
| 11 | Reached sample-end, DMA stopped. |

TABLE 23

| LF | Description |
|---|---|
| 00 (initial value, if sample not looped) | Looping disabled for this sample stream (LF may be dynamically cleared to 00 to stop looping and play release portion of sample, if any) |
| 01 | Looping enabled; loop is contained in 1 page |
| 10 | Looping enabled; loop is spread across 2 pages |
| 11 | Looping enabled; loop is spread across at least 3 pages |

TABLE 24

| SE | Description |
|---|---|
| 0 | Sample data runs from the specified beginning byte offset to the end of the 4096-byte page (i.e. sample-end is not on this page) |
| 1 | Sample data runs from the specified beginning byte offset through the specified sample-end byte offset. This entry maps the last sample in the stream. |

TABLE 25A

| Name | Description | Type | Count |
|---|---|---|---|
| AD[31:0] | Address/Data Bus | IO | 32 |
| C_BE[3:0]# | Command Type/Byte Enables | IO | 4 |
| PAR | Parity | IO | 1 |
| FRAME# | Cycle Frame | IO | 1 |
| IRDY# | Initiator Ready | IO | 1 |
| TRDY# | Target Ready | IO | 1 |
| STOP# | Transaction Stop | IO | 1 |
| IDSEL | Initialize Device Select | IN | 1 |
| DEVSEL# | Device Select | IO | 1 |
| PCI_REQ# | Master Request | OUT | 1 |
| PCI_GNT# | Master Grant | IN | 1 |
| PERR# | Parity Error | IO | 1 |
| SERR# | System Error | OD | 1 |
| INTA# | Host Interrupt A | OD | 1 |
| PCI_CLK | PCI Bus Clock | CLK | 1 |
| RST# | PCI Device Reset | IN | 1 |
| VDD5REF | Clean 5 V for Pseudo Supply | Power | 1 |
| PCIVDD[7:0] | PCI Driver Power | Power | 8 |
| PCIGND[7:0] | PCI Driver Ground | Ground | 8 |

TABLE 25B

| Name | Description | Type | Count |
|---|---|---|---|
| TEST# | Test Mode Strap | IN wPU | 1 |
| EEDAT/GPIO2 | EEPROM Data/GP IO 2 | IO, OD | 1 |
| EECLK/GPOUT | EEPROM Clock/GP Output | OUT | 1 |
| SDIN2/GPIO | Auxiliary Serial Data Input/GP IO | IO | 1 |
| VOLUP/XTALI | Volume Up Button/Crystal Input | IN/Analog | 1 |
| VOLDN/XTALO | Volume Down Button/Crystal Output | IN/Analog | 1 |

TABLE 25C

| Name | Description | Type | Count |
|---|---|---|---|
| CRYVDD | Crystal/PLL Power | Power | 1 |
| CRYGND | Crystal/PLL Ground | Ground | 1 |
| J[A:B]C[X:Y] | Joystick Coordinate Inputs | Analog IN | 4 |
| JAB1/SDOUT2 | Joystick A Button 1/Serial Data Output 2 | IO | 1 |
| JAB2/SDOUT3 | Joystick A Button 2/Serial Data Output 3 | IO | 1 |
| JBB1/LRCLK | Joystick B Button 1/Alternate Framing Clock | IO | 1 |
| JBB2/MCLK | Joystick B Button 2/Master Clock Out | IO | 1 |
| MIDIIN | MIDI Input Port | IN | 1 |
| MIDIOUT | MIDI Output Port | OUT | 1 |
| CVDD[4:0] | Core Power | Power | 5 |
| CGND[4:0] | Core Ground | Ground | 5 |
| BOND[1:3] | Bonding Options 1,2,3 | Bond Option | 3 |

TABLE 25D

| Name | Description | Type | Count |
|---|---|---|---|
| ABITCLK/SCLK | AC97 Bit Rate Clock/Serial Audio Data Clock | IO | 1 |
| ASYNC/FSYNC | AC97 Frame Sync/Serial Audio Out Framing | IO | 1 |
| ASDOUT/SDOUT | AC97 Data Out/Serial Audio Out Data | OUT | 1 |
| ASDIN/SDIn | AC97 Data In/Serial Audio In Data | IN | 1 |
| ARST# | AC97 Reset Pin | OUT | 1 |

TABLE 26

| Pin Name | Direction | Functional Description |
|---|---|---|
| SCLK | Input | Main timing driver for link, both edges used internally for timing. Also functions as the source to the PLL for internal clock generation. |
| FSYNC | Input | Framing signal for Brahms link, high time indicates left channel data and low time indicates right channel data. Frame should be sampled on the falling edge of the SCLK Input. |
| SDOUT | Output | Primary output port serial data pin. This data is the output stream going to the digital mixer. The serial data on this pin should transition off of the rising edge of the SCLK input. |
| SDIN | Input | Primary input port serial data pin. This data contains both ADC data and the final digital mix output data. The serial data on this pin should be sampled on the falling edge of the SCLK input. |

TABLE 27

| Pin Name | Direction | Functional Description |
|---|---|---|
| SCLK | Input | Main timing driver for link, both edges used internally for timing. Also functions as the source to the PLL for internal clock generation. |
| FSYNC | Input | Framing signal for link, high time indicates left channel data and low time indicates right channel data. Frame should be sampled on the falling edge of the SCLK input. |
| SDOUT | Output | Primary output port serial data pin. This data is in the output stream going to the digital mixer. The serial data on this pin should transition off of the rising edge of the SCLK input. |
| SDIN | Input | Primary input port serial data pin. This data contains both ADC data and the final digital mix |

TABLE 27-continued

| Pin Name | Direction | Functional Description |
|---|---|---|
| | | output data. The serial data on this pin should be sampled on the falling edge of the SCLK input. |
| LRCLK | Output | Framing signal for external DACs, high time indicates left channel data and low time indicates right channel data. This pin should transition off of the falling edge of the SCLK input. |
| SDO2, SDO3 | Output | Second and third output port serial data pins. These output streams are the expanded output channels beyond the left/right pair. The serial data on these pins should transition off of the falling edge of the SCLK input. Note that this is a DIFFERENT edge than the one for the SDOUT pin. |

TABLE 28

Bit Descriptions:

MSPE  Master Serial Port Enable: this bit is the master enable/disable for all serial port functions. Normally this bit will only be set after all the other serial port configuration registers are initialized.
0 = All serial ports disabled (reset default)
1 = Serial ports enabled as specified in their individual SERC registers (see below)

PTC2–0  Port Timing Configuration: this 3 bit field specifies the timing configuration of the serial ports. Timing configuration includes bit clock source, BITCLK/SYNC pin directions, BITCLK/SYNC timing relationship, SYNC signal format, and framing control.
000 = Configurations A&B: link mode, SCLK in, FSYNC in (reset default)
001 = Configuration C: AC97 link mode, BITCLK in, ASYNC out
010 = Configuration D: DAC timing master mode, SCLK out, FSYNC out
011 = Reserved.
100 = Reserved.
101 = Reserved.
110 = Reserved.
111 = Reserved.

TABLE 29

LROE  LRCLK Output Enable: this bit is the master enable/disable for the LRCLK output function of the JBB1/LRCLK multiple function pin.
0 = JBB1/LRCLK pin in input mode, JBB1 function (reset default)
1 = JBB1/LRCLK pin in output mode, LRCLK output function.

MCOE  MCLK Output Enable: this bit is the master enable/disable for the MCLK output function of the JBB2/MCLK multiple function pin.
0 = JBB2/MCLK pin in input mode, JBB2 function (reset default)
1 = JBB2/MCLK pin in output mode, MCLK output function.

MCDIV  MCLK Divisor: this bit selects the MCLK output frequency.
0 = 256 $F_S$ (reset default)
1 = 128 $F_S$

TABLE 30

Bit Descriptions:

SO1EN  Serial Output 1 Enable.
0 = Port Disabled, no shifts or FIFO activity, SDOUT locked low (reset default)
1 = Port Enabled

TABLE 30-continued

Bit Descriptions:

SO1F2–0  Serial Output 1 Format: this 3 bit field specifies the output data format for this port. See corresponding configuration sections for data format details.
000 = digital mix input format (reset default)
001 = AC97 format
010 = 433X DAC format
011 = Digital audio (SP/DIF) transmitter format (same as 433X?).
100 = Reserved.
101 = Reserved.
110 = Reserved.
111 = Reserved.

TABLE 31

Bit Descriptions:

SI1EN  Serial Input 1 Enable.
0 = Port Disabled, no shifts or FIFO fill activity, SDIN ignored (reset default)
1 = Port Enabled SI1F2–0  Serial Input 1 Format: this 3 bit field specifies the input data format for this port. See corresponding configuration sections for data format details.
000 = digital output format (reset default)
001 = AC97 format
010 = 533X ADC format
011 = Digital audio (SP/DIF) receiver format
100 = Reserved.
101 = Reserved.
110 = Reserved.
111 = Reserved.

TABLE 32A

Bit Descriptions:

SO2EN  Serial Output 2 Enable.
0 = Port Disabled, no shifts or FIFO activity, pin function set to JAB1 (reset default)
1 = Port Enabled, pin function set to SDOUT2.

SO2F1–0  Serial Output 2 Format: this 2 bit field specifies the output data format for this port. See corresponding configuration sections for data format details.
00 = 433XDAC format (reset default)
01 = Digital audio (SP/DIF) transmitter format (same as 433X?).
10 = Reserved
11 = Reserved

TABLE 32B

Bit Descriptions:

SO3EN  Serial Output 3 Enable.
0 = Port Disabled, no shifts or FIFO activity, pin function set to JAB2 (reset default)
1 = Port Enabled, pin function set to SDOUT3.

SO3F1–0  Serial Output 3 Format: this 2 bit field specifies the output data format for this port. See corresponding configuration sections for data format details.
00 = 433X DAC format (reset default)
01 = Digital audio (SP/DIF) transmitter format (same as 433X?).
10 = Reserved
11 = Reserved

TABLE 33

Bit Descriptions:

| | |
|---|---|
| SI2EN | Serial Input 2 Enable.<br>0 = Port Disabled, no shifts or FIFO fill activity, pin function GPIO (reset default)<br>1 = Port Enabled, pin function SDIN2 |
| SI2F1–0 | Serial Input 2 Format: this 2 bit field specifies the input data format for this port. See corresponding configuration sections for data format details.<br>00 = 533X ADC format (reset default)<br>01 = Digital audio (SP/DIF) receiver format (same as 533X?).<br>10 = Reserved<br>11 = Reserved |

TABLE 34

Bit Descriptions

| | |
|---|---|
| DIN/EEN | This bit is used to read back Data from the EEPROM and to enable the DOUT and CLK bits onto the Clyde pins. When DIN/EEN is set to a one the DOUT and CLK bits will be enabled onto the EEDAT and EECLK pins. |
| DOUT | When DIN/EEN is set to a one by the host, the EEDAT pin follows the state of this register bit. |
| CLK | When DIN/EEN is set to a one by the host, the EECLK pin follows the state of this register bit. |
| Usage: | Clyde provides a two wire serial interface that is directly controlled by two register bits. The timing of the two bits is controlled by the host software. One bit is used as a clock (CLK) while the other is used as a Data Output (DOUT) bit to the EEPROM device. |

TABLE 35

| Byte Offset | Field Description | Configuration Location | Notes |
|---|---|---|---|
| 0 | Header/Version: Constant 55h | N/A | Abort if ◊ 55h |
| 1 | Primary Subsystem Vendor ID Low Byte | Offset 2Ch | |
| 2 | Primary Subsystem Vendor ID High Byte | Offset 2Dh | |
| 3 | Primary Subsystem ID Low Byte | Offset 2Eh | |
| 4 | Primary Subsystem ID High Byte | Offset 2Fh | |
| 5 | Configuration Byte 1 for CFL1 Register | N/A | Contents defined by driver |
| 6 | Configuration Byte 2 for CFL2 Register | N/A | Contents defined by driver |

TABLE 36

Bit Descriptions:

| | |
|---|---|
| OSCS | Oscillator Pin Select: this bit selects the pin function for the VOLUP/XTALI and VOLDN/XTALO pins (can also be viewed as the output enable for the XTALO driver).<br>0 = VOLUP and VOLDN (reset default)<br>1 = XTALI and XTALO |
| OSCP | Oscillator Power Up: this bit is the master enable/disable for the integrated crystal oscillator. Note that "powering up" the oscillator requires a certain stabilization delay before operating the device.<br>0 = Power down oscillator (reset default)<br>1 = Oscillator running |
| PLLSS[1:0] | PLL Source Select: this field selects the clock source for the pre-divider and the PLL.<br>00 = Serial Port Bit Clock: for Brahms link and AC97 configurations (reset default)<br>01 = Crystal Oscillator Output: for stand-alone/wavetable header upgrades<br>10 = PCI Bus Clock: for debug and development only<br>11 = Reserved |
| PLLP | PLL Power UP: this bit is the master enable/disable for the PLL. Note that "powering up" the PLL requires a certain stabilization delay before operating the device.<br>0 = Stop PLL (reset default)<br>1 = PLL running |
| SWCE | Software Clock Enable: this bit is the master enable/disable for the DMA, RAM, and SP clocks. Clearing this bit without clearing PLLP and OSCP allows a reduced power state without the start-up latency of stopping the crystal oscillator or PLL.<br>0 = Device clocks stopped (reset default)<br>1 = Device clocks enable |
| PLLOS | PLL Output Select: this bit selects the clock fed to the SP core and DMA/RAM blocks.<br>0 = Normal PLL output (reset default)<br>1 = PCI Clock (for debut/development only) |

TABLE 37

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | | | | | PDIVS3 | PDIVS2 | PDIVS1 | PDIVS0 |

TABLE 38

| 31 | 30 | 29 | 28 | 27 | 26 | 25 | 24 | 23 | 22 | 21 | 20 | 19 | 18 | 17 | 16 |
|----|----|----|----|----|----|----|----|----|----|----|----|----|----|----|----|
|    |    |    |    |    |    |    |    |    |    |    |    |    |    |    |    |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
|    |    |    |    |    |    |   |   | PLLM7 | PLLM6 | PLLM5 | PLLM4 | PLLM3 | PLLM2 | PLLM1 | PLLM0 |

TABLE 39

Bit Descriptions:

| | |
|---|---|
| FAB[2:0] | This bit field reports the fab used for this device.<br>000 = Clyde initial fab<br>All other encodings = Reserved |
| CFOP[2:0] | These three bits return the detected status of the BOND1 (mapped to CFOP0 bit), BOND2 (mapped to CFOP1), and BOND3 (mapped to CFOP2) bonding option pads. This allows indication of 8 different configurations (possibly for indication of licensed algorithm) by the connection options for the three bond wires. Per pad, the returned values will be:<br>0 = pad is grounded by presence of bond wire to adjacent pin ground<br>1 = pad is high due to presence of bond wire to adjacent pin VDD |

TABLE 40

Bit Descriptions:

| | |
|---|---|
| CB0[7:0] | This bit field returns the first configuration byte. |

TABLE 41

Bit Descriptions:

| | |
|---|---|
| CB1[7:0] | This bit field returns the second configuration byte. |

TABLE 42

| Virtual Channel | Signal Receiver | Action taken by signal receiver |
|---|---|---|
| 0–15 | host | Set the corresponding bit in the HISR (interrupting the host, if not masked). |
| 16–47 | host | Set the corresponding bit in the host signal register array (HSR0). |
| 48–255 | — | Reserved for future interprocessor signaling |

TABLE 43

Bit Descriptions:
| | |
|---|---|
| INTENA | Current state of internal interrupt enable bit. First read after interrupt will show INTENA = 1 (not cleared until end of/after read). Subsequent reads of HISR will show INTENA = 0 until EOI issued. |
| H0P | Indicate presence of active bits in HSR0. A host interrupt service routine can determine, with a single read of HISR, if any or none of the virtual channels need service. |
| FROVR | SP double frame overrun interrupt. |
| DMAI | DMA interrupt signaling completion of Host initiated DMA transfer. |
| INT1, INT0 | SP general purpose interrupts 0 and 1. |
| VC15–VC0 | Virtual Channel 15–0 signal indicators. These are the "interrupt immediately" channels. |

Functional Description:
* All interrupt source bits are cleared at hardware reset (VC15–VC0, DMAI, FROVR, INT1, INT0).
* Vc(n) bit is set upon receiving a channel signal from the DNA controller.
* DMAI, INT1, INT0, and FROVR bits are set from their respective sources.
* If any interrupt source bit is set and interrupts are enabled, the host interrupt line will be asserted.
Host read of HISR clears all source bits and disables interrupts (sets INTENA to 0) after the read completes.

Note: Only VC15–VC0, DMAI, INT1, INT0, and FROVR are considered source bits (which get cleared upon a read of the register). INTENA and HOP are pure status bits with no side effects on

TABLE 44

Functional Description:
* All VC(n) bits are cleared at hardware reset
* VC(n) bit is set (latched) upon receiving a channel signal from the DMA controller
* Host read of HSR0 clears all set bits in HSR0, and also clears H0P bit in H0P bit in HISR register.
* H0P bit is set when any bit in HSR0 is set.

TABLE 45

Definition: The Host Interrupt Control register provides a host write port for EOI and discrete masking of interrupts. Also, it provides a read port for INTENA status.
Bit Descriptions:
CHGM         INTENA Change Mask: This bit, if set to 1 on a write, enables the writing of the IEV bit into INTENA. If CHGM=0, then INTENA is unaffected. On a host read this bit always returns a zero.
IEV         INTENA Value: On a wtite, this bit contains the new value of INTENA to be stored if CHGM=1. On a host read this bit contains the current state of INTENA.
Usage Descriptions
*   EOI command will be a write of 00000003 to HICR,
*   Interrupt disable command (clear of INTENA) will be a 00000002 write to HICR.
*   Read of current value of INTENA (without side effects) will be the value in bit 0 from a read of HICR.

TABLE 46

Bit Descriptions:
C1RS       Counter 1 Run/Stop: this bit is the master enable for counter 1. Transitions of this bit trigger
counter operations as shown:
0 = Counter Stopped (reset default)
0 to 1 Transition: Counter resets (to 0) and starts counting as specified by C1EV and C1SS.
1 = Counter Running
1 to 0 Transition: Counter stops, transfers count to value register (PFCV1).
C1EV       Counter 1 Event/Clocks: this bit controls the type of counting done by Counter 1
0 = Count clocks during event (reset default)
1 = Count events only
C1SS[4:0]  Counter 1 Source Select: this field specifies the count source as shown in the source select table below.
C2RS       Counter 2 Run/Stop: this bit is the master enable for counter 2. Transitions of this bit trigger
counter operations as shown:
0 = Counter Stopped (reset default)
0 to 1 Transition: Counter resets (to 0) and starts counting as specified by C2EV and C2SS.
1 = Counter Running
1 to 0 Transition: Counter stops, transfers count to value register (PPCV2).
C2EV       Counter 2 Event/Clocks: this bit controls the type of counting done by Counter 2
0 = Count clocks during event (reset default)
1 = Count events only
C2SS[4:0]  Counter 2 Source Select: this field specifies the count source in the source select table below.

TABLE 47

Bit Descriptions:
    PC1V[31:0] Performance Counter 1 Value: this field returns the count results for counter 1 when the counter is stopped.

TABLE 48

Bit Descriptions:
    PC2V[31:0] Performance Counter 2 Value: this field returns the count results for counter 2 when the counter is stopped.

TABLE 49

| CxSS[4:0] | Events | Description |
|---|---|---|
| 00000 | Bus grant | Assertion of GNT |
| 00001 | Req followed by Grant | Assertion of GNT after assertion of REQ |
| 00010 | Transaction | Assertion of FRAME to deassertion of last IRDY |
| 00011 | Dword transfer | IRDY and TRDY asserted |
| 00100 | Slave Read | Slave hit and read |
| 00101 | Slave Write | Slave hit and write |
| 00110 | Preemption | GNT deasserted and latency timer expired during transaction |
| 00111 | Disconnect/Retry | STOP asserted when FRAME is low |
| 01000 | Interrupt | Assertion of INTA |
| 01001 | Bus Ownership | REQ, GNT asserted to FRAME, IRDY deasserted |
| 01010 | Transaction Lag | Deassertion of FRAME to assertion of next FRAME |
| 01011 | PCI Clock | Increment counter on pci clock |
| 01100 | Serial Clock | Increment counter on serial clock bit rate source |
| 01101 | SP Clock | Increment counter on SP clock (pre-SWCE control) |

TABLE 50

| Monitored feature | C1EV & C1SS | C2EV & C2SS |
|---|---|---|
| Average request to grant | 100001 | 000001 |
| Bus Ownership rate (#gnts/sec) | 100000 | 101100 |
| PCI clocks per transaction | 100010 | 000010 |
| Dword transfers per transaction | 100011 | 100010 |
| Dword transfer rate (dwords/sec) | 100011 | 101100 |
| Slave read rate | 100100 | 101100 |
| Slave write rate | 100101 | 101100 |
| PCI clock rate | 101100 | N/A |
| Preemption rate | 101100 | 100010 |
| Disconnect/Retry rate | 100111 | 100010 |
| PLL lock indicator (SP clocks vs. Serial clocks) | 101100 | 101101 |
| Interrupt rate | 101000 | 101100 |
| Lag between 2 master transactions | 101010 | 001100 |

TABLE 51

| Initiator | Target | Type | PCI Dir |
|---|---|---|---|
| Host | Registers (BA0) | Mem Write | In |
| Host | Registers (BA0) | Mem Read | Out |
| Host | Memories (BA1) | Mem Write | In |
| Host | Memories (BA1) | Mem Read | Out |
| Host | Config Space 1 | Config Write | In |
| Host | Config Space 1 | Config Read | Out |
| DMA | Host System | Mem Write | Out |
| DMA | Host System | Mem Read | In |

TABLE 52

| Byte 3 | Byte 2 | Byte 1 | Byte 0 | Offset |
|---|---|---|---|---|
| Device ID: R/O, | | Vendor ID: R/O, | | 00h |
| Status Register, bits 15–0:<br>Bit 15 Detected Parity Error: Error Bit<br>Bit 14 Signalled SERR: Error Bit<br>Bit 13 Received Master Abort Error Bit<br>Bit 12 Received Target Abort Error Bit<br>Bit 11 Signalled Target Abort: Error Bit<br>Bit 10-9 DEVSEL Timing: R/O, 01b (medium)<br>Bit 8 Data Parity Error Detected: Error Bit<br>Bit 7 Fast Back to Back Capable: R/O 0<br>Bit 6-0UDF, 66 MHz, Reserved: R/O 00000000<br>Reset Status State: 0200h<br>Write of 1 to any error bit position clears it. | | Command Register, bits 15–0:<br>Bit 15–10: Reserved, R/O 0<br>Bit 9 Fast B2B Enable: R/O 0<br>Bit 8 SERR Enable: R/W, default 0<br>Bit 7 Wait Control: R/O 0<br>Bit 6 Parity Error Response: R/W, default 0<br>Bit 5 VGA Palette Snoop: R/O 0<br>Bit 4 MWI Enable: R/O 0<br>Bit 3 Special Cycles: R/O 0<br>Bit 2 Bus Master Enable: R/W, default 0<br>Bit 1 Memory Space Enable: R/W, default 0<br>Bit 0 IO Space Enable: R/O 0 | | 04h |
| Class Code: R/O 040100h (Note: change from 80h)<br>Class 04h multimedia device), Sub-class 01h (audio), Interface 00h | | | Revision ID:<br>R/O 01h | 08h |
| BIST: R/O 0 | Header Type:<br>Bit 7: R/O 0<br>Bit 6–0: R/O 0 (type 0) | Latency Timer:<br>Bit 7–3: R/W, default 0<br>Bit 2–0: R/O 0 | Cache Line Size:<br>R/O 0 | 0Ch |
| Base Address Register 0<br>Device Control Register space, memory mapped. 4KB size<br>Bit 31–12: R/W, default 0. Compare address for register space accesses<br>Bit 11–4: R/O 0, specifies 4KB size<br>Bit 3: R/O 0, Not Prefetchable (Cacheable)<br>Bit 2–1: R/O 00, Location Type 0 Anywhere in 32 bit address space<br>Bit 0: R/O 0, Memory space indicator | | | | 10h |
| Base Address Register 1<br>Device Memory Array mapped into host system memory space, 1MB size<br>Bit 31–20: R/W, default 0. Compare address for memory array accesses<br>Bit 19–4: R/O 0, specifies 1MB size<br>Bit 3: R/O 0, Not Prefetchable (Cacheable) | | | | 14h |

TABLE 52-continued

| Byte 3 | Byte 2 | Byte 1 | Byte 0 | Offset |
|---|---|---|---|---|
| Bit 2–1: R/O 00, Location Type - Anywhere in 32 bit address space | | | | |
| Bit 0: R/O 0, Memory space indicator | | | | |
| Base Address Register 2: R/O 00000000h, Unused | | | | 18h |
| Base Address Register 3: R/O 00000000h, Unused | | | | 1Ch |
| Base Address Register 4: R/O 00000000h, Unused | | | | 20h |
| Base Address Register 5: R/O 00000000h, Unused | | | | 24h |
| Cardbus CIS Pointer: R/O 00000000h, Unused | | | | 28h |
| Subsystem ID | | Subsystem Vendor ID | | 2Ch |
| R/O 0000h if EXTEE not present, otherwise R/W, loaded from EEPROM (offsets 07,06) | | R/O 0000h if EXTEE not present, otherwise R/W, loaded from EEPROM (offsets 05,04) | | |
| Expansion ROM Base Address: R/O 00000000h, Unused | | | | 30h |
| Reserved: R/O 00000000h | | | | 34h |
| Reserved: R/O 00000000h | | | | 38h |
| Max_Lat: R/O 18h  Min_Gnt: R/O 04h | | Interrupt Pin: | Interrupt Line: | 3Ch |
| 24 × 0.25 uS = 6 uS  4 × 0.25 uS = 1 uS | | R/O 01h, INTA used | R/W, default 0 | |

TABLE 53

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | | | OREN | RSTSP | DRQEN | Res. | TICK | RUNFR | STPFR | RUN |

TABLE 54

| 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|
| | | | | | | | | | | | | | | | |

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | TRAP | RGBK2 | RGBK1 | RGBK0 | DEBUG | REGID6 | REGID5 | REGID4 | REGID3 | REGID2 | REGID1 | REGID0 |

TABLE 55

| REGID[6:0] Exact Representation | REGID for access | Contents of F1S[15:0] |
|---|---|---|
| 0010000b | 10h | R0[15:0] |
| 0010001b | 11h | R1[15:0] |
| 0010010b | 12h | R2[15:0] |
| 0010011b | 13h | R3[15:0] |
| 0010100b | 14h | R4[15:0] |
| 0010101b | 15h | R5[15:0] |
| 0010110b | 16h | R6[15:0] |
| 0010111b | 17h | R7[15:0] |
| 0011000b | 18h | R8[15:0] |
| 0011001b | 19h | R9[15:0] |
| 0011010b | 1Ah | RA[15:0] |
| 0011011b | 1Bh | RB[15:0] |
| 0011100b | 1Ch | RC[15:0] |
| 0011101b | 1Dh | RD[15:0] |
| 0011110b | 1Eh | RE[15:0] |
| 0011111b | 1Fh | RF[15:0] |
| 0100XXXb | 20h | RA Bus [15:0] |
| 0111XXXb | 38h | RA Bus [31:16] |
| 1010XXXb | 50h | YBus [15:0] (AGU must be driving) |
| 1011XXXb | 58h | YBus [31:16] (AGU must be driving) |

TABLE 56

| REGID[6:0] Exact Representation | REGID for access | Contents of F1S[15:0] |
|---|---|---|
| XXX0000b | 00h | Instruction Trap Register T0[15:0] |
| XXX0001b | 01h | Instruction Trap Register T1[15:0] |
| XXX0010b | 02h | Instruction Trap Register T2[15:0] |
| XXX0011b | 03h | Instruction Trap Register T3[15:0] |
| XXX0100b | 04h | Instruction Trap Register T4[15:0] |
| XXX0101b | 05h | Instruction Trap Register T5[15:0] |
| XXX0110b | 06h | Instruction Trap Register T6[15:0] |
| XXX0111b | 07h | Instruction Trap Register T7[15:0] |
| XXX1111b | 0Fh | Top of Stack[15:0] |

TABLE 57

| REGID[6:0] Exact Representation | REGID for access | Contents of F1S[15:0] |
|---|---|---|
| XX00000b | 00h | rsa0[15:0] |
| XX00001b | 01h | rsa0[31:16] |
| XX00010b | 02h | rsa1[15:0] |
| XX00011b | 03h | rsa1[31:16] |
| XX00100b | 04h | rsa2 |
| XX00101b | 05h | rsa3 |

TABLE 57-continued

| REGID[6:0] Exact Representation | REGID for access | Contents of F1S[15:0] |
|---|---|---|
| XX00110b | 06h | rsi0[15:0] |
| XX00111b | 07h | rsi0[31:16] |
| XX01000b | 08h | rsi1 |
| XX01001b | 09h | rsi2 |
| XX01010b | 0Ah | sAGUstatus (upper 8 bits are 0's) |
| XX01011b | 0Bh | rsConfig01[15:0] |
| XX01100b | 0Ch | rsConfig01[31:16] |
| XX01101b | 0Dh | rsConfig23[15:0] |
| XX01110b | 0Eh | rsConfig23[31:16] |
| XX01111b | 0Fh | rsDMA01e |
| XX10000b | 10h | rsDMA23e |
| XX10001b | 11h | rsd0[15:0] |
| XX10010b | 12h | rsd0[31:16] |
| XX10011b | 13h | rsd1[15:0] |
| XX10100b | 14h | rsd1[31:16] |
| XX10101b | 15h | rsd2[15:0] |
| XX10110b | 16h | rsd2[31:16] |
| XX10111b | 17h | rsd3[15:0] |
| XX11000b | 18h | rsd3[31:16] |
| XX11010b | 1Ah | Selected requester array row [31:16] |
| XX11011b | 1Bh | Selected requester array row [15:0] |
| XX11100b | 1Ch | DMA requester array state machine (in bits [4:0]) |
| XX11101b | 1Dh | Current stream pointer information: Bit 8: Fore/Back (0 = fore, 1 = back) Bits 7–0: Stream Pointer |
| XX11110b | 1Eh | Next stream pointer information Bit 8: Fore/Back (0 = fore, 1 = back) Bits 7–0: Stream Pointer |

TABLE 58

| REGID[6:0] Exact Representation | REGID for access | Contents of F1S[15:0] |
|---|---|---|
| XXX0000b | 00h | CPU Status Register[15:0] Bit 15:SM Bits 14:8 Reserved Bit 7: TS Bit 6: TB Bit 5: LT Bit 4: C Bit 3: EX Bit 2: OV Bit 1: N Bit 0: Z |
| XXX0001b | 01h | CPU MAC Mode Register[15:0] Bit 15: sAGUroute[1] Bit 14: sAGUroute[0] Bit 13: pAGUroute[1] Bit 12: pAGUroute[0] Bit 11: pAGUsize20b Bit 10: yr32 Bit 9: MACunitEnab[1] Bit 8: MACunitEnab[0] Bits 7–0: Reserved |
| XXX0010b | 02h | Stack Pointer/Repeat Register[15:0] Bit 15: Interrupt disable previous Bit 14: Interrupt disable current Bit 13: In For Loop Bits 12:5 Repeat Count[7:0] Bit 4 Reserved, reads '0' Bit 3:0 Stack Pointer |
| XXX0100b | 04h | rci0 (Index 0) |
| XXX0101b | 05h | rci1 (Index 1) |

TABLE 59

| REGID[6:0] Exact Representation | REGID for access | Contents of F1S[15:0] |
|---|---|---|
| 0000000b | 00h | MAC 0 ACC0[15:0] (low word portion) |
| 0000001b | 01h | MAC 0 ACC1[15:0] (low word portion) |
| 0000010b | 02h | MAC 0 ACC2[15:0] (low word portion) |
| 0000011b | 03h | MAC 0 ACC3[15:0] (low word portion) |
| 0000100b | 04h | MAC 1 ACC0[15:0] (low word portion) |
| 0000101b | 05h | MAC 1 ACC1[15:0] (low word portion) |
| 0000110b | 06h | MAC 1 ACC2[15:0] (low word portion) |
| 0000111b | 07h | MAC 1 ACC3[15:0] (low word portion) |
| 0001000b | 08h | MAC 0 ACC0[31:16] (middle word portion) |
| 0001001b | 09h | MAC 0 ACC1[31:16] (middle word portion) |
| 0001010b | 0Ah | MAC 0 ACC2[31:16] (middle word portion) |
| 0001011b | 0Bh | MAC 0 ACC3[31:16] (middle word portion) |
| 0001100b | 0Ch | MAC 1 ACC0[31:16] (middle word portion) |
| 0001101b | 0Dh | MAC 1 ACC1[31:16] (middle word portion) |
| 0001110b | 0Eh | MAC 1 ACC2[31:16] (middle word portion) |
| 0001111b | 0Fh | MAC 1 ACC3[31:16] (middle word portion) |
| 0010000b | 10h | MAC 0 ACC0[39:32] |
| 0010001b | 11h | MAC 0 ACC1[39:32] |
| 0010010b | 12h | MAC 0 ACC2[39:32] |
| 0010011b | 13h | MAC 0 ACC3[39:32] |
| 0010100b | 14h | MAC 1 ACC0[39:32] |
| 0010101b | 15h | MAC 1 ACC1[39:32] |
| 0010110b | 16h | MAC 1 ACC2[39:32] |
| 0010111b | 17h | MAC 1 ACC3[39:32] |
| 0100XXXb | 20h | Rshout(15:0] |
| 0101XXXb | 28h | Rshout[31:16] |
| 0110XXXb | 30h | Rshout[39:32] |

TABLE 59A

| REGID[6:0] Exact Representation | REGID for access | Contents of F1S[15:0] |
|---|---|---|
| RRRRCCCb | 00h–5Ch | Stream N State[3:0] in F1S[3:0], Stream N+1 State[3:0] in F1S[7:4], Stream N+2 State[3:0] in F1S[11:8], Stream N+3 State[3:0] in F1S[15:12], with "N" ranging from 0 to 92, addressed by row (RRRR in REGID) and column (CCC in REGID) starting with Streams 0,1,2, & 3 in location [0,0] and ending with Streams 92,93,94, & 95 in [11,4]. Row numbers range from 0000b to 1011b (0 to 11). Column numbers can be 000b or 100b (0 or 4). Four 4-bit entries are returned for each row, column address, so valid column numbers are 0 and 4. Stream State [3:0] is defined as follows: Bit 3 - Request Pending Bit 2 - Priority[1] Bit 1 - Priority[0] Bit 0 - Background Request Note that software can ignore the row, column addressing model and just treat the REGID as a binary number for the channel number with valid channel numbers every 4 channels (0,4,8,12, etc.) |
| Bit Descriptions | | |
| DRS[3:0] | | DMA Requestor State: This 4 bit field, when written, sets the state of a given stream's DMA requestor, with the stream number specified by row and column in REGID contents according to the table below. DRS[3:0] is defined as follows: Bit 3 - Request Pending Bit 2 - Priority[1] Bit 1 - Priority[0] Bit 0 - Background Request |

TABLE 63

| REGID[6:0] Exact Representation | REGID for access | Contents of F1S[15:0] |
|---|---|---|
| XXXX000b | 00h | Instruction Trap Register T0[15:0] |
| XXXX001b | 01h | Instruction Trap Register T1[15:0] |
| XXXX010b | 02h | Instruction Trap Register T2[15:0] |
| XXXX011b | 03h | Instruction Trap Register T3[15:0] |
| XXXX100b | 04h | Instruction Trap Register T4[15:0] |
| XXXX101b | 05h | Instruction Trap Register T5[15:0] |
| XXXX110b | 06h | Instruction Trap Register T6[15:0] |
| XXXX111b | 07h | Instruction Trap Register T7[15:0] |

TABLE 62

| | |
|---|---|
| DCS[7:0] | DMA Current Stream Pointer: This 8 bit field reports the current stream number being serviced the SP's DMA request engine. When this field returns 0, there are no currently pending DMA requests. Note that 0 is an invalid stream number. |

TABLE 60

| REGID[6:0] Exact Representation | REGID for access | Stream Addressing |
|---|---|---|
| RRRRCCCb | 00h–5Fh | Stream N State with "N" ranging from 0 to 95, addressed by row (RRRR in REGID) and column (CCC in REGID) starting with Streams 0 in location [0,0] and ending with Stream 95 in [11,7]. Row numbers range from 0000b to 1011b (0 to 11). Column numbers range from 000b to 111b (0 to 7). A single 4-bit entry is accessed for each row, column address, so valid column numbers are 0,1,2,3,4,5,6,7. Note that software can ignore the row, column addressing model and just treat the REGID as a binary number for the channel number. |

TABLE 61

Bit Descriptions

| | |
|---|---|
| SLEEP | Sleep State (active low bit): If active (0), processor clock stopped (Reset State). |
| FG | Foreground State: If active (1), SP is running foreground task. |
| ORUN | Frame Overrun: If active (1), SP has overrun the frame (state was "Foreground" when frame boundary occurred). |
| IRQ | Interrupt Request: If active (1), SP has an interrupt pending. |
| SPRUN | SP "Run" Flag: Composite state bit indicating SP run/stop status.<br>0 = SP is stopped.<br>1 = SP is running.<br>Note that if this bit transitions from a 1 to 0 without "Stop at Frame" being commanded, then the SP has stopped as a result of a "Deep Sleep" instruction or a double overrun condition. |
| FGN[2–0] | Foreground Nest Level: this field is a binary encoding of the foreground nesting level. |
| FRI | Frame Interrupt: force frame interrupt status bit, used for emulating frames during ticking.<br>0 = Don't generate frame interrupt (default)<br>1 = Force generation of frame interrupt to SP |
| DOI | Double Overrun Interrupt: force double overrun interrupt status bit.<br>0 = Don't generate interrupt (default)<br>1 = Force generation of double frame overrun interrupt to SP |
| GPI2 | General Purpose Interrupt 2: force frame GP interrupt 2 status bit. |

TABLE 61-continued

Bit Descriptions

| | |
|---|---|
| | 0 = Don't generate interrupt (default)<br>1 = Force generation of GP interrupt 2 to SP |
| GPI3 | General Purpose Interrupt 3: force frame GP interrupt 3 status bit.<br>0 = Don't generate interrupt (default)<br>1 = Force generation of GP interrupt 3 to SP |
| IP0 | Interrupt Priority Control status, Channel 0 (Frame Interrupt)<br>0 = Interrupt background only (default)<br>1 = Allow interrupt of both foreground and background<br>Note: this bit has no effect, and is technically "reserved", always write to 0. |
| IP1 | Interrupt Priority Control status, Channel 1 (Double Overrun Interrupt)<br>0 = Interrupt background only (default)<br>1 = Allow interrupt of both foreground and background |
| IP2 | Interrupt Priority Control status, Channel 2<br>0 = Interrupt background only (default)<br>1 = Allow interrupt of both foreground and background |
| IP3 | Interrupt Priority Control status, Channel 3<br>0 = Interrupt background only (default)<br>1 = Allow interrupt of both foreground and background |

TABLE 64

| Address (BA0 Offset) | Name | Description |
|---|---|---|
| 000h | HISR | Host Interrupt Status Register |
| 004h | HICR | Host Interrupt Control Register |
| 010h | HSR0 | Host Signal Register 0 |
| 100h | DMSR | DMA Status Register |
| 110h | HSAR | Host-channel Source Address Register |
| 114h | HDAR | Host-channel Destination Address Register |
| 118h | HDMR | Host-channel DMA Mode Register |
| 11C | HDCR | Host-channel DMA Control Register |
| 200h | PFMC | Performance Monitor Control Register |
| 204h | PFCV1 | Performance Counter Value 1 Register |
| 208h | PFCV2 | Performance Counter Value 2 Register |
| 300h–328h | N/A | PCI Configuration Space Echo (offsets 00h–28h, read only) |
| 32Ch | N/A | PCI Subsystem ID and PCI Vendor ID Write Port |
| 330h–33Ch | N/A | PCI Configuration Space Echo (offsets 30h–3Ch, read only) |
| 400h | CLKCR1 | Clock Control Register 1 |
| 404h | CLKCR2 | Clock Control Register 2 |
| 408h | PLLM | PLL Multiplier Register |
| 410h | FRR | Feature Reporting Register |
| 414h | CFL1 | Configuration Load Register 1 |
| 418h | CFL2 | Configuration Load Register 2 |
| 420h | SERMC1 | Serial Port Master Control Register 1 |
| 424h | SERMC2 | Serial Port Master Control Register 2 |
| 428h | SERC1 | Serial Port Configuration Register 1 |
| 42Ch | SERC2 | Serial Port Configuration Register 2 |
| 430h | SERC3 | Serial Port Configuration Register 3 |
| 434h | SERC4 | Serial Port Configuration Register 4 |
| 438h | SERC5 | Serial Port Configuration Register 5 |
| 440h | CFGI | Configuration Interface Register (EE Interface) |

TABLE 65

| Address (BA1 Offset) | Name | Description |
|---|---|---|
| 00000h–0FFFFh | SP-DMEM0 | SP Parameter RAM Memory Block Actual Size: 3K × 32, or 12 KBytes |
| 10000h–1FFFFh | SP-DMEM1 | SP Sample RAM Memory Block Actual Size: 3K × 32, or 12 KBytes |
| 20000h–2FFFFh | SP-PMEM | SP Program RAM Memory Block Actual Size: 4K × 40, or 20 KBytes |
| 30000h–3FFFFh | SP-DEBUG | Access to SP Debut Registers, as shown below: |

TABLE 65-continued

| Address (BA1 Offset) | Name | Description |
|---|---|---|
| 30000h | SPCR | SP Control Register |
| 30004h | DREG | Debut Register Index |
| 30008h | DSRWP | DMA Stream Requestor Write Port |
| 3000Ch | TWPR | Trap Write Port Register |
| 30010h | SPWR | Stack Pointer Write Register |
| 30020h | FGR1 | Functional Group Register 1 SP Core & DMA Requestor State Access/Real Time PC |
| 30028h | SPCS | SP Clock Status Register |
| 3002Ch | SDSR | SP DMA Requestor Status Register |
| 30030h | FRMT | Frame Timer Register (pre-load value) |
| 30034h | FRCC | Frame Timer Current Count |
| 40000h–DFFFFh | Reserved | NOT IMPLEMENTED on Clyde |
| E0000h–EFFFFh | OMNI-MEM | Special Address range which writes to ALL writable memory blocks. |
| F0000h–FFFFFh | Reserved | NOT IMPLEMENTED on Clyde |

TABLE 66

Bit Descriptions

| | |
|---|---|
| FRI | Frame Interrupt: force frame interrupt command bit, used for emulating frames during ticking.<br>0 = Don't generate frame interrupt (default)<br>1 = Force generation of frame interrupt to SP |
| DOI | Double Overrun Interrupt: force double overrun interrupt command bit.<br>0 = Don't generate interrupt (default)<br>1 = Force generation of double frame overrun interrupt to SP |
| GPI2 | General Purpose Interrupt 2: force frame GP interrupt 2 command bit.<br>0 = Don't generate interrupt (default)<br>1 = Force generation of GP interrupt 2 to SP |
| GPI3 | General Purpose Interrupt 3: force frame GP interrupt 3 command bit.<br>0 = Don't generate interrupt (default)<br>1 = Force generation of GP interrupt 3 to SP |
| IP0 | Interrupt Priority Control, Channel 0 (Frame Interrupt)<br>0 = Interrupt background only (default)<br>1 = Allow interrupt of both foreground and background<br>Note: this bit has no effect, and is technically "reserved", always write to 0. |
| IP1 | Interrupt Priority Control, Channel 1 (Double Overrun Interrupt)<br>0 = Interrupt background only (default)<br>1 = Allow interrupt of both foreground and background |
| IP2 | Interrupt Priority Control, Channel 2<br>0 = Interrupt background only (default)<br>1 = Allow interrupt of both foreground and background |
| IP3 | Interrupt Priority Control, Channel 3<br>0 = Interrupt background only (default)<br>1 = Allow interrupt of both foreground and background |

TABLE 67A

Address: BA0: 43Ch, Read-Write
 SP: 8004h, Write Only
 SP: 8005h, Read Only
Default: 00000000h
Definition: The Serial Port Backdoor Sample Pointer register provides a host and SP accessible port for initialization and real-time monitoring of the internal sample pointer for the input and output sample pointers. This register can only be written when the serial port is stopped (inactive, not loading samples). The register can be read at any time.
Bit Descriptions:

| | |
|---|---|
| FSP[3:0] | FIFO Sample Pointer: this 4 bit field specifies the current location in the input/output sample FIFOs from which output samples will be fetched and into which input samples will be stored. |

TABLE 67B

Address: BA0: 440h, Read Only
Default: 00000000h
Definition: The Serial Port Backdoor Status register provides a host port for checking readiness of the host port for data transfer to or from the sample FIFOs following a transfer command.
Bit Descriptions:

| | |
|---|---|
| RRDY | Read Data Ready: this bit reflects a data ready (available) status for a backdoor read command.<br>0 = Not Ready<br>1 = Data Ready |
| WBSY | Write Busy: this bit reflects a busy status for a host backdoor write sequence.<br>0 = Not Busy, another write command sequence can be started<br>1 = Write Busy, the last write command is still in progress |

TABLE 67C

Address: BA0: 444h, Read
Default: 00000000h
Definition: The Serial Port Backdoor Command register provides a host port for initiating a data transfer to or from the sample FIFOs. Note that it is illegal to set both bits in this register simultaneously.
Bit Descriptions:

| | |
|---|---|
| RDC | Read Command: setting this bit initiates a host backdoor read data transfer.<br>0 = No Operation (default)<br>1 = Initiate Read Command to sample FIFO |
| WRC | Write Command: setting this bit initiates a host backdoor write data transfer.<br>0 = No Operation (default)<br>1 = Initiate Write Command to sample FIFO |

TABLE 67D

Address: BA0: 448h, Read-Write
Default: 00000000h
Definition: The Serial Port Backdoor Address register provides a host port for specifying the FIFO address for a host back door data transfer.
Bit Descriptions:

| | |
|---|---|
| FAD[7:0] | FIFO Address: this 8 bit field specifies the absolute sample address in the input/output sample FIFO memory for the back door data transfer. |

TABLE 67E

Address: BA0: 44Ch, Read-Write
Default: 00000000h
Definition: The Serial Port Backdoor Configuration register provides a host port for backdoor configuration.
Bit Descriptions:

| | |
|---|---|
| HBP | Host Bypass: setting this bit enables serial port operation (FIFO transfers) immediately after MSPE bit is set, as opposed to normal operation where an SP signal is required to start FIFO transfer operation.<br>0 = Normal, SP driven FIFO transfer start-up (default)<br>1 = Host backdoor bypass mode, no SP signal required. |

TABLE 67F

Address: BA0: 450h, Write Only
Default: N/A
Definition: The Serial Port Backdoor Write Port provides a host port for specifying the FIFO data for a host back door data transfer.

TABLE 67F-continued

Bit Descriptions:

FWD[19:0]  FIFO Write Data: this 20 bit field specifies the sample data for the back door data transfer into the FIFO sample RAM.

TABLE 67G

Address:     BA0: 454h, Read Only
Default:     N/A
Definition:  The Serial Port Backdoor Read Port provides a host port for accessing the FIFO RAM data for a host back door data transfer.

Bit Descriptions:

FRD[19:0]  FIFO Read Data: this 20 bit field specifies the sample data for the back door data transfer from the FIFO sample RAM.

TABLE 68A

Address:     BA0: 460h, Read-Write
             SP: 8008h, Write Only
Default:     00000000h
Definition:  This register provides the host control port for the AC97 link.

Bit Descriptions:

RSTN   Reset NOT!: this bit controls the ARST# pin. Note the negative sense of the bit, which matches the active low output pin definition.
       0 = ARST# active, AC97 codec reset (reset default)
       1 = ARST# inactive, AC97 codec not reset.
ESYN   Enable Sync: this bit controls ASYNC generation for the AC97 link.
       0 = ASYNC generation disabled (reset default)
       1 = ASYNC generation enabled, AC97 framing, FIFO accesses and data shifting will start.
VFRM   Valid Frame: this bit controls "Valid Frame" value in the AC97 output stream.
       0 = Valid Frame disabled (reset default)
       1 = Valid Frame enabled, AC97 codec can interpret frame time slots.
DCV    Dynamic Command Valid: this bit controls dynamic command address and data generation on the AC97 link. To generate a valid command data slot:
       1) host should write 16-bit data into AC97 Command Address and Data Registers
       2) host should then set this bit
       3) serial port will dynamically set the slot valid bits for the command address and data slots
       4) serial port will shift out command address and data during their corresponding time slots
       5) serial port will clear this bit, DCV, automatically to indicate completion of the process.
CRW    Control Read/Write: this bit indicates type of transaction request to the control registers.
       0 = Write Command
       1 = Read Command
ASYN   Asynchronous ASYNC Assertion: this bit allows the unclocked assertion of the ASYNC pin for AC97 link management protocol requirements.
       0 = Normal ASYNC generation (reset default)
       1 = Force ASYNC valid (with no clocking dependencies other than PCI clock).

TABLE 68B

Address:     BA0: 464h, Read Only
             SP: 8009h, Read Only
Default:     00000000h
Definition:  This register provides the host status port for the AC97 link.

TABLE 68B-continued

Bit Descriptions:

CRDY   Codec Ready: this bit returns the last frame's "Codec Ready" indicator in the AC97 input data stream.
       0 = Codec Not Ready
       1 = Codec Ready.
VSTS   Valid Status: this set/reset bit support dynamic status capture from the AC97 input data stream, according to the following rules:
       1) a valid status data slot (slot 2 tag) in a given input frame will set this bit
       2) the status address and data will be stored in the ACSAD and ACSDA registers
       3) subsequent valid status address and data slots will be ignored until the current set is read
       4) host should read ACSAD and ACSDA registers upon seeing this bit set
       5) the host read of the ACSDA register will automatically clear/reset this bit

TABLE 68C

Address:     BA0: 468h, Read-Write
Default:     00000000h
Definition:  This register provides the host port for setting the static slot valid signals for the AC97 tag phase (slot 0).

Bit Descriptions:

SLV[12:3]  Slot Valid bits: these bits set the static slot valid bits in the AC97 output data stream.
           0 = Slot not valid
           1 = Slot valid.

TABLE 68D

Address:     BA0: 46Ch, Read-Write
             SP: 800Ah, Write Only
Default:     00000000h
Definition:  This register provides the host port for setting the command address field for an AC97 frame. Note that the contents of this register will not be sent out in an output frame unless the dynamic command valid bit is set in ACCTL.

Bit Descriptions:

CI[6:0]  Control Register Index: this 76 bit field addresses the 64 16-registers bit in the AC97 control register address space. Normally bit 0 should always be set to 0 (even addresses only).

TABLE 68E

Address:     BA0: 470h, Read-Write
             SP: 800Bh, Write Only
Default:     00000000h
Definition:  This register provides the host port for setting the command data field for an AC97 frame. Note that the contents of this register will not be sent out in an output frame unless the dynamic command data valid bit is set in ACCTL.

Bit Descriptions:

CD[15:0]  Control Register Data: this 16 bit field provides data during writes to the AC97 control register address space. This field should be set to 0000h during control register reads.

TABLE 68F

Address:     BA0: 474h, Read Only
Default      00000000h
Definition:  This register provides the host port for sensing the input slot valid signals for the AC97 tag phase (slot 0). The contents

TABLE 68F-continued of this register are dynamic updated with each AC97 input frame.

Bit Descriptions:

ISV[12:3]  Slot Valid bits: these bits sense the slot valid bits in the AC97 input data stream.
0 = Slot not valid
1 = Slot valid.

TABLE 68G

Address:     BA0: 478h, Read Only
             SP: 800Ch, Read Only
Default:     00000000h
Definition:  This register provides the host port for capturing the status address field for an AC97 input frame. Note that the contents of this register will not be overwritten by another input frame's valid status address unless the valid status bit is cleared in ACSTS by a read of ACSDA.

Bit Descriptions:

SI[6:0]   Status Register Index: this 7 bit field returns the captured status address returned in slot 1 of the AC97 input frame.

TABLE 68H

Address:     BA0 47Ch, Read Only
             SP: 800Dh, Read Only
Default:     00000000h
Definition:  This register provides the host port for capturing the status data field for an AC97 input fame. Note that the contents of this register will not be overwritten by another input frame's valid status address unless the valid status bit is cleared in ACSTS by a read of this register.
Side Effect: When this register is read, the valid status bit in ACSTS is cleared.

Bit Descriptions:

SD[15:0]  Status Data: this 16 bit field returns data of a read from the AC97 control register address

TABLE 68I

Link Start-up

*Reset Control*
Upon hardware reset (via PCI RST# signal input) the AC97 Reset Line (ARST#) will be active. Any subsequent ARST# pin transitions are controlled by a bit (RSTN) in the AC97 Control Register (ACCTL). Software controls the AC97 Codec's exit from reset via the RSTN bit.
*Sync Generation Control*
Start-up and shutdown of ASYNC generation (AC97 framing) is controlled by a bit (ESYN) in the AC97 Control Register (ACCTL). ESYN also controls primary port shifting/loading and FIFO pointer advancement on ASYNC boundaries.
Asynchronous ASYNC generation for power management mode transitions is controlled by a separate bit (ASYN) in ACCTL.
*Global "Valid Frame" Control*
The "Valid Frame" indicator bit in the AC97 output data stream is controlled by a bit (VFRM) in the AC97 Control Register (ACCTL).
*Codec Ready Monitor*
A bit (CRDY) in the AC97 Status Register (ACSTC) is provided for real time host monitoring of the "Codec Ready" indicated in the AC97 input data stream.
Link Channel Control

*Static Channel Valid Map*
A static output channel valid map, which is part of the AC97 output data stream, is programmable in the AC97 Output Slot Valid Register (ACOSV). Note that this map does not include the dynamic command issue slot, which is controlled via a separate command issue mechanism.
*Dynamic Command issue*

TABLE 68I-continued

AC97 command issue is supported via the Command Address and Data Registers (ACCAD, ACCDA) and dynamic slot valid bits in the AC97 Control Register (ACCTL).
Link Channel Feedback

*Input Channel Valid Status*
The AC97 Input Slot Valid Register (ACISV) contains the last input frame's time slot valid bits.
*Dynamic Status Capture*
Status capture is supported by a dynamically set/cleared Valid Status bit (VSTS) in the AC97 Status Register (ACSTS) and the Status Address and Data Registers (ACSAD, ACSDA).
Host I/O Channel

*FIFO Writes*
See host backdoor section on serial port
*FIFO Reads*
See host backdoor section on serial port
*Pointer Read/Write*
See host backdoor section on serial port
FIFO to AC97 Timeslot Mapping

*Output Slots*
AC97 output slots 3 through 12 are directly mapped to FIFO buffers 0 through 9. Buffer 0 consists of FIFO RAM addresses 00h–0Fh. Buffer 9 consists of FIFO RAM addresses 90h–9Fh.
*Input Slots*
AC97 input slots 3 through 8 are directly mapped to FIFO buffers A through F. Buffer A consists of FIFO RAM addresses A0h–AFh. Buffer F consists of FIFO RAM addresses F0h–FFh.
AC97 Diagnostic Loop Back Support See serial port look back modes in main serial port register definitions.

TABLE 69A

Bit Descriptions:

TXE   MIDI Transmit Enable: this bit controls the MIDI output port
      0 = Disable MIDI Transmit (reset default)
      1 = Enable MIDI Transmit (output port enabled)
RXE   MIDI Receive Enable: this bit controls the MIDI input port
      0 = Disable MIDI Receive (reset default)
      1 = Enable MIDI Receive (input port enabled)
RIE   MIDI Receive Interrupt Enable: this bit controls the host interrupt generation of the MIDI input port
      0 = Disable Receive Interrupts (reset default)
      1 = Enable MIDI Receive Interrupts
TIE   MIDI Transmit Interrupt Enable: this bit controls the host interrupt generation of the MIDI output port
      0= Disable Transmit Interrupts (reset default)
      1 = Enable MIDI Transmit Interrupts
MLB   MIDI Loop Back Enable: this bit controls the loop back feature of the MIDI port
      0 = Disable Loop Back/Normal Operation (reset default)
      1 = Enable Loop Back of MIDIOUT (internal) to MIDIIN (internal)
MRST  MIDI Reset: this bit resets the MIDI interface, including the receive and transmit FIFOs.
      0 = Normal Operation (reset default)
      1 = Reset MIDI interface (remains reset until this bit set back to 0)

TABLE 69B

Bit Descriptions:

TBF   Transmit Buffer Full: this bit returns the full/not-full status of the MIDI transmit FIFO
      0 = FIFO not full (reset default)
      1 = FIFO full

TABLE 69B-continued

Bit Descriptions:

RBE   Receive Buffer Empty: this bit returns the empty/not-empty status of the MIDI receive FIFO
      0 = FIFO not empty
      1 = FIFO empty (reset default)

TABLE 69C

Bit Descriptions:

RDA   Receive Data Available: this bit returns the empty/not-empty status of the MIDI receive FIFO
      0 = FIFO empty
      1 = FIFO not empty, MIDI byte available in read port

TABLE 69D

Bit Descriptions:

MWD[7:0]   MIDI Write Data: this byte is placed into the MIDI transmit FIFO when written. A read of this port will return the last byte written.

TABLE 69E

Definition: This register provides the host port for reading the MIDI receive FIFO. An SP accessible version of this register also exists.

Bit Descriptions:

MRD[7:0]   MIDI Read Data: this byte is removed from the MIDI receive FIFO when read.

TABLE 70C

Bit Descriptions:

X1V[15:0]   Joystick 1 X Coordinate Value: this field returns the captured value from the digital assist counters for the JACX input.
Y1V[15:0]   Joystick 1 Y Coordinate Value: this field returns the captured value from the digital assist counters for the JACY input.

TABLE 70D

Bit Descriptions:

X2V[15:0]   Joystick 2 X Coordinate Value: this field returns the captured value from the digital assist counters for the JBCX input.
Y2V[15:0]   Joystick 2 Y Coordinate Value: this field returns the captured value from the digital assist counters for the JBCY input.

TABLE 70E

Bit Descriptions:

DAX    Data JACX: this bit represents a host port view of the JACK pin, returning current state of pin on reads and setting state of pin on writes (if output enabled).
AXOE   Output Enable JACX: this control bit enables the open drain output on the JACX pin. If this bit is enabled, then writes to the DAX bit will be presented on the pin (only actively driving low, an pull-up resistor is required for high output)

TABLE 70E-continued

Bit Descriptions:

0 = Output Disabled, pin has input function only (reset default)
       1 = Output Enabled, if DAX=0 then open drain output will be enabled.
DAY    Data JACY: this bit represents a host port view of the JACY pin, returning current state of pin on reads and setting state of pin on writes (if output enabled).
AYOE   Output Enable JACY: this control bit enables the open drain output on the JACY pin. If this bit is enabled, then writes to the DAY bit will be presented on the pin (only actively driving low, an pull-up resistor is required for high output)
       0 = Output Disabled, pin has input function only (reset default)
       1 = Output Enabled, if Day=0 then open drain output will be enabled.
DBX    Data JBCX: this bit represents a host port view of the JBCX pin, returning current state of pin on reads and setting state of pin on writes (if output enabled).
BXOE   Output Enable JBCX: this control bit enables the open drain output on the JBCX pin. If this bit is enabled, then writes to the DBX will be presented on the pin (only actively driving low, an pull-up resistor is required for high output)
       0 = Output Disabled, pin has input function only (reset default)
       1 = Output Enabled, if DBX=0 then open drain output will be enabled.
DBY    Data JBCY: this bit represents a host port view of the JBCY pin, returning current state of pin on reads and setting state of pin on writes (if output enabled).
BYOE   Output Enable JBCY: this control bit enables the open drain output on the JBCY pin. If this bit is enabled, then writes to the DBY bit will be presented on the pin (only actively driving low, an pull-up resistor is required for high output)
       0 = Output Disabled, pin has input function only (reset default)
       1 = Output Enabled, if DBY=0 then open drain output will be enabled.

TABLE 70A

Bit Descriptions:

CAX   AX Coordinate Comparator Output: this status bit returns the comparator output value for the AX coordinate input associated with the JACX pin.
      0 = Charge point reached, now discharged (reset default)
      1 = Charging in progress, comparator trip point not reached yet.
CAY   AY Coordinate Comparator Output: this status bit returns the comparator output value for the AY coordinate input associated with the JACY pin.
      0 = Charge point reached, no discharged (reset default)
      1 = Charging in progress, comparator trip point not reached yet.
CBX   BX Coordinate Comparator Output: this status bit returns the comparator output value for the BX coordinate input associated with the JBCX pin.
      0 = Charge point reached, no discharged (reset default)
      1 = Charging in progress, comparator trip point not reached yet.
CBY   BY Coordinate Comparator Output: this status bit returns the comparator output value for the BY coordinate input associated with the JBCY pin.
      0 = Charge point reached, now discharged (reset default)
      1 = Charging in progress, comparator trip point not reached yet.
BA1   Button A1 Input: this status bit returns the input value associated with the JAB1 pin.
      0 = Button pressed (input pin is low)
      1 = Button released (input pin is high)
BA2   Button A2 Input: this status bit returns the input value associated with the JAB2 pin.
      0 = Button pressed (input pin is low)
      1 = Button released (input pin is high)
BB1   Button B1 Input: this status bit returns the input value associated with the JBB1 pin.
      0 = Button pressed (input pin is low)
      1 = Button released (input pin is high)

TABLE 70A-continued

Bit Descriptions:

BB2    Button B2 Input: this status bit returns the input value associated with the JBB2 pin.
0 = Button pressed (input pin is low)
1 = Button released (input pin is high)

TABLE 70B

Bit Descriptions:

SP[1:0]    Comparator Set Point: this field controls the comparator trigger point, and therefore the relative speed of the joystick coordinate charging process.
00 = slowed speed (reset default)
01 = medium slow speed

TABLE 70B-continued

Bit Descriptions:

10 = medium fast speed

11 = fastest speed

ARE    Auto Retrigger Enable: this control bit enables the auto retrigger capability of the digital assist function in the joystick port.
0 = Auto retrigger disabled (reset default)
1 = Auto retrigger enabled.

APPENDIX 1

{(if (tb)} Rdest = Rm + {Rn | simm4 | imm}
Add 16-bit Rm to Rn/immediate storing the result in the specified Rdest register Operation:    {if (tb)} Rdest = Rm + {Rn | simm4 | imm}
where:    Rm is    r0, r1, r2, . . ., rF
    Rn is    r0, r1, r2, . . ., rF
    imm is    a 16-bit immediate value
    simm4 is    a 4-bit immediate value plus sign ranging from −16 to +15
    Rdest is    r0, r1, r2, . . ., rF Restrictions:    None Description:    The contents of Rm are added to the contents of Rn (or an immediate value). If unconditional or the test bit is set, the result is stored in the specified Rdest register and the ALU flags are updated. Note that saturation is not performed in case of overflow (see the description of "{if (tb)} Rdest = Rm $+ Rn" on page 51 for an add with saturation).

Flags affected: if unconditional or test bit is set, then update N, Z, C, OV, LT Example:    r5 = rA + rB;    // Add rA and rB storing result in r5
    tb = LT(7 − r5);    // Compare r5 to 7; if r5 > 7, set TB to 1; otherwise, set TB to 0
    if (tb) r7 = r7 + 4;    // If (r5 > 7) r7 = r7 + 4

Opcodes:

| ALUop: | aluOperands | | | | | opcode | | |
|---|---|---|---|---|---|---|---|---|
| | [18:15] | [14:11] | [10:7] | 6 | [5:4] | [3:0] | | |
| | Rn | Rdest | Rm | if | 01 | 0100 | {if (tb)} Rdest = Rm + Rn | |
| | imm4 | | | tb | 11 | 0 s 00 | {if (tb} Rdest = Rm + simm4 | |

| WideOp: | wideOperands | | | | | opcode | |
|---|---|---|---|---|---|---|---|
| | [30:15] | [14:11] | [10:7] | 6 | [5:4] | [3:0] | |
| | imm[15:0] | Rdest | Rm | if tb | 01 | 0100 | {if (tb)} Rdest = Rm + imm |

Detailed instruction operation:
```
// Select source B operand (according to instruction type/opcode)
if ( wideOp )
    opB[15:0] ← wideOperands[30:15]
else if ( aluOpcode[5] == '1' )
    opB[15:4] ← aluOpcode[2]
    opB[3:0] ← aluOperands[18:15]
else
    opB[15:0] ← (Rn)[15:0]
// Compute the requested sum
result[15:0] ← (Rm)[15:0] + opB[15:0]
// If unconditional or (conditional on test bit AND tb is set)
if( opcode[6] == '0' or TB == '1' )
{
    // Update flags according to the result
    N ← result[15]
    Z ← (result[15:0] == '0' )
    C ← Cy, out[15]
    OV ← Cy, out[14] ⊕ Cy, out[15]
    LT ← N ⊕ OV
    // Write result back into the destination register
    (Rdest)[15:0] ← result[15:0]
}
```

APPENDIX 1-continued

{if (tb)} Rdest = Rm $+ {Rn | simm4 | imm}
Add 16-bit Rm to Rn/immediate with saturation on overflow storing the result in the specified Rdest register

| | | |
|---|---|---|
| Operation: | {if (tb)} Rdest = Rm $+ {Rn | simm4 | imm} | |
| | where: $+ is | a 16-bit addition with saturation on overflow (saturation may be signed or unsigned according to the saturation mode) |
| | Rm is | r0, r1, r2, . . . , rF |
| | Rn is | r0, r1, r2, . . . , rF |
| | imm is | a 16-bit immediate value |
| | simm4 is | a 4-bit immediate value plus sign ranging from −16 to +15 |
| | Rdest is | r0, r1, r2, . . . , rF |
| Restrictions: | None | |
| Description: | The contents of Rm are added to the contents of Rn (or an immediate value) with saturation on overflow. If unconditional or the test bit is set, the result is stored in the specified Rdest register and the ALU flags are updated. Saturation may be configured as signed or unsigned by the satMode instruction. Note that flags are set according to the result prior to saturation and that for unsigned saturation, the carry flag (C) indicates overflow. | |
| Flags affected: | if unconditional or test bit is set, then update N, Z, C, OV, LT | |
| Example: | mode(signedSat,,,,); | // Set desired saturation mode (in this case signed) |
| | r5 = rC $+ r8; | // Add rC and r8 with saturation on overflow storing result in r5 |
| Opcodes: | | |

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if | 01 | 0110 | {if (tb)} Rdest = Rm $+ Rn |
| | imm4 | | | tb | 11 0 s | 10 | {if (tb)} Rdest = Rm $+ simm4 |

| WideOp: | wideOperands | | | opcode | | |
|---|---|---|---|---|---|---|
| | [30:15] | [14:11] | [10:7] | 6 | [5:4] | [3:0] | |
| | imm[15:0] | Rdest | Rm | if tb | 01 | 0110 | {if (tb)} Rdest = Rm $+ imm |

Detailed instruction operation:
```
        // Select source B operand (according to instruction type/opcode)
        if ( wideOp )
            opB[15:0] ← wideOperands[30:15]
        else if ( aluOpcode[5] == '1' )
            opB[15:4] ← aluOpcode[2]
            opB[3:0] ← aluOperands[18:15]
        else
            opB[15:0] ← (Rn)[15:0]
        // Compute the requested sum
        result[15:0] ← (Rm)[15:0] + opB[15:0]
        // If unconditional or (conditional on test bit AND tb is set)
        if( opcode[6] == '0' or TB == '1' )
            {
            // Update flags according to the result
            N ← result[15]
            Z ← (result[15:0] == '0' )
            C ← Cy, out[15]
            OV ← Cy, out[14] ⊕ Cy, out[15]
            LT ← N ⊕ OV
            // Check for un/signed overflow and write proper result into Rdest
            if ( OV == 1 and satMode == signed)
                (Rdest)[15:0] ← ( (N == 0) ? 0x8000: 0x7FFF )
            else if ( C == 1 and satMode == unsigned)
                (Rdest){15:0] ← 0xFFFF
            else // Result did not overflow, write back output of adder
                (Rdest)[15:0] ← result[15:0]
            }
```

{if (tb)} Rdest = Rm + C + {Rn | imm}
Add with carry 16-bit Rm to Rn/immediate storing the result in the specified Rdest register

| | | |
|---|---|---|
| Operation: | {if (tb)} Rdest = Rm +C+ {Rn | imm} | |
| | where: Rm is | r0, r1, r2, . . . , rF |
| | Rn is | r0, r1, r2, . . . , rF |
| | imm is | a 16-bit immediate value |
| | Rdest is | r0, r1, r2, . . . , rF |
| Restrictions: | None | |
| Description: | The contents of Rm and the carry flag (C) are added to the contents of Rn (or an immediate value). If unconditional or the test bit is set, the result is stored in the specified Rdest register and the ALU flags are updated. Note that saturation is not performed in case of overflow (see the description of "{if (tb)} Rdest = Rm $+c+ Rn" on page 55 for an add with carry and saturation). | |
| Flags affected: | if unconditional or test bit is set, then update N, Z, C, OV, LT | |
| Example: | // Add 32-bit r54 to r76 storing result in r98 | |
| | r8 = r4 + r6; | // Add least-significant 16 bits |

APPENDIX 1-continued

```
                r9 = r5 +c +r7;    // Add most-significant 16 bits + carry out of lsw
Opcodes:
```

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if tb | 01 | 0000 | {if (tb)} Rdest = Rm +c+ Rn |

| WideOp: | wideOperands | | | | opcode | | |
|---|---|---|---|---|---|---|---|
| | [30:15] | [14:11] | [10:7] | 6 | [5:4] | [3:0] | |
| | imm[15:0] | Rdest | Rm | if tb | 01 | 0000 | {if(tb)} Rdest = Rm +c+ imm |

Detailed instruction operation:
```
        // Select source B operand (according to instruction type/opcode)
        if ( wideOp )
                opB[15:0] ← wideOperands[30:15]
        else
                opB[15:0] ← (Rn)[15:0]
        // Compute the requested sum
        result[15:0] ← (Rm)[15:0] + opB[15:0] + C
        // If unconditional or (conditional on test bit AND tb is set)
        if( opcode[6] == '0' or TB == '1' )
            {
                // Update flags according to the result
                N ← result[15]
                Z ← (result[15:0] == '0' )
                C ← Cy, out[15]
                OV ← Cy, out[14] ⊕ Cy, out[15]
                LT ← N ⊕ OV
                // Write result back into the destination register
                (Rdest)[15:0] ← result[15:0]
            }
```

{if (tb)} Rdest = Rm $+C+ {Rn | imm}
Add with carry 16-bit Rm to Rn/immediate with saturation on overflow storing
the result in the specified Rdest register

| Operation: | {if (tb)} Rdest = Rm $+C+ {Rn \| imm} | |
|---|---|---|
| | where: $ + is | a 16-bit addition with saturation on overflow (saturation may be signed or unsigned according to the saturation mode) |
| | Rm is | r0, r1, r2, . . ., rF |
| | Rn is | r0, r1, r2, . . ., rF |
| | imm is | a 16-bit immediate value |
| | Rdest is | r0, r1, r2, . . ., rF |
| Restrictions: | None | |
| Description: | The contents of Rm and the carry flag (C) are added to the contents of Rn (or an immediate value) with saturation on overflow. If unconditional or the test bit is set, the result is stored in the specified Rdest register and the ALU flags are updated. Saturation may be configured as signed or unsigned by the satMode instruction. Note that flags are set according to the result prior to saturation and that for unsigned saturation, the carry flag (C) indicates overflow. | |
| Flags affected: | if unconditional or test bit is set, then update N, Z, C, OV, LT | |
| Example: | // This example illustrates a 32-bit saturating add (using the 16-bit ALU & add w/carry) | |
| | mode        // Set desired saturation mode (in this case unsigned) | |
| | (unsignedSat,,,,); | |
| | r8 = r4 + r6;    // Add least-significant 16 bits | |
| | r9 = r5 $ + c+ r7;  // Add most-significant 16 bits + carry out of lsw | |
| | if (C) r8 =      // If (cany out of msw), saturate lsw to max positive unsigned # | |
| | 0xFFFF; | |
| | // Note: Many times the "if (C) r8 = 0xFFFF" will be unnecessary since the most-sig. | |
| | //      16 bits are already saturated (lsw may not be that important when msw clipping) | |

Opcodes:

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if tb | 01 | 0010 | {if (tb)} Rdest = Rm $+c+ Rn |

| WideOp: | wideOperands | | | | opcode | | |
|---|---|---|---|---|---|---|---|
| | [30:15] | [14:11] | [10:7] | 6 | [5:4] | [3:0] | |
| | imm[15:0] | Rdest | Rm | if tb | 01 | 0010 | {if (tb) } Rdest = Rm $+c+ imm |

Detailed instruction operation:
```
        // Select source B operand (according to instruction type/opcode)
        if ( wideOp )
                opB[15:0] ← wideOperands[30:15]
        else
```

APPENDIX 1-continued

```
        opB[15:0] ← (Rn)[15:0]
// Compute the requested sum
result[15:0] ← (Rm)[15:0] + opB[15:0] + C
// If unconditional or (conditional on test bit AND tb is set)
if( opcode[6] == '0' or TB == '1' )
    {
        // Update flags according to the result
        N ← result[15]
        Z ← (result[15:0] == '0' )
        C ← Cy, out[15]
        OV ← Cy, out[14] ⊕ Cy, out[15]
        LT ← N ⊕ OV
        // Check for un/signed overflow and write proper result into Rdest
        if ( OV == 1 and satMode == signed )
            (Rdest)[15:0] ← ( (N == 0) ? 0x8000:0x7FFFF )
        else if ( C == 1 and satMode == unsigned )
            (Rdest){15:0] ← 0xFFFF
        else // Result did not overflow, write back output of adder
            (Rdest)[15:0] ← result[15:0]
    }

{tb = {!}cond,} if (cond) Rdest = Rdest $ + {Rn | simm4 | imm}
    Conditionally add Rn/immediate to Rdest register with sturation on overflow
                     storing the result in the Rdest register
```

| | | |
|---|---|---|
| Operation: | {tb={!}cond,} if (cond) Rdest = Rdest $+ {Rn \| simm4 \| imm} | |
| | where: $ + is a 16-bit addition with saturation on overflow (saturation may be signed or unsigned according to the saturation mode) | |
| | cond is tb, !tb, ex, !ex, n, !n, ov, !ov, z, !z, c, !c, gte, lt, always, never | |
| | Rn is r0, r1, r2, . . ., rF | |
| | imm is a 16-bit immediate value | |
| | simm4 is a 4-bit immediate value plus sign ranging from −16 to +15 | |
| | Rdest is r0, r1, r2, . . ., rF | |
| Restrictions: | None | |
| Description: | The contents of Rdest are added to the contents of Rn (or an immediate value) with saturation on overflow. If the specified cond evaluates to true, the result is stored in the specified Rdest register and the ALU flags are updated. If the test bit is to be updated, then set the test bit according to the condition-evaluation with optional inversion (!tb). | |
| Flags affected: | If the specified condition evaluated to true, then update N, Z, C, OV, LT. | |
| | If the instruction specified to update TB with the condition-evaluation, update TB, TS. | |
| Example: | // C-like code: if ( −−r8 == 0 ) ++r9; else r2 = r8 + 8; | |
| | r8 = r8 + (−1); | |
| | tb = !z, if (z) r9 $+= 1;    // if (r8 == 0) ++r9; (sets tb = !(r8 == 0)) | |
| | if (tb) r2 = r8 + 8;    //else r2 = r8 + 8; | |
| Opcodes: | | |

```
ALUOp:          aluOperands              opcode
        [18:15] [14:11] [10:7]  6  [5:4]    [3:0]
         Rn     Rdest    cond   0   00      0100      if (cond) Rdest $+= Rn
                                1           0100      tb = cond, if (cond) Rdest $+= Rn
                                            0110      tb = !cond, if (cond) Rdest $+= Rn
         imm4   Rdest    cond   0   10  0  s 00       if (cond) rdest $+= simm4
                                1               00    tb = cond, if (cpnd) Rdest $+= simm4
                                                10    tb = !cond, if (cpnd) Rdest $+= simm4

WideOp:         wideOperands             opcode
        [30:15]         [14:11] [10:7]  6  [5:4]    [3:0]
        imm[15:0]       Rdest    cond   0   00      0100      if (cond) Rdest $+= imm
                                        1           0100      tb = cond, if (cond) Rdest $+= imm
                                                    0110      tb = !cond, if (cond) Rdest $+= imm
```

Detailed instruction operation:
```
        // Select source B operand (according to instruction type/opcode)
        if ( wideOp )
            opB[15:0] ← wideOperands[30:15]
        else if ( aluOpcode[5] == '1' )
            opB[15:4] ← aluOpcode[2]
            opB[3:0] ← aluOperands[18:15]
        else
            opB[15:0] ← (Rn)[15:0]
        // Compute the requested sum
        result[15:0] ← (Rdest)[15:0] + opB[15:0]
        // Evaluate the specified condition to determine whether to writeback the result
        switch ( cond[3:1] )
            {
                case {!}TB :      condFlag = TB   // Condition depends on TB of prev. instruc.
                case {!}EX:       condFlag = EX   // Condition depends on EX
                case {!}N:        condFlag = N    // Condition depends on N
                case {!}OV:       condFlag = OV   // Condition depends on OV
```

APPENDIX 1-continued

```
                    case {!}Z:         condFlag = Z    // Condition depends on Z
                    case {!}C:         condFlag = C    // Condition depends on C
                    case GTE/LT:       condFlag = LT   // Condition depends on LT
                    case never/always: condFlag = 1    // Condition is never/always true
            }
            condEval ← condFlag ⊕ cond[0]
            // If the test bit is to be updated, set TB to the condition-evaluation or its complement
            if ( opcode[6] == '1')
                    TS ← TB    // Save previous value of test-bit into test-bit save flag
                    TB ← condEval ⊕ opcode[1]
            // If condition evaluated to true, write back the add result and update flags
            if ( condEval )
                {
                    // Update flags according to the result
                    N ← result[15]
                    Z ← (result[15:0] == '0')
                    C ← Cy, out[15]
                    OV ← Cy, out[14] ⊕ Cy, out[15]
                    LT ← N ⊕ OV
                    // Check for un/signed overflow and write proper result into Rdest
                    if ( OV == 1 and satMode == signed )
                        (Rdest)[15:0] ← ( (N == 0) ? 0x8000:0x7FFF)
                    else if ( C == 1 and satMode == unsigned)
                        (Rdest){15:0] ← 0xFFFF
                    else // Result did not overflow, write back output of adder
                        (Rdest)[15:0] ← result[15:0]
                }

{tb={!}cond,} if (cond) Rdest = Rdest $+ {Rn | simm4 | imm} tb {'&'|'|'}= cFlagOp( {Rn | simm4 | imm} - Rm)
            Compare 16-bit Rm to Rn/immediate updating flags and select a condition for the test bit
```

| | | | |
|---|---|---|---|
| Operation: | tb {'&'|'|'}= cFlagOp( {Rn | simm4 | imm} - Rm) | | |
| | where: | Rm is | r0, r1, r2, . . ., rF |
| | | Rn is | r0, r1, r2, . . ., rF |
| | | imm is | a 16-bit immediate value |
| | | simm4 is | a 4-bit immediate value plus sign ranging from −16 to +15 |
| | | cFlagop is | ex, !ex, n, !n, ov, !ov, z, !z, c, !c, gte, lt, gt, lte, ugt, ulte |
| Restrictions: | None | | |
| Description: | The contents of Rm are subtracted from the contents of Rn. The ALU flags are updated as a result of the compare execution. The test bit is then assigned the desired condition/ flag. This instruction should prove useful to eliminate many branches in control code, as shown in the examples, below. | | |
| Flags affected: | N, Z, C, OV, LT, EX, TB, TS (TS only affected on "tb=" assignments) | | |
| Example: | /* Consider the case where an increment must occur only if the result won't exceed a maximum value of 8: */<br>tb = GT( 8 − r4 ); // Compare 8 to r4 (counter)<br>if (tb) r4 = r4 + 2; // Increment r4 by 2 (r4 can't exceed 9)<br>/* This instruction sets the EX flag uniquely to allow simple implementation of a limit comparison. This is used to implement piecewise linear segments in real-time DSP code. It is used in wavetable synthesis to update the amplitude along a linear segment of the envelope. The following diagram illustrates the two cases for a piecewise linear segment: | | |

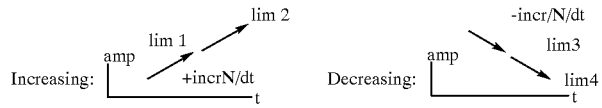

It is desirable to implement both increasing and decreasing linear segments; unfortunately, a simple compareison and branch (current amp compared to limit) will not work for both increasing and decreasing segments without changing the branch condition dynamically. The limit compare solves this problem by providing a means to factor the sign of a third variable, the increment, into the comparison. The following code conditionally increments the current amp, if the limit has not been reached: */
// On input: r4 = curAmp, r9 = limN, and r8 = incrN
tb = EX( r4 − r9);   // tb = (curAmp < limN) ⊕ (incrN < 0)
if (tb) r9 = r9 + r8;   // if (not past limit) curAmp + = incrN
    /* Note that for increasing segments, limN = trueUpperBoundN − (incrN − 1). Similarly, for decreasing segments, limN = trueLowerBoundN − incrN. The difference between incrN and (incrN−1) is due to the fact that zero is included with the positive case. */

Opcodes:

| ALUop: | | aluOperands | | | opcode | | | |
|---|---|---|---|---|---|---|---|---|
| | [18:15] | [14:11] | [10:7] | [6:4] | [3:2] | [1:0] | | |
| | Rn | cFlagOp | Rm | 000 | 11 | 10 | tb = cFlagOp( Rn − Rm ) | |
| | | | | | 01 | 10 | tb |= cFlagOp( Rn − Rm ) | |

APPENDIX 1-continued

|  |  |  |  |  |  | 11 | tb &= cFlagOp( Rn − Rm ) |
|--|--|--|--|--|--|----|--------------------------|
|  | imm4 | cFlagop | Rm | 010 | 1  s | 10 | tb = cFlagOp( simm4 − Rm ) |
|  |      |         |    |     | 0    | 10 | tb \|= cFlagOp( simm4 − Rm ) |
|  |      |         |    |     |      | 11 | tb &= cFlagOp( simm4 − Rm ) |

| WideOp: |  | wideOperands |  |  | opcode |  |  |  |
|---------|--|--------------|--|--|--------|--|--|--|
| [30:15] |  | [14:11] | [10:7] | [6:4] | [3:2] | [1:0] |  |  |
| imm[15:0] |  | cFlagOp | Rm | 000 | 11 | 10 | tb = cFlagOp( imm − Rm ) |  |
|           |  |         |    |     | 01 | 10 | tb \|= cFlagOp( imm − Rm ) |  |
|           |  |         |    |     |    | 11 | tb &= cFlagOp( imm − Rm ) |  |

Detailed instruction operation:
```
        // Select source B operand (according to instruction type/opcode)
        if ( wideOp )
                opB[15:0] ← wideOperands[30:15]
        else if ( aluOpcode[5] == '1' )
                opB[15:4] ← aluOpcode[2]
                opB[3:0] ← aluOperands[18:15]
        else
                opB[15:0] ← (Rn)[15:0]
        // Compute the requested sum
        result[15:0] ← opB[15:0] + (Rm)[15:0] + 1
        // Extract sgnA for limitCMP test placed in EX flag
        switch ( Rm )
            {
            case r0, r1, r8, r9: sgnA ← r8[bit 15] //srcaPair is r8, extract sign
            case r2, r3, rA, rB: sgnA ← rA[bit 15] //srcaPair is rA, extract sign
            case r4, r5, rC, rD: sgnA ← rC[bit 15] //srcaPair is rC, extract sign
            case r6, r7, rE, rF: sgnA ← rE[bit 15] //srcaPair is rE, extract sign
            }
        // Update flags according to the result
        N ← result[15]
        Z ← (result[15:0] == '0')
        C ← Cy,out[15]
        OV ← Cy, out[14] ⊕ Cy, out[15]
        LT ← N ⊕ OV
        // Assign EX to serve as the limitCMP indicator flag (this and the accumulator move
        // instructions are the only ones to affect the EX flag)
        EX ← N ⊕ sgnA
        // Set flag according to cFlagOp
        switch ( cFlagOp[3:1])
            {
            case N:    rawFlag ← N          // N(Rn − Rm)
            case OV:   rawFlag ← OV         // OV(Rn − Rm)
            case Z:    rawFlag ← Z          // Z(Rn − Rm)
            case C:    rawFlag ← C          // C(Rn − Rm)
            case LT:   rawFlag ← LT         // LT(Rn − Rm)
            case LTE:  rawFlag ← LT | Z     // LTE(Rn − Rm)
            case ULTE: rawFlag ← C | Z      // ULTE(Rn − Rm)
            case EX:   rawFlag ← EX         // EX(Rn − Rm)   //see example
            }
        flag ← rawFlag ⊕ cFlagOp[0]
        // Set TB from flag according to the desired method
        switch ( opcode[3] & opcode[0] )
            {
            case 10:   TS ← TB             // TB = ...
                       TB ← flag
            case 00:   TB ← TB | flag      // TB |= ...
            case 01:   TB ← TB & flag      // TB &= ...
            } tb {'&'|'|'}= cFlagOp( {Rn | simm4 | imm} − Rm )

{if (tb)} Rdest = {Rn | simm4 | imm} − Rm
Subtract 16-bit Rm from Rn/immediate storing the result in the specified Rdest register
```

Operation: {if (tb)} Rdest = (Rn | simm4 | imm} − Rm
where:  Rm is     r0, r1, r2, ..., rF
        Rn is     r0, r1, r2, ..., rF
        imm is    a 16-bit immediate value
        simm4 is  a 4-bit immediate value plus sign ranging from −16 to +15
        Rdest is  r0, r1, r2, ..., rF Restrictions: None Description: The contents of Rm are subtracted from the contents of Rn (or an immediate value). If unconditional or the test bit is set, the result is stored in the specified Rdest register and the ALU flags are updated. Note that saturation is not performed in case of overflow (see the description of "{if (tb)} Rdest = Rn $− Rm" on page 67 for a subtract with saturation).

Flags affected: if unconditional or test bit is set, then update N, Z, C, OV, LT APPENDIX 1-continued Example: r5 = rA − rB;  // Subtract rB from rA storing result in r5
   tb = GTE(0 − r7); // Compare r7 to 0; if r7 <= 0, set TB to 1; otherwise, set TB to 0
          // Note: Actually, we compare 0 to r7 and set TB if 0 >= r7
          which is the same condition as stated in the comment, just
          reversed from right-to-left
   if (tb) r7 = 0 − r7; // If (r7 <= 0) r7 = −r7
Opcodes:

| ALUop: | aluOperands | | | | opcode | | | |
|---|---|---|---|---|---|---|---|---|
| | [18:15] | [14:11] | [10:7] | 6 | [5:4] | [3:0] | | |
| | Rn | Rdest | Rm | if | 01 | 0101 | {if (tb)} Rdest = Rn − Rm | |
| | imm4 | | | tb | 11 0 s | 01 | {if (tb) Rdest = simm4 − Rm | |

| WideOp: | wideOperands | | | | opcode | | |
|---|---|---|---|---|---|---|---|
| | [30:15] | [14:11] | [10:7] | 6 | [5:4] | [3:0] | |
| | imm[15:0] | Rdest | Rm | if tb | 01 | 0101 | {if (tb)} Rdest = imm − Rm |

Detailed instruction operation:
  // Select source B operand (according to instruction type/opcode)
  if ( wideOp )
    opB[15:0] ← wideOperands[30:15]
  else if ( aluOpcode[5] == '1' )
    opB[15:4] ← aluOpcode[2]
    opB[3:0] ← aluOperands[18:15]
  else
    opB[15:0] ← (Rn)[15:0]
  // Compute the requested difference by complementing subtrahend and adding one
  result[15:0] ← opB[15:0] + $\overline{(Rm)[15:0]}$ + 1
  // If unconditional or (conditional on test bit AND tb is set)
  if( opcode[6] = '0' or TB == '1' )
    {
    // Update flags according to the result
    N ← result[15]
    Z ← $\overline{(result[15:0] == \text{'0'})}$
    C ← $\overline{Cy,out[15]}$
    OV ← Cy, out[14] ⊕ Cy, out[15]
    LT ← N ⊕ OV
    // Write result back into the destination register
    (Rdest)[15:0] ← result[15:0]
    }

{if (tb)} Rdest = {Rn | simm4 | imm} $− Rm
   Subtract 16-bit Rm to Rn/immediate with saturation on overflow storing
     the result in the specified Rdest register Operation: {if (tb)} Rdest = {Rn | simm4 | imm} $− Rm
   where: $− is a 16-bit subtraction with saturation on overflow (saturation may be
        signed or unsigned according to the saturation mode)
     Rm is r0, r1, r2, ..., rF
     Rn is r0, r1, r2, ..., rF
     imm is a 16-bit immediate value
     simm4 is a 4-bit immediate value plus sign ranging from −16 to +15
     Rdest is r0, r1, r2, ..., rF
Restrictions: None
Description: The contents of Rm are subtracted from the contents of Rn (or an immediate value) with
   saturation on overflow. If unconditional or the test bit is set, the result is stored in the
   specified Rdest register and the ALU flags are updated. Saturation may be configured as
   signed or unsigned by the satMode instruction. Note that flags are set according to the
   result prior to saturation and that for unsigned saturation, the carry flag (C) indicates
   overflow.
Flags affected: if unconditional or test bit is set, then update N, Z, C, OV, LT
Example: mode(signedSat,,,,); // Set desired saturation mode (in this case signed)
   r5 = rC $− r8; // Subtract r8 from rC with sat. on overflow storing result in r5
   if (tb) r7 = r5 $+ 4; // If (test bit set), add r5 and 4 with sat. on overflow, result to r7
Opcodes:

| ALUop: | aluOperands | | | | opcode | | | |
|---|---|---|---|---|---|---|---|---|
| | [18:15] | [14:11] | [10:7] | 6 | [5:4] | [3:0] | | |
| | Rn | Rdest | Rm | if | 01 | 0111 | {if (tb)} Rdest = Rn $− Rm | |
| | imm4 | | | tb | 11 0 s | 11 | {if (tb) Rdest = simm4 $− Rm | |

| WideOp: | wideOperands | | | | opcode | | |
|---|---|---|---|---|---|---|---|
| | [30:15] | [14:11] | [10:7] | 6 | [5:4] | [3:0] | |
| | imm[15:0] | Rdest | Rm | if tb | 01 | 0101 | {if (tb)} Rdest = imm $− Rm |

Detailed instruction operation:
  // Select source B operand (according to instruction type/opcode)

APPENDIX 1-continued

```
        if ( wideOp )
            opB[15:0] ← wideOperands[30:15]
        else if ( aluOpcode[5] == '1' )
            opB[15:4] ← aluOpcode[2]
            opB[3:0] ← aluOperands[18:15]
        else
            opB[15:0] ← (Rn)[15:0]
        // Compute the requested difference by complementing subtrahend and adding one
        result[15:0] ← opB[15:0] + (Rm)[15:0] + 1
        // If unconditional or (conditional on test bit AND tb is set)
        if( opcode[6] = '0' or TB == '1' )
            {
                // Update flags according to the result
                N ← result[15]
                Z ← (result[15:0] == '0' )
                C ← Cy,out[15]
                OV ← Cy, out[14] ⊕ Cy, out[15]
                LT ← N ⊕ OV
                // Check for un/signed overflow and write proper result into Rdest
                if ( OV == 1 and satMode == signed)
                    (Rdest)[15:0] ← ( (N == 0) ? 0x8000:0x7FFF)
                else if ( C == 1 and satMode == unsigned)
                    (Rdest){15:0] ← 0x0000
                else // Result did not overflow, write back output of adder
                    (Rdest)[15:0] ← result[15:0]
            }
```

{if (tb)} Rdest = {Rn | simm4 | imm} –B– Rm
Subtract with borrow 16-bit Rm from Rn/immediate storing the result in the specified Rdest register Operation:    {if(tb)} Rdest = {Rn | simm4 | imm} –B– Rm
           where:   Rm is     r0, r1, r2, . . ., rF
                     Rn is      r0, r1, r2, . . ., rF
                     imm is    a 16-bit immediate value
                     B is       the borrow (carry) flag
                     Rdest is   r0, r1, r2, . . , rF
Restrictions: None
Description: The contents of Rm and the borrow flag (C) are subtracted from the contents of Rn (or an
immediate value). If unconditional or the test bit is set, the result is stored in the speci-
fied Rdest register and the ALU flags are updated. Note that saturation is not performed
in case of overflow (see the description of "{if (tb)} Rdest = Rn $-b– Rm" on page 71 for
a subtract with borrow and saturation).
Flags affected: if unconditional or test bit is set, then update N, Z, C, OV, LT
Example:     // Subtract 32-bit r76 from r54 storing result in r98
            r8 = r4 – r6;      // Subtract least-significant 16 bits
            r9 = r5 –b– r7;   // Subtract most-significant 16 bits + borrow from msw
Opcodes:

| ALUop: | aluOperands | | | opcode | | | |
|---|---|---|---|---|---|---|---|
| | [18:15] | [14:11] | [10:7] | 6 | [5:4] | [3:0] | |
| | Rn | Rdest | Rm | if tb | 01 | 0001 | {if (tb)} Rdest = Rn –b– Rm |

| WideOp: | wideOperands | | | opcode | | | |
|---|---|---|---|---|---|---|---|
| | [30:15] | [14:11] | [10:7] | 6 | [5:4] | [3:0] | |
| | imm[15:0] | Rdest | Rm | if tb | 01 | 0001 | {if (tb)} Rdest = imm –b– Rm |

Detailed instruction operation:
```
        // Select source B operand (according to instruction type/opcode)
        if ( wideOp )
            opB[15:0] ← wideOperands[30:15]
        else
            opB[15:0] ← (Rn)[15:0]
        // Compute the requested difference by complementing subtrahend and borrow
        result[15:0] ← opB[15:0] + (Rm)[15:0] + C
        // If unconditional or (conditional on test bit AND tb is set)
        if( opcode[6] = '0' or TB == '1' )
            {
                // Update flags according to the result
                N ← result[15]
                Z ← (result[15:0] == '0' )
                C ← Cy,out[15]
                OV ← Cy, out[14] ⊕ Cy, out[15]
                LT ← N ⊕ OV
                // Write result back into the destination register
                (Rdest)[15:0] ← result[15:0]
            }
```

APPENDIX 1-continued

{if (tb)} Rdest = {Rn | simm4 | imm} $-B- Rm
Subtract with borrow 16-bit Rm from Rn/immediate with saturation on overflow storing
the result in the specified Rdest register Operation:    {if(tb)} Rdest = {Rn | simm4 | imm} $-B- Rm
where:
- $- is    a 16-bit subtraction with saturation on overflow (saturation may be signed or unsigned according to the saturation mode)
- Rm is    r0, r1, r2, . . ., rF
- Rn is    r0, r1, r2, . . ., rF
- imm is    a 16-bit immediate value
- B is    the borrow (carry) flag
- Rdest is    r0, r1, r2, . . ., rF Restrictions: None Description: The contents of Rm and the borrow flag (C) are subtracted from the contents of Rn (or an immediate value) with saturation on overflow. If unconditional or the test bit is set, the result is stored in the specified Rdest register and the ALU flags are updated. Saturation may be configured as signed or unsigned by the satMode instruction. Note that flags are set according to the result prior to saturation and that for unsigned saturation, the carry flag (C) indicates overflow.

Flags affected: if unconditional or test bit is set, then update N, Z, C, OV, LT Example:    // This example illustrates a 32-bit saturating subtract (using 16-bit subtract w/borrow)
```
mode(signedSat,,,,):    // Set desired saturation mode (in this case signed)
r8 = r4 - r6;           // Subtract least-significant 16 bits
r9 = r5 $-b- r7;        // Subtract most-significant 16 bits + borrow from msw
tb = OV, if (OV) r8 = r9;  // if msw overflowed, saturate lsw (instr. copies OV flag to tb)
if (tb) r8 = r9 << 1;   // Shift saturated lsw left 1 bit (w/o overflow protect)
if (tb) r8 = r8 +>> 1;  // Shifting back right 1 bit w/sign-ext. fills lsw
// Note: Many times the lsw-saturation will be unnecessary since the most-significant 16
//       bits are already saturated (lsw may not be that important when msw clipping)
//       Also, the right-shift only affects the lsbit for positive overflow making it almost
//       certainly negligable.
```

Opcodes:

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if tb | 01 | 0011 | {if (tb)} Rdest = Rn $-b- Rm |

| WideOp: | wideOperands | | | | opcode | | |
|---|---|---|---|---|---|---|---|
| | [30:15] | [14:11] | [10:7] | 6 | [5:4] | [3:0] | |
| | imm[15:0] | Rdest | Rm | if tb | 01 | 0011 | {if (tb)} Rdest = imm $-b- Rm |

Detailed instruction operation:
```
// Select source B operand (according to instruction type/opcode)
if ( wideOp )
    opB[15:0] ← wideOperands[30:15]
else
    opB[15:0] ← (Rn)[15:0]
// Compute the requested difference by complementing subtrahend and borrow
result[15:0] ← opB[15:0] + (Rm)[15:0] + C
// If unconditional or (conditional on test bit AND tb is set)
if( opcode[6] = '0' or TB == '1' )
{
    // Update flags according to the result
    N ← result[15]
    Z ← (result[15:0] == '0' )
    C ← Cy,out[15]
    OV ← Cy, out[14] ⊕ Cy, out[15]
    LT ← N ⊕ OV
    // Check for un/signed overflow and write proper result into Rdest
    if ( OV == 1 and satMode == signed )
        (Rdest)[15:0] ← ( (N == 0) ? 0x8000:0x7FFF)
    else if ( C == 1 and satMode == unsigned)
        (Rdest){15:0] ← 0x0000
    else // Result did not overflow, write back output of adder
        (Rdest)[15:0] ← result[15:0]
}
```

APPENDIX 2

{if (tb)} Rdest = Rm << {Rn | imm4}
Shift 16-bit Rm left by the number of bits specified in Rn/immediate storing the result
in the specified Rdest register

| | |
|---|---|
| Operation: | {if (tb)} Rdest = Rm << {Rn | imm4} |
| | where: Rm is    r0, r1, r2, . . ., rF |
| | Rn is    r0, r1, r2, . . ., rF |
| | imm4 is    a 4-bit immediate value ranging from 0 to +15 |
| | Rdest is    r0, r1, r2, . . ., rF |
| Restrictions: | Valid shift counts range from 0 to 15 (hardware ignores upper 12 bits of Rn). |
| Description: | The contents of Rm are shifted left by the number of bits specified by the contents of Rn (or an immediate value). If unconditional or the test bit is set, the result is stored in the specified Rdest register and the ALU flags are updated. The carry flag (C) indicates unsigned overflow and the overflow flag (OV) indicates signed overflow. If the shift was unconditional, the test bit (TB) will contain the last bit shifted out of the 16-bit Rdest register (ideal for bit testing). Note that saturation is not perforrned in case of overflow (see the description of "{(if (tb) } Rdest = Rm $<< Rn" on page 77 for a shift-left with saturation). |
| Flags affected: | if unconditional or test bit is set, then update N, Z, C, OV, LT |
| | TB and TS are affected, if an unconditional shift was specified |
| Example: | r7 = r7 << 1;     // Shift r7 left 1 bit and implicitly set TB to former msb |
| | if (tb) r6 = r6 + 1; // Increment count of one bits in r7 |
| Opcodes: | |

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if | 01 | 1100 | {if (tb)} Rdest = Rm << Rn |
| | imm4 | | | tb | 11 | | {if (tb)} Rdest = Rm << imm4 |

Detailed instruction operation:

```
// Select the shift count operand (according to instruction type/opcode)
if ( aluOpcode[5] == '1')
    opB[3:0] ← aluOperands[18:15]
else
    opB[15:0] ← (Rn)[15:0]
// Perform the requested shift (note 17-bit output for flag generation)
result[16:0] ← (Rm)[15:0] << (shCnt ← opB[3:0])
// If unconditional or (conditional on test bit AND tb is set)
if ( opcode[6] == '0' or TB == '1')
    {
    // Update flags according to the result
    N ← result[15]
    Z ← (result[15:0] == '0')
    C ← (shCnt == 0) ? 0: ((Rm)[15:(16-shCnt)] != (shCnt) '0')
    OV ← ( (Rm)[15:(15-shCnt)] != (shCnt+1) '0' and
        (Rm)[15:(15-shCnt)] != (shCnt+1) '1'
    LT ← N ⊕ OV (only useful for 1-bit left-shifts)
    // Only update TS, TB on unconditional shifts
    if( opcode[6] != '1')
        TS ← TB     // Save previous value of test-bit into test-bit save flag
        TB ← result[16]
    // Write result back into the destination register
    (Rdest)[15:0] ← result[15:0]
    }
```

{if (tb)} Rdest = Rm $<< {Rn | imm4}
Shift 16-bit Rm left by the number of bits specified in Rn/immediate with saturation on
overflow storing the result in the specified Rdest register

| | |
|---|---|
| Operation: | {if (tb)} Rdest = Rm $<< {Rn | imm4} |
| | where: $<< is    a left shift with saturation in case of overflow (saturation may be con- figured as signed or unsigned according to the saturation mode) |
| | Rm is    r0, r1, r2, . . ., rF |
| | Rn is    r0, r1, r2, . . .,rF |
| | imm4 is    a 4-bit immediate value ranging from 0 to +15 |
| | Rdest is    r0, r1, r2, . . .,rF |
| Restrictions: | Valid shift counts range from 0 to 15 (hardware ignores upper 12 bits of Rn). |
| Description: | The contents of Rm are shifted left by the number of bits specified by the contents of Rn (or an immediate value) with saturation on overflow. If unconditional or the test bit is set, the result is stored in the specified Rdest register and the ALU flags are updated. Saturation may be configured as signed or unsigned by the satMode instruction. The carry flag (C) indicates unsigned overflow and the overflow flag (OV) indicates signed overflow. Note that the flags are set according to the result prior to saturation. If the shift was unconditional, the test bit (TB) will contain the last bit shifted out of the 16-bit Rdest register (ideal for bit testing). |
| Flags affected: | if unconditional or test bit is set, then update N, Z, C, OV, LT |
| | TB and TS are affected, if an unconditional shift was specified |
| Example: | if (tb) r7 = r7 $<< 1;    // If (tb) scale r7 up by shifting left by 1 bit with overflow prot. |
| | r8 = rE $<< 4;         // Shift rE left 4 bits w/saturation in case of overflow, result to r8 |

APPENDIX 2-continued

Opcodes:

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if | 01 | 1110 | {if (tb)} Rdest = Rm $<< Rn |
| | imm4 | | | tb | 11 | | {if (tb)} Rdest = Rm $<< imm4 |

Detailed instruction operation:
   // Select the shift count operand (according to instruction type/opcode)
   if ( aluOpcode[5] == '1')
     opB[3:0] ← aluOperands[18:15]
   else
     opB[15:0] ← (Rn)[15:0]
   // Perform the requested shift (note 17-bit output for flag generation)
   result[16:0] ← (Rm)[15:0] << (shCnt ← opB[3:0])
   // If unconditional or (conditional on test bit AND tb is set)
   if ( opcode[6] == '0' or TB == '1')
   {
     // Update flags according to the result
     N ← result[15]
     Z ← (result[15:0] == '0')
     C ← (shCnt == 0) ? 0:( (Rm)[15:(16-shCnt)] != (shCnt) '0')
     OV ← ( (Rm)[15:(15-shCnt)] != (shCnt+1) '0' and
       (Rm)[15:(15-shCnt)] != (shCnt+1) '1'
     LT ← N ⊕ OV (only useful for 1-bit left-shifts)
     // Only update TS, TB on unconditional shifts
     if( opcode[6] != '1')
       TS ← TB  // Save previous value of test-bit into test-bit save flag
       TB ← result[16]
     // Check for un/signed overflow and write proper result into Rdest
     if ( OV == 1 and satMode == signed)
       (Rdest)[15:0] ← ((Rm[15] == 1) ? 0x8000:0x7FFF)
     else if ( C == 1 and satMode == unsigned)
       (Rdest){15:0] ← 0xFFFF
     else // Result did not overflow, write back output of adder
       (Rdest)[15:0] ← result[15:0]
   }

{if (tb)} Rdest = Rm >> {Rn | imm4}
   Shift 16-bit Rm right-logical by the number of bits specified in Rn/immediate storing
         the result in the specified Rdest register

| Operation: | {if (tb)} Rdest = Rm >> {Rn \| imm4} | |
|---|---|---|
| | where: | >> is  a logical (zero-extending) right shift |
| | | Rm is  r0, r1, r2, . . ., rF |
| | | Rn is  r0, r1, r2, . . ., rF |
| | | imm4 is a 4-bit immediate value ranging from 0 to +15 |
| | | Rdest is r0, r1, r2, . . ., rF |
| Restrictions: | Valid shift counts range from 0 to 15 (hardware ignores upper 12 bits of Rn). | |
| Description: | The contents of Rm are shifted right logically by the number of bits specified by the contents of Rn (or an immediate value). If unconditional or the test bit is set, the result is stored in the specified Rdest register and the ALU flags are updated. The carry (C) and overflow (OV) flags are always cleared. If the shift was unconditional, the test bit (TB) will contain the last bit shifted out of the 16-bit Rdest register (ideal for bit testing). This is a logical right-shift which shifts zero bits into the vacated most-significant bits of the result. For a sign-extending (arithmetic) shift, see the description of "{if (tb)} Rdest = Rm +>> Rn" on page 81. | |
| Flags affected: | if unconditional or test bit is set, then update N, Z, C, OV, LT
TB and TS are affected, if an unconditional shift was specified | |
| Example: | r5 = r7 >> 4;  // Shift r7 right 4 bits and set implicity set TB to bit 4 of r7
if (tb) r6 = r6 + r8; // if ( r7 & (1 << 4)) r6 += r8 (r5 is clobbered in this sequence) | |

Opcodes:

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if | 01 | 1101 | {if (tb)} Rdest = Rm >> Rn |
| | imm4 | | | tb | 11 | | {if (tb)} Rdest = Rm >> imm4 |

Detailed instruction operation:
   // Select the shift count operand (according to instruction type/opcode)
   if ( aluOpcode[5] == '1')
     opB[3:0] ← aluOperands[18:15]
   else
     opB[15:0] ← (Rn)[15:0]
   // Perform the requested shift (note 17-bit output for flag generation)
   result[15:-1] ← (Rm)[15:0] >> (opB[3:0])
   // If unconditional or (conditional on test bit AND tb is set)
   if ( opcode[6] == '0' or TB == '1')
   {

APPENDIX 2-continued

```
        // Update flags according to the result
        N ← result[15]
        Z ← (result[15:0] == '0')
        C ← 0
        OV ← 0
        LT ← N ⊕ OV = N
        // Only update TS, TB on unconditional shifts
        if ( opcode[6] != '1')
            TS ← TB        // Save previous value of test-bit into test-bit save flag
            TB ← result[-1]
        // Write result back into the destination register
        (Rdest)[15:0] ← result[15:0]
    }
```

{if (tb)} Rdest = Rm +>> {Rn | imm4}
Shift 16-bit Rm right-arithmetic by the number of bits in Rn/immediate storing the result
in the specified Rdest register

| | |
|---|---|
| Operation: | {if (tb)} Rdest = Rm +>> {Rn \| imm4} |
| | where:  +>> is    an arithmetic (sign-extending) right shift |
| |         Rm is    r0, r1, r2, . . ., rF |
| |         Rn is    r0, r1, r2, . . ., rF |
| |         imm4 is  a 4-bit immediate value ranging from 0 to +15 |
| |         Rdest is r0, r1, r2, . . ., rF |
| Restrictions: | Valid shift counts range from 0 to 15 (hardware ignores upper 12 bits of Rn). |
| Description: | The contents of Rm are shifted right arithmetically by the number of bits specified by the contents of Rn (or an immediate value). If unconditional or the test bit is set, the result is stored in the specified Rdest register and the ALU flags are updated. The carry (C) and overflow (OV) flags are always cleared. If the shift was unconditional, the test bit (TB) will contain the last bit shifted out of the 16-bit Rdest register (ideal for bit testing). This is an arithmetic right-shift which shifts copies of the sign bit into the vacated most-significant bits of the result. For a zero-extending (logical) shift, see the description of "{if (tb)} Rdest = Rm >> Rn" on page 79. |
| Flags affected: | if unconditional or test bit is set, then update N, Z, C, OV, LT |
| | TB and TS are affected, if an unconditional shift was specified |
| Example: | if (tb) r5 = r9 +>> 1;    // Conditionally divide r9 by 2 and store result in r5 |
| Opcodes: | |

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if | 01 | 1111 | {if (tb)} Rdest = Rm +>> Rn |
| | imm4 | | | tb | 11 | | {if (tb)} Rdest = Rm +>> imm4 |

Detailed instruction operation:
```
        // Select the shift count operand (according to instruction type/opcode)
        if ( aluOpcode[5] == '1')
            opB[3:0] ← aluOperands[18:15]
        else
            opB[15:0] ← (Rn)[15:0]
        // Perform the requested shift (note 17-bit output for flag generation)
        result[15:1] ← (Rm)[15:0] +>> opB[3:0]
        // If unconditional or (conditional on test bit AND tb is set)
        if ( opcode[6] == '0' or TB == '1')
        {
            // Update flags according to the result
            N ← result[15]
            Z ← (result[15:0] == '0')
            C ← 0
            OV ← 0
            LT ← N ⊕ OV = N
            // Only update TS, TB on unconditional shifts
            if( opcode[6] != '1')
                TS ← TB      // Save previous value of test-bit into test-bit save flag
                TB ← result[-1]
            // Write result back into the destination register
            (Rdest)[15:0] ← result[15:0]
        }
```

APPENDIX 3

{if (tb)} Rdest = Rm & {Rn | imm}
Logically AND 16-bit Rm with Rn/immediate storing the result in specified Rdest register

| | |
|---|---|
| Operation: | {if (tb)} Rdest = Rm & {Rn \| imm} |
| | where:  Rm is  r0, r1, r2, . . ., rF |
| |         Rn is  r0, r1, r2, . . ., rF |

APPENDIX 3-continued

|  |  |  |
|---|---|---|
|  | imm is | a 16-bit immediate value |
|  | Rdest is | r0, r1, r2, . . ., rF |
| Restrictions: | None | |
| Description: | The contents of Rm are logically AND'ed with the contents of Rn (or an immediate value). If unconditional or the test bit is set, the result is stored in the specified Rdest register and the ALU flags are updated. The carry (C) and overflow (OV) flags are always cleared. | |
| Flags affected: | if unconditional or test bit is set, then update N, Z, C, OV, LT | |
| Example: | rC = r3 & 0xff; // Mask off least-significant byte of r3 | |
|  | rD = r3 >> 8; // rD = most-significant byte of r3 | |
| Opcodes: |  |  |

| ALUop: | aluOperands | | | | opcode | | |
|---|---|---|---|---|---|---|---|
|  | [18:15] | [14:11] | [10:7] | 6 | [5:4] | [3:0] | |
|  | Rn | Rdest | Rm | if tb | 01 | 1000 | {if (tb)} Rdest = Rm & Rn |

| WideOp: | wideOperands | | | opcode | | |
|---|---|---|---|---|---|---|
|  | [30:15] | [14:11] | [10:7] | 6 | [5:4] | [3:0] | |
|  | imm[15:0] | Rdest | Rm | if tb | 01 | 1000 | {if (tb)} Rdest = Rm & imm |

Detailed instruction operation:
```
        // Select source B operand (according to instruction type/opcode)
        if ( wideOp )
                opB[15:0] ← wideOperands[30:15]
        else
                opB[15:0] ← (Rn)[15:0]
        // Compute the requested logical operation
        result[15:0] ← (Rm)[15:0] & opB[15:0]
        // If unconditional or (conditional on test bit AND tb is set)
        if ( opcode[6]== '0' or TB == '2')
        {
                // Update flags according to the result
                N ← result[15]
                Z ← (result[15:0] == '0')
                C ← 0
                OV ← 0
                LT ← N ⊕ OV = N
                // Write result back into the destination register
                (Rdest)[15:0] ← result[15:0]
        }
```

{if (tb)} Rdest = {Rn | imm} & ~Rm
Logically AND 16-bit Rn/immediate with NOT(Rm) storing the result in the specified Rdest register

|  |  |  |
|---|---|---|
| Operation: | {if (tb)} Rdest = {Rn | imm} & ~Rm | |
|  | where: Rm is | r0, r1, r2, . . ., rF |
|  | Rn is | r0, r1, r2, . . ., rF |
|  | imm is | a 16-bit immediate value |
|  | Rdest is | r0, r1, r2, . . ., rF |
| Restrictions: | None | |
| Description: | The contents of Rm are inverted and logically AND'ed with the contents of Rn (or an immediate value). If unconditional or the test bit is set, the result is stored in the specified Rdest register and the ALU flags are updated. The carry (C) and overflow (OV) flags arc always cleared. | |
| Flags affected: | if unconditional or test bit is set, then update N, Z, C, OV, LT | |
| Example: | r4 = r3 &~ r5; // r4 = r3 masked by the zero-bits of r5 | |
|  | // r7 = mask for particalar bit in a bitfield | |
|  | rE = rE &~ r7; // Clear specified bitfield bit in rE (andnot performs bit clear) | |
| Opcodes: |  |  |

| ALUop: | aluOperands | | | opcode | | |
|---|---|---|---|---|---|---|
|  | [18:15] | [14:11] | [10:7] | 6 | [5:4] | [3:0] | |
|  | Rn | Rdest | Rm | if tb | 01 | 1001 | {if (tb)} Rdest = Rn &~ Rm |

| WideOp: | wideOperands | | | opcode | | |
|---|---|---|---|---|---|---|
|  | [30:15] | [14:11] | [10:7] | 6 | [5:4] | [3:0] | |
|  | imm[15:0] | Rdest | Rm | if tb | 01 | 1001 | {if (tb)} Rdest = imm &~ Rm |

Detailed instruction operation:
```
        // Select source B operand (according to instruction type/opcode)
        if ( wideOp )
                opB[15:0] ← wideOperands[30:15]
        else
                opB[15:0] ← (Rn)[15:0]
        // Compute the requested logical operation
```

APPENDIX 3-continued

```
            result[15:0] ← (Rm)[15:0] & opB[15:0]
            // If unconditional or (conditional on test bit AND tb is set)
            if ( opcode[6]== '0' or TB == '2')
                {
                    // Update flags according to the result
                    N ← result[15]
                    Z ← (result[15:0] == '0')
                    C ← 0
                    OV ← 0
                    LT ← N ⊕ OV = N
                    // Write result back into the destination register
                    (Rdest)[15:0] ← result[15:0]
                }
```

{if (tb)} Rdest = Rm | {Rn | imm}
Logically (inclusive) OR 16-bit Rm with Rn/immediate storing the result in the specified
Rdest register

| | | | | | | | |
|---|---|---|---|---|---|---|---|
| Operation: | {if (tb)} Rdest = Rm \| {Rn \| imm} | | | | | | |
| | where: | Rm is | r0, r1, r2, . . ., rF | | | | |
| | | Rn is | r0, r1, r2, . . ., rF | | | | |
| | | imm is | a 16-bit immediate value | | | | |
| | | Rdest is | r0, r1, r2, . . ., rF | | | | |
| Restrictions: | None | | | | | | |
| Description: | The contents of Rm are logically inclusive-OR'ed with the contents of Rn (or an immediate value). If unconditional or the test bit is set, the result is stored in the specified Rdest register and the ALU flags are updated. The carry (C) and overflow (OV) flags are always cleared. | | | | | | |
| Flags affected: | if unconditional or test bit is set, then update N, Z, C, OV, LT | | | | | | |
| Example: | r4 = r3 \| r5;   // r4 = r3 logically OR'ed r5 | | | | | | |
| | // r7 = mask for particular bit in a bitfield | | | | | | |
| | rE = rE \| r7;   // Set the specified bitfield bit in rE (OR peforms bit set) | | | | | | |
| Opcodes: | | | | | | | |

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if tb | 01 | 1010 | {if (tb)} Rdest = Rm \| Rn |

| WideOp: | wideOperands | | | | opcode | | |
|---|---|---|---|---|---|---|---|
| | [30:15] | [14:11] | [10:7] | 6 | [5:4] | [3:0] | |
| | imm[15:0] | Rdest | Rm | if tb | 01 | 1010 | {if (tb)} Rdest = Rm \| imm |

Detailed instruction operation:

```
            // Select source B operand (according to instruction type/opcode)
            if ( wideOp )
                opB[15:0] ← wideOperands[30:15]
            else
                opB[15:0] ← (Rn)[15:0]
            // Compute the requested logical operation
            result[15:0] ← (Rm)[15:0] | opB[15:0]
            // If unconditional or (conditional on test bit AND tb is set)
            if ( opcode[6] == '0' or TB == '1')
                {
                    // Update flags according to the result
                    N ← result[15]
                    Z ← (result[15:0] == 1'0')
                    C ← 0
                    OV ← 0
                    LT ← N ⊕ OV = N
                    // Write result back into the destination register
                    (Rdest)[15:0] ← result[15:0]
                }
```

{if (tb)} Rdest = Rm ^ {Rn | imm}
Logically exclusive-OR 16-bit Rm with Rn/immediate storing the result in the
specified Rdest register

| | | | |
|---|---|---|---|
| Operation: | {if (tb)} Rdest = Rm ^ (Rn \| imm) | | |
| | where: | ^ is | the exclusive-or operator |
| | | Rm is | r0, r1, r2, . . ., rF |
| | | Rn is | r0, r1, r2, . . ., rF |
| | | imm is | a 16-bit immediate value |
| | | Rdest is | r0, r1, r2, . . ., rF |
| Restrictions: | None | | |
| Description: | The contents of Rm are logically exclusive-OR'ed with the contents of Rn (or an immediate value). If unconditional or the test bit is set, the result is stored in the specified Rdest register and the ALU flags are updated. The carry (C) and overflow (OV) flags are | | |

APPENDIX 3-continued

|  |  |
|---|---|
| | always cleared. |
| Flags affected: | if unconditional or test bit is set, then update N, Z, C, OV, LT |
| Example: | r4 = r3 ^ r5;  // r4 = r3 logically XOR'ed r5 |
| | // r7 = mask for particular bit in a bitfield |
| | rE = rE ^ r7;  // Toggle specified bitfield bit in rE (XOR performs bit toggle) |
| Opcodes: | |

| ALUop: | aluOperands | | | | opcode | | |
|---|---|---|---|---|---|---|---|
| | [18:15] | [14:11] | [10:7] | 6 | [5:4] | [3:0] | |
| | Rn | Rdest | Rm | if tb | 01 | 1011 | {if (tb)} Rdest = Rm ^ Rn |

| WideOp: | wideOperands | | | opcode | | |
|---|---|---|---|---|---|---|
| | [30:15] | [14:11] | [10:7] | 6 | [5:4] | [3:0] | |
| | imm[15:0] | Rdest | Rm | if tb | 01 | 1011 | {if (tb)} Rdest = Rm ^ imm |

Detailed instruction operation:
```
        // Select source B operand (according to instruction type/opcode)
        if ( wideOp )
              opB[15:0] ← wideOperands[30:15]
        else
              opB[15:0] ← (Rn)[15:0]
        // Compute the requested logical operation
        result[15:0] ← (Rm)[15:0] ⊕ opB[15:0]
        // If unconditional or (conditional on test bit AND tb is set)
        if ( opcode[6] == '0' or TB == '1')
              {
              // Update flags according to the result
              N ← result[15]
              Z ← (result[15:0] == '0')
              C ← 0
              OV ← 0
              LT ← N ⊕ OV = N
              // Write result back into the destination register
              (Rdest)[15:0] ← result[15:0]
              }
```

{if (tb)} Rdest = Rm {'|' |'&~'} bit[N]
Set/clear the specified bit mask with 16-bit Rm storing the result in specified Rdest register

|  |  |
|---|---|
| Operation: | {if (tb)} Rdest = Rm {'|' |'&~'} bit[N] |
| | where:  Rm is  r0, r1, r2, . . ., rF |
| |          bit[N] is  bit number specifier ranging from bit[0] to bit[15] (bit[0] is the least-significant bit) |
| |          Rdest is  r0, r1, r2, . . ., rF |
| Restrictions: | None |
| Description: | The specified bit in Rm is set or cleared by performing the specified logical OR or AND (with mask invert) operation. If unconditional or the test bit is set, the result is stored in the specified Rdest register and the ALU flags are updated. The carry (C) and overflow (OV) flags are always cleared. |
| Flags affected: | if unconditional or test bit is set, then update N, Z, C, OV, LT |
| Example: | tb = Z( rD & bit[2]);    // Set TB if bit 2 of rD is clear |
| | rC = rC | bit[12];       // Set bit 12 in rC |
| | if (tb) r9 = rD &~ bit[9];  // if (rD bit 2 is clear) r9 = rD with bit 9 cleared |
| Opcodes: | |

| ALUop: | aluOperands | | | | opcode | | |
|---|---|---|---|---|---|---|---|
| | [18:15] | [14:11] | [10:7] | 6 | [5:4] | [3:0] | |
| | N | Rdest | Rm | if tb | 11 | 1000 | {if (tb)} Rdest = Rm &~ bit[N] |
| | | | | | | 1010 | {if (tb)} Rdest = Rm | bit[N] |

Detailed instruction operation:
```
        // Select source B operand
        opB[3:0] ← N[3:0]
        // Compute the requested bit set/clear operation using the logic unit
        if ( opcode[1:0] == "00")
              result[15:0] ← (Rm)[15:0] & ~(1 << opB[3:0])
        else // opcode[1:0] == "10"
              result[15:0] ← (Rm)[15:0] | (1 << opB[3:0])
        // If unconditional or (conditional on test bit AND tb is set)
        if(opcode[6] == '0' or TB == '1')
              {
              // Update flags according to the result
              N ← result[15]
              Z ← (result[15:0] =='0')
              C ← 0
              OV ← 0
              LT ← N ⊕ OV = N
```

APPENDIX 3-continued

```
// Write result back into the destination register
(Rdest)[15:0] ← result[15:0]
}
```

{tb {'&' |'|'}= bFlagOp}( Rm & {Rn | imm} )
Logically AND 16-bit Rm with Rn/immediate updating flags, and optionally select the
desired flag to update the test bit

| | | |
|---|---|---|
| Operation: | {tb {'&' |'|'}) = bFlagOp}( Rm & {Rn | imm} ) | |
| | where: | Rm is    r0, r1, r2, . . ., rF |
| | | Rn is    r0, r1, r2, . . ., rF |
| | | imm is    a 16-bit immediate value |
| | | bFlagOp is    z, !z |
| Restrictions: | None | |
| Description: | The contents of Rm are logically AND'ed with the contents of Rn (or an immediate value). The ALU flags are updated as a result of the logical AND execution. If specified, the test bit is then assigned the desired condition/flag. This instruction should prove useful to eliminate many branches in control code, as shown in the example, below. | |
| Flags affected: | N, Z, C, OV LT | |
| | TB is affected, if the instruction specifies an assignment to it | |
| | TS is only affected on "tb=" assignments | |
| Example: | // Increment if the 2 lsbits are clear | |
| | tb = Z(r6 & 3);    // Mask for 2 lsbits | |
| | if (tb) r4 = r4 + 2; // Increment r4 by 2, if the 2 lsbits of r6 are clear | |
| Opcodes: | | |

| ALUop: | | aluOperands | | | | opcode | | | |
|---|---|---|---|---|---|---|---|---|---|
| | [18:15] | 14 | 13 | 12 | 11 | [10:7] | [6:4] | [3:0] | |
| | Rn | 11 | | 0 | b | Rm | 000 | 0011 | Rm & Rn |
| | | 10 | | | Flag | | | | tb = bFlagOp( Rm & Rn ) |
| | | 00 | | | Op | | | | tb |= bFlagOp( Rm & Rn ) |
| | | 01 | | | | | | | tb &= bFlagOp( Rm & Rn ) |

| WideOp: | | wideOperands | | | | opcode | | | |
|---|---|---|---|---|---|---|---|---|---|
| | [30:15] | 14 | 13 | 12 | 11 | [10:7] | [6:4] | [3:0] | |
| | imm[15:0] | 11 | | 0 | b | Rm | 000 | 0011 | Rm & imm |
| | | 10 | | | Flag | | | | tb = bFlagOp( Rm & imm ) |
| | | 00 | | | Op | | | | tb |= bFlagOp( Rm & imm ) |
| | | 01 | | | | | | | tb &= bFlagOp( Rm & imm ) |

Detailed instruction operation:
```
// Select source B operand (according to instruction type/opcode)
if ( wideOp )
    opB[15:0] ← wideOperands[30:15]
else
    opB[15:0] ← (Rn)[15:0]
// Compute the requested logical-AND
result[15:0] ← (Rm)[15:0] & opB[15:0]
// Update flags according to the result
N ← result[15]
Z ← (result[15:0] == '0')
C ← OV ← 0
LT ← N ⊕ OV = N
// Set flag according to bFlagOp
flag ← Z ⊕ bFlagOp[0]
// Set TB from flag according to the desired method
switch ( operand[14:13] )
    {
        case 11:    no TB assignment
        case 10:    TS ← TB        // TB = . . .
                    TB ← flag
        case 00:    TB ← TB | flag // TB |= . . .
        case 01:    TB ← TB &      // TB &= . . .
                    flag
    }
```

{tb {'&' | '|'}= bFlagOp}( Rm & bit[ {Rn | N}])
Test specified bit by logically ANDing the Rn/immediate bit mask with 16-bit Rm and
updating flags, and optionally select the desired flag to update the test bit

| | | |
|---|---|---|
| Operation: | {tb {'&' | '|'}= bFlagOp}( Rm & bit[ {Rn | N} ]) | |
| | where: | Rm is    r0, r1, r2, . . ., rF |
| | | Rn is    r0, r1, r2, . . ., rF |
| | | bit[Rn] is    bit mask from the 4 least-significant bits of Rn (like bit[N], but bit number is in a register instead of specified as an immediate) |
| | | bit[N] is    bit number specifier ranging from bit[0] to bit[15] (bit[0] is the least-significant bit) |
| | | bFlagOp is    z, !z |
| Restrictions: | None | |

APPENDIX 3-continued

| | |
|---|---|
| Description: | The contents of Rm are logically AND'ed with the bit mask as specified by Rn (or bitN, immediately). The ALU flags are updated as a result of the logical AND execution. The test bit is then assigned the desired condition/flag. This instruction should prove useful to eliminate many branches in control code, as shown in the example, below. |
| Flags affected: | N, Z, C, OV, LT<br>TB is affected, if the instruction specifies an assignment to it<br>TS is only affected on "tb=" assignments |
| Example: | // increment if bit 6 is set.<br>tb = !Z( r6 & bit[6]);   // Mask for bit 6<br>if (tb) r4 = r4 + 2;    // Increment r4 by 2, if bit 6 of r6 is set |
| Opcodes: | |

| ALUop: | | aluOperands | | | | opcode | | |
|---|---|---|---|---|---|---|---|---|
| | [18:15] | 14  13 | 12 | 11 | [10:7] | [6:4] | [3:0] | |
| | N | 11 | 1 | b | Rm | 000 | 0010 | Rm & bit[N] |
| | | 10 | | Flag | | | | tb = bFlagOp( Rm & bit[N] ) |
| | | 00 | | Op | | | | tb \|= bFlagOp( Rm & bit[N] ) |
| | | 01 | | | | | | tb &= bFlagOp( Rm & bit[N] ) |
| | Rn | 11 | 1 | b | Rm | 000 | 0011 | Rm & bit[Rn] |
| | | 10 | | Flag | | | | tb = bFlagOp( Rm & bit[Rn] ) |
| | | 00 | | Op | | | | tb \|= bFlagOp( Rm & bit[Rn] ) |
| | | 01 | | | | | | tb &= bFlagOp( Rm & bit[Rn] ) |

Detailed instruction operation:

```
// Select source B operand (according to instruction type/opcode)
if ( opcode[0] == '1')
    opB[15:0] ← (Rn)[15:0]
else
    opB[3:0] ← N[3:0]
// Compute the requested logical-AND
result[15:0] ← (Rm)[15:0] & (1 << opB[3:0])
// Update flags according to the result
N ← result[15]
Z ← (result[15:0] == '0')
C ← 0
OV ← 0
LT ← N ⊕ OV = N
// During the subsequent execution cycle, set flag according to bFlagOp
flag ← Z ⊕ bFlagOp[0]
// Set TB from flag according to the desired method
switch ( operand[14:13])
    {
    case 11:    no TB assignment
    case 10:    TS ← TB          // TB = . . .
                TB ← flag
    case 00:    TB ← TB | flag   // TB |= . . .
    case 01:    TB ← TB & flag   // TB &= . . .
    }
```

{tb={!}cond,} if (cond) Rdest = {Rn | simm4 | imm}
Conditionally move 16-bit Rn/immediate to the specified Rdest register

| | |
|---|---|
| Operation: | {tb={!}cond,} if(cond) Rdest = {Rn \| simm4 \| imm}<br>where:   cond is   tb, !tb, ex, !ex, n, !n, ov, !ov, z, !z, c, !c, gte, lt, always, never<br>        Rn is     r0, r1, r2, . . ., rF<br>        imm is    a 16-bit immediate value (frequently, the address of some RAM or ROM data Structure obtained by applying the & (address-of) operator to its label)<br>        simm4 is  a 4-bit immediate value plus sign ranging from −16 to +15<br>        Rdest is  r0, r1, r2, . . ., rF |
| Restrictions: | None |
| Description: | If the specified cond evaluates to true, the contents of Rn (or an immediate value) is stored in the specified Rdest register (no flags are affected). If the test bit is to be updated, then set the test bit according to the condition-evaluation with optional inversion (!tb). |
| Flags affected: | If the instruction specified to update TB with the condition-evaluation, update TB, TS. |
| Example: | // C-like code: if( −r8 == 0 ) r4 = 1; else r5 = r5 + 4;<br>r8 = r8 + (−1);<br>tb=!z, if (z) r4 = 1;   // if( r8 == 0) r4 = 1; (sets tb =!(r8 == 0))<br>if (tb) r5 = r5 + 4;    // else increment r5 by 4 |
| Opcodes: | |

| ALUop: | | aluOperands | | | | opcode | | | |
|---|---|---|---|---|---|---|---|---|---|
| | [18:15] | [14:11] | [10:7] | 6 | [5:4] | | [3:0] | | |
| | Rn | Rdest | cond | 0 | 00 | | 0101 | if (cond) Rdest= Rn | |
| | | | | 1 | | | 0101 | tb = cond, if (cond) Rdest = Rn | |
| | | | | | | | 0111 | tb = !cond, if (cond) Rdest = Rn | |
| | imm4 | Rdest | cond | 0 | 10 | 0 | s  01 | if (cond) Rdest = simm4 | |
| | | | | 1 | | | 01 | tb = cond, if (cond) Rdest = simm4 | |

APPENDIX 3-continued

|  |  |  |  |  |  | 11 | tb = !cond, if (cond) Rdest = simm4 |
|---|---|---|---|---|---|---|---|
| WideOp: | wideOperands | | | opcode | | | |
| [30:15] | [14:11] | [10:7] | 6 | [5:4] | [3:0] | | |
| imm[15:0] | Rdest | cond | 0 | 00 | 0101 | | if (cond) Rdest = imm |
| | | | 1 | | 0101 | | tb = cond, if (cond) Rdest = imm |
| | | | | | 0111 | | tb = !cond, if (cond) Rdest = imm |

Detailed instruction operation:
    // Select source B operand (according to instruction type/opcode)
    if ( wideOp )
        opB[15:0] ← wideOperands[30:15]
    else if ( aluOpcode[5] == '1')
        opB[15:4] ← aluOpcode[2]
        opB[3:0] ← aluOperands[18:15]
    else
        opB[15:0] ← (Rn)[15:0]
    // Move the specified source operand
    result[15:0] ← opB[15:0]
    Insert "switch ( cond[3:1] )" block (including assignment to condEval) from the detailed
    instruction description of "{tb= {!}cond, } if (cond) Rdest = Rdest $+ {Rn | simm4 |
    imm}" on page 57.
    // If the test bit is to be updated, set TB to the condition-evaluation or its complement
    if ( opcode[6] == '1')
        TS ← TB    // Save previous value of test-bit into test-bit save flag
        TB ← condEval ⊕ opcode[1]
    // If condition evaluated to true, write back the result
    if ( condEval)
        (Rdest)[15:0] ← result[15:0]

APPENDIX 4 mode( {accOnly | auxOnly | acc:aux | signedSat | unsignedSat}, . . .
Change the MAC unit, ALU saturation, Y-register/sample routing, parameter/coefficient
routing, and/or parameter/coefficient data size modes

| Operation: | mode( | {accOnly | auxOnly | acc:aux | signedSat | unsignedSat}, . . . |
|---|---|---|
| | | {ySingle | yDual}, {,, | s[hl]:[hl], p[hl]:[hl], p(16 | 20)} ); |
| | Where: | accOnly      specifies to use MAC-unit 0 only, |
| | | auxOnly      specifies to use MAC-unit 1 only, |
| | | acc:aux      specifies to use both MAC units concurrently, |
| | | signedSat      specifies to use signed ALU saturation mode, |
| | | unsignedSat      specifies to use unsigned ALU saturation mode, |
| | | ySingle      specifies that when the Y input to the multiplier is a register-file register, it is to be interpreted as broadcast to both MAC units, |
| | | yDual      specifies that when the Y input to the multiplier is a register-file register, it is to be interpreted as going to MAC-unit 0. The source for MAC-unit 1 is the paired register of that specified (i.e. r4 implies r4 goes to MAC-unit 0 and r5 to MAC-unit 1) |
| | | sh:h, sh:l, sl:h, sl:l      specifies that when the sample AGU sources the Y input to the multiplier ("rsa0–3++ . . . or rsd0–3), the first selection (h or l before ':') specifies the routing into MAC-unit 0 from the sample data and the second selection (h or l after ':') specifies the routing into MAC-unit 1. For single MAC-unit mode, you should specify "sh:h" since when single samples are read from sample memory, they are placed into the most-significant 16-bits of the sp_yd. |
| | | ph:h, ph:l, pl:h, pl:l      specifies that when the parameter/coefficient AGU sources the X input to the multiplier (*r0–3{++ . . .}, *(r0–3+1)), the first selection (h or l before ':') specifies the routing into MAC-unit 0 from the parameter data and the second selection (h or l after ':') specifies the routing into MAC-unit 1. For 20-bit data, "ph:h" should be specified since 20-bit data consumes the entire 32-bit word and is aligned in the upper 20 bits of the word. |
| | | p16, p20      specifies the bit-width of data from the parameter/coefficient AGU into the X input of the multiplier. 20-bit data is broadcast to both MAC units (ph:h only). For 16-bit data, any of the above parameter/coefficient routings are valid. |
| Restrictions: | None | |
| Description: | Mode-change instruction. This instruction can change the MAC-unit, ALU saturation, sp_vd register-file source, or sample/parameter dual data routing modes. It also may specify the bit-width of data from the parameter/coefficient AGU. The MAC unit and routing modes allow single-instruction, dual-data control of the dual MAC units. All mode bits except the ALU saturation mode may be set bu modifying the MACmode register. See page 14 for a description of this register. The ALU saturation mode may be set by modifying the status register (see page 17). Both of these register may be modified using the extended register move instructions on page 124. | |

APPENDIX 4-continued

Flags affected: None
Example: mode ( acc:aux,, sh:l, ph:h, p20);
  // Set dual MAC-unit mode, route high/low words of sample
  data to MAC units 0/1, and select 20-bit param. AGU data
  mode( accOnly,,,,);  // Set single MAC-unit mode
Opcodes:

| ALUop: | | | aluOperands | | | | | | aluOpcode | | | |
|---|---|---|---|---|---|---|---|---|---|---|---|---|
| 18 | 17 | 16 15 | 14 | 13 | 12 | 11 | 10 | [9:7] | [6:4] | [3:0] | |
| samp route | | param route | pa sz | sprs upd | 0 | yr upd | yr 32 | MuSatM | 000 | 0000 | mode({MuSatM}, {yr32}, („lsampleAGU route, paramAGU route, param, size}) |
| | | | | 0 | 0 | 0 | | 000 | | | NOP (ALUop) |

Detailed instruction operation:
```
            // Update MAC-unit or saturation mode as appropriate
            if ( aluOperands[9] == '0' )
                {
                // Insure that "000" is a NOP,
                // MACunitEnab[0] indicates whether MAC-unit 0 is active, and
                // MACunitEnab[1] indicates whether MAC-unit 1 is active.
                if ( aluOperands[8:7] != "00")
                    MACunitEnab[1:0] ← aluOperands[8:7]
                // A change to the parallel MAC-unit mode is staged over 3 clock cycles. In the
                // execution cycle of the current instruction, the multiplier is switched to the
                // new mode. Two clock cycles later, the 39-bit adder is switched into the
                // specified mode. This staging allows for the normal flow of MACs through
                // the unit to be cleanly changed from single to dual and back.
                }
            else // aluOperands[9] =='1'
                {
                // Insure that "11x" is reserved for future use,
                // satMode indicates signed saturation when 0 and unsigned when 1
                if ( aluOperands[8] == '0' )
                    satMode ← aluOperands[7]
                // A change in the saturation mode affects all 16-bit ALU adds, subtracts, and
                // shifts that specify to use saturation (operator preceded by $).
                }
            // Update mode for register-file sources to the Y input of the MAC units
            if( aluOperands[11] =='1' )
                yr32 ← aluOperands[10]
            // Update sample routing parameter/coef. routing, and parameter/coef. size
            if( aluOperands[13] == '1' )
                { sAGUroute[1:0] ← aluOperands[18:17]
                pAGUroute[1:0] ← aluOperands[16:15]
                pAGUsize20b ← aluOperands[14]
                }
``` mode( {accOnly | auxOnly | acc:aux | signedSat | unsignedSat}, . . .

pr = +/− srcx * srcy, after a 1 cycle delay
  Load the specified srcx and srcy operands into X and Y for multiplication with an optional
  sign change of the resulting product Operation: pr = +/− srcx * srcy, after a 1 cycle delay
  where:  srcx is  r8, r9, rA, . . ., rF, hi20(r54, r76, r98, . . ., rFE), r5:r4, r7:r6, . . ., rF:rE,
    acc0–3$, *r0–3, *(r0–3+1), *r0–3++1, *r0–3++rci0, *r0–3++rci1,
    rsa0frac, 1.0-rsa0frac, c-1.0, abs(srcy), square(srcy)
  srcy is  r4, r5, r6, . . ., rF, rsdN, (rsdN = *rsaN++1), (rsdN = *rsaN++rsiM)
    where N = 0–3 and M = 0–2
Restrictions:  If srcx specifies a register-file register source (r8, r9, . . ., rF, hi20(r54, r76, . . ., rFE), or
    r5:r4, r7:r6, . . ., rF:rE), then the accumulator may not be loaded from a register-file regis-
    ter in a parallel ALUop instruction (both accumulator load and srcx use the sp_gx bus
    for register-file sources).
    If srcx specifies a saturated accumulator source (acc0$, acc1$, acc2$, or acc3$), then the
    accumulator may not be loaded from a register-file register in a parallel ALUop instruc-
    tion (both accumulator load and srcx use the sp_gx bus for register-file sources). A paral-
    lel accumulator shift operation is also prohibited since both instructions use the sp_ad
    (MAC unit result) bus.
    If srcx specifies a parameter/coefficient memory source (*r0–3, *(r0–3+1), *r0–3++1,
    *r0–3++rci0/1), then a parameter/coefficient memory load may not be specified in a par-
    allel ALUop instruction. A parameter/coefficient memory store may not be specified in
    either a parallel ALUop instruction nor in the immediately preceding instruction. Also
    note that the address register (r0–3) and any increment register used (rci0/1) must be
    loaded at least 2 cycles before being used in the parameter/coefficient AGU. See the
    pipeline illustration in the description of "Rldst{16} = {lo | hi} *bs{++postInc}" on
    page 119.
    If srcy specifies a register-file register, then a parameter memory store may not be speci-

APPENDIX 4-continued fied in a parallel ALUop instruction (parameter store and srcy share a register-file port).
If srcy specifies a sample memory load (. . . *rsaN . . .), then the accumulator may not be loaded from a sample AGU source in a parallel ALUop instruction. A sample store may not be specified in either a parallel ALUop instruction nor in the immediately preceding instruction. Also note that the sample address register (rsa0–3) and any sample increment register used (rsi0–2) must be loaded at least 3 cycles before being used in the sample AGU. See the pipeline illustration in the description of "AccDest = sampleAGUsrc" on page 111.
If srcy specifies a sample data register load (rsdN), then the accumulator may not be loaded from a sample AGU source in a parallel ALUop instruction (the two would collide upon reading rsdN over the Y bus).
Note that the latency of the multiplier is two cycles (the multiply instruction loads X and Y during its execution cycle and the multiply automatically takes place in the subsequent execution cycle in a fully-pipelined manner).
Also note that the multiply instruction disables interrupts for 6 cycles.

Description: The contents of the specified srcx operand are loaded into the X register and the contents of the specified srcy operand are loaded into the Y register. If a negative sign-change is specified, the srcy operand is negated. During the subsequent execution phase, X and Y are multiplied to produce the product. The product is latched into the PR register unless the instruction following the multiply (which is executing currently) is a WideOp instruction and the product from a preceding multiply would be overwritten without opportunity to access it. The product is eventually latched into PR during the execution of the first non-wideOp instruction after the sequence of one or more wideOp instructions. The following pipeline diagram illustrates a common code sequence which results in the product latch being deferred:

Pipelined sequence illustrating wideOp multiply hold

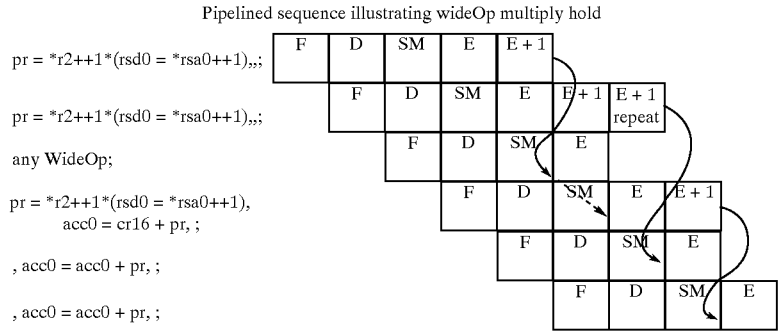

NOTE: if you switch MAC-unit modes (e.g. from acc:aux to accOnly), the effect on adds is NOT delayed. Thus care must be taken when interspersing WideOps near critically late MAC-unit mode changes (an example of such would be where you change modes, but in the previous cycle issued the last multiply for the previous mode expecting to accumulate its results according to the old mode, but then insert WideOps which delay the product, but not the adder mode).
The following table describes the srcx operands in greater detail:

| srcx | Description | Source bus | Conflicts |
| --- | --- | --- | --- |
| acc0$, acc1$, acc2$, acc3$ | Load X register on MAC units from saturated 20-bit accumulator value. Note that MAC unit 0's accumulator values are broadcast to both MAC units. | sp_ad, sp_gx | Load acc from reg-file, shift accum. |
| r8, r9, rA, rB, . . ., rF | Load X register on MAC units from 16-bit reg-file register (lower 4 bits of X are cleared) | sp_gx | Load acc from reg-file |
| hi20(r54, r76 r98, . . ., rFE) | Load X register on MAC units from upper 20 bits of the specified 32-bit reg-file register. | sp_gx | Load acc from reg-file |
| r5:r4, r7:r6, r9:r8, . . ., rF:rE | Load X register on MAC unit 0 from upper 16 bits of the specified 32-bit register pair, MAC Unit 1 is loaded from the lower 16-bits of the specified 32-bit register pair. | sp_gx | Load acc from reg-file |
| *rP *(rP+1) (P=0, 1, 2, 3) | Load X register on MAC units from parameter/coef. data bus at the address in rP or rP+1 (16/20-bit data size and routing controlled by mode) | sp_pd | Parameter mem. load/store |
| *rP++1 *rP++rci0 *rP++rci1 | Load X register on MAC units from parameter/coef. data bus at the address in rP. Post-increment rP by specified increment/register | sp_pd | Parmeter mem. load/store |
| rsa0frac | Load X register on MAC units from the | rsFracD | None |

APPENDIX 4-continued

| | | | |
|---|---|---|---|
| 1.0-rsa0frac | fractional part of rsa0. See "4.2 Sample AGU" on page 21 for a more info. Note that these two codes are differentiated by the multiply sign, if +, srcx = rsa0frac, if −, srcx = rsa0frac-1.0 | | |
| c-1.0 | Constant −1.0 (to copy srcy to PR, use "pr = −c-1.0 * srcy") | rsFracD | None |
| abs(srcy)† | Computes absolute value of srcy (X is loaded with C-1.0) | rsFracD | None |
| square(srcy)† | Computes srcy squared | sp_yd | None |

†The proper syntax for abs and square is "pr = abs(srcy)" and "pr = square(srcy)"

The following table describes the srcy operands in greater detail:

| srcy | Description | Source bus | Conflicts |
|---|---|---|---|
| r4, r5, r6, r7, . . ., rF | Load Y register on MAC units from 16-bit reg-file register (valid if yr32 is false) | sp_yd | Parallel parameter memory store |
| r4:r5, r5:r4, r6:r7, r7:r6, . . ., rF:rE | Load Y register on MAC unit 0 from the first specified 16-bit register of pair, MAC unit 1 is loaded from the other register of the pair (valid if yr32 is true) | sp_yd | |
| rsdQ (Q=0, 1, 2, 3) | Load Y register on MAC units with the last data read from sample memory using *rsaQ (Y0/1 controlled by rsConfig) | sp_yd | Load acc sample-AGUsrc |
| *rsaQ++1 *rsaQ++rsi0 *rsaQ++rsi1 *rsaQ++rsi2 | Load Y register on MAC units from sample RAM data bus at the address in rsaQ. Post-increment rsaQ by specified increment/register | sp_sd to rsdQ, then sp_yd | Sample store in same or prev instr |

| | | |
|---|---|---|
| Flags affected: | None | |
| Example: | mode( accOnly,,,,); | // Set single MAC-unit mode |
| | pr = r8 * r7,,; | // Load r7 and r8 to multiply (r7 can only be spec'd on srcy) |
| | nop; | // Delay slot to allow pipelined multiply to complete |
| | , acc0 = cr16 + pr,; | // Add r7 * r8 to 16-bit rounding constant |
| | r9 = acc0; | // r9 = r7 * r8 rounded to 16 bits |
| | // This example illustrates a pair of multiplies pipelined together | |
| | pr = −rA * rD, , mode(accOnly,,,,); | |
| | | // Load rA into X0, and rD into Y0, set single MAC-unit mode |
| | pr = r8 * r9,,; | // Multiply X0 by Y0, result to PR, load r8 into X0 & r9 into Y0 |
| | , acc0 = cr16 + pr,; | // Multiply X0 by Y0, result to PR, acc0 = −r5 * r7 + rounding const. for 16-bit result |
| | , acc1 = c0 + pr, | // acc1 = r8 * r9 |
| | r6 = acc0; | // r6 = −r5 * r7 rounded to 16 bits |
| | rBA = acc1; | // rBA = 32-bit product of r8 and r9 |
| Opcodes: | Note that srcx is the union of srcx0, srcx1, and srcx2 | |

| mOp: | mOpcode | | | | | mOperands |
|---|---|---|---|---|---|---|
| | [39:38] | [37:36] | [35:32] | 31 | [30:26] | |
| | 01 | 00 | srcx0 | +/− | srcy | pr = +/− srcx * srcy |
| | | 01 | srcx1 | | | |
| | | 11 | srcx2 | | | |

Detailed instruction description:
```
        switch (srcx)       // Select and load srcx operand from appropriate bus
            {
            case r8, r9, rA, . . ., rF:
            case hi20(r54), hi20(r76), hi20(r98), . . ., hi20(rFE):
            case r5:r4, r7:r6, r9:r8, . . ., rF:rE:
            case acc0, acc1, acc2, acc3:
                // Place register-file data on the general-purpose bus (sp_gx)
                if ( srcx == (hi20(r54, r76, . . ., rFE) or r5:r4, r7:r6 rF:rE) )
                    sp_gx[31:0] ← (srcx)[31:0]
                else if ( srcx == r9, rB, rD, or rF)
                    sp_gx[31:16] ← regPair(srcx)[31:16]
                    sp_gx[15:9] ← (16) '0'
                else if ( srcx == r8, rA, rC, or rE )
                    sp_gx[31:16] ← regPair(srcx)[15:0]
                    sp_gx[15:0] ← (16) '0'
                else // if ( srcx == acc0, acc1, acc2, or acc3 )
                    {
                    // Read source operand from the accumulator
                    MACunitResultBus[39:0] ← (accM)[39:0]
                    // Place saturated result on the gx bus
                    if ( MACunitResultBus[39:34] != (6) '0' and
                         MACunitResultBus[39:34] != (6) '1' )
                            sp_gx[31:0] ← MACunitResultBus[39] &
                                (31) MACunitResultBus[39]
```

APPENDIX 4-continued

```
                else // No overflow, place full acc-value onto sp_gx
                     sp_gx[31:0] ← MACunitResultBus[34:3]
                }
         // Load both X0 and X1 from the general-purpose bus (sp_gx)
         if ( srcx == r5:r4, r7:r6, . . ., or rF:rE)
                X0[19:0] ← sp_gx[31:16] & (4) '0'
                X1[19:0] ← sp_gx[15:0] & (4) '0'
         else
                X0[19:0] ← sp_gx[31:12]
                X1[19:0] ← sp_gx[31:12]
     case *rP, *(rP+1), *rP++1,*rP++rci0, *rP++rci1:
         // Read source operand from parameter RAM/coefficient ROM
         sp_pa[15:0] ← rP[15:0] + ((srcx == *(rP+1)) ?1:0)
         pSelHiWord ← pSelLoWord ← pRead ← '1'
         sp_pd[31:0] ← memoxy @ sp_pa[15:0]
         // Post-increment address, if requested
         if ( srcx == (*rP++1, *rP++rci0, or *rP++rci1) )
                rP ← rP + ((srcx == *rP++1) ? 1:((srcx == *rP++rci0) ? rci0:rci1))
         // Load both X0 and X1 from the parameter/coefficient data bus
         if ( pAGUsize20b)
                X0[19:0] ← sp_pd[31:12]
                X1[19:0] ← sp_pd[31:12]
         else
                X0[19:0] ← (pAGUroute[0] ? sp_pd[31:16]:sp_pd[15:0]) & (4) '0'
                X1[19:0] ← (pAGUroute[1] ? sp_pd[31:16]:sp_pd[15:0]) & (4) '0'
     case rsa0frac:            // same code as 1.0-rsa0frac
         // Place source operand onto rsFracD[19:0] data bus
         // Sign bit of rsa0frac is set to +/- (0/1) to achive + rsa0frac and
         // -(rsa0frac - 1.0) = 1.0 - rsa0frac
         rsFracD[19] ← mOperands[31]
         switch ( rsConfig01[ds])
                {
                       caseFracD[18:0] ← rsa0[17:0] & '0'
                       BYTE:
                       cassFracD[18:0] ← rsa0[16:0] & '00'
                       WORD:
                       cassFracD[18:0] ← rsa0[15:0] & '000'
                       DWORD:
                }
         // Load both X0 and X1 from the rsFracD bus
         X0[19:0] ← rsFracD[19:0]
         X1[19:0] ← rsFracD[19:0]
     case c-1.0, abs(srcy):
         // Place source operand onto rsFracD[19:0] data bus
         rsFracD[19:0] ← '1' & (19) '0'
         // Load both X0 and X1 from the rsFracD bus
         X0[19:0] ← rsFracD[19:0]
         X1[19:0] ← rsFracD[19:0]
     case square(srcy):
         X0[19:0] ← Y0sel[15:0] & (4) '0'
         X1[19:0] ← Y1sel[15:0] & (4) '0'
     }
// Select srcy from the sp_yd sourced from either the register-file or the sAGU
switch (srcy)
     {
     case r4, r5, r6, . . ., rF:
         // Place register-file data onto the sp_yd
         sp_yd[31:0] ← regPair(srcy)[31:0]
         // Load both Y0 and Y1 from sp_yd
         if ( srcy = r4, r6, r8, . . ., rE)
                Y0sel[15:0] ← sp_yd[15:0]
                Y1sel[15:0] ← (yr32 ? sp_yd[31:16]:sp_yd[15:0])
         else // srcy == r5, r7, r9, . . ., rF
                Y0sel[15:0] ← sp_yd[31:16]
                Y1sel[15:0] ← (yr32 ? sp_yd[15:0]:sp_yd[31:16])
     case rsdQ, *rsaQ++1, #rsaQ++rsi0, *rsaQ++rsi1, *rsaQ++rsi2:
         // See detail for loading accumulator from a sampleAGUsrc on page 111
         // Load both Y0 and Y1 from sp_yd
         Y0sel[15:0] ← (sAGUroute[0] ? sp_yd[31:16]:sp_yd[15:0])
         Y1sel[15:0] ← (sAGUroute[1] ? sp_yd[31:16]:sp_yd[15:0])
     }

// Load Y operand for multiply
         // Note: bit [-1] is to be input to the Boothe recoder as the bit below the least-significant
         //              2 bits (normally a 0 is jammed into the lsb of the least-significant recoder). This
         //              effectively adds 1 to the complement thus negating the product.
         if ( srcx == abs(srcy) )
                {
                       Y0[15:0] ← Y0sel[15:0] ⊕ $\overline{Y0sel[15]}$
                       Y0[-1] ← $\overline{Y0sel[15]}$
```

APPENDIX 4-continued

```
                Y1[15:0] ← Y1sel[15:0] ⊕ Y1sel[15]
                Y1[-1] ← Y1sel[15]
            }
        else if (±sign == '+' (0) )
            {
                Y0[15:0] ← Y0sel[15:0]
                Y0[-1] ← '0'
                if(lockMAC1sign && MAX1sign == '1'/*negative*/)
                    {
                        Y1[15:0] ← Y1sel[15:0]
                        Y1[-1] ← '1'
                    }
                else
                    {
                        Y1[15:0] ← Y1sel[15:0]
                        Y1[-1] ← '0'
                    }
            }
        else // ±sign == '-' (1)
            {
                Y0[15:0] ← Y0sel[15:0]
                Y0[-1] ← '1'
                if(lockMAC1sign && MAC1sign == '0' /*positive*/))
                    {
                        Y1[15:0] ← Y1sel[15:0]
                        Y1[-1] ← '0'
                    }
                else
                    {
                        Y1[15:0] ← Y1sel[15:0]
                        Y1[-1] ← '1'
                    }
            }
    } pr = +/- srcx * srcy, after a 1 cycle delay
``` destAcc = accM {+|-} accN
Add/subtract the specified accumulator to/from an accumulator storing the result in the
destination accumulator

| | |
|---|---|
| Operation: | destAcc = accM {+|-} accN |
| | where: accM is   acc0, acc1, acc2, or acc3 |
| | accN is   acc2 or acc3 |
| | destAcc is   acc0, acc1, acc2, acc3 |
| Restrictions: | The destination for a parallel accumulator load must not be the same as that for this add (the result will be an indeterminate value in the dest. acc). Due to the MiC-unit mode, it may not be possible for the assembler to detect this conflict, but it can always produce a waring/error when a collision is possible/definate. |
| Description: | The contents of the specified accN are added to or subtracted from the contents of the specified accM with the result being stored in the specified destination accumulator. |
| Flags affected: | None |
| Example: | , acc3 = acc0 - acc2,;   // Subtract acc2 from acc0 and store result in acc3 |
| Opcodes: | |

```
aOp:           aOp        addOperands
          [25:24]   23    [22:21]  [20:19]
            01     accN    accM     destAcc    destAcc = accM + accN
            10                                 destAcc = accM - accN
```

Detailed instruction operation:
```
        srcMsel[39:0] ← (accM)[39:0]
        if ( aOp[25:24] == "10")
            srcNsel[39:0] ← (accN)[39:0]
            srcCsel[39:0] ← (39) '0' & '1'
        else
            srcNsel[39:0] ← (accN)[39:0]
            srcCsel[39:0] ← (40) '0'
        destAcc[39:0] ← srcMsel[39:0] + srcNsel[39:0] + srcCsel[39:0]
``` destAcc = {accM | constM} + pr
Add the specified accumulator/rounding constant to the product storing the result in the
destination accumulator

| | |
|---|---|
| Operation: | destAcc = {accM | constM} + pr |
| | where: accM is   acc0, acc1, acc2, or acc3 |
| | constM is   c0, cr16, cr17, . . ., cr22 |
| | pr is   Virtual product register in the MAC-units. |
| | destAcc is   acc0, acc1, acc2, acc3 |
| Restrictions: | The product being added to the specified constant or accumulator must have been issued |

APPENDIX 4-continued as a multiply instruction at least two instructions prior to this add instruction since the multiplier requires a two cycle latency to produce the product which is accumulated using this instruction.

The destination for a parallel accumulator load must not be the same as that for this add (the result will be an indeterminate value in the dest. acc). Due to the MAC-unit mode, it may not be possible for the assembler to detect this conflict, but it can always produce a warning/error when a collision is possible/definate.

Description: The contents of the specified accM or rounding constant are added to the contents of the virtual product register with the result being stored in the specified destination accumulator. Note that a 3-input adder is used to permit compression of the final sum and carry vectors out of the multiplier.

Flags affected: None

Example:
```
pr = rC * r5,,;         // Load rC and r5 for multiply
nop;                    // Multiply rC and r5 (extra cycle of latency)
, acc0 = crl6 + pr,;    // Add 16-bit rounding const. to product (rC * r5)
r6 = acc0;              // Place 16-bit rounded result into r6
```

Opcodes:

| aOp: | aOp [25:24] | 23 | addOperands [22:21] | [20:19] | |
|---|---|---|---|---|---|
| | 00 | 1 | accM | destAcc | destAcc = accM + pr |
| | 11 | | constM[2] | constM[1:0] | destAcc = constM + pr |

Detailed instruction operation:
```
if ( aOp[25:24] = "11")
    switch ( constM[2:0] )
    {
        case c0:    srcM[39:0] ← (40) '0'
        case cr16:  srcM[39:0] ← (21) '0' & '1' & (18) '0'
        case cr17:  srcM[39:0] ← (22) '0' & '1' & (17) '0'
        case cr18:  srcM[39:0] ← (23) '0' & '1' & (16) '0'
        case cr19:  srcM[39:0] ← (24) '0' & '1' & (15) '0'
        case cr20:  srcM[39:0] ← (25) '0' & '1' & (14) '0'
        case cr21:  srcM[39:0] ← (26) '0' & '1' & (13) '0'
        case cr22:  srcM[39:0] ← (27) '0' & '1' & (12) '0'
    }
else
    srcM[39:0] ← (accM)[39:0]
destAcc[39:0] ← srcM[39:0] + ( (4) '0' & PRsumVec[35:0] ) +
                             ( (4) '1' & PRcarryVec[35:1] & '0')
```

APPENDIX 5

{if (tb)} Rldst{16} = {lo | hi} * (bs + idx)   // param./coef. mem read
Load 32- or 16-bit word from parameter/coefficient memory into the specified register-file or sample AGU register using indirect, indexed addressing Operation:  {if (tb)} Rldst{16} = {lo | hi }*(bs + idx)   // param./coef. mem read
where:
- wsel is     low, high, or both (32-bit)
- bs is       base address register r0, r1, r2, or r3
- idx4 is     a 4-bit unsigned index to be added to the base address register in the mOp and ALUop indirect, indexed load/store instructions
- idx16 is    a 16-bit index to be added to the base address register in the WideOp indirect, indexed load/store instructions
- sidx8 is    an 8-bit signed index to be added to the base address register in the extended indirect, indexed load/store instructions
- Rldst is    r10, r32, . . ., rFE, rsa0, rsa1, rsa2:i2, rsa3, rsi0, rsi1, rsConfig01, rsDMA01, rsConfig23, rsDMA23
- Rldst16 is  r0, r1, r2, . . ., rF Restrictions: A parallel operation specifying a parameter/coefficient memory load/store is not permitted (cannot perform two loads nor a load and a store from/to parameter/coefficient memory simultaneously). This also excludes a parallel multiply instruction specifying srcx as coming from parameter/coefficient memory.

A parameter/coefficient load or I/O read instruction may not immediately follow any parameter/coefficient store or I/O write instruction due to the pipelining of stores at the RAM which results in the address being delayed one clock cycle.

Note that the parameter/coefficient base address register (r0-3) must be loaded at least 2 cycles before being used in a parameter/coefficient memory load. See Table 6 on page 118 for an illustration of the relationship between loading parameter AGU registers and their use in parameter memory loads.

The rsConfig01 and rsDMA01 register share a common encoding with the restriction that rsDMA01 may only be loaded in the cycle immediately after rsConfig01 was loaded and that rsConfig01 may not be loaded twice back-to-back (rsConfig23 and rsDMA23 similarly share a single Rldst encoding). In order to insure that data intended for rsDMA is loaded into the rsDMA register, interrupts are inhibited for 1 cycle when rsConfig01, rsConfig23, rsDMA01, or rsDMA23 are loaded.

APPENDIX 5-continued

Description: The contents of parameter/coefficient memory, at the specified base address register plus
index are loaded into the specified Rldst register. If a partial dword is specified (lo or hi),
then the only the corresponding 16-bit word is read over the data bus and loaded into the
specified 16-bit register-file register.
Flags affected: None

```
                                            AccDest = {sampleAGUsrc | Gsrc}
        else if ( ds == WORD )
                                            sp_sdM[31:16] ← ((src_rsa)[17] == '1')? sp_sd[31:16]:sp_sd[15:0]
                                            sp_sdM[15:0] ← (16) '0'
        else // ds must be BYTE
            switch ( (src_rsa)[17:16] )
                {
                    case "00":  sp_sdM[31:24] ← sp_sd[7:0]
                    case "01":  sp_sdM[31:24] ← sp_sd[15:8]
                    case "10":  sp_sdM[31:24] ← sp_sd[23:16]
                    case "11":  sp_sdM[31:24] ← sp_sd[31:24]
                }
            sp_sdM[23:0] ← (24) '0'
        // Load data register corresponding to address register
        switch ( src_rsaSel)
            {
                case "00":  rsd0[31:0] ← sp_sdM[31:0]
                case "01":  rsd1[31:0] ← sp_sdM[31:0]
                case "10":  rsd2[31:0] ← sp_sdM[31:0]
                case "11":  rsd3[31:0] ← sp_sdM[31:0]
            }
        // Perform sample address post-increment (subject to modulo/reverse-
        // carry mode from the appropriate rsConfig register)
        rsPostInc ← (src_rsa) + ((src_incrSel == ++1) ? 1:(rsiM))
        // Writeback resulting sum, if address passes the over/underflow check
        if ( !(rsPostInc is inside region of next DMA AND src_rsa was outside) )
            switch (dest_rsaSel)
                {
                    case "00":  rsa0[31:0] ← (rsPostInc)[31:0]
                    case "01":  rsa1[31:0] ← (rsPostInc)[31:0]
                    case "10":  rsa2[15:0] ← (rsPostInc)[31:16]
                    case "11":  rsa3[15:0] ← (rsPostInc)[31:16]
                }
    } // end if rdSmem
    // Read source operand from sample data register onto Ybus
    switch ( src_rsaSel)
        {
            case "00":  sp_yd[31:0] ← (rsd0)[31:0]
            case "01":  sp_yd[31:0] ← (rsd1)[31:0]
            case "10":  sp_yd[31:0] ← (rsd2)[31:0]
            case "11":  sp_yd[31:0] ← (rsd3)[31:0]
        }
    // Load accumulator from Y bus
    AccDest[39:35] ← (5) sp_yd[31]
    AccDest[34:3]  ← sp_yd[31:0]
    AccDest[2:0]   ← (3) '0'
}
```

Example: // The following example might be used to process data where tables of data are linked
// into a singly-linked list with a pointer to the code to process that data. It illustrates a
// possible technique to reduce the impact of delay slots by preloading generic params.
// presumed to be needed to process the data for the next data element (if the linked-list
// was associated with stream data processing, then the stream/DMA configuration regs.
// could be preloaded without knowledge of the details of the stream).

```
    r32 = *(r1 + 0);        // Load next link into r3, next algorithm pointer into r2
    ...                     // Compute final result and place it in r98
    *(r1 + 6) = r98,,       // Store final result
            ind = r2;       // Load r2 into the indirect program address register
    goto *ind after {       // Branch to next algorithm
        r54 = *(r3 + 1),,   // Load first parameter for next algorithm
            r1 = r3;        // Overwrite current link w/next link
        r76 = *(r3 + 2);    // Load second parameter
        r98 = *(r3 + 3);    // Load third parameter
    }
    // if ( r5 == r4 ) r4 = hi * (r2 + 3)
    tb = Z( r5 - r4);       // Compare r5 to r4 and set tb, if equal
    if (tb) r4 = hi *(r2 + 3);  // if (tb) load r4 from bits [31:16] of parameter memory at the
                            // address contained in r2 indexed by +3
```

Opcodes:

| ALUop: | | aluOperands | | | | | opcode | | | |
|---|---|---|---|---|---|---|---|---|---|---|
| [18:15] | 14 | 13 | 12 | 11 | [10:7] | 6 | [5:4] | [3:0] | | |
| idx4[3:0] | wsel | | bs | | Rldst/<br>Rldst16 | if<br>tb | 00 | 1000 | {if (tb)} Rldst {16} {lo \| hi} * (bs +<br>idx4) |

APPENDIX 5-continued

| Wideop: | | | | wideOperands | | | | opcode | | |
|---|---|---|---|---|---|---|---|---|---|---|
| | [30:15] | 14 | 13 | 12 | 11 | [10:7] | 6 | [5:4] | [3:0] | |
| | idx16[15:0] | wsel | | bs | | Rldst/ Rldst16 | if tb | 00 | 1000 | {if (tb)} Rldst{16} = {lo | hi} * (bs + idx16) |

| mOp: | | | | | mOpcode | | | | | mOperands | | |
|---|---|---|---|---|---|---|---|---|---|---|---|---|
| | 39 | 38 | 37 | 36 | 35 | 34 | 33 | 32 | 31 | 30 | [29:26] | |
| | 10 | | 11 | | idx4 | | bs | | idx4 | | Rldst | Rldst = *(bs +0 idx4) |
| | | | 10 | | [1:0] | | | | [3:2] | | Rldst16 | Rldst16 = hi * (bs + idx4)† |
| | | | 00 | | 11 | | | | | | | Rldst16 = lo *(bs + idx4)† |

†These 2 instructions are disallowed to permit future instruction-set expandability

| Ext. load/ store op: | | mOpcode | | | | | mOperands | | | | aOp | aOperands | |
|---|---|---|---|---|---|---|---|---|---|---|---|---|---|
| | 39 | 38 | 37 | 36 | 35 | 34 | 33 | 32 | 31 | 30 | [29:26] | [25:23] | [22:19] |
| | 10 | | 11 | | sidx8 | | bs | | sidx8 | | Rldst | 000 | sidx8 | Rldst = * (bs + sidx8) |
| | | | 10 | | [1:0] | | | | [3:2] | | Rldst16 | | [7:4] | Rldst16 = hi * (bs + sidx8) |
| | | | 00 | | 11 | | | | | | | | | Rldst16 = lo * (bs + sidx8) |

Detailed instruction operation:
```
// Extract load operands from instruction word
if ( mOp load)
    {
        // Extract basic load operands
        baseSel[1:0] ← mOperands[33:32]
        RldstSel[3:0] ← mOperands[29:26]
        // Extract the proper 16-bit index
        index[15:7] ← (aOp[25:23] == "000") ? aOperands[22]: '0'
        index[6:4] ← (aOp[25:23] == "000") ? aOperands[21:19]: "000"
        index[3:2] ← mOperands[31:30]
        index[1:0] ← mOperands[35:34]
        // Extract word selects from mOpcode bits
        pSelHiWord ← mOpcode[39]
        pSelLoWord ← mOpcode[36]
    }
else // must be either an ALUop or a WideOp
    {
        // Extract basic load operands
        baseSel[1:0] ← operands[12:11]
        RldstSel[3:0] ← operands[10:7]
        // Extract the proper 16-bit index
        if ( wideOp load)
            index[15:4] ← operands[30:19]
        else if ( aOp field present in instruction word AND aOp[25:23] == "000")
            index[15:7] ← aOperands[22]
            index[6:4] ← aOperands[21:19]
        else
            index[15:4] ← (12) '0'
        index[3:0] ← operands[18:15]
        // Extract word selects from dedicated wsel field
        pSelHiWord ← operands[14]
        pSelLoWord ← operands[13]
    }
// Present address and read command to parameter/coefficient memories
sp_pa[15:0] ← (baseSel)[15:0] + index[15:0]
pRead ← '1'
// If mOp (including extended load) or unconditional ALU/wideOp or
//      (an ALU/wideOp conditional on test bit AND tb is set)
if ( mOp or opcode[6] == '0' or TB == '1' )
    {
        // Load selected register from data bus
        if ( pSelHiWord and pSelLoWord)
            reg32(RldstSel)[31:0] ← sp_pd[31:0]
        else if ( pSelHiWord)
            reg 16(RldstSel)[15:0] ← sp_pd[31:16]
        else // pSelLoWord
            reg16(RldstSel)[15:0] ← sp_pd[15:0]
    }
```

Rldst{16} = {lo | hi} *bs{++postInc}    // param./coef. mem read
Load 32- or 16-bit word from parameter/coefficient memory into the specified register-file
or sample AGU register using indirect, post-increment addressing

| Operation: | Rldst{16} = {lo | hi} *bs{++postInc}    // param./coef. mem read | |
|---|---|---|
| | where: | wsel is | low, high, or both (32-bit) |
| | | bs is | base address register r0, r1, r2, or r3 |
| | | postInc is | bs, bs++1, bs++rci0, bs++rci1 |
| | | Rldst is | r10, r32, . . ., rFE, rsa0, rsa1, rsa2:i2, rsa3, rsi0, rsi1, rsConfig01, rsDMA01, rsConfig23, rsDMA23 |

APPENDIX 5-continued

| | |
|---|---|
| | Rldst 16 is r0, r1, r2, . . ., rF |
| Restrictions: | A parallel operation specifying a parameter/coefficient memory load/store is not permitted (cannot perform two loads nor a load and a store from/to parameter/coefficient memory simultaneously). This also excludes a parallel multiply instruction specifying srcx as coming from parameter/coefficient memory.<br>A parameter/coefficient load or I/O read instruction may not immediately follow any parameter/coefficient store or I/O write instruction due to the pipelining of stores at the RAM which results in the address being delayed one clock cycle.<br>Note that the parameter/coefficient address register (r0–3) and any increment register used (rci0/1) must be loaded at least 2 cycles before being used in the parameter/coefficient AGU. Table 6 illustrates the relationship between loading parameter AGU registers and their use in parameter memory loads: |

Pipelined sequence illustrating parameter AGU reg. load latency

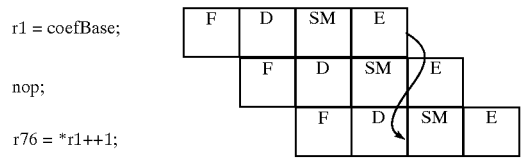

r1 = coefBase;

nop;

r76 = *r1++1;

| | |
|---|---|
| | The rsConfig01 and rsDMA01 register share a common encoding with the restriction that rsDMA01 may only be loaded in the cycle immediately after rsConfig01 was loaded and that rsConfig01 may not be loaded twice back-to-back (rsConfig23 and rsDMA23 similarly share a single Rldst encoding). To insure tnat rsDMA is properly loaded, interrupts are inhibited for 1 cycle when rsConfig01/23 or rsDMA01/23 are loaded. |
| Description: | The contents of parameter/coefficient memory at the specified base address register are loaded into the specified Rldst register. If a partial dword is specified (lo or hi), then the only the corresponding 16-bit word is read over the data bus and loaded into the specified 16-bit register-file register. The specified base address register is then incremented by the specified post-increment value/register. |
| Flags affected: | None |
| Example: | r8 = lo *r0++rci0;  // r8=bits[15:0] @ r0 in param. memory, incr. r0 by rci0 and update r0<br>r54 = *r1++1;     // Load r54 from the data at r1 in parameter/coef. memory,<br>                   increment r1 by 1 and update r1 |
| Opcodes: | |

| ALUop: | | | aluOperands | | | | opcode | | | |
|---|---|---|---|---|---|---|---|---|---|---|
| | 18 | 17 16 | 15 14 13 | 12 11 | [10:7] | [6:4] | [3:0] | | | |
| | 0 | post-<br>Inc | wsel | bs | Rldst/<br>Rldst16 | 100 | 0000 | Rldst{16} = {lo \| hi} *bs{++postInc}<br>// ALUop | | |

| mOp: | | mOpcode | | | | | mOperands | | | | |
|---|---|---|---|---|---|---|---|---|---|---|---|
| | 39 | 38 | 37 | 36 35 34 | 33 32 | 31 30 | [29:26] | | | | |
| | | 00 | 10 | wsel<br>(!=00) | bs | postInc | Rldst/Rldst16 | Rldst{16} = {lo \| hi} *bs{++postInc} | | | |

Detailed instruction operation:
```
    // Extract basic load operands and word selects from instruction word
    if ( mOp load)
        {
            baseSel[1:0]    ← mOperands[33:32]
            RldstSel[3:0]   ← mOperands[29:26]
            postIncSel[1:0] ← mOperands[31:30]
            pSelHiWord      ← mOperands[35]
            pSelLoWord      ← mOperands[34]
        }
    else {      // must be an ALUop
            baseSel[1:0]    ← operands[12:11]
            RldstSel[3:0]   ← operands[10:7]
            postIncSel[1:0] ← operands[16:15]
            pSelHiWord      ← operands[14]
            pSelLoWord      ← operands[13]
        }
    // Present address and read command to parameter/coefficient memories
    sp_pa[8 15:0] ← (baseSel)[15:0]
    pRead ← '1'
    // Post-increment address, if requested
    if ( postInc == (bs++1, bs++rci0, or bs++rci1) )
        baseSel ← (baseSel) + ((postInc == bs++1) ? 1:(postInc == bs++rci0) ? rci0:rci1)
    // Load selected register from data bus
    if ( pSelHiWord and pSelLoWord)
        reg32(RldstSel)[31:0] ← sp_pd[31:0]
    else if ( pSelHiWord )
        reg16(RldstSel)[15:0] ← sp_pd[31:16]
    else // pSelLoWord
```

APPENDIX 5-continued reg16(RldstSel)[15:0] ← sp_pd[15:0]

RldstIO{16} = {lo | hi} daddr   // param./coef. mem read
Load-direct 32- or 16-bit word from parameter/coef. memory into the specified register

| | | |
|---|---|---|
| Operation: | RldstIO{16} = {lo | hi} daddr   // param./coef. mem read | |
| | where: | daddr is a 116-bit direct address into parameter RAM or coeficient ROM of the word to load (a label or expression involving a label for a variable) |
| | | RldstIO is r10, r32, . . ., rFE, rsa0, rsa1, rsa2:i2, rsa3, rsi0, rsi1 |
| | | Rldst16 is r0, r1, r2, . . ., rF |
| Restrictions: | A parameter/coefficient load or I/O read instruction may not immediately follow any parameter/coefficient store or I/O write instruction due to the pipelining of stores at the RAM which results in the address being delayed one clock cycle. | |
| Description: | The contents of parameter/coefficient memory at the specified direct address are loaded into the specified register. If a partial dword is specified (lo or hi), then the only the corresponding 16-bit word is read over the data bus and loaded into the specified 16-bit register-file register. | |
| Flags affected: | None | |
| Example: | #segment parameter | |
| | short listHead:algoP; | |
| | int sin256[256]; | |
| | #segment code | |
| | r10 = listHead:algoP;   // Load head-of-linked list, pointer to the first algorithm code | |
| | r54 = *(&sin256 + 32); // Load the sin (45 degrees) into r54 from 256-entry ROM table | |
| Opcodes: | | |

| WideOp: | | wideOperands | | | | opcode | | |
|---|---|---|---|---|---|---|---|---|
| [30:15] | 14 | 13  12  11 | [10:7] | 6 | [5:4] | [3:0] | | |
| daddr[15:0] | wsel | | RldstIO/ Rdlst16 | if tb | 01 | 1100 | {if (tb)} RldstIO[16] = {lo | hi} daddr |

Detailed instruction operation:
   // Extract basic load operands
   RldstSel[3:0] ← operands[10:7]
   // Extract the direct address as an index (base is 0)
   index[15:0] ← operands[30:15]
   // Extract word selects from dedicated wsel field
   pSelHiWord ← operands[14]
   pSelLoWord ← operands[13]
   // Present address and read command to parameter/coefficient memories
   sp_pa[15:0] ← (16) '0' + index[15:0]
   pRead ← '1'
   // If unconditional or (conditional on test bit AND tb is set)
   if ( opcode[6] == '0' or TB == '1')
       {
          // Load selected register from data bus
          if ( pSelHiWord and pSelLoWord)
              reg32(RldstSel)[31:0] ← sp_pd[31:0]
          else if ( pSelHiWord)
              reg16(RldstSel)[15:0] ← sp_pd[31:16]
          else // pSelLoWord
              reg16(RldstSel)[15:0] ← sp_pd[15:0]
       }

Rdest = EregSrc
Move the specified extended register into tbe specified Rdest register

| | | |
|---|---|---|
| Operation: | Rdest = EregSrc | |
| | where: | EregSrc is AGUtrap0–7, fcnt, ind, MACmode, sptr, stack, rci0/1, status, spInt0/1, sAGUstatus, rsaOL/H, rsaIL/H, rsa2/3, rsiOL/H, rsi1/2, rsConfig01L/H, rsConfig23L/H, rsDMA01e, rsDMA23e, rsd0–3L/H, rShOutL/H/X, acc0–3L/H/X†, aux0–3L/H/Z† |
| | Rdest is | r0, r1, r2, . . ., rF |
| | † Accumulator reads are only supported at reduced clock rates, they should not be used in any production code | |
| Restrictions: | Any compare, test, or bit-test instruction must be at least 2 instructions prior to reading the status register. | |
| | Ereg writes of Status will update the TB bit as like all other instructions which update this bit at end of EX+1. The unforwarded value of TB (the actual value in the status register), will be updated in EX+2. Consequently, an Ereg read of Status will always read the value of the TB effective for the instruction at i-2. | |
| | Ereg reads of the parts of rShOut (rShOuL, rShOutH, and rShOutX) are not allowed in parallel with a multiply specifying srcx as an accumulator (acc0–3$). | |
| | Ereg reads of accumulator parts (acc0–3L/H/X and aux0–3L/H/X) are invalid in parallel with loading rShOut into an accumulator. As the note above indicates, these reads are not supported at normal running speed and should only be used in hardware debug code. | |
| Description: | The specified Ereg is read and the result is transferred to the specified Rdest register (no flags are affected). | |
| | Generally a suffix of L specifies that this Ebus register accesses the lower 16 bits of a 32- | |

APPENDIX 5-continued

|  |  |
|---|---|
|  | bit register. Similarly, a suffix of H indicates access to the upper 16 bits of a 32-bit register. In the case of rShOut, a 40-bit register, the suffixes L and H allow access to the lower 32 bits of rShout. The suffix X (rShOutX) specifies access to the upper 8 bits of rShout (bits [39:32]) as bits [7:0] of rShOutX. |
| Flags affected: | None |
| Example: | r5 = status:  // Load the status register into r5 |
| Opcodes: |  |

| ALUOp: | aluOperands | | | opcode | | |
|---|---|---|---|---|---|---|
|  | [18:15] | [14:11] | [10:7] | [6:4] | [3:0] | |
|  | Ereg-Src[7:4] | Rdest | Ereg-Src[3:0] | 100 | 0001 | Rdest = EregSrc |

Detailed instruction operation:
  result[15:0] ← (extended/peripheralRegister @ (EregSrc[7:0]))[15:0]
  // Write back the result to the register file
  (Rdest)[15:0] ← result[15:0]

EregDest = Rm
Move the specified 16-bit register-file register into the specified extended register

| Operation: | EregDest = Rm | |
|---|---|---|
|  | where: EregDest is | iAGUtrap0–7, fcnt, ind, MACmode, stack, rci0/1, status, spInt0/1, sAGUstatus, reqDMA, s01/23reqDMA, rsa0–3?reqDMA, rsaOL/H, rsaIL/H, rsa2/3, rsiOL/H, rsi1/2, rsConfig01L/H, rsConfig23L/H, rsDMA01e, rsDMA23e, rsd0–3L/H, rShOutL/H/X |
|  | Rm is | r0, r1, r2, . . ., rF |
| Restrictions: | Ereg stores to MACmode update MACmode at end of execute. Consequently, a mode() instruction after an Ereg store to MACmode would negate the effects of the Ereg store on those bits affected by the particular mode( ) instruction (since this instruction is logically most recent). Ereg stores to MACmode, combined with a parallel MPY would not effect the parallel MPY. However, the MPY instruction at i+1 would take on the new mode bits. | |
| Description: | The specified 16-bit register is transferred to the specified extended register (no flags are affected). Generally a suffix of L specifies that this Ebus register accesses the lower 16 bits of a 32-bit register. Similarly, a suffix of H indicates access to the upper 16 bits of a 32-bit register. In the case of rShOut, a 40-bit register, the suffixes L and H allow access to the lower 32 bits of rShout. The suffix X (rShOutX) specifies access to the upper 8 bits of rShout (bits [39:32]) as bits [7:0] of rShOutX. | |
| Flags affected: | None | |
| Example: | ind = r2;   // Load r2 into the indirect program address register goto *ind; rsaOH = r5;   // Load most-significant 16 bits of rsa0 from r5 | |
| Opcodes: | | |

| ALUop: | aluOperands | | opcode | | |
|---|---|---|---|---|---|
|  | [18:15] | [14:11] | [10:7] | [6:4] | [3:0] |
|  | EregDest[7:0] | Rm | 000 | 0001 | EregDest = Rm |

Detailed instruction operation:
  result[15:0] ← (Rm)[15:0]
  // Write result into the extended/peripheral register
  (extended/peripheralRegister @ (EregDest[7:0]))[15:0] ← result[15:0]

{lo | hi} IO(*bs{++postInc}) = RldstIO{16}   // I/O space write
Output the specified 32- or 16-bit register into I/O space using indirect, post-increment addressing

| Operation: | {lo | hi} IO(*bs{++postInc}) = RldstIO{16}   // I/O space write | |
|---|---|---|
|  | where: wsel is | low, high, or both (32-bit) |
|  | bs is | base address register r0, r1, r2, or r3 |
|  | postInc is | bs, bs++1, bs++rci0, bs++rci1 |
|  | RldstIO is | r10, r32, . . ., rFE, rsa0, rsa1, rsa2:i2, rsa3, rsi0, rsi1 |
|  | Rldst16 is | r0, r1, r2, . . ., rF |
| Restrictions: | A parallel operation specifying a parameter/coefficient memory load/store is not permitted (cannot perform an I/O write and a load or store from/to parameter/coefficient memory simultaneously). This also excludes a parallel multiply instruction specifying srcx as coming from parameter/coefficient memory. A parallel multiply instruction must not specify srcy as coming from the register-file (I/O space write and Y from reg-file share a common reg-file port). A parameter/coefficient load or I/O read instruction may not immmediately follow this instruction due to the pipelining of stores at the RAM which results in the address being delayed one clock cycle. Note that unlike I/O space reads and parameter/coefficient loads, there is no delay slot on the base address register (r0–3) or on any increment register used (rci0/1). | |
| Description: | The specified RldstlIO register is output to I/O space at the address in the specified base address register. If a partial dword is specified (lo or hi), then the only the corresponding 16-bit word is written over the data bus from the specified 16-bit register-file register. The specified base address register is then incremented by the specified post-increment | |

APPENDIX 5-continued

|  | value/register. |
|---|---|
| Flags affected: | None |
| Example: | lo IO(*r0++rci0) = r8;  // Output r8 into bits [15:0] of I/O space at r0, increment r0 by rci0 and update r0 |
|  | IO(*r1++1) = r54;  // Output r54 into I/O space at r1, increment r1 by 1 and update r1 |
| Opcodes: | |

| ALUop: | | | | aluOperands | | | | | opcode | | | |
|---|---|---|---|---|---|---|---|---|---|---|---|---|
| 18 | 17 | 16 | 15 | 14 | 13 | 12 | 11 | [10:7] | [6:4] | [3:0] | | |
| 1 | | post-Inc | | wsel | | bs | | RldstIO/ Rldst16 | 100 | 0010 | {lo \| hi} IO(bs{++postInc}) = RldstIO{16} | |

Detailed instruction operation:
// Extract store operands and word selects from instruction word
baseSel[1:0] ← operands[12:11]
RldstSel[3:0] ← operands[10:7]
postIncSel[1:0] ← operands[16:15]
pSelHiWord ← operands[14]
pSelLoWord ← operands[13]
// Load selected register to store
if ( pselHiWord and pSelLoWord)
    sp_pd[31:0] ← reg32(RldstSel)[31:0]
else if ( pSelHiWord)
    sp_pd[31:16] ← reg16(RldstSel)[15:0]
else // pSelLoWord
    sp_pd[15:0] ← reg16(RldstSel)[15:0]
// Present address and I/O write command to initiate the output
sp_pa[15:0] ← (baseSel)[15:0]
ioWrite ← '1'
// Post-increment address, if requested
if( postInc == (bs++1, bs++rci0, or bs++rci1) )
    baseSel ← (baseSel) + ((postInc == bs++1) ? 1:(postInc == bs++rci0) ? rci0:rci1)

{lo | hi} IO(iaddr) = RldstIO{16}   // I/O space write
Output the specified 32- or 16-bit register into the specified I/O space address

| Operation: | {lo \| hi} IO(ioaddr) = RldstIO{16}   // I/O space write |
|---|---|
|  | where:   ioaddr is   a 16-bit direct address into parameter RAM or coefficient ROM to which to store the specified data |
|  | RldstIO is   r10, r32, . . ., rFE, rsa0, rsa1 , rsa2:i2, rsa3 , rsi0, rsi1 |
|  | Rldst16 is   r0, r1, r2, . . ., rF |
| Restrictions: | A parameter/coeffcient load or I/O read instruction may not immediately follow any parameter/coefficient store or I/O write instruction due to the pipelining of stores at the RAM which results in the address being delayed one clock cycle. |
| Description: | The specified register is stored into I/O space at the specified direct address. If a partial dword is specified (lo or hi), then only the corresponding 16-bit word is written over the data bus from the specified 16-bit register-file register. |
| Flags affected: | None |
| Example: | IO(0x0104) = r98;   // Output r98 to port 0x0104 |
|  | hi IO(0x1000) = r6;   // Output r6 to bits [31:16] of port 0x1000 |
| Opcodes: | |

| WideOp: | | | | wideOperands | | | opcode | | | |
|---|---|---|---|---|---|---|---|---|---|---|
| [30:15] | 14 | 13 | 12 | 11 | [10:7] | 6 | [5:4] | [3:0] | | |
| ioaddr[15:0] | | wsel | | | RldstIO/ Rldst16 | if | tb | 01 | 1111 | {if (tb)} {lo \| hi} IO(ioaddr) = RldstIO{16} |

Detailed instruction operation:
// Extract basic store operands
RldstSel[3:0] ← operands[10:7]
// Extract the direct address as an index (base is 0)
index[15:0] ← operands[30:15]
// Extract word selects from dedicated wsel field
pSelHiWord ← operands[14]
pSelLoWord ← operands[13]
// Load selected register to store
if ( pSelHiWord and pSelLoWord)
    sp_pd[31:0] ← reg32(RldstSel)[31:0]
else if ( pSelHiWord)
    sp_pd[31:16] ← reg16(RldstSel)[15:0]
else // pSelLoWord
    sp_pd[15:0] ← reg16(RldstSel)[15:0]
// If unconditional or (conditional on test bit AND tb is set)
if ( opcode[6] = '0' or TB == '1')
    {
        // Present address and I/O write command to initiate output
        sp_pa[15:0] ← (16) '0' + index[15:0]
        ioWrite ← '1'

APPENDIX 5-continued

}

{if (tb)} Radest = Asrc {$+>> | +>>} {Rn | simm4}
Shift accumulator right (+) or left (−) optionally saturating on overflow and store result in
specified Radest destination register

| Operation: | {if (tb)} Radest = Asrc {$+>> \| +>>} {Rn \| simm4} |
|---|---|
| | where: $+>> is an arithmetic shift right (Rn, +) or shift left with saturation (Rn, −) |
| | +>> is an arithmetic shift right (Rn, +) or shift left without saturation (Rn, −) |
| | Asrc is acc0/1/2/3, aux0/1/2/3 |
| | Rn is r0, r1, r2, . . ., rF |
| | Radest is r0, r1, r2, . . ., rF, r10, r32, r54, . . ., rFE, rShOut |
| Restrictions: | Valid shift counts range from −15 to 15 (hardware ignores bits[14:4] of the shift count operand). A parallel AbusMove operation may not specify an accumulator-to-accumulator move (when an accumulator is the source of such a move, the source accumulator is placed on the MACunitResultBus which is used by this instruction). |
| Description: | The contents of Asrc are shifted right arithmetically for positive values of the contents of Rn. The contents of Asrc are shifted left for negative values of the contents of Rn. The EX flag is set to indicate saturation was required (if the non-saturating variant was selected, it indicates that overflow occurred). Alternative syntax for shift accumulator left-immediate is as follows: |
| | {if (tb)} Radest = Asrc {$}<< imm4 |
| Flags affected: | EX |
| Example: | r54 = acc3 $+>> 0;   // Load r54 from acc3[34:3], saturate if acc3[39:35] != acc3[34] |
| | r7 = aux1 $<< 15;   // Load r7 from acc3[19:4], saturate if aux1[39:20] != aux1[19] |
| | // Shift and combine double-precision results |
| | rShOut = aux2 $+>> 15;   // Shift aux2 right by 15 |
| | acc3 = rShOut;           // Load acc3 from aux2 +>> 15 |
| | , acc2 = acc2 + acc3,;   // Accumulate double-precision result in acc2 |
| Opcodes: | |

| ALUop: | aluOperands | | | | opcode | | |
|---|---|---|---|---|---|---|---|
| | [18:15] | [14:12] | [11:7] | 6 | [5:4] | [3:0] | |
| | Rn | Asrc | Radest | if | 00 | 1100 | {if (tb)} Radest = Asrc $+>> Rn |
| | | | | tb | | 1101 | {if (tb)} Radest = Asrc +>> Rn |
| | imm4 | | | | 10  1  s  00 | | {if (tb)} Radest = Asrc $+>> simm4 |
| | | | | | | 01 | {if (tb)} Radest = Asrc +>> simm4 |

Detailed instruction operation:
    MACunitResultBus[39:0] ← (Asrc)[39:0]
    // Select source B operand (according to instruction type/opcode)
    if ( aluOpcode[5] == '1')
        opB[15:4] ← aluOpcode[2]
        opB[3:0] ← aluOperands[18:15]
    else
        opB[15:0] ← (Rn)[15:0]
    // If shift count ≧ 0, shift right by specified count between 0 and 15
    if ( opB[15] == 0)
        {
        // Perform arithmetic right-shift (sign-extending)
        scaledResult[39:0] ← MACunitResultBus[39:0] +>> opB[3:0]
        ov32 ← ( scaledResult[39:34] != (6) '0' AND
            scaledResult[39:34] != (6) '1' )
        ov40 ← 0
        }
    else // shift count < 0, shift left by negative of specified count between −1 and −15
        {
        shCnt ← opB[3:0] + 1
        scaledResult[39+shCnt:0] ← MACunitResultBus[39:0] << shCnt
        ov32 ← (MACunitResultBus[39:(34-shCnt)] != (shCnt+6) '0' AND
            MACunitResultBus[39:(34-shCnt)] != (shCnt+6) '1' )
        ov40 ← (MACunitResultBus[39:(39-shCnt)] != (shCnt+1) '0' AND
            MACunitResultBus[39:(39-shCnt)] != (shCnt+1) '1')
        }
    // If unconditional or (conditional on test bit AND tb is set)
    if ( aluOpcode[6] == '0' or TB== '1')
        {
        // Perform optional overflow-saturation according to dest width (32 or 40 bits)
        if ( destReg == rShOut ) // Result is 40 bits wide
            {
            if ( aluOpcode[0] == '0' and ov40)
                destReg[39:0] = MACunitResultBus[39] !0x80,0000,0000:
                                    0x7F,FFFF,FFFF
            else
                destReg[39:0] = scaledResult[39:0]
            // Set EX to indicate saturation was required
            EX ← ov40
            }
        else // Result is 32 bits wide (or upper 16b of 32b result which saturates the same)

APPENDIX 5-continued

```
        {
            // Saturate result to "middle" 32 bits
            if ( aluOpcode[0] == '0' and ov32)
                satScaleResult[31:0] = MACunitResultBus[39] ! 0x8000,0000:
                                                              0x7FFF,FFFF
            else
                satScaledResult[31:0] = scaledResult[34:3]
            // Writeback 16-bit or 32-bit result to register
            if ( destReg == (r0, r2, r4, . . ., rE) )
                regPair(destReg)[15:0] = satScaledResult[31:16]
            else if ( destReg == (r1, r3, r5, . . ., rF) )
                regPair(destReg)[31:16] = satScaledResult[31:16]
            else // destReg is a full 32 bits wide
                destReg[31:0] = satScaledResult[31:0]
            // Set EX (extension bits used) to indicate that saturation was required
            EX ← ov32
        }
    }
```

{if (tb)} Radest Asrc {$+>> | +>>} {Rn | simm4}

{if (tb)} {lo | hi} *(bs + idx) = Rldst{16}   // param. memory write
Store the specified register to 32- or 16-bit d/word in parameter/coefficient memory using
indirect, indexed addressing

| | | |
|---|---|---|
| Operation: | {if (tb)} {lo \| hi} *(bs + idx) = Rldst{16}   // param. memory write | |
| | where: wsel is | low, high, or both (32-bit) |
| | bs is | base address register r0, r1, r2, or r3 |
| | idx4 is | a 4-bit unsigned index to be added to the base address register in the mOp and ALUop indirect, indexed load/store instructions |
| | idx16 is | a 16-bit index to be added to the base address register in the WideOp indirect, indexed load/store instructions |
| | sidx8 is | an 8-bit signed index to be added to the base address register in the extended indirect, indexed load/store instructions |
| | Rldst is | r10, r32, . . ., rFE, rsa0, rsa1, rsa2:i2, rsa3, rsi0, rsi1, rsConfig01, rsDMA01, rsConfig23, rsDMA23 |
| | Rldst 16 is | r0, r1, r2, . . ., rF |
| Restrictions: | A parallel operation specifying a parameter/coefficient memory load/store is not permitted (cannot perform two stores nor a load and a store from/to parameter/coefficient memory simultaneously). This also excludes a parallel multiply instruction specifying srcx as coming from parameter/coefficient memory. | |
| | A parallel multiply instruction must not specify srcy as coming from the register-file (parameter store and Y from reg-file share a common reg-file port). | |
| | A parameter/coefficient load or I/O read instruction may not immediately follow this instruction due to the pipelining of stores at the RAM which results in the address being delayed one clock cycle. | |
| | Note that unlike parameter/coefficient loads, there is no delay slot on the base address register (r0–3). | |
| | The rsConfig01 and rsDMA01 register share a common encoding with the restriction that rsDMA01 may only be stored in the cycle immediately after rsConfig01 was stored and that rsConfig01 may not be stored twice back-to-back (rsConfig23 and rsDMA23 similarly share a single Rldst encoding). In order to insure that data intended to be from rsDMA is stored from the rsDMA register, interrupts are inhibited for 1 cycle when rsConfig01, rsConfig23, rsDMA01, or rsDMA23 are stored. | |
| Description: | The the specified Rldst register is stored into parameter/coefficient memory at the specified base address register plus index. If a partial dword is specified (lo or hi), then only the corresponding 16-bit word is stored over the data bus and from the specified 16-bit register-file register. | |
| Flags affected: | None | |
| Example: | *(r2 + 4) = rsa0; | // Store updated input FIFO pointer |
| | hi *(r0 + 2) = r6; | // Store r6 into bits [31:16] of parameter memory at the address contained in r0 indexed by +2 |
| | // if(r5 == r4) lo *(r2 + 3) = rC | |
| | tb = Z(r5 − r4); | // Compare r5 to r4 and set tb, if equal |
| | if (tb) lo *(r2 + 3) = rC; | // if (tb) store rC to bits [15:0] of parameter memory at the/ address contained in r2 indexed by +3 |
| Opcodes: | | |

| ALUop: | | aluOperands | | | | opcode | | |
|---|---|---|---|---|---|---|---|---|
| | [18:15] | 14  13 | 12  11 | [10:7] | 6 | [5:4] | [3:0] | |
| | idx4[3:0] | wsel | bs | Rldst/ Rldst16 | if tb | 00 | 1010 | {if (tb)} {lo \| hi} *(bs + idx4) = Rldst{16} |

| WideOp: | | wideOperands | | | | opcode | | |
|---|---|---|---|---|---|---|---|---|
| | [30:15] | 14  13 | 12  11 | [10:7] | 6 | [5:4] | [3:0] | |
| | idx16[15:0] | wsel | bs | Rldst/ Rldst16 | if tb | 00 | 1010 | {if (tb)} {lo \| hi} *(bs + idx16) = Rldst{16} |

| mOp: | mOpcode | mOperands |
|---|---|---|

APPENDIX 5-continued

| | 39 38 | 37 36 | 35 34 | 33 32 | 31 30 | [29:26] | | | |
|---|---|---|---|---|---|---|---|---|---|
| | 10 | 01 | idx4 | bs | idx4 | Rldst | | *(bs + idx4) = Rldst | |
| | | 00 | [1:0] | | [3:2] | Rldst16 | | hi *(bs + idx4) = Rldst16† | |
| | 00 | 01 | | | | | | lo *(bs + idx4) = Rldst16† | |

†These 2 instructions are disallowed to permit future instruction-set expandability

| | | | | | | | | aOp | aOper- |
| Ext. | | mOpcode | | | mOperands | | | | ands |
|---|---|---|---|---|---|---|---|---|---|
| load/ | 39 38 | 37 36 | 35 34 | 33 32 | 31 30 | [29:26] | [25:33] | [22:19] | *(bs + sidx8) = Rldst |
| store | 10 | 01 | sidx8 | bs | sidx8 | Rldst | 000 | sidx8 | hi *(bs + sidx8) = Rldst16 |
| op: | | 00 | [1:0] | | [3:2] | Rldst16 | | [7:4] | lo *(bs + sidx8) = Rldst16 |
| | 00 | 01 | | | | | | | |

Detailed instruction operation:
```
        // Extract store operands from instruction word
        if ( mOp store )
        {
                // Extract basic store operands
                baseSel[1:0] ← mOperands[33:32]
                RldstSel[3:0] ← mOperands[29:26]
                // Extract the proper 16-bit index
                index[15:7] ← (aOp[25:23] == "000") ? aOperands[22]: '0'
                index[6:4] ← (aOp[25:23] == "000") ? aOperands[21:19]: "000"
                index[3:2] ← mOperands[31:30]
                index[1:0] ← mOperands[35:34]
                // Extract word selects from mOpcode bits
                pSelHiWord ← mOpcode[39]
                pSelLoWord ← mOpcode[36]
        }
        else // must be either an ALUop or a WideOp
        {
                // Extract basic store operands
                baseSel[1:0] ← operands[12:11]
                RldstSel[3:0] ← operands[10:7]
                // Extract the proper 16-bit index
                if ( wideOp load)
                        index[15:4] ← operands[30:19]
                else if ( aOp field present in instruction word AND aOp[25:23] =="000")
                        index[15:7] ← aOperands[22]
                        index[6:4] ← aOperands[21:19]
                else
                        index[15:4] ← (12) '0'
                index[3:0] ← operands[18:15]
                // Extract word selects from dedicated wsel field
                pSelHiWord ← operands[14]
                pSelLoWord ← operands[13]
        }
        // Load selected register to store
        if ( pSelHiWord and pSelLoWord)
                sp_pd[31:0] ← reg32(RldstSel)[31:0]
        else if ( pSelHiWord )
                sp_pd[31:16] ← reg16(RldstSel)[15:0]
        else // pSelLoWord
                sp_pd[15:0] ← reg16(RldstSel)[15:0]
        // If mOp (including extended load) or unconditional ALU/wideOp or
        //         (an AlU/wideOp conditional on test bit AND tb is set)
        if ( mOp or opcode[6] == '0' or TB == '1')
        {
                // Present address and write command to parameter/coefficient memories
                sp_pa[15:0] ← (baseSel)[15:0] + index[15:0]
                pWrite ← '1'
        }
```

{if (tb)} {lo | hi} *(bs + idx} = Rldst{16}   // param. memory write

{lo | hi} *bs{++postInc} = Rldst{16}   // param. memory write
Store the specified 32- or 16-bit register into parameter/coefficient memory using indirect,
post-increment addressing

| Operation: | {lo | hi} *bs{++postInc} = Rldst{16}   // param. memory write | |
|---|---|---|
| | where: | wsel is low, high, or both (32-bit) |
| | | bs is base address register r0, r1, r2, or r3 |
| | | postInc is bs, bs++1, bs++rci0, bs++rci1 |
| | | Rldst is r10, r32, . . ., rFE, rsa0, rsa1, rsa2:i2, rsa3, rsi0, rsi1, rsConfig01, rsDMA01, rsConfig23, rsDMA23 |
| | | Rldst16 is r0, r1, r2, . . ., rF |
| Restrictions: | A parallel operation specifying a parameter/coefficient memory load/store is not permitted (cannot perform two stores nor a load and a store from/to parameter/coefficient memory simultaneously). This also excludes a parallel multiply instruction specifying | |

APPENDIX 5-continued

|  |  |
|---|---|
|  | srcx as coming from parameter/coefficient memory.<br>A parallel multiply instruction must not specify srcy as coming from the register-file (parameter store and Y from reg-file share a common reg-file port).<br>A parameter/coefficient load or I/O read instruction may not immediately follow this instruction due to the pipelining of stores at the RAM which results in the address being delayed one clock cycle.<br>Note that unlike parameter/coefficient loads, there is no delay slot on the base address register (r0–3) or on any increment register used (rci0/1).<br>The rsConfig01 and rsDMA01 register share a common encoding with the restriction that rsDMA01 may only be stored in the cycle immediately after rsConfig01 was stored and that rsConfig01 may not be stored twice back-to-back (rsConfig23 and rsDMA23 similarly share a single Rldst encoding). In order to insure that data intended to be from rsDMA is stored from the rsDMA register, interrupts are inhibited for 1 cycle when rsConfig01, rsConfig23, rsDMA01, or rsDMA23 are stored. |
| Description: | The specified Rldst register is stored into parameter/coefficient memory at the specified base address register. If a partial dword is specified (lo or hi), then the only the corresponding 16-bit word is read over the data bus and loaded into the specified 16-bit register-file register. The specified base address register is then incremented by the specified post-increment value/register. |
| Flags affected: | None |
| Example: | lo *r0++rci0 = r8;   // Store r8 into bits [15:0] of parameter memory at r0, increment r0 by rci0 and update r0<br>*r1++1 = r54;   // Store r54 into parameter memory at r1, incretnetit r1 by 1 and update r1 |
| Opcodes: |  |

| ALUop: |  |  | aluOperands |  |  |  | opcode |  |  |
|---|---|---|---|---|---|---|---|---|---|
|  | 18 | 17 16 15 | 14 13 | 12 11 | [10:7] |  | [6:4] | [3:0] |  |
|  | 0 | post-<br>Inc | wsel | bs | Rldst/<br>Rldst16 |  | 100 | 0010 | {lo \| hi} *(bs{++postInc} = Rldst{16}<br>// ALUoP |

| mOp: |  | mOpcode |  |  |  | mOperands |  |  |  |
|---|---|---|---|---|---|---|---|---|---|
|  | 39 | 38 37 36 | 35 34 | 33 32 | 31 30 | [29:26] |  |  |  |
|  |  | 00     00 | wsel<br>(!=00) | bs | postInc | Rldst/Rldst16 | {lo \| hu} *bs{++postInc} = Rldst{16} |  |  |

Detailed instruction operation:
```
// Extract store operands and word selects from instruction word
if ( mOp store)
    {
        baseSel[1:0]    ← mOperands[33:32]
        RldstSel[3:0]   ← mOperands[29:26]
        postIncSel[1:0] ← mOperands[31:30]
        pSelHiWord      ← mOperands[35]
        pSelLoWord      ← mOperands[34]
    }
else // must be an ALUop
    {
        baseSel[1:0]    ← operands[12:11]
        RldstSel[3:0]   ← operands[10:7]
        postIncSel[1:0] ← operands[16:15]
        pSelHiWord      ← operands[14]
        pSelLoWord      ← operands[13]
    }
// Load selected register to store
if ( pSelHiWord and pSelLoWord)
    sp_pd[31:0]  ← reg32(RldstSel)[31:0]
else if ( pSelHiWord )
    sp_pd[31:16] ← reg16(RldstSel)[15:0]
else // pSelLoWord
    sp_pd[15:0]  ← reg16(RldstSel)[15:0]
// Present address and write command to parameter/coefficient memories
sp_pa[15:0] ← (baseSel)[15:0]
pWrite ← '1'
// Post-increment address, if requested
if ( postInc == (bs++1, bs++rci0, or bs++rci1))
    baseSel ← (baseSel) + ((postInc == bs++1) ? 1:(postInc == bs++rci0) ? rci0:rci1)

{lo | hi} daddr = RldstIO{16}   // param. memory write
    Store-direct the specified 32- or 16-bit register into parameter/coefficient memory
```

| Operation: | {lo \| hi} daddr = RldstIO {16} // param. memory write |
|---|---|
|  | where:   daddr is   a 16-bit direct address into parameter RAM or coefficient ROM to which to store the specified data (a label or expression involving a label for a variable) |
|  | RldstIO is   r10, r32, . . ., rFE, rsa0, rsa1, rsa2:i2, rsa3, rsi0, rsi1 |
|  | Rldst16 is   r0, r1, r2, . . ., rF |
| Restrictions: | A parameter/coefficient load or I/O read instruction may not immediately follow this instruction due to the pipelining of stores at the RAM which results in the address being |

APPENDIX 5-continued

| | |
|---|---|
| | delayed one clock cycle. |
| Description: | The specified register is stored into parameter/coefficient memory at the specified direct address. If a partial dword is specified (lo or hi), then only the corresponding 16-bit word is written over the data bus from the specified 16-bit register-file register. |
| Flags affected: | None |
| Example: | #segment parameter<br>int rawOut[8];<br>#segment code<br>*(&rawOut + 1) = r98;  // Store second raw output sample to a fixed visible place |
| Opcodes: | |

```
WideOp:           wideOperands              opcode
    [30:15]     14  13  12  11    [10:7]    6   [5:4]  [3:0]
    daddr[15:0]     wsel          RldstIO/  if   01    1110  {if (tb)} {lo | hi} daddr = RldstIO{16}
                                  Rldst16   tb
```

Detailed instruction operation:

```
// Extract basic store operands
RldstSel[3:9] ← operands[10:7]
// Extract the direct address as an index (base is 0)
index[15:0] ← operands[30:15]
// Extract word selects from dedicated wsel field
pSelHiWord ← operands[14]
pSelLoWord ← operands[13]
// Load selected register to store
if ( pSelHiWord and pSelLoWord)
    sp_pd[31:0] ← reg32(RldstSel[31:0]
else if ( pSelHiWord)
    sp_pd[31:16] ← reg16(RldstSel)[15:0]
else // pSelLoWord
    sp_pd[15:0] ← reg16(RldstSel)[15:0]
// If unconditional or (conditional on test bit AND tb is set)
if ( opcode[6] =='0' or TB == '1')
    {
        // Present address and write command to parameter/coefficient memories
        sp_pa[15:0] ← (16) '0' + index[15:0]
        pWrite ← '1'
    }
``` sampleAGUdest = Rss   // sample mem write
Store the specified 32- or 16-bit register into SAMPLE memory using indirect, post-increment addressing

| | |
|---|---|
| Operation: | sampleAGUdest = Rss // sample mem write |
| | where: sampleAGUdest is *rsaN++1, *rsaN++rsiM where N = 0–3 and M = 0–2 |
| | Rss is    r54, r76, . . ., rFE, r8, r9, rA, . . ., rF |
| Restrictions: | At most one sample store operation may be specified in any given instruction.<br>The accumulator may not be loaded from sample memory, nor may a multiply operation specify srcy from sample memory in parallel with or succeeding this instruction (although either may specify rsd0–3 as a source).<br>Note that the sample address register (rsa0–3) and any sample increment register used (rsi0–2) must be loaded at least 3 cycles before being used in the sample AGU. See Table 5 on page 110 for an illustration of the relationship between loading sample AGU registers and their use in the sample AGU |
| Description: | The specified Rss register is stored into sample memory at the specified sample base address register. The configuration of the sample AGU determines whether a 16-bit word or a 32-bit dword is stored into sample RAM. If a 32-bit word is being written from a 16-bit Rss source, the 16-bit source is placed into the upper 16 bits of the 32-bit memory dword. The specified sample base address register is then incremented by the specified post-increment value/register. |
| Flags affected: | None |
| Example: | *rsa2++1 = r54;         // Store r54 to sample memory at rsa2, post-increment by 1 |
| Opcodes: | |

```
ALUop:              aluOperands              opcode
    [18:15]     14  13  12    [11:7]      [6:4]   [3:0]
    Rss         sd  11        sampleAGU    100    0011   sampleAGUdest = Rss   //ALUop
                              dest mOp:     mOpcode              mOperands
    39  38  37  36  35  [34:31]       [30:26]
    01          10      1    Rss      sampleAGUdest     sampleAGUdest = Rss
```

Detailed instruction operation:

```
// Extract store operands from instruction word
if ( mOp store )
    {
        RssSel[3:0] ← mOperands[34:31]
        src_incrSel[1:0] ← mOperands[29:28]
```

APPENDIX 5-continued

```
                src_rsaSel[1:0] ← mOperands[27:26]
                dest_rsaSel[1:0] ← mOperands[27:26]
            }
    else // must be an ALUop
            {
                RssSel[3:0]    ← aluOperands[18:15]
                src_incrSel[1:0] ← aluOperands[10:9]
                src_rsaSel[1:0]  ← aluOperands[8:7]
                dest_rsaSel[1:0] ← aluOperands[8] & aluOperands[14]
            }
    // Read source sample address register
    switch ( src_rsaSel )
            {
                case "00":  src_rsa[31:0] ← (rsa0)[31:0]
                case "01":  src_rsa[31:0] ← (rsa1)[31:0]
                case "10":  src_rsa[31:0] ← (rsa2)[15:0] & (16) '0'
                case "11":  src_rsa[31:0] ← (rsa3)[15:0] & (16) '0'
            }
    // Read sample data size (from proper config register)
    ds[1:0] ← (src_rsaSel[1] == '0') ? rsConfig01[ds]:rsConfig23[ds]
    // Place selected register on sample data bus to store
    if ( RssSel[3:0] == r8, r9, rA, . . ., rF)
            {
                if (ds == DWORD)
                    sp_sd[31:16] ← (RssSel)[15:0]
                    sp_sd[15:0]  ← (16) '0'
                    sSelHiWord ← sSelLoWord ← '1'
                else // Data being stored is 16-bit data (ship same data to both halves of bus)
                    {
                        sp_sd[31:16] ← (RssSel)[15:0]
                        sp_sd[15:0]  ← (RssSel)[15:0]
                        sSelHiWord ← src_rsa[17]
                        sSelLoWord ← src_rsa[17]
                    }
            }
    else // data size must be 32 bits to get correct result w/32-bit store
            sp_sd[31:0] ← (RssSel)[31:0]
            sSelHiWord ← sSelLoWord ← '1'
    // Perform sample address post-increment (subject to modulo/reverse-carry mode from
    // the appropriate rsConfig register)
    rsPostInc ← (src_rsa) + ((src_incrSel == ++1) ? 1:(rsiM))
    // Writeback resulting sum, if address passes the over/underflow check
    if ( !(rsPostInc is inside region of next DMA transfer AND src_rsa was outside) )
        switch ( dest_rsaSel )
            {
                case "00":     rsa0[31:0] ← (rsPostInc)[31:0]
                cast "01":     rsa1[31:0] ← (rsPostInc)[31:0]
                case "10":     rsa2[15:0] ← (rsPostInc)[31:16]
                case "11":     rsa3[15:0] ← (rsPostInc)[31:16]
            }
```

RldstIO{16} = {lo | hi} IO(*bS{++postInc})   // I/O space read
Input a 32- or 16-bit word from I/O space into the specified register-file or sample AGU register using indirect, post-increment addressing

| | |
|---|---|
| Operation: | RldstIO{16} = {lo \| hi} IO(*bs{++postInc})   // I/O space read |
| | where:  wsel is    low, high, or both (32-bit) |
| |         bs is      base address register r0, r1, r2, or r3 |
| |         postInc is bs, bs++1, bs++rci0, bs++rci1 |
| |         RldstIO is r10, r32, . . . , rFE, rsa0, rsa1, rsa2:i2, rsa3, rsi0, rsi1 |
| |         Rldst16 is r0, r1, r2, . . ., rF |
| Restrictions: | A parallel operation specifying a parameter/coeffcient memory load/store is not permitted (cannot perform an input from I/O space and a load or store from/to parameter/coefficient memory simultaneously). This also excludes a parallel multiply instruction specifying srcx as coming from parameter/coefficient memory. |
| | A parameter/coefficient load or I/O read instruction may not immediately follow any parameter/coefficient store or I/O write instruction due to the pipelining of stores at the RAM which results in the address being delayed one clock cycle. |
| | Note that the parameter/coefficient address register (r0–3) and any increment register used (rci0/1) must be loaded at least 2 cycles before being used in the parameter/coefficient AGU. See Table 6 on page 118 for an illustration of the relationship between loading parameter AGU registers and their use in I/O space reads (like parameter memory loads). |
| Description: | The contents of I/O space at the specified base address register are input into the specified Rldst register. If a partial dword is specified (lo or hi), then the only the corresponding 16-bit word is read over the data bus and loaded into the specified 16-bit register-file register. The specified base address register is then incremented by the specified post increment value/register. |
| Flags affected: | None |

APPENDIX 5-continued

Example: r8 = lo IO(*r0++rci0); // Load r8 from bits [15:0] of the data at the I/O address in r0,
               increment r0 by rci0 and update r0
     r54 = IO(*r1++1); // Load r54 from the data at r1 in I/O space, increment r1 by 1
               and update r1

Opcodes:

| ALUop: | | | aluOperands | | | | | | opcode | | | |
|---|---|---|---|---|---|---|---|---|---|---|---|---|
| 18 | 17 | 16 | 15 | 14 | 13 | 12 | 11 | [10:7] | [6:4] | [3:0] | | |
| 1 | | post-Inc | | wsel | | bs | | RldstIO/ Rldst16 | 100 | 0000 | RldstIO {16} = {lo \| hi} IO(*bs{++postInc}) | |

Detailed instruction operation:
  // Extract basic I/O input operands
  postIncSel[1:0] ← operands[16:15]
  baseSel[1:0] ← operands[12:11]
  RldstSel[3:0] ← operands[10:7]
  // Extract word selects from dedicated wsel field
  pSelHiWord ← operands[14]
  pSelLoWord ← operands[13]
  // Present address and I/O read command to initiate input
  sp_pa[15:0] ← (baseSel)[15:0]
  ioRead ← '1'
  // Post-increment address, if requested
  if ( postInc == (bs++1, bs++rci0, or bs++rci1) )
    baseSel ← (baseSel) + ((postInc == bs++1) ? 1:(postInc == bs++rci0) ? rci0:rci1)
  // Load selected register from data bus
  if ( pSelHiWord and pSelLoWord)
    reg32(Rldststl)[31:0] ← sp_pd[31:0]
  else if ( pSelHiWord )
    reg16(RldstSel)[15:0] ← sp_pd[31:16]
  else // pSelLoWord
    reg16(RldstSel)[15:0] ← sp_pd[15:0]

{if (tb)} RldstIO{16} {lo | hi} IO(ioaddr) // I/O space read
    Input from the specified I/O space address to the specified 32- or 16-bit register Operation: (if (tb)} RldstIO{16} = {lo | hi} IO(ioaddr) // I/O space read
    where: wsel is  low, high, or both (32-bit)
       ioaddr is a 16-bit direct address into I/O space of the word to read
       RldstIO is r10, r32, . . . , rFE, rsa0, rsa1, rsa2:i2, rsa3, rsi0, rsi1
       Rldst16 is r0, r1, r2, . . . , rF Restrictions: A parameter/coefficient load or I/O read instruction may not immediately follow any parameter/coeffcient store or I/O write instruction due to the pipelining of stores at the RAM which results in the address being delayed one clock cycle.
    Conditional inputs (like conditional loads) always perform the read operation and then decide during the execute cycle whether to store the result coming back from the input device. As a result, care should be taken to either avoid designing I/O devices whose state changes based on an input from port, or to avoid using conditional inputs on such an I/O device. Since conditional outputs do not suffer this same problem (they occur at the end of execute), I/O peripherals should preferably use only output to port to change I/O device/interface state.

Description: The contents of I/O space at the specified direct address are loaded into the specified register. If a partial dword is specified (lo or hi), then the only the corresponding 16-bit word is read over the data bus and loaded into the specified 16-bit register-file register.

Flags affected: None

Example: r76 = IO(0x0100); // Input from port 0x0100 into r76
    r5 = hi IO(0x0330); // Input from bits [31:16] of port 0x0330 into r5

Opcodes:

| WideOp: | | wideoperands | | | | | | opcode | | | |
|---|---|---|---|---|---|---|---|---|---|---|---|
| [30:15] | | 14 | 13 | 12 | 11 | [10:7] | 6 | [5:4] | [3:0] | | |
| ioaddr[15:0] | | wsel | | | | RldstIO/ Rldst16 | if tb | 01 | 1101 | {if (tb)} RldstIO {16} = {lo \| hi} IO(ioaddr) | |

Detailed instruction operation:
  // Extract basic load operands
  RldstSel[3:0] ← operands[10:7]
  // Extract the direct address as an index (base is 0)
  index[15:0] ← operands[30:15]
  // Extract word selects from dedicated wsel field
  pSelHiWord ← operands[14]
  pSelLoWord ← operands[13]
  // Present address and I/O read command to initiate input
  sp_pa[15:0] ← (16) '0' + index[15:0]
  ioRead ← '1'
  // If unconditional or (conditional on test bit AND tb is set)
  if ( opcode[6] == '0' or TB == '1')
    {
      // Load selected register from data bus APPENDIX 5-continued

```
                    if ( pSelHiWord and pSelLoWord )
                        reg32(RldstSel)[31:0] ← sp_pd[31:0]
                    else if ( pSelHiWord )
                        reg16(RldstSel)[15:0] ← sp_pd[31:16]
                    else // pSelLoWord
                        reg16(RldstSel)[15:0] ← sp_pd[15:0]
                }

AccDest = {sampleAGUsrc | Gsrc}
                the MAC-unit mode does not affect AccDest (to load acc2 & aux2, specify acc:aux2)
```

Flags affected: None
Example:
    acc:aux2 = rD;    // Load rD into both acc2 & aux2 sign-extending 5 guard bits and appending 19 least-significant zero bits
    acc3 = (rsd1 = *rsa1++rsi0);    // Load data from sample memory at address contained in rsa1 post-incrementing by the increment contained in rsi0 placing the data in rsd1 as well as acc3
    aux1 = r98;    // Load 32-bit r98 into aux1 accumulator sign-extending 5 guard bits and appending 3 least-significant zero bits Opcodes:

| ALUop: | | aluOperands | | | opcode | | | | |
|---|---|---|---|---|---|---|---|---|---|
| | [18:15] | 14 | 13 | 12 | [11:7] | [6:4] | [3:0] | | |
| | AccDest | | 00 | | Gsrc | 100 | 0011 | AccDest = Gsrc | // ALUop |
| | | sd | 01 | | sampleAGUsrc | | | AccDest = sampleAGUsrc | // ALUop |

| mOp: | mOpcode | | mOperands | | | | | | | |
|---|---|---|---|---|---|---|---|---|---|---|
| | [39:38] | [37:36] | 35 | 34 | 33 | 32 31 30 | 29 28 27 | 26 | | |
| | 00 | AccDest[3] | 0 | | 00 | AccDest[2:0]† | | Gsrc | AccDest = Gsrc | |
| | 01 | 1 | | | 0 | Accdest | | sampleAGUsrc | AccDest = sampleAGUsrc | |

† If AccDest[3] == 0, AccDest[2] must be 1 (AccDest[3:2] = 00 is a different mOp )

Detailed instruction operation:
```
            // Check to see if this is moving from the general-purpose bus (Gsrc)
            if ( source == Gsrc )
                }
                // Place source onto 40-bit Gbus (40 bits required from rShOut to MAC units)
                if ( Gsrc == rShOut)
                    Gbus[39:0] ← (rShOut)[39:0]
                else if ( Gsrc == (r4, r6, r8, . . ., rE) )
                    {
                        Gbus[39:35] ← regPair(Gsrc)[15]
                        Gbus[34:19] ← regPair(Gsrc)[15:0]
                        Gbus[18:0] ← (19) '0'
                    }
                else if ( Gsrc == (r5, r7, r9, . . ., rF) )
                    {
                        Gbus[39:35] ← regPair(Gsrc)[31]
                        Gbus[34:19] ← regPair(Gsrc)[31:16]
                    }

AccDest = {sampleAGUsrc | Gsrc}
            Load the specified accumulator from the register-file or from sample RAM
```

Operation:   AccDest = {sampleAGUsrc | Gsrc }
    where: sampleAGUsrc is rsdN, (rsdN = *rsaN++1), (rsdN *rsN++rsiM) where
        N = 0–3 and M = 0–2
    Gsrc is    r4, r5, r6, . . ., rF, rShOut, r54, r76, r98, . . ., rFE
    AccDest is acc 0–3, aux0–3, acc:aux0–3

Restrictions:   At most one accumulator load operation may be specified in any given instruction. The destination for a parallel MAC-unit add must not be the same as that for an accumulator load (the result will be an indeterminate value in the dest. acc). Due to the MAC-unit mode, it may not be possible for the assembler to detect this conflict, but it can always produce a warning/error when a collision is possible/definate.
If a Gsrc register (register-file or rShOut register) is being loaded into an accumulator, a parallel multiply instruction may not specify srcx from a register-file register (multiplier srcx also uses the sp_gx bus to access register-file registers).
If a sampleAGUsrc specifying a sample memory load (. . . *rsaN . . .) is being loaded into an accumulator, no multiply instruction specifying srcy from the sample AGU may be specified in parallel with this instruction. A sample store may not be specified in either a parallel operation nor in the immediately preceding instruction. Also note that the sample address register (rsa0–3) and any sample increment register used (rsi0–2) must be loaded at least 3 cycles before being used in the sample AGU. Table 5 illustrates the relationship between loading sample AGU registers and their use in the sample AGU:

APPENDIX 5-continued

Pipelined sequence illustrating sample AGU register load latency

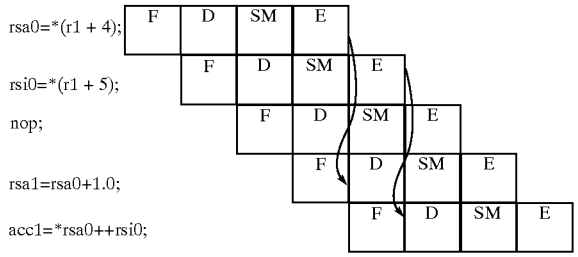

```
rsa0=*(r1 + 4);

rsi0=*(r1 + 5);

nop;

rsa1=rsa0+1.0;

acc1=*rsa0++rsi0;
```

Description:
If a sampleAGUsrc specifying a sample data register read (rsdN) is being loaded into an accumulator, no multiply instruction specifying srcy from the sample AGU may be specified in parallel with this instruction.
The contents of the specified Gsrc register or sample RAM are loaded into the specified AccDest register. All 16-bit sources are inserted onto bits [31:16] of the Gbus with bits [15:0] set to zero. 32-bit sources are inserted directly onto bits [31:0] of Gbus. The Gbus data is then sign-extended from bit 31 to bit 36 and zero-extended from bit −1 to bit −3 to obtain a properly aligned 40-bit word to load into the specified accumulator(s). Note that

```
                Gbus[18:0] ← (19) '0'
            }
        else // full 32-bit Gsrc
            {
                Gbus[39:35] ← (Gsrc)[31]
                Gbus[34:31] ← (Gsrc)[31:0]
                Gbus[2:0] ← (3) '0'
            }
        AccDest[39:0] ← Gbus[39:0]
    }
    else // source is the sample AGU
    {
        // Extract sample AGU operands from instruction word
        if ( mOp form )
            {
                rdSmem ← mOperands[30]
                src_incrSel[1:0] ← mOperands[29:28]
                src_rsaSel[1:0] ← mOperands[27:26]
                dest_rsaSel[1:0] ← mOperands[27:26]
            }
        else // must be an ALUop
            {
                rdSmem ← aluOperands[11]
                src_incrSel[1:0] ← aluOperands[10:9]
                src_rsaSel[1:0] ← aluOperands[8:7]
                dest_rsaSel[1:0] ← aluOperands[8] & aluOperands[14]
            }
        // Read sample memory and post-increment addr. reg., if specified
        if ( rdSmem )
            {
                // Read source sample address register
                switch ( src_rsaSel )
                {
                    case    src_rsa[31:0] ← (rsa0)[31:0]
                    "00":
                    case    src_rsa[31:0] ← (rsa1)[31:0]
                    "01":
                    case    src_rsa[31:0] ← (rsa2)[15:0] & (16) '0'
                    "10":
                    case    src_rsa[31:0] ← (rsa3)[15:0] & (16) '0'
                    "11":
                }
                // Read Sample data size (from proper config register)
                ds[1:0] ← (src_rsaSel[1] == '0') ? rsConfig01[ds]:rsConfig23[ds]
                // Place source address onto the sample address bus and read data
                sp_sa[13:0] ← (src_rsa)[31:18]
                sp_sd[31:0] ← sample memory @ sp_sa[13:0]
                // Mux data according to data size, byte, and word addresses
                if ( ds == DWORD)
                    sp_sdM[31:0] ← sp_sd[31:0]
```

APPENDIX 6

{tb = {!}condX,} if (condX) goto {paddr | *ind} after { }
Conditionally branch to the specified program address or the program address in the indirect register after 0, 2, or 3 delay slots Operation:     {tb = {!}condX,} if (condX) goto {paddr | *ind} after { }
    where:   condX is   tb, !tb, ts, !ts, ex, !ex, n, !n, ov, !ov, z, !z, c, !c, gte, lt, gt, lte, ugt, ulte, always, never
             paddr is    a 16-bit direct address to program memory Restrictions: This instruction may not appear in the delay slot (after clause) of another instruction. The instruction following the after clause must be aligned on a 40-bit instruction word boundary (the hardware never executes part of a dual, packed ALUop instruction). Interrupts are inhibited for the entire execution of the branch instruction including any delay slot instructions Description: If the specified extended condition evaluates to true, branch to the specified program address after executing the 0, 2, or 3 instructions in the after clause (3, 1, or 0 NOPs are inserted to replace the omitted delay slots). If the "tb = {!}condX" form of the instruction is chosen, then the result of the condition-evaluation is copied into the test bit.

Flags affected: If the instruction specified to update TB with the condition-evaluation, update TS, TB.

Example:
```
            goto *ind                      // Link to next stream processing algorithm
                after {
                    rsConfig01 = *(r0 + 2);   // Configure the sample AGU to read a sample stream
                    rsDMA01 = *(r0 + 9);      // Setup for sample FIFO underflow checking
                    rsa0 = *(r0 + 3):         // Load current sample FIFO pointer
                }
      /*     rF = rF - 1;          // Desired code that is scheduled below
       *     if ( (r6 = r5 - r4) < 0) {
       *         ...               // Many instructions in here
       *     } else {
       *         r7 = r7 + 1;
       *         r98 = *r1;
       *     }
       *     r9 = 5;
       */
            r6 = r5 - r4;
            tb = !N, if (N) goto skipBigThenClause after {  //Branch if then clause is taken
                rF = rF + (-1); // Independent instruction moved in to fill delay slot
                // Implement the else clause using the tb set above
                if (tb) r7 = r7 + 1; // Increment count of r6 >= 0
                if (tb) r98 = *r1; // Load r98 from parameter/coef memory at r1
            }
            ...                            // Many instructions in here
         skipBigThenClause:
            r9 = 5;
```

Opcodes:

| WideOp:<br>[30:15] | wideOperands | | | wideOpcode | | |
|---|---|---|---|---|---|---|
| | 14 | 13 | 12 | [11:7] | [6:4] | [3:0] |
| paddr[15:0] | d2 | d0 | | condX | 011 | 0000 if (condX) goto paddr after { } |
| | | | | | 111 | tb = condX, if (condX) goto paddr after { } |
| | | | | | | 0010 tb = !condX, if (condX) goto paddr after { } |
| | d2 | d0 | | condX | 011 | 0100 if (condX) goto *ind after { } |
| | | | | | 111 | tb = condX, if (condX) goto *ind after { } |
| | | | | | | 0110 tb = !condX, if (condX) goto *ind after { } |

Detailed instruction operation:
```
//Optionally insert 1 or 3 NOPs in hardware, if d2 or d0 specified (reduces the
// number of delay slot instructions that must be coded from 3 to 2 or 0)
if ( d2 )
    Insert one NOP (reducing delay slots from 3 to 2 instructions)
else if(d0)
    Insert three NOPs (eliminating delay slots, but still requiring 4 cycles)
// Evaluate the specified condition to determine whether to branch to the spec'd address
switch ( condX[4:1])
    {
        case Z:       condFlag ← Z
        case N:       condFlag ← N
        case OV:      condFlag ← OV
        case EX:      condFlag ← EX
        case C:       condFlag ← C
        case LT:      condFlag ← LT
        case TB:      condFlag ← TB
        case always:  condFlag ← 1
        case TS:      condFlag ← TS
        case LTE:     condFlag ← LT | Z
        case ULTE:    condFlag ← C | Z
    }
condEval ← condFlag ⊕ condX[0]
// If the "tb = {!}condX," variant is selected, set TB to the condition-evaluation
if ( wideOpcode[6] =='1' )
```

APPENDIX 6-continued

```
        TS ← TB  // Save previous value of test-bit into test-bit save flag
        TB ← condEval ⊕ wideOpcode[1]
    // Determine the address to which to branch
    newAddr[15:0] ← (wideOpcode[2] ? ind[15:0]:wideOperands[30:15])
    // If condition evaluated to true, branch to paddr after executing the next 3 instructions
    if ( condEval )
            goto new Addr[15:0] after a 3 cycle delay;
```

{tb = {!}condX,} if (condX) {paddr( ) | *ind( )} after { }
Conditionally call the specified program address or the program address in the indirect register after 2 or 3 delay slots

| | |
|---|---|
| Operation: | {tb = {!}condX,} if(condX) {paddr( ) | *ind( )} after { }<br>where: condX is    tb, !tb, ts, !ts, ex, !ex, n, !n, ov, !ov, z, !z, c, !c, gte, lt, gt, lte, ugt, ulte, always, never<br>             paddr is    a 16-bit direct address to program memory |
| Restrictions: | This instruction may not appear in the delay slot (after clause) of another instruction.<br>The instruction following the after clause must be aligned on a 40-bit instruction word boundary (the hardware never executes part of a dual, packed ALUop instruction).<br>The call/return stack is limited to 16 levels and those levels must be shared between any background task and all interrupt service routines. Due to the implementation of the call-stack, it is not permissible to issue a conditional call that will not he taken when the stack is full. Also note that the FOR-loop uses one level of stack to hold the loop-begin address.<br>Interrupts are inhibited for the entire execution of the call instruction including any delay slot instructions |
| Description: | If the specified extended condition evaluates to true, branch to the specified program address after executing the 0, 2, or 3 instructions in the after clause (3, 1, or 0 NOPs are inserted to replace the omitted delay slots) saving the return address on the call stack. If the "tb = {!}condX" form of the instruction is chosen, then the result of the condition-evaluation is copied into the test bit. |
| Flags affected: | If the instruction specified to update TB with the condition-evaluation, update TS, TB. |
| Example: | subFunction( )                 // Invoke some subfunction w/3 parameters<br>        after {<br>            r32 = *(r0 + 1);     // Load first parameter for subfunction<br>            r54 = *(r0 + 2);     // Load 2nd parameter for subfunction<br>            r76 = *(r0 + 3);     // Load 3rd parameter for subfunction<br>        }<br>        . . .<br>void subFunction( )<br>{<br>        . . .<br>        return;<br>} |
| Opcodes: | |

| WideOp: | | wideOperands | | | wideOpcode | | |
|---|---|---|---|---|---|---|---|
| [30:15] | 14 | 13 | 12 | [11:7] | [6:4] | [3:0] | |
| paddr[15:0] | d2 | d0 | | condX | 011 | 0001 | if (condX) paddr( ) after { } |
| | | | | | 111 | | tb = condX, if(condX) paddr( ) after { } |
| | | | | | | 0011 | tb = !condX, if(condX)paddr( ) after { } |
| | d2 | d0 | | condX | 011 | 0101 | if (condX) *ind( ) after { } |
| | | | | | 111 | | tb = condX, if (condX), *ind( ) after { } |
| | | | | | | 0111 | tb = !condX, if (condX) *ind( ) after { } |

Detailed instruction operation:
```
            // Optionally insert 1 or 3 NOPs in hardware, if d2 or d0 specified (reduces the
            // number of delay slot instructions that must be coded from 3 to 2 or 0)
            if ( d2 )
                    Insert one NOP (reducing delay slots from 3 to 2 instructions)
            else if (d0)
                    Insert three NOPs (eliminating delay slots, but still requiring 4 cycles)
            Insert "switch (condX[4:1])" block from the detail of "if(condX)goto paddr after { }"
                    on page 149.
            condEval ← condFlag ⊕ condX[0]
            // If the "tb = {!}condX," variant is selected, set TB to the condition-evaluation
            if ( wideOpcode[6] == '1')
                    {
                        TS ← TB   // Save previous value of test-bit into test-bit save flag
                        TB ← condEval ⊕ wideOpcode[1]
                    }
            // Determine the address to which to call
            newAddr[15:0] ← (wideOpcode[2] ? ind[15:0]:wideOperands[30:15])
            After a 3 cycle delay (during the execute cycle of the call instruction):
                    // The address to be saved onto the call stack is that of the 1st instruction after
                    // the after { } clause.
                    store (pc)+1 on the call stack @ the stack pointer
                    // If condition evaluated to true, increment the stack pointer and call paddr
                    if ( condEval)
```

APPENDIX 6-continued

```
{
    Increment the stack pointer
    goto newAddr[15:0]
}
```

{tb = {!}condX,} if (condX) return after { }
Conditionally return from subroutine after 2 or 3 delay slots

| | |
|---|---|
| Operation: | {tb = {!}condX,} if (condX) return after { } |
| | where: condX is tb !tb, ts, !ts, ex, !ex, n, !n, ov, !ov, z, !z, c, !c, gte, lt, gt, lte, ugt, ulte, always, never |
| Restrictions: | This instruction may not appear in the delay slot (after clause) of another instruction. The instruction following the after clause must be aligned on a 40-bit instruction word boundary (the hardware never executes part of a dual, packed ALUop instruction). Interrupts are inhibited for the entire execution of the return instruction including any delay slot instructions |
| Description: | If the specified extended condition evaluates to true, return from subroutine after executing the 0, 2, or 3 instructions in the after clause (3, 1, or 0 NOPs are inserted to replace the omitted delay slots). If the "tb = {!}condX" form of the instruction is chosen, then the result of the condition-evaluation is copied into the test bit. |
| Flags affected: | If the instruction specified to update TB with the condition-evaluation, update TS, TB. |
| Example: | tb = N( r7 – rB );       // Compare r7 to rB |
| | if (Z) return            // Return if r7 == rB |
| |    after { |
| |       if (tb)r9 = r7 + rA; // if ( r7 < rB ) r9 = r7 + rA |
| |       if (tb)r8 = 1;       // if ( r7 < rB ) r8 = 1 |
| |       // Bring an acceptable instruction up from fall-through (an acceptable instr. is one |
| |       // that will not corrupt anything that must be returned to the caller) |
| |    } |
| | . . . |
| Opcodes: | |

```
WideOp:        wideOperands         wideOpcode
[30:15]      14  13  12  [11:7]   [6:4]  [3:0]
             d2  d0       condX    011   1101  if (condX) return after { }
                                   111   tb =
                                          condX,
                                          i f
                                          (condX)
                                          return
                                          after {
                                          }
                                         1111  tb = !condX, if (condX) return after { }
```

Detailed instruction operation:
```
            // Optionally insert 1 or 3 NOPs in hardware, if d2 or d0 specified (reduces the
            // number of delay slot instructions that must be coded from 3 to 2 or 0)
            if ( d2 )
                Insert one NOP (reducing delay slots from 3 to 2 instructions)
            else if ( d0 )
                Insert three NOPs (eliminating delay slots, but still requiring 4 cycles)
            Insert "switch ( condX[4:1])" block from the detail of "if (condX) goto paddr after { }"
                on page 149.
            condEval ← condFlag ⊕ condX[0]
            // If the "tb = {!}condX," variant is selected, set TB to the condition-evaluation
            if ( wideOpcode[6] == '1')
                TS ← TB   // Save previous value of test-bit into test-bit save flag
                TB ← condEval ⊕ wideOpcode[1]
            // If condition evaluated to true, call paddr after executing the next 3 instructions
            if ( condEval )
                {
                After a 3 cycle delay:
                    pop (top of call stack) into newAddr[15:0]
                    goto newAddr
                }
``` tb {'|' |'&'}= condX
Select the desired flag to modify the test bit

| | |
|---|---|
| Operation: | tb {'|' |'&'}= condX |
| | where: condX is tb, !tb, ts, !ts, ex, !ex, n, !n, ov, !ov, z, !z, c, !c, gte, lt, gt, lte, ugt, ulte, always, never |
| Restrictions: | None |
| Description: | The test bit is assigned the desired flag/condition. |
| Flags affected: | TB, TS (TS only affected on "tb =" assignments) |
| Example: | // Evaluate the following C-like conditional statement: |
| | //       if ( ((r4 >= r5) && (r5 >= r6)) \|\| ((r4 < r5) && (r5 < r6)) ) |
| | //             r8 = r8 + 1; |
| | // |

APPENDIX 6-continued

```
                tb = GTE(r4 - r5);        // tb = r4 >= r5
                tb &= GTE(r5 - r6);       // tb = (r4 >= r5) && (r5 >= r6)
                tb = LT(r4 - r5);         // save tb into ts and set tb = r4 < r5
                tb &= LT(r5 - r6);        // tb= (r4 < r5) && (r5 < r6)
                tb |= ts;                 // tb = evaluation of full logical expression
                if ( tb ) r8 = r8 + 1;    // Increment r8, if condition is true
                // Keep track of whether saturation occurred on any result from accumulator
                r54 = acc3 $+>> 0;        // Move result from acc3 into r54
                *r2++1 = r54,, tb = ex;   // Store r54 and keep track of whether sat. occurred in tb
                r76 = acc2 $+>> 0;        // Move result from acc2 into r76
                *r2++1 = r76,, tb |= ex;  // Store r76 and keep track of whether sat. occurred in tb
                nop;                      // Delay slot for store (may not be necessary)
Opcodes:
```

| ALUop: |  | aluOperands |  |  | aluOpcode |  |  |
|---|---|---|---|---|---|---|---|
| [18:15] | 14 | 13 | 12 | [11:7] | [6:4] | [3:0] |  |
|  | 10 | 0 |  | condX | 000 | 0010 | tb = condX |
|  | 00 |  |  |  |  |  | tb \|= condX |
|  | 01 |  |  |  |  |  | tb &= condX |

Detailed instruction operation:
    Insert "switch ( condX[4:1])" block from the detail of "if(condX) goto paddr after { }"
        on page 149.
    condEval ← condFlag ⊕ condX[0]
    // Set TB from flag according to the desired method
    switch (operand[14:13] )
        {
            case 10: TS ← TB        // TB = . . .
                    TB ← condEval
            case 00: TB ← TB | condEval  // TB |= . . .
            case 01: TB ← TB & condEval  // TB &= . . .
        } for (i = {Rm | rcnt}; i >= 0; --i) after { } {i1; i2; . . . paddr:iN;}
    Begin zero-overhead loop to iterate for the count specified in the lower 10 bits of a 16-bit
            register or an 8-bit immediate after 3 delay slots

| | |
|---|---|
| Operation: | for ( i = {Rm \| rcnt}; i >= 0; --i) after { } {i1; i2; . . . paddr:iN;} |
| | where:  Rm is    r0, r1, r2, . . ., rF |
| |             rcnt is   an 8-bit immediate count |
| |             paddr is  a 16-bit direct address to program memory of the last instruction in |
| |                         the FOR loop (which must not be a dual, packed ALUop instr. word) |
| |             {i1; i2; . . . paddr:iN;} is the loop body |
| Restrictions: | This instruction may not appear in the delay slot (after clause) of another instruction. |
| | FOR-loops inhibit interrupts for the entire duration of the loop beginning with the |
| | decode of the FOR instruction. |
| | The beginning of the loop must be aligned on a 40-bit program word boundary. The end- |
| | ing of the loop must be coded as a single 40-bit instruction that requires 1 cycle to exe- |
| | cute (it cannot be a dual-packed ALUOp instruction). The assembler will code two 16-bit |
| | ALUops in the body of a loop as two 40-bit instructions using the parallel mOp, aOp, |
| | and ALUop instruction format with a NOP specified for mOp and aOp. |
| | At least 2 instructions must follow the end of the after clause of a branch or call instruc- |
| | tion before the end of a containing FOR-loop. See the 2nd example on the next page. |
| | Loop repetition count is limited to 8 bits (maximum of 256 iterations). |
| Description: | Begin a FOR-loop to repeat the body of code in the loop body the number of times spec- |
| | ified in the contents of Rm or rcnt plus one. Note that FOR loops are NOT nestable (the |
| | hardware only supports one FOR loop at a time). |
| Flags affected: | None |
| Example: | // Perform a 24-tap FIR filter convolution |

```
                #segment parameter
                int coefTable[24];
                #segment code
                rsa0 = *(r0 + 3);                        // Load pointer to first sample to convolve
                r3 = &coefTable;                         // Load pointer to table of filter coefficients
                for ( i = 9; i >= 0; --i)                // Execute loop body 10 times (20 taps)
                    after {
                        pr = *r3++1 * (rsd0 = *rsa0++1),,;   // Multiply 1st tap
                        pr = *r3++1 * (rsd0 = *rsa0++1),,;   // Multiply 2nd tap
                        pr = *r3++1 * (rsd0 = *rsa0++1),    // Multiply 3rd tap
                            acc0 = cr16 + pr,;              // Add 1st tap to 16-bit jam rounding const.
                    }
                    {
                        pr = *r3++1 * (rsd0 = *rsa0++1),    // Multiply 4 + 2*(9-i)th tap
                            acc0 = acc0 + pr,;              // Add 2 + 2*(9-i)th tap
                        pr = *r3++1 * (rsd0 = *rsa0++1),    // Multiply 5 + 2*(9-i)th tap
                            acc0 = acc0 + pr,;              // Add 3 + 2*(9-i)th tap
                        }
                        pr = *r3 * (rsd0 = *rsa0++1),       // Multiply 24th tap
                            acc0 = acc0 + pr,;              // Add 22nd tap
```

APPENDIX 6-continued

```
              , acc0 = acc0 + pr,;           // Add 23rd tap
              , acc0 = acc0 + pr,;           // Add 24th and final tap
              r54 = acc0 $+>> 0;             // r54 = convolution result saturated, if over-
                                             //    flow occurred (i.e. guard bits in use)
              // Example of FOR-loop calling a subroutine in its body
              for ( i = 7; i >= 0; --i)      // Execute loop body 8 times
                after {
                  nop;
                  nop;
                  nop;
                }
                {
                  subFunction( );            // call subroutine
                  nop;                       // At least 2 instructions required after the end
                  nop;                       // of the branch/call delay slots and the end of
                                             // the FOR-loop
                }
Opcodes:
```

| WideOp:<br>[30:15]<br>paddr[15:0] | 14 | 13 | 12 | 11 | wideOperands<br>[10:7] | [6:4] | wideOpcode<br>[3:0] | |
|---|---|---|---|---|---|---|---|---|
| | | | | | Rm | 010 | 0000 | for (i = Rm; i >= 0; −i) after { }<br>{i1; i2; . . . paddr:iN;} |
| | | | rcnt[7:0] | | | | 0001 | for (i=rcnt; i >= 0; --i) after { }<br>{i1; i2; . . . paddr:iN;} |

```
Detailed instruction operation:
              // Setup 8-bit FOR loop count (ignores upper 8 bits of Rm, if specified)
              if ( wideOpcode[0] == '0')
                  loopCount[7:0] ← (Rm)[7:0]
              else
                  loopCount[7:0] ← rcnt[7:0]
              // Setup begin address on the call stack
              After a 3 cycle delay:
                  push (pc)+1 onto the call stack
              // Extract end address (last instruction executed in loop body)
              endAddr[15:0] ← paddr[15:0]
              // Note that due to the 4-stage pipeline, the above assignments are not effective in the
              //   fetch stage until after the 3 delay slot instructions have been executed returnFromIntr after { }
              Return (unconditionally) from interrupt after 0, 2, or 3 delay slots
```

| | |
|---|---|
| Operation: | returnFromIntr after { } |
| Restrictions: | This instruction may not appear in the delay slot (after clause) of another instruction.<br>The instruction following the after clause must be aligned on a 40-bit instruction word<br>boundary (the hardware never executes part of a dual, packed ALUop instruction). |
| Description: | Return from interrupt after executing the 0, 2, or 3 instructions in the after clause. |
| Flags affected: | None?. |
| Example: | // Restore reg-file registerd from register save area and return from interrupt |

```
              #segment parameter
              struct RegSaveArea
              {
                  int r10save;
                  int r32save:
                  int r54save;
                  int r76save;
                  int r98save;
                  int rBAsave;
                  int rDCsave;
                  int rFEsave;
              };
              short statusSave:regSaveAreaPtr;
              #segment code
              r10 = statusSave:regSaveAreaPtr;// Restore reg-save pointer (r0) and status reg (r1)
              nop;                         // Perform last op before restoring regs.
              rFE = r0->rFEsave;           // Restore rFE
              rDC = r0->rDCsave;           // Restore rDC
              rBA = r0->rBAsave;           // Restore rBA
              r98 = r0->r98save;           // Restore r98
              r76 = r0->r76save;           // Restore r76
              r54 = r0->r54save;           // Restore r54
              r32 = r0->r32save,,          // Restore r32
                  status = r1; // Restore status register
              returnFromIntr
                  after {
                      r10 = r0->r10save;   // Restore r10
                      nop;                 // Insure that r10 valid as addr. reg upon return
                      nop;
```

APPENDIX 6-continued

Opcodes:
}

| WideOp: [30:15] | wideOperands | | | | wideOpcode | | |
|---|---|---|---|---|---|---|---|
| | 14 | 13 | 12 | [11:7] | [6:4] | [3:0] | |
| | d2 | d0 | 0 | condX=always (01110) | 011 | 1100 | returnFromIntr after { } |

Detailed instruction operation:
    // Optionally insert 1 or 3 NOPs in hardware, if d2 or d0 specified (reduces the
    // number of delay slot instructions that must be coded from 3 to 2 or 0)
    if ( d2 )
        Insert one NOP (reducing delay slots from 3 to 2 instructions)
    else if ( d0 )
        Insert three NOPs (eliminating delay slots, but still requiring 4 cycles)
    After a 3 cycle delay:
        pop (top of call stack) into newAddr[15:0]
        goto newAddr
        enable interrupts <div align="center">returnFromTrap after { }<br>Return (unconditionally) from trap after 0, 2, or 3 delay slots</div>

| | |
|---|---|
| Operation: | returnFromTrap after { } |
| Restrictions: | This instruction may not appear in the delay slot (after clause) of another instruction. The instruction following the after clause must be aligned on a 40-bit instruction word boundary (the hardware never executes part of a dual, packed ALUop instruction). |
| Description: | Return from trap after executing the 0, 2, or 3 instructions in the after clause. |
| Flags affected: | None. |
| Example: | // Restore reg-file registerd from register save area and return from trap<br>r10 = statusSave:regSaveAreaPtr;// Restore reg-save pointer (r0) and status reg (r1)<br>nop;                       // Perform last op before restoring regs.<br>r54 = r0->r54save;      // Restore r54<br>r32 = r0->r32save,,      // Restore r32<br>    status = r1; // Restore status register<br>returnFromTrap<br>    after {<br>        r10 = r0->r10save;    // Restore r10<br>        nop;                   // Insure that r10 valid as addr. reg upon return<br>        nop;<br>    } |

Opcodes:

| WideOp: [30:15] | wideOperands | | | | wideOpcode | | |
|---|---|---|---|---|---|---|---|
| | 14 | 13 | 12 | [11:7] | [6:4] | [3:0] | |
| | d2 | d0 | 1 | condX=always (01110) | 011 | 1100 | returnFromTrap after { } |

Detailed instruction operation:
    // Optionally insert 1 or 3 NOPs in hardware, if d2 or d0 specified (reduces the
    // number of delay slot instructions that must be coded from 3 to 2 or 0)
    if ( d2 )
        Insert one NOP (reducing delay slots from 3 to 2 instructions)
    else if ( d0 )
        Insert three NOPs (eliminating delay slots, but still requiring 4 cycles)
    After a 3 cycle delay:
        pop (top of call stack) into newAddr[15:0]
        goto newAddr inhibiting traps for 1 cycle
        restore interrupt enable status <div align="center">Disable/enable interrupts<br>Disable or enable interrupts</div>

| | |
|---|---|
| Operation: | Disable/enable interrupts |
| Restrictions: | These instructions may not appear in the delay slot (after clause) of another instruction. |
| Description: | Disable or enable interrupts according to the specified instruction. Note that even though disable interrupt takes 3 cycles to become active, it is protected by being grouped with instructions with delay slots. Ordinarily it would be necessary to restrict what instruction may appear in the first 3 cycles after disabling interrupts, but in this case, there is no problem in allowing other instructions with delay slots such as branches, calls, returns, FOR-loops, etc. Enable interrupts does require delay slots that should almost always be fillable from the last 3 instructions in the critical section. |
| Flags affected: | None |
| Example: | disableIntr;<br>  . . .           // All but last 3 instructions in critical section<br>enableIntr; |

Opcodes:

| WideOp: | wideOperands | wideOpcode |
|---|---|---|

APPENDIX 6-continued

| [30:15] | 14 | 13 | 12 | 11 | 10 | 9 | 8 | 7 | [6:4] | [3:0] | |
|---|---|---|---|---|---|---|---|---|---|---|---|
| | | | | | | | | | 011 | 0011 | disableIntr |
| | | | | | | | | | | 0010 | enableIntr |

Detailed instruction operation:
    // If "disableIntr" specified, set the interrupt mask flag
    if ( wideOpcode[0] == '1' )
        intrMask ← 1
    else // If "enableIntr" specified, clear the interrupt mask flag
        intrMask ← 0

Put the SP to sleep
sleep with or without interrupts enabled

| | |
|---|---|
| Operation: | Put the SP to sleep |
| Restrictions: | This instruction may not appear in the delay slot (after clause) of another instruction. This instruction must be preceded by a pair of NOPs packed into a single 40-bit word and followed by a single 40-bit nop (parallel mOp, aOp, and ALUop all specifying NOP). The assembler should generate the surrounding NOPs automatically. |
| Description: | Put the SP to sleep (low power state) according to the specified instruction. sleepForever disables interrupts before going to sleep and interrupts the host indicating the SP has gone to sleep and may only be awakened with a reset (useful for fatal errors). |
| Flags affected: | None |
| Example: | // labelToForceAlignment: // generated by assembler<br>// nop; nop:   // generated by assembler<br>sleep:<br>// nop;       // generated by assembler |
| Opcodes: | |

| WideOp: | | | wideOperands | | | | | | wideOpcode | | |
|---|---|---|---|---|---|---|---|---|---|---|---|
| [30:15] | 14 | 13 | 12 | 11 | 10 | 9 | 8 | 7 | [6:4] | [3:0] | |
| | | | | | | | | | 011 | 0110 | sleep |
| | | | | | | | | | | 0111 | sleepForever |

Detailed instruction operation:
    // If "sleepForever" specified, set the interrupt mask flag
    if ( wideOpcode[0] == '1' )
        intrMask ← 1
    else // If "sleep" specified, clear the interrupt mask flag
        intrMask ← 0
    go to sleep state {rsaN | rsa(N^1)} = rsaN + {1.0 | rsiM}
Sample address generation unit (AGU) add instruction

| | |
|---|---|
| Operation: | {rsaN | rsa(N^1)} = rsaN + {1.0 | rsiM}<br>where:  rsaN is     the sample AGU address register rsa0–3<br>           rsa(N^1) is  the pair of sample AGU address register rsaN, if N = 0, 1, 2, or 3,<br>                        then (N^1) = 1, 0, 3, or 2, respectively<br>           rsiM is     the desired increment register |
| Restrictions: | This instruction cannot be issued in parallel with a sample memory load or store including a multiply by a sample-memory source. Also note that the source operands (rsaN and possibly rsiM) must be valid in the sample AGU. They become valid in the sample AGU in the third instruction after the instruction which loaded the specified register. |
| Description: | This instruction performs the specified addition using the sample AGU adder. As such, it occurs during the second half of decode and the first half of the sample-memory pipeline stages. |
| Flags affected: | None |
| Example: | // ********EXAMPLE below is incomplete!!!<br>// Setup sample AGU to read from input stream buffer and compute hi *(r0 + 4)<br>// outputs of an FIR filter (odd # of taps >= 5 taps) rounded to 16 bits.<br>// When the filter is completed, trigger a DMA, if there is room for the<br>// next block of samples in the input stream buffer.<br>rsConfig01 = *(r0 + 6);   // Load stream/buffer configuration info.<br>rsDMA01 = *(r0 + 9);    // Load dest. address for next stream<br>rsa0 = *(r0 + 5);         // Load rsa0 with current pointer into stream buffer<br>r54 = *(r0 + 4);         // r5 = # of outputs to produce, r4 =<br>r32 = *(r0 + 3);         // r3 = pointer to first coefficient, r2 = pointer to output buf.<br>nop;                     // Delay from loading rsa0 before using it<br>rsa1 = rsa0 + 1.0;      // Setup for FIR filter<br>for ( i = r2; i >= 0; --i )<br>    after {<br>        pr = *r3++1 * (rsd0 = *rsa0++1),,;  // First multiply, post-incr. advances to first<br>                                              sample to input to next convolution<br>        pr = *r3++1 * (rsd1 = *rsa1++1),,;  // Second multiply, post-incr. advances<br>                                              pointer to this convolution.<br>        pr = *r3++1 * (rsd1 = *rsa1++1),   // Third multiply,<br>           acc0 = cr16 + pr,;<br>    } |

APPENDIX 6-continued

```
            {
                 pr = *r3++1 *(rsd1 = *rsa1++1),
                     acc0 = acc0 + pr,;
                 pr = *r3++1 * (rsd1 = *rsa1++1),
                     acc0 = acc0 + pr,;
            }
        , acc0 = acc0 + pr,;
        , acc0= acc0 ' pr,;
        rsa0?reqDMA = r2;                      // Dummy write checks rsa0 and triggers a
                                                  DMA, if there is room in the input buffer
Opcodes:
```

| ALUop: | | | | aluOperands | | | | aluOpcode | | |
|---|---|---|---|---|---|---|---|---|---|---|
| 18 | 17 | 16 | 15 | 14 | 13 | 12 | [11:7] | [6:4] | [3:0] | |
| | | | sd | 10 | | | sampleAGU add | 100 | 0011 | sd = sampleAGUadd |

Detailed instruction operation:
```
            // Extract sample AGU operands from instruction word
            src_incrSel[1:0] ← aluOperands[10:9]
            src_rsaSel[1:0] ← aluOperands[8:7]
            dest_rsaSel[1:0] ← aluOperands[8] & aluOperands[14]
            // Read source sample address register
            switch ( src_rsaSel)
                {
                    case "00":  src_rsa[31:0] ← (rsa0)[31:0]
                    case "01":  src_rsa[31:0] ← (rsa1)[31:0]
                    case "10":  src_rsa[31:0] ← (rsa2)[15:0] & (16) '0'
                    case "11":  src_rsa[31:0] ← (rsa3)[15:0] & (16) '0'
                }
            // Load source register into dest (in case resulting address does not pass the DMA
            // over/underflow check, this guarantees a valid address register value
            switch (dest_rsaSel )
                {
                    case "00":  rsa0[31:0] ← (src_rsa)[31:0]
                    case "01":  rsa1[31:0] ← (src_rsa)[31:0]
                    case "10":  rsa2[15:0] ← (src_rsa)[31:16]
                    case "11":  rsa3[15:0] ← (src_rsa)[31:16]
                }
            // Perform sample address post-increment (subject to modulo/reverse-
            // carry mode from the appropriate rsConfig register)
            rsPostInc ← (src_rsa) + ((src_incrSel == ++1) ? 1:(rsiM))
            // Writeback resulting sum, if address passes the over/underflow check
            if ( !(rsPostInc is inside region of next DMA transfer AND src_rsa was outside) )
                        switch ( dest_rsaSel )
                        {
                            case "00":  rsa0[31:0] ← (rsPostInc)[31:0]
                            case "01":  rsa1[31:0] ← (rsPostInc)[31:0]
                            case "10":  rsa2[15:0] ← (rsPostInc)[31:16]
                            case "11":  rsa3[15:0] ← (rsPostInc)[31:16]
                        }
```

NOP (mOp )
Select WideOp instruction format/NOP for mOp instruction field

| Operation: | NOP (mOp ) |
|---|---|
| Restrictions: | None |
| Description: | Perform no multiply/memory/move operation in the mOp field or select the WideOp instruction format.. |
| Flags affected: | None |
| Example: | /*empty mOp field*/, acc0 = acc0 + acc2, r4 = acc1; |
| Opcodes: | |

| mOp: | mOpcode | | | mOperands | | |
|---|---|---|---|---|---|---|
| | [39:38] | [37:36] | [35:34] | [33:32] | 31 | [30:36] |
| | 00 | 00 | 00 | 00 | | NOP (mOp ) |
| | | | | | 01 | wideOperand[30:26] Select WideOp instr. format |

Detailed instruction operation:
    Do nothing for the mOp instruction field

NOP (aOp )/extended load/store
Extended load/store/NOP for aOp instruction field

| Operation: | NOP (aOp )/extended load/store |
|---|---|
| Restrictions: | None |
| Description: | For a description of the extended load/store instructions, see the description of load and store in section "9. Move/Load/Store Instructions" on page 103. |
| Flags affected: | None |

APPENDIX 6-continued

Example: acc0 = r54, /*empty aOp field*/, r4 = acc1;
Opcodes:

| aOp: | aOp<br>[25:24] | 23 | addOperands<br>[22:19] | |
|---|---|---|---|---|
| | 00 | 0 | sidx8[7:4] | NOP/ext. load/store |

Detailed instruction operation:
    Perform no add operation, provide 4-bit extension to index for indirect-indexed load/
    store instructions (either as mOp or ALUop).

---

What is claimed is:

1. An audio stream processor comprising:
   a register file for storing information;
   an arithmetic logic unit receiving input information from selected registers in said register file and outputting results to selected registers in said register file;
   a parameter address generator for retrieving parameters and coefficients from parameter memory, said parameter address generator operable to exchange information with said register file;
   a sample address generator for controlling the exchange of audio sample data with sample memory, said sample address generator operable in response to information received from said parameter memory; and
   a dual multiply-accumulate unit for operating on first and second channels of sample data received from said sample address generator unit and information received from selected registers in said register file.

2. The stream processor of claim 1 wherein said register file comprises pairs of registers, said registers of each said pair accessible individually and as a pair.

3. The stream processor of claim 1 wherein said arithmetic logic unit comprises:
   an adder for adding information retrieved from first and second selected registers in said register file; and
   logic circuitry for performing logic operations on information retrieved from a selected one of said registers in said register file.

4. The stream processor of claim 3 wherein said register file is organized as two columns of registers and said adder operates on data received from a selected register in a first one of said columns and a selected register in a second one of said column.

5. The stream processor of claim 3 wherein said parameter address generation is operable in effectuate addressing in a mode selected from the set including indirect post-increment addressing, register indirect index addressing, and direct addressing.

6. The stream processor of claim 3 wherein said parameter address generation comprises:
   an increment register for storing an increment value;
   an index register for storing an index value generated from decoding an instruction; and
   an adder for adding a value from a selected one of said increment and index registers to an address received from a selected register in said register file.

7. The stream processor of claim 6 and further comprising a multiplexer for selecting between an address output from said adder and an address received directly from a selected one of said registers in said register file.

8. The stream processor of claim 3 wherein said sample address generator comprises:
   at least one address register for storing an address for a direct memory access to be performed;
   at least one increment register for storing an increment value;
   an adder for adding an address from said address register with said increment value to generate a memory request; and
   a requestor for prioritizing memory requests.

9. The stream processor of claim 8 wherein said requestor comprises:
   an array of storage locations, each location storing information describing a corresponding data stream; and
   a state machine for scanning said information in said array to identify a said stream having a highest priority, said requestor passing a stream number to direct memory access circuitry for accessing said data stream corresponding to said stream number.

10. The stream processor of claim 1 wherein said multiply-accumulate unit comprises:
    a plurality of parallel information processing paths each comprising:
       a multiplier for multiplying first and second words of input information, said multiplier outputting a sum vector and a carry vector;
       a carry-save adder for adding said sum vector, said carry vector and a stored value;
       an adder for adding first and second outputs of said carry-save adder; and
       at least one accumulator for storing an output from said adder.

11. The stream processor of claim 10 wherein said a selected one of said first and second words of input information comprises a selected fraction of information received from a register in said sample address generator.

12. The stream processor of claim 10 wherein at least one of said plurality of information processing paths comprises circuitry for inverting a selected one of said first and second words of input information such that a negative product can selectively be generated by said multiplier and a product of two words of information can be subtracted.

13. An audio information processing subsystem fabricated on a single-integrated circuit chip comprising:
    a stream processor for simultaneously processing multiple streams of audio data;
    a program memory coupled to said stream processor by a first bus for storing instructions for controlling said processing subsystem;
    data memory coupled to said stream processor by a second bus; and direct memory access circuitry for controlling direct memory accesses to a selected one of said program and data memories, said direct memory access circuitry defining a plurality of buffers in said data memory, each buffer associated with one of said data streams.

14. The audio information subsystem of claim 13 wherein said data memory comprises a sample memory for storing audio data samples and a parameter memory for storing parameters for use by said stream processor.

15. The audio information subsystem of claim 13 and further comprising circuitry for interfacing said processing subsystem with an external PCI bus.

16. The audio information subsystem of claim 14 wherein said stream processor comprises:
- dual multiply-accumulate units for concurrently processing parallel information;
- a general arithmetic logic unit for performing arithmetic and logic operations on information in parallel with operations performed by said dual multiply-accumulate units;
- a register file for providing input information to said multiply-accumulate units and said arithmetic logic unit and for storing information output from said multiply-accumulate units and said arithmetic logic unit;
- an address generator for controlling the exchange of information between said parameter memory and said register file; and
- an address generator for controlling the exchange of information between said sample memory and said dual multiply accumulate units.

17. The audio information processing subsystem of claim 13 and further comprising trapping circuitry for monitoring instructions being transferred from said program memory to said stream processor and initiating a program branch in response.

18. The audio information processing subsystem of claim 13 and further comprising input/output ports for exchanging serial audio data with external audio information processing circuitry.

19. The audio information processing subsystem of claim 14 wherein said program memory, said parameter memory, said sample memory and said direct memory access circuitry are coupled to an internal DMA bus.

20. A multiply-accumulate unit comprising:
- a multiply-accumulate path for processing a channel of audio data comprising:
  - first input circuitry for selectively receiving an M-bit wide coefficient word;
  - second input circuitry for selectively receiving an N-bit wide data word;
  - an M-bit by N-bit two's complement multiplier array receiving data and coefficients from said input circuitry and outputting a sum vector and a carry vector in response;
  - a P-bit wide carry-save adder for adding said sum and carry vectors and an accumulator output;
  - a P-bit wide adder for adding first and second outputs of said carry-save adder;
  - at lest one P-bit wide accumulator for storing data output from said adder; and
  - circuitry for selectively feeding-back data from said at least one accumulator to said carry-save adder.

21. The multiply-accumulate unit of claim 20 wherein M is greater than N.

22. The multiply-accumulate unit of claim 20 and further comprising:
- a second multiply-accumulate path for processing a second channel of audio data comprising:
  - first input circuitry for selectively receiving an M-bit wide coefficient word;
  - second input circuitry for selectively receiving an N-bit wide data word;
  - an M-bit by N-bit two's complement multiplier array outputting a sum vector and a carry vector;
  - a P-bit wide carry-save adder for adding said sum and carry vectors and an accumulator output;
  - a P-bit wide adder for adding first and second outputs of said carry-save adder;
  - at least one P-bit wide accumulator for storing data output from said adder; and
  - circuitry for selectively feeding-back data from said at least one accumulator to said carry-save adder.

23. The multiply-accumulate unit of claim 22 wherein an R-bit wide coefficient word presented to said multiply-accumulate unit provides an M-bit coefficient word to each of said first and second paths concurrently.

24. The multiply-accumulate unit of claim 20 wherein said first and second paths are concurrently controllable by a single instruction.

25. The multiply-accumulate unit of claim 20 wherein said first and second paths are controllable by separate instructions.

26. The multiply-accumulate unit of claim 20 wherein said first and second paths are controlled in a single instruction multiple data fashion.

27. The multiply-accumulate of claim 20 is operable to multiply fractional data input by said second input circuitry.

28. The multiply-accumulate of claim 20 wherein said multiply-accumulate path includes circuitry for inverting a data word presented at said second input to effectuate a subtraction.

29. A stream processing system comprising:
- a PCI bus;
- a host processing subsystem coupled to said PCI bus including:
  - a central processing unit;
  - a host memory; and
  - circuitry for interfacing said central processing unit and said host memory with said PCI bus; and
- a stream processing subsystem coupled to said PCI bus including:
  - a stream processor for processing a plurality of streams of data simultaneously received, said stream processor including a direct memory access engine operable to exchange information with said host system using direct memory accesses, said direct memory access circuitry controlling a plurality of buffers in memory, each said buffer associated with a corresponding one of said streams of data; and
  - circuitry for interfacing said stream processor with a source of multiple streams of data.

30. The system of claim 29 wherein said circuitry for interfacing said stream processor and said source of streams of data comprises an audio data interface.

* * * * *